(12) United States Patent
Liu et al.

(10) Patent No.: US 11,552,479 B2
(45) Date of Patent: Jan. 10, 2023

(54) BATTERY CHARGE BALANCING CIRCUIT FOR SERIES CONNECTIONS

(71) Applicant: Inventus Power, Inc., Woodridge, IL (US)

(72) Inventors: Jianfei Liu, Guangdong Province (CN); Jujie Xia, Guangdong Province (CN); Youwu Chen, Guangdong Province (CN); Zhengyi Zhou, Guangdong Province (CN)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/829,775

(22) Filed: Jun. 1, 2022

(65) Prior Publication Data

US 2022/0294238 A1    Sep. 15, 2022

Related U.S. Application Data

(63) Continuation of application No. PCT/CN2022/076500, filed on Feb. 16, 2022, and a
(Continued)

(51) Int. Cl.
*H01M 10/44* (2006.01)
*H01M 10/46* (2006.01)
(Continued)

(52) U.S. Cl.
CPC ..... *H02J 7/00032* (2020.01); *H01M 10/0525* (2013.01); *H01M 10/425* (2013.01);
(Continued)

(58) Field of Classification Search
CPC ......... H01M 10/0525; H01M 10/4257; H01M 10/441; H01M 10/46; H01M 2010/4271;
(Continued)

(56) References Cited

U.S. PATENT DOCUMENTS 3,534,241 A    10/1970   Trenkler
5,504,415 A     4/1996   Podrazhansky et al.
(Continued)

FOREIGN PATENT DOCUMENTS

CN    102104176 A    6/2011
CN    202474131 U   10/2012
(Continued)

OTHER PUBLICATIONS

Jun. 23, 2022—(US) Notice of Allowance—U.S. Appl. No. 17/549,398.
(Continued)

*Primary Examiner* — Edward Tso
(74) *Attorney, Agent, or Firm* — Banner & Witcoff, Ltd.

(57) ABSTRACT

Systems and methods are described for managing charging and discharging of battery packs. In one or more aspects, a system and method are provided to minimize overcharging of battery cells of specific battery chemistries while still enabling fast charging cycles. In other aspects, a buck converter may be used to reduce a voltage of power used to charge the cells. In further aspects, a fast overcurrent protection circuit is described to address situations involving internal short circuits of a battery cell or battery pack. In yet further aspects, a bypass circuit is provided in series-connected battery packs to improve the charging of undercharged battery packs while also increasing the efficiency of the overall charging process. In other aspects, a circuit is provided that permits a controller to determine a configuration of battery packs. In yet further aspects, a system may determine a discharge current for a collection of battery packs based on each battery pack's state of health (SOH) and forward that determination to an external device.

16 Claims, 59 Drawing Sheets

Related U.S. Application Data continuation-in-part of application No. 17/395,987, filed on Aug. 6, 2021, which is a continuation of application No. 17/183,422, filed on Feb. 24, 2021, now Pat. No. 11,095,140, which is a continuation of application No. 16/937,931, filed on Jul. 24, 2020, now Pat. No. 10,944,278, which is a continuation of application No. PCT/CN2020/093886, filed on Jun. 2, 2020, said application No. 17/183,422 is a continuation of application No. 16/937,979, filed on Jul. 24, 2020, now Pat. No. 10,944,279, which is a continuation of application No. PCT/CN2020/093886, filed on Jun. 2, 2020, said application No. 17/183,422 is a continuation of application No. 16/938,008, filed on Jul. 24, 2020, now Pat. No. 10,938,221, which is a continuation of application No. PCT/CN2020/093886, filed on Jun. 2, 2020, said application No. 17/183,422 is a continuation of application No. PCT/CN2020/093886, filed on Jun. 2, 2020.

(51) Int. Cl.
  *H02J 7/00* (2006.01)
  *H01M 10/42* (2006.01)
  *H01M 10/48* (2006.01)
  *H01M 10/0525* (2010.01)

(52) U.S. Cl.
  CPC ..... *H01M 10/4257* (2013.01); *H01M 10/441* (2013.01); *H01M 10/482* (2013.01); *H02J 7/007* (2013.01); *H02J 7/0013* (2013.01); *H02J 7/0014* (2013.01); *H02J 7/0029* (2013.01); *H02J 7/0047* (2013.01); *H02J 7/0048* (2020.01); *H02J 7/0063* (2013.01); *H02J 7/00712* (2020.01); *H01M 2010/4271* (2013.01); *H01M 2010/4278* (2013.01)

(58) Field of Classification Search
  CPC ....... H01M 2010/4278; H01M 10/482; H01M 10/425; H02J 7/0063; H02J 7/0048; H02J 7/0029; H02J 7/0047; H02J 7/007; H02J 7/0013; H02J 7/00032; H02J 7/0014; H02J 7/00712
  USPC ....... 320/107, 116, 118, 122, 132, 134, 136, 320/150, 152
  See application file for complete search history.

(56) References Cited

U.S. PATENT DOCUMENTS

| | | |
|---|---|---|
| 6,288,521 B1 | 9/2001 | Meador |
| 6,586,909 B1 | 7/2003 | Trepka |
| 6,771,491 B2 | 8/2004 | Tojo et al. |
| 6,919,707 B2 | 7/2005 | Kawai et al. |
| 6,931,481 B2 | 8/2005 | Montero |
| 7,453,236 B2 | 11/2008 | Eguchi et al. |
| 7,463,008 B2 | 12/2008 | Takahashi |
| 7,525,285 B2 | 4/2009 | Plett |
| 7,617,027 B2 | 11/2009 | Jeong |
| 7,646,167 B2 | 1/2010 | Feng et al. |
| 7,663,341 B2 | 2/2010 | Lee et al. |
| 7,759,904 B2 | 7/2010 | Yasuhito et al. |
| 7,834,595 B2 | 11/2010 | Yasuhito et al. |
| 8,004,238 B2 | 8/2011 | Kim et al. |
| 8,018,205 B2 | 9/2011 | Yasuhito et al. |
| 8,264,201 B2 | 9/2012 | Tae et al. |
| 8,307,223 B2 | 11/2012 | Tae et al. |
| 8,344,687 B2 | 1/2013 | Nishikawa et al. |
| 8,350,529 B2 | 1/2013 | Loncarevic |
| 8,432,132 B2 | 4/2013 | Nakanishi |
| 8,502,503 B2 | 8/2013 | Densham |
| 8,519,670 B2 | 8/2013 | Castelaz et al. |
| 8,547,065 B2 | 10/2013 | Trigiani |
| 8,723,482 B2 | 5/2014 | Dao et al. |
| 8,766,597 B2 | 7/2014 | Nork et al. |
| 8,816,640 B2 | 8/2014 | Yokoura et al. |
| 8,860,372 B2 | 10/2014 | Guang et al. |
| 8,874,298 B2 | 10/2014 | Houchin-Miller et al. |
| 8,898,341 B2 | 11/2014 | Kim et al. |
| 8,912,758 B2 | 12/2014 | Kang et al. |
| 8,963,507 B2 | 2/2015 | Kim et al. |
| 9,000,935 B2 | 4/2015 | Dao et al. |
| 9,002,537 B2 | 4/2015 | Duncan et al. |
| 9,005,788 B2 | 4/2015 | Zhu |
| 9,048,513 B2 | 6/2015 | Butzmann et al. |
| 9,071,049 B2 | 6/2015 | Densham |
| 9,088,052 B2 | 7/2015 | Sim et al. |
| 9,118,192 B2 | 8/2015 | Zhu et al. |
| 9,136,714 B2 | 9/2015 | Tsai |
| 9,219,366 B2 | 12/2015 | Kim |
| 9,236,735 B2 | 1/2016 | Yoo |
| 9,252,464 B2 | 2/2016 | Boehm et al. |
| 9,293,935 B2 | 3/2016 | Lee et al. |
| 9,296,306 B2 | 3/2016 | Schygge et al. |
| 9,300,016 B2 | 3/2016 | Yun |
| 9,302,595 B2 | 4/2016 | Tabatowski-Bush et al. |
| 9,306,409 B2 | 4/2016 | Yoo |
| 9,337,668 B2 | 5/2016 | Yip |
| 9,431,684 B2 | 8/2016 | Wang et al. |
| 9,436,261 B2 | 9/2016 | Yun |
| 9,438,061 B2 | 9/2016 | Takeyama |
| 9,479,004 B2 | 10/2016 | Mao |
| 9,496,730 B2 | 11/2016 | Gallegos et al. |
| 9,537,328 B2 | 1/2017 | Kim |
| 9,559,389 B2 | 1/2017 | Greef et al. |
| 9,606,187 B2 | 3/2017 | Choi |
| 9,641,002 B2 | 5/2017 | Lavender |
| 9,641,013 B2 | 5/2017 | Lee et al. |
| 9,667,074 B2 | 5/2017 | Farhi et al. |
| 9,692,242 B2 | 6/2017 | Butzmann |
| 9,768,629 B2 | 9/2017 | Jestin et al. |
| 9,772,666 B1 | 9/2017 | Kam et al. |
| 9,787,108 B2 | 10/2017 | Huggins |
| 9,817,467 B2 | 11/2017 | Lee et al. |
| 9,859,712 B2 | 1/2018 | Nishibayashi et al. |
| 9,876,367 B2 | 1/2018 | Trigiani |
| 9,882,401 B2 | 1/2018 | Beaston |
| 9,912,017 B1 | 3/2018 | Kuo et al. |
| 9,923,247 B2 | 3/2018 | Beaston et al. |
| 10,003,214 B2 | 6/2018 | Nasir et al. |
| 10,007,507 B2 | 6/2018 | Huang |
| 10,012,699 B2 | 7/2018 | Muto |
| 10,044,211 B2 | 8/2018 | Seo et al. |
| 10,097,013 B2 | 10/2018 | Norton |
| 10,122,186 B2 | 11/2018 | Nystrom et al. |
| 10,131,042 B2 | 11/2018 | Mergener et al. |
| 10,131,246 B2 | 11/2018 | Demont |
| 10,144,304 B2 | 12/2018 | Dai |
| 10,186,878 B2 | 1/2019 | Pognant-Gros et al. |
| 10,243,923 B2 | 3/2019 | Jo |
| 10,259,336 B2 | 4/2019 | McQuillen et al. |
| 10,270,262 B2 | 4/2019 | Kim et al. |
| 10,270,266 B2 | 4/2019 | Beaston |
| 10,347,952 B2 | 7/2019 | Choi et al. |
| 10,361,571 B2 | 7/2019 | Kim |
| 10,361,573 B2 | 7/2019 | Do et al. |
| 10,396,570 B2 | 8/2019 | Loncarevic |
| 10,414,285 B2 | 9/2019 | Park et al. |
| 10,439,176 B2 | 10/2019 | Choi et al. |
| 10,439,430 B2 | 10/2019 | Chan et al. |
| 10,442,306 B2 | 10/2019 | Sufrin-Disler et al. |
| 10,491,007 B2 | 11/2019 | Kim |
| 10,491,012 B2 | 11/2019 | Kang |
| 10,505,374 B2 | 12/2019 | Kain et al. |
| 10,505,377 B2 | 12/2019 | Jeon |
| 10,532,665 B2 | 1/2020 | Brochhaus |
| 10,536,007 B2 | 1/2020 | Beaston et al. |
| 10,571,523 B2 | 2/2020 | Kim et al. |
| 10,608,444 B2 | 3/2020 | Kaneko |
| 10,627,448 B2 | 4/2020 | Koo et al. |

(56) References Cited

U.S. PATENT DOCUMENTS

| | | | |
|---|---|---|---|
| 10,794,957 | B2 | 10/2020 | Yoon et al. |
| 10,879,717 | B2 | 12/2020 | Yang et al. |
| 10,938,221 | B1 | 3/2021 | Tenorio |
| 10,944,278 | B1 | 3/2021 | Kang et al. |
| 10,998,751 | B2 | 5/2021 | Wan et al. |
| 2009/0052109 | A1 | 2/2009 | Stockman |
| 2009/0134840 | A1 | 5/2009 | Yamamoto et al. |
| 2009/0167244 | A1 | 7/2009 | Kurose et al. |
| 2010/0090652 | A1 | 4/2010 | Takeda et al. |
| 2011/0001456 | A1 | 1/2011 | Wang |
| 2012/0194139 | A1 | 8/2012 | Sasaki et al. |
| 2012/0223722 | A1 | 9/2012 | Ueda et al. |
| 2013/0033793 | A1 | 2/2013 | Takeda |
| 2013/0320772 | A1 | 12/2013 | Qiao et al. |
| 2015/0221993 | A1 | 8/2015 | Wang et al. |
| 2015/0222132 | A1 | 8/2015 | Shikatani et al. |
| 2016/0172901 | A1 | 6/2016 | Hsieh et al. |
| 2016/0359329 | A1 | 12/2016 | Kim et al. |
| 2017/0194673 | A1 | 7/2017 | Jeon |
| 2017/0214256 | A1 | 7/2017 | Hardy |
| 2017/0288422 | A1 | 10/2017 | Yang et al. |
| 2017/0345101 | A1 | 11/2017 | Beaston |
| 2018/0198291 | A1 | 7/2018 | Kuo et al. |
| 2018/0233928 | A1 | 8/2018 | Li |
| 2018/0278066 | A1 | 9/2018 | Kurahashi et al. |
| 2018/0323623 | A1 | 11/2018 | Nysen |
| 2018/0342772 | A1 | 11/2018 | Wei |
| 2019/0042228 | A1 | 2/2019 | Nolan et al. |
| 2019/0052109 | A1 | 2/2019 | Sturnfield |
| 2019/0067755 | A1 | 2/2019 | Kim et al. |
| 2019/0115769 | A1 | 4/2019 | Chen et al. |
| 2019/0129369 | A1 | 5/2019 | Song et al. |
| 2019/0152342 | A1 | 5/2019 | Shen et al. |
| 2019/0160972 | A1 | 5/2019 | Zeiler et al. |
| 2019/0227863 | A1 | 7/2019 | Cho et al. |
| 2019/0229376 | A1 | 7/2019 | Petrakivskyi et al. |
| 2019/0229377 | A1 | 7/2019 | Kim |
| 2019/0237816 | A1 | 8/2019 | Kim et al. |
| 2019/0252735 | A1 | 8/2019 | Sung et al. |
| 2019/0267815 | A1 | 8/2019 | Hidaka et al. |
| 2019/0273293 | A1 | 9/2019 | Kim et al. |
| 2019/0285699 | A1 | 9/2019 | Weidner et al. |
| 2019/0356025 | A1 | 11/2019 | Sung et al. |
| 2019/0356140 | A1 | 11/2019 | Sung |
| 2019/0361075 | A1 | 11/2019 | Lee et al. |
| 2019/0363552 | A1 | 11/2019 | Choi |
| 2019/0379214 | A1 | 12/2019 | Loncarevic |
| 2020/0036194 | A1 | 1/2020 | Park et al. |
| 2020/0052503 | A1 | 2/2020 | Statman |
| 2020/0059106 | A1 | 2/2020 | Karlsson et al. |
| 2020/0067323 | A1 | 2/2020 | Jeon et al. |
| 2020/0076007 | A1 | 3/2020 | Jeon et al. |
| 2020/0083720 | A1 | 3/2020 | Kain et al. |
| 2020/0119564 | A1 | 4/2020 | Lee |
| 2020/0136197 | A1 | 4/2020 | Bossi |
| 2020/0144679 | A1 | 5/2020 | Kam et al. |
| 2020/0144871 | A1 | 5/2020 | Wan |
| 2020/0227925 | A1 | 7/2020 | Park |
| 2020/0244075 | A1 | 7/2020 | Park et al. |
| 2020/0366103 | A1 | 11/2020 | Zhou et al. |
| 2021/0006076 | A1 | 1/2021 | Rentel et al. |

FOREIGN PATENT DOCUMENTS

| | | | |
|---|---|---|---|
| CN | 103199579 | A | 7/2013 |
| CN | 103390921 | A | 11/2013 |
| CN | 103647258 | A | 3/2014 |
| CN | 104201749 | A | 12/2014 |
| CN | 104646107 | A | 6/2016 |
| CN | 106143366 | A | 11/2016 |
| CN | 106253363 | A | 12/2016 |
| CN | 206820541 | U | 12/2017 |
| CN | 109193050 | A | 1/2019 |
| CN | 107275692 | B | 12/2019 |
| CN | 111114380 | A | 5/2020 |
| CN | 111162576 | A | 5/2020 |
| CN | 111488160 | A | 8/2020 |
| CN | 211508677 | U | 9/2020 |
| CN | 112271791 | A | 1/2021 |
| CN | 112737022 | A | 4/2021 |
| DE | 10 2015 004 834 | A1 | 10/2016 |
| EP | 3576621 | B1 | 7/2020 |
| EP | 3783766 | A1 | 2/2021 |
| GB | 2346596 | A | 8/2000 |
| KR | 10-2015-0066222 | A | 6/2015 |
| KR | 101561885 | B1 | 10/2015 |
| KR | 101562015 | B1 | 10/2015 |
| KR | 20170022162 | A | 3/2017 |
| KR | 20170062757 | A | 6/2017 |
| KR | 101788513 | B1 | 10/2017 |
| WO | 2013125850 | A1 | 8/2013 |
| WO | 2018075793 | A1 | 4/2018 |
| WO | 2018225921 | A1 | 12/2018 |
| WO | 201912128 | A1 | 1/2019 |
| WO | 2019009531 | A1 | 1/2019 |
| WO | 2019009535 | A1 | 1/2019 |
| WO | 2019020531 | A1 | 1/2019 |
| WO | 2019022377 | A1 | 1/2019 |
| WO | 2019027190 | A1 | 2/2019 |
| WO | 2019066214 | A1 | 4/2019 |
| WO | 2019074217 | A1 | 4/2019 |
| WO | 2019/138425 | A1 | 7/2019 |
| WO | 2019/205138 | A1 | 10/2019 |
| WO | 2019212128 | A1 | 11/2019 |
| WO | 2019216532 | A1 | 11/2019 |
| WO | 2020076127 | A1 | 4/2020 |
| WO | 2020104277 | A1 | 5/2020 |
| WO | 2021/071655 | A1 | 4/2021 |
| WO | 20212433350 | A1 | 12/2021 |

OTHER PUBLICATIONS

Jun. 10, 2022—(US) Notice of Allowance—U.S. Appl. No. 17/708,564.
Jun. 20, 2022—(US) Notice of Allowance—U.S. Appl. No. 17/708,725.
Sep. 9, 2020 —(US) Non-Final Office Action—U.S. Appl. No. 16/937,931.
Sep. 15, 2020—(US) Non-Final Office Action—U.S. Appl. No. 16/937,979.
Sep. 16, 2020—(US) Ex Parte Quayle Action—U.S. Appl. No. 16/937,008.
Jan. 27, 2021—(WO) International Search Report & Written Opinion—App. No. PCT/CN2020/093886.
Andrea Reindl, et al., Software Update of a Decentralized, Intelligent Battery Management System Based on Multi-Microcomputers, Proceedings of the 2nd Symposium Electronics and System Integration ESI 2020: "Intelligent Systems and their Components: Research and Industrial Application", 2020, pp. 8-19 [retrieved from <https://opus4.kobv.de/opus4-haw-landshut/frontdoor/index/index/docId/207>].
SUAS News, The Market, BatMon: Smartify your drone battery, Jan. 22, 2020, 8 pages, [retrieved from <https://www.suasnews.com/2020/01/batmon-smarlily-your-drone-battery/>].
Phytools, PEAK System, Webpage, printed Aug. 18, 2021, 9 pages [retrieved from <https://phytools.com/collections/peak-system-technik>].
Tracxn Technologies, Webpage, Top Battery Management System Startups, Updated Apr. 13, 2021, 6 pages [retrieved from <https://tracxn.com/d/trending-themes/Startups-in-Battery-Management-System>].
Ng, MF., Zhao, J., Yan, Q et al. Predicting the state of charge and health of batteries using data-driven machine earning Nat Mach Intell 2,161-170 (2020) Abstract only, [<https://doi.org/10.1038/s42256-020-0156-7>].
Jul. 7, 2021—(US) Notice of Allowance—U.S. Appl. No. 17/183,422.
Aug. 2, 2021—(US) Notice of Allowance—U.S. Appl. No. 17/270,885.
Nov. 22, 202—(US) Non-Final Office Action—U.S. Appl. No. 17/466,800.
Nov. 20, 2021—(US) Notice of Allowance—U.S. Appl. No. 17/466,800.
Dec. 20, 20210—(US) Notice of Allowance—U.S. Appl. No. 17/466,800.

(56) References Cited

OTHER PUBLICATIONS

Mengarelli, Kevin, et al., "Lithium-ion Battery Pack Charging Interfaces and Challenges," The Battery Show North America and Electric & Hybrid Vehicle Technology Expo., Inventus Power Oct. 19, 2021, pp. 1-12.
Mar. 23, 2022—(US) Notice of Allowance—U.S. Appl. No. 17/563,916.
Mar. 18, 2022—(US) Notice of Allowance—U.S. Appl. No. 17/563,856.
Datasheet, "TPS2640 42-V, 2-A eFuse with Integrated Reverse Input Polarity Protection" Texas Instruments, TPS2604 Jun. 2021. pp. 1-54.
Jul. 2, 20220—(US) Non-Final Office Action—U.S. Appl. No. 17/830,009.
Aug. 1, 2022—(US) Ex Parte Quayle—U.S. Appl. No. 17/830,140.
Nov. 2, 2022—(WO) International Search Report and Written Opinion—App PCT/CN2022/076500.

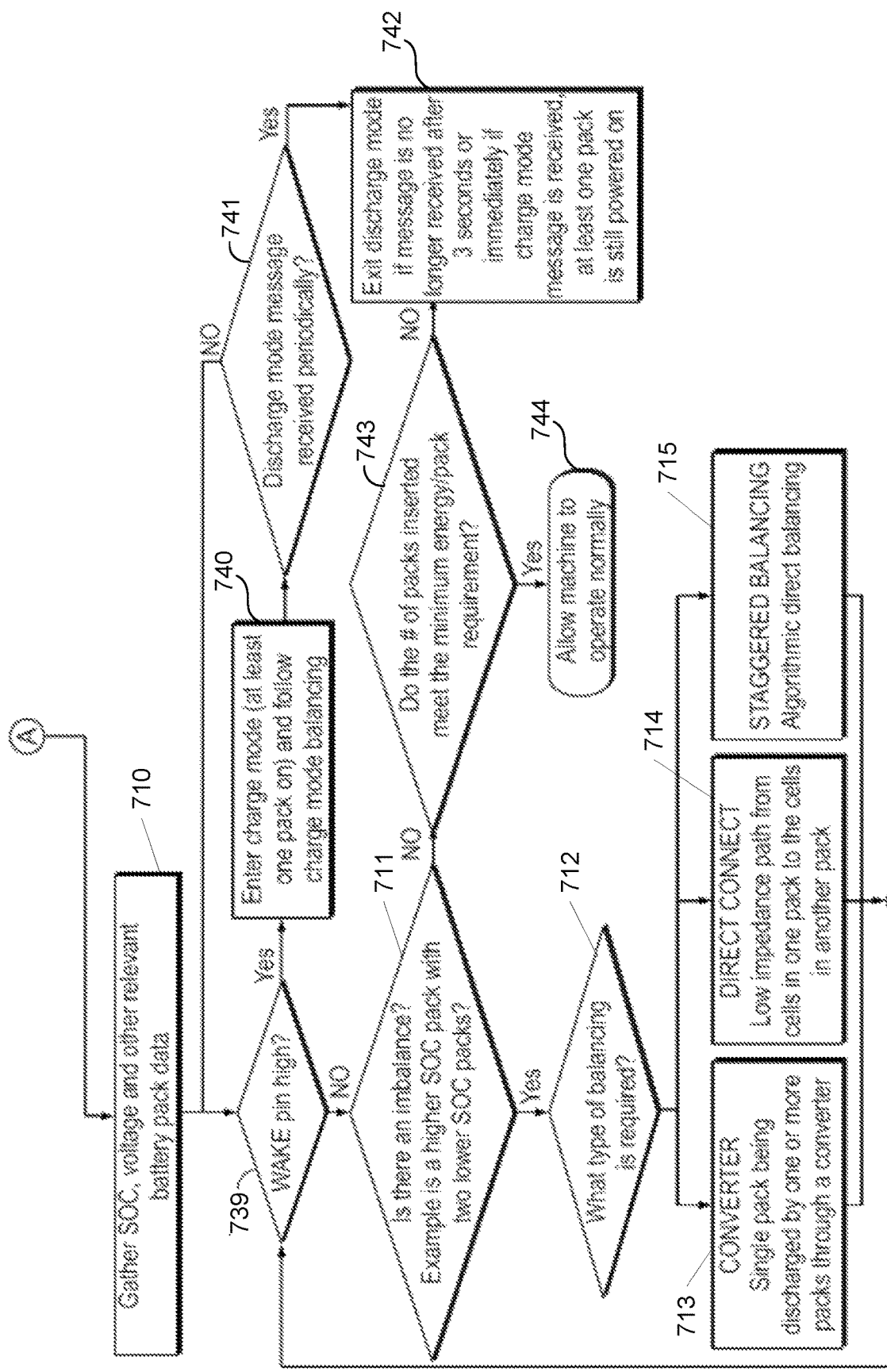
Figure 7C - Continued

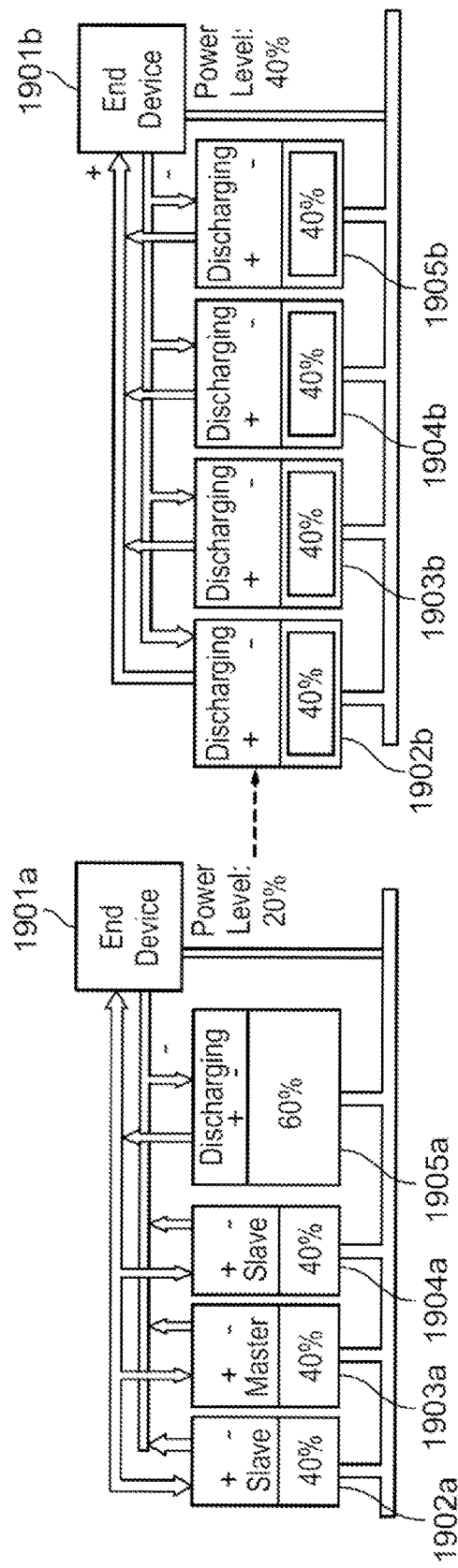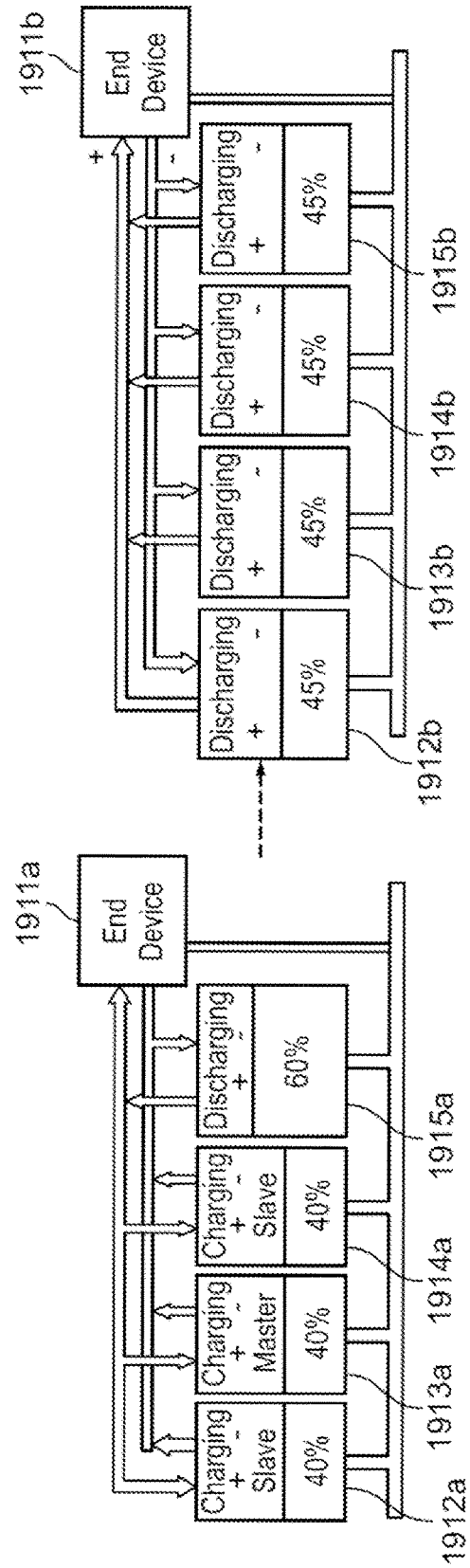
Figure 19A
Figure 19B

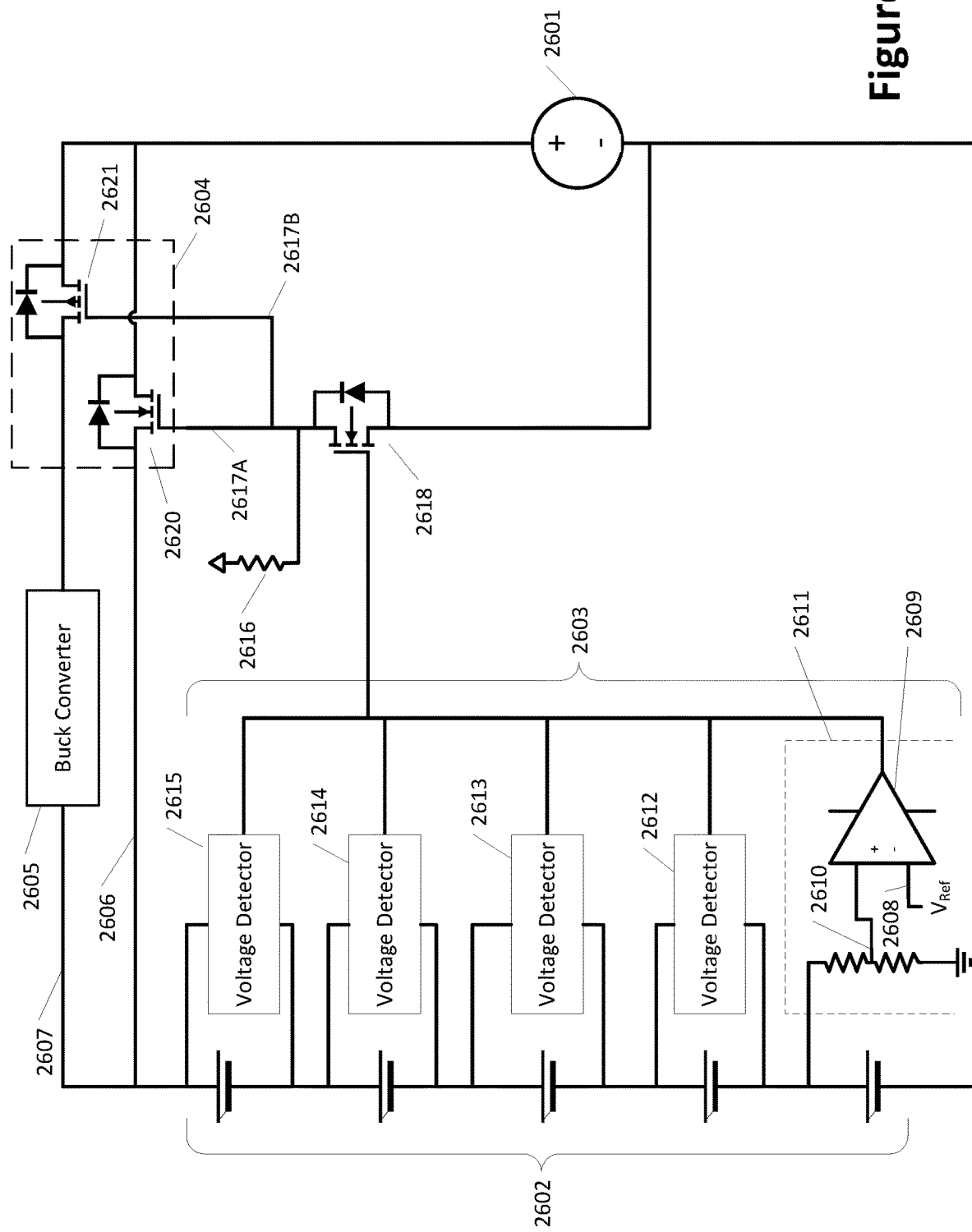

BATTERY CHARGE BALANCING CIRCUIT FOR SERIES CONNECTIONS

CROSS-REFERENCE TO RELATED APPLICATIONS

This application is a continuation of International Patent Application Serial No. PCT/CN2022/076500 with an international filing date of Feb. 16, 2022. This application is also a continuation-in-part application of U.S. patent application Ser. No. 17/395,987, filed Aug. 6, 2021, which is a continuation of U.S. patent application Ser. No. 17/183,422, filed Feb. 24, 2021, now U.S. Pat. No. 11,095,140, which is a continuation of U.S. patent application Ser. No. 16/937,931, filed Jul. 24, 2020, now U.S. Pat. No. 10,944,278, which is a continuation of International Patent Application Serial No. PCT/CN2020/093886 with an international filing date of Jun. 2, 2020; and U.S. patent application Ser. No. 17/183,422, is also a continuation of U.S. patent application Ser. No. 16/937,979, filed Jul. 24, 2020, now U.S. Pat. No. 10,944,279, which is a continuation of International Patent Application Serial No. PCT/CN2020/093886 with an international filing date of Jun. 2, 2020; and U.S. patent application Ser. No. 17/183,422, is also a continuation of U.S. patent application Ser. No. 16/938,008, filed Jul. 24, 2020, now U.S. Pat. No. 10,938,221, which is a continuation of International Patent Application serial no. PCT/CN2020/093886 with an international filing date of Jun. 2, 2020; and all of the aforementioned are herein incorporated by reference in their entireties for all purposes.

TECHNICAL FIELD

One or more aspects relate to electrical systems and, more particularly, to protecting components in those electrical systems from inrush currents.

BACKGROUND

The charging of battery cells, in a single battery pack or across multiple battery packs, can be difficult. In some situations, battery cells with specific battery chemistries are prone to reaching an over-voltage condition while other battery cells in the same array have not yet reached a desired state of charge. Responding to an over-voltage condition is often too late to prevent damage to the battery cells. Similarly, parallel arrangements of battery cells or battery packs can create dangerous situations when one of the cells or packs experiences a short circuit. While that cell or pack may protect itself from catastrophic failure, other cells or packs may experience a cascading overcurrent situation that may untimely wear and/or degrade the life expectancy of the non-shorting cells or packs. Also, continuing to charge series-connected battery packs may create issues by overcharging already charged packs while trying to charge undercharged packs. Further, some operations for battery packs may be improved based on knowledge of how the battery packs are arranged in an environment. However, battery pack manufacturers are not always knowledgeable of all arrangements of their battery packs and cannot optimize specific operations.

SUMMARY

One or more systems and methods are described to address these and other shortcomings. In one or more aspects, a system and method are provided to minimize overcharging of battery cells of specific battery chemistries while still enabling fast charging cycles. In one or more aspects, a buck converter may be used to reduce a voltage of power used to charge the cells. In other aspects, a fast overcurrent protection circuit is described to address situations involving internal short circuits of a battery cell or battery pack. In further aspects, a bypass circuit is provided in series-connected battery packs to improve the charging of undercharged battery packs while also increasing the efficiency of the overall charging process. In yet other aspects, a circuit is provided that permits a controller to determine a configuration of battery packs. In yet further aspects, a system may determine a discharge current for a collection of battery packs based on each battery pack's state of health (SOH) and forward that determination to an external device.

These features, along with many others, are discussed in greater detail below.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

FIG. 19A shows an example of a plurality of battery packs discharging in order to electrically power an end device in accordance with an embodiment. FIG. 19B shows an example of a plurality of battery packs discharging in order to electrically power an end device in accordance with an embodiment.

FIG. 26 shows a battery pack having a buck converter with multiple voltage detectors.

Figure 1:
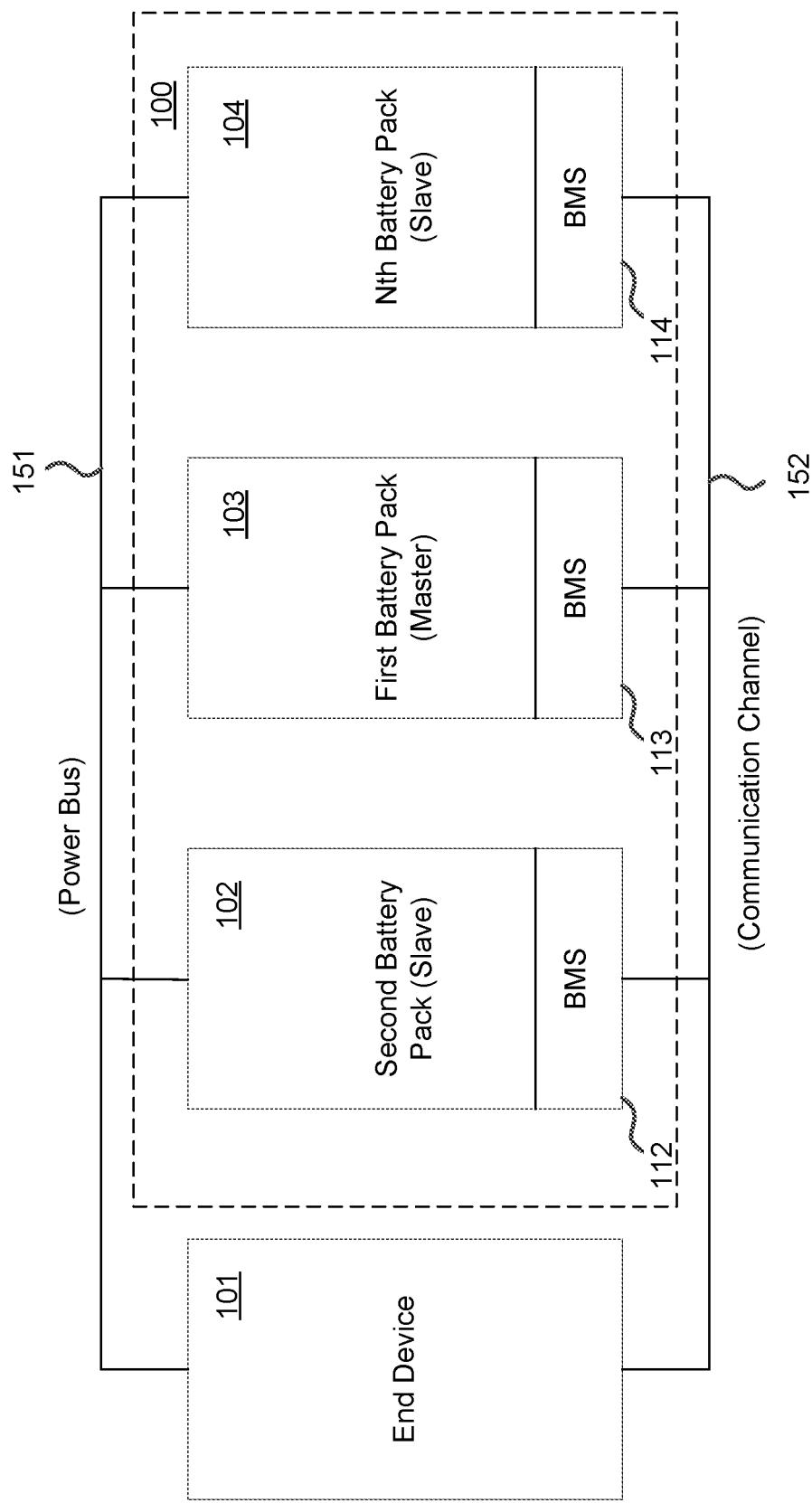
FIG. 1 shows an end device electrically powered by a plurality of battery packs in accordance with an embodiment.

The figures are further described in the following section.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Any sequence of computer-implementable instructions described in this disclosure may be considered to be an "algorithm" as those instructions are intended to solve one or more classes of problems or to perform one or more computations. While various directional arrows are shown in the figures of this disclosure, it the directional arrows are not intended to be limiting to the extent that bi-directional communications are excluded. Rather, the directional arrows are to show a general flow of steps and not the unidirectional movement of information, signals, and/or power.

One or more aspects of the disclosure relate to providing multiple charging pathways for fast charging of batteries having battery chemistries that discouraged use of fast chargers for fear of one battery cell reaching an overvoltage condition before the incoming voltage could be reduced. Additional aspects relate to providing fast disconnection of power supplies to prevent overcurrent situations. Further aspects relate to providing efficient bypass operations in charging of series-arranged battery packs. Yet further aspects relate to determining a configuration of battery packs without prior knowledge of how the packs are to be arranged. In yet further aspects, a system may determine a discharge current for a collection of battery packs based on each battery pack's state of health (SOH) and forward that determination to an external device.

In general, a battery system may comprise a plurality of battery packs that may have the same or similar electrical and electronic components and/or chemistries. Each battery pack may support battery cells (often Li-ion). Battery packs need not require a specific configuration before the battery pack is installed in the battery system. Rather, the battery pack may assume a role of either a master (e.g., a primary) battery pack or a slave (e.g., a secondary) battery pack after the battery pack is inserted into the system and commences activity on the communication channel without user intervention.

With another aspect, the battery system need not utilize an external battery management system. Rather, each battery pack may include an internal battery management system that can manage a pack's battery cells and may coordinate via messaging with the other battery packs in the battery system via a communication channel.

With another aspect, a master battery pack may gather battery status information from one or more slave battery packs by messaging over a communication channel. Based on this status information, the master battery pack can appropriately initiate the enabling/disabling of the charging or discharging of battery cells located at the slave battery packs.

With another aspect, a configuration list may be sent by a master battery pack to slave battery packs over a communication channel (for example, serial communication channel such as a controller area network (CAN) bus), where the configuration list may include entries for each of the master and slave battery packs. The entry at the top position can serve as the master battery pack while the other battery packs can serve as slave battery packs. When a battery pack is added or removed, the configuration list can be revised to reflect the change.

With another aspect, battery packs in a battery system may be charge-balanced to mitigate and/or prevent in-rush electrical current that may occur for one or more of a plurality of battery packs in the battery system when there is significant variation of state of charge (SoC) among the battery packs. For example, a large SoC variation may occur when a new battery pack is installed in a battery system, such as when a SoC of the new battery pack is much different (e.g., discharged, fully charged) when compared to the existing battery packs in the battery system. In-rush electrical current can be particularly undesirable with Li-ion batteries since its life may be substantially reduced.

With another aspect, different balancing technique of battery packs are supported in a battery system. Based on the SoC characteristics of the battery packs, one of a plurality of balancing techniques may be selected. Balancing techniques may include, for example, a "smart converter balancing," a "start direct balancing," and/or a "start staggered balancing."

With another aspect, a battery system may support a "limp home mode" when a battery pack in a battery system experiences a catastrophic failure, for example, when its battery cells are characterized by a very low voltage output. An internal battery management system may diagnose the failure and may mitigate the failure by configuring an unused battery pack (if available) in the battery system or by initiating a partial shutdown of the battery system, enabling operation of the equipment to "limp home" under at least partial power.

With another aspect, a battery system supports "smart discharge" in order to power equipment (end device). Battery packs with varying SoC's may be connected to an end device to provide electrical power to the device. However, battery packs that have a large SoC variation cannot be immediately connected together to power the end device and may necessitate charge balancing to be performed. Battery packs are then selectively enabled from a plurality of battery packs in the battery system so that the battery packs can properly discharge.

With another aspect, a battery system supports "smart charge" in order to restore charge to its battery cells. A battery system having battery packs with varying SoC's may be connected to a charger in order to restore the SoC's of each battery pack and to reduce the SoC variability among the battery packs. If the battery packs have a large SoC variation, the battery packs cannot be immediately connected to the charger at the same time. Measures are thus supported to circumvent this situation by enabling charging of selected battery packs at the appropriate time based on dynamic SoC characteristics.

According to an aspect of the embodiments, a battery system with a large-format battery (e.g., a Li-ion battery) powers attached equipment (an end device) by discharging battery cells distributed among a plurality of battery packs. The discharging of the battery cells is controlled in an efficient manner while preserving the expected life of the Li-ion battery cells.

According to another aspect of the embodiments, a battery system may support different advanced technology batteries of different chemistries and/or structures including, but not limited to, Li-ion batteries and solid-state batteries.

Each battery pack internally supports a battery management system (BMS), thus circumventing the need of an external battery management in contrast to traditional approaches. Moreover, each of the battery packs may have identical electrical and electronics components, thus supporting an architecture that easily scales to higher power/energy output as needed by an end device. Battery packs may be individually added or removed, where one of the battery packs serves as a master battery pack and the remaining battery packs serve as slave battery packs. Moreover, configuration of the battery packs may be automatically performed without user interaction. When the master battery pack is removed, one of the slave battery packs is automatically reconfigured to become the master battery pack. Charging and discharging of the battery cells is coordinated by the master (e.g., primary) battery pack with the slave (e.g., secondary) battery packs over a communication channel such as a controller area controller (CAN) bus.

In addition, the battery system may be efficiently charged in order to restore charge to the battery cells while preserving the life expectancy of the battery cells.

Rechargeable medium-to-large format battery packs with battery management systems are providing power for small, portable devices and are also extending to larger mobile and stationary uses. Moreover, transportation applications spanning smaller uses such as scooters to larger ones such as full-size autos are contemplated with rechargeable batteries. Industrial applications are also contemplated as battery-based designs are replacing small internal combustion engines for lawn mowers and yard equipment in both commercial and consumer products. Enabling electrification has several advantages, including but not limited to, elimination of polluting emissions, reduced noise, and lower maintenance needs. Furthermore, self-contained backup power systems for residential and commercial sites are benefiting from battery-based designs which eliminate the issues associated with on-site hydrocarbon-based fuel storage.

FIG. 1 shows end device 101 electrically powered by a plurality of battery packs 100 (battery system) in accordance with an embodiment. Each battery pack 102, 103, and 104 includes its own internal battery management system (BMS) 112, 113, and 114, respectively. Battery packs 102, 103, and 104 are electrically connected to a direct current (DC) power bus 151 (comprising positive and negative connections) so that the voltage presented to end device 101 is essentially the same as the voltage provided by each battery pack 102, 103, and 104 while the electrical current supplied to end device 101 is the sum of individual electrical currents provided by each battery pack. Battery packs 100 may be housed within end device 101, mounted to end device 101, or externally situated with respect to end device 101.

End device 101 may assume different types of devices including, but not limited to, power tools, lawn mowers, garden tools, appliances, and vehicles including forklifts, cars, trucks, and so forth.

Figure 16:
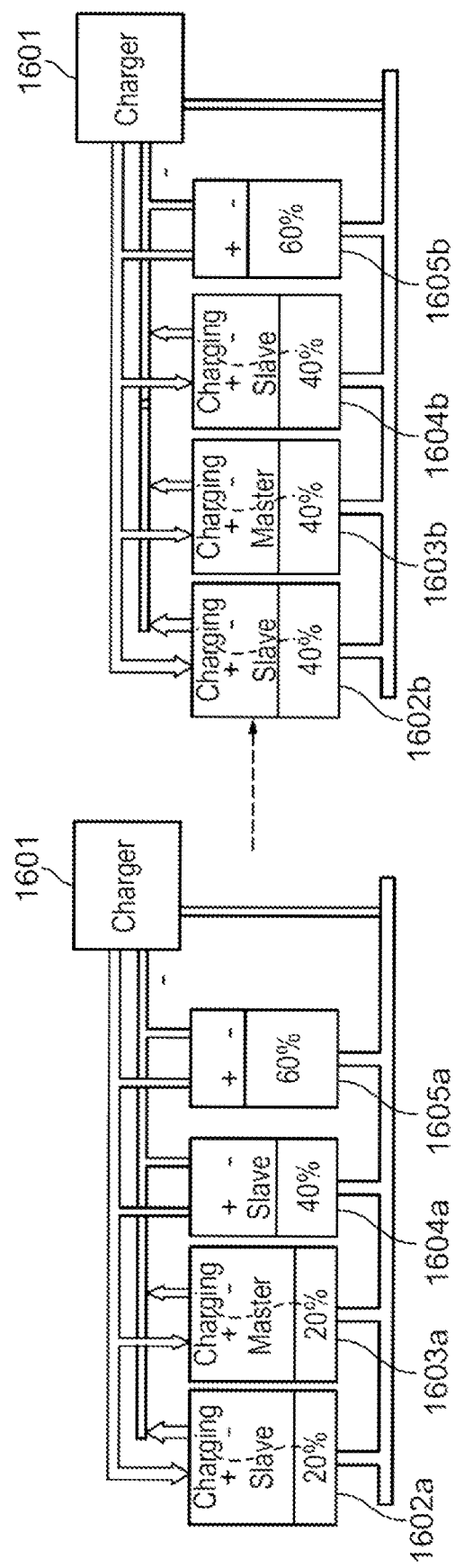
FIG. 16 shows an example of charging a plurality of battery packs in accordance with an embodiment.

Battery management systems 112, 113, and 114 communicate with all of the battery packs as well as end device 101 and/or charger 1601 (as shown in FIG. 16) over communication channel 152. For example, communication channel 152 may comprise a serial communication channel (e.g., a controller area network (CAN) bus) or a parallel communication bus. However, embodiments may support other types of communication channels such as Ethernet, Industrial Ethernet, I²C, Microwire, or Bluetooth Low Energy (BLE). In some cases, the communication channel may support synchronous communication (e.g., CAN) or asynchronous communication (e.g., RS-232, RS-422, RS-485, etc.)

The CAN and Ethernet protocols support the lower two layers of the OSI model while the BLE protocol spans the lower layers as well as the higher layers including the application layer. Consequently, embodiments utilizing protocols such as CAN and Ethernet must support the equivalent higher layers by software applications built on top of the two lower layers.

Embodiments may support different messaging protocols. For example, a protocol may support node to node communication by supporting both a source address and a destination address. The destination address may specify a particular node address or may be a global address so that a message may be broadcast to more than one node. In some cases, a protocol (such as the CAN protocol, the Modbus protocol, etc.) may support only a single source address (e.g., a master address) so that all nodes may process a message broadcast over a communication channel.

Battery packs 102, 103, and 104 may each connect to communication channel 152 in a parallel fashion. However, embodiments may support different arrangements such as pack-to-pack communication on separate busses or a daisy chain connection through each battery pack.

Battery packs 102, 103, and 104 may have similar or identical electrical and electronic components. After being inserted into a battery system, one of the battery packs 102, 103, or 104 may be configured as a master battery pack or a slave battery pack. Moreover, if a battery pack initially serves as a slave battery pack, it may subsequently serve as a new master battery pack if the current master battery pack is removed.

Figure 2A:
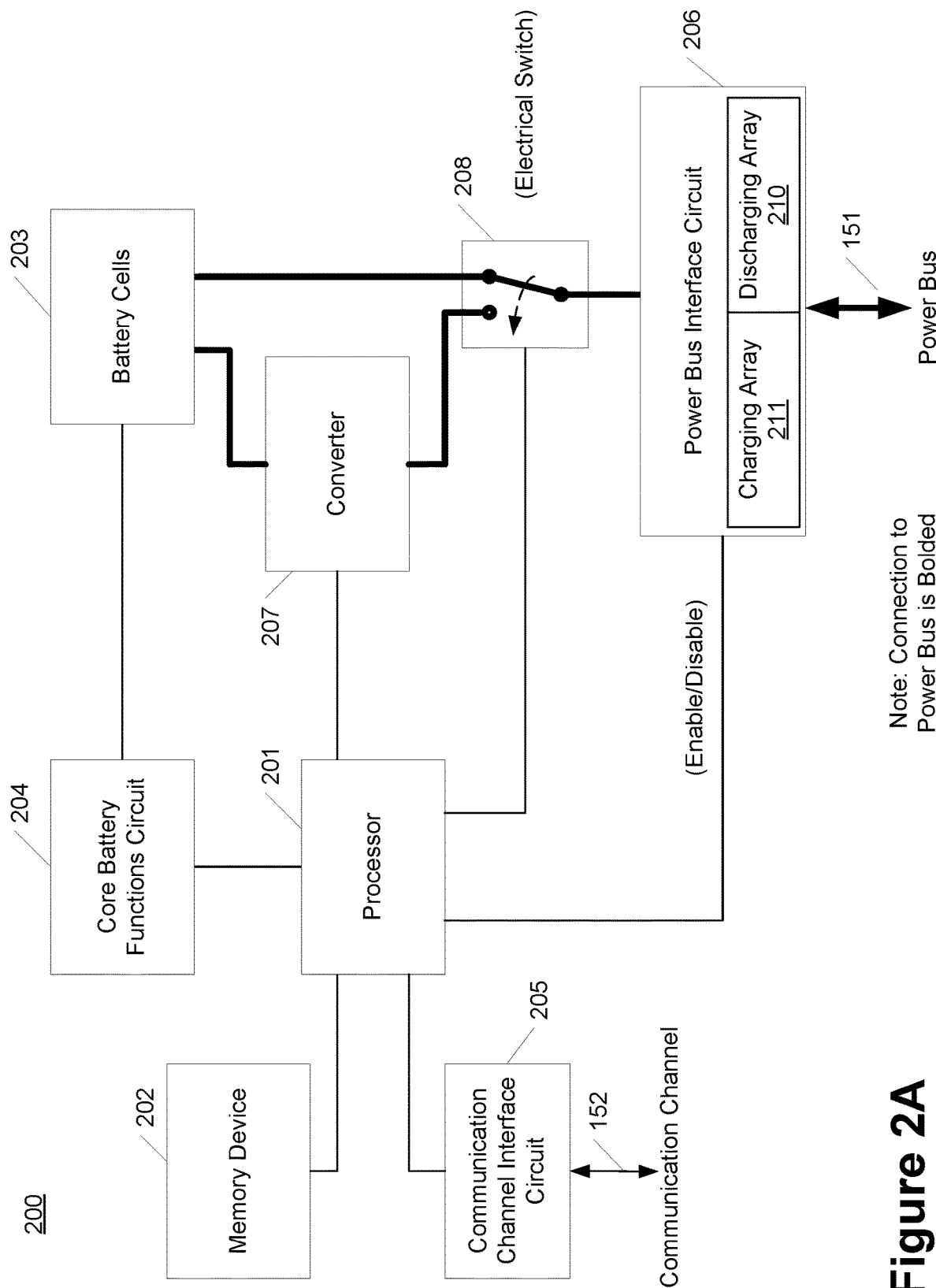
FIG. 2A shows a battery pack with an internal battery management system (BMS) in accordance with an embodiment.

FIG. 2A shows battery pack 200 with an internal battery management system (BMS) in accordance with an embodiment. The battery management system may be implemented by processor 201, which may comprise one or more microprocessors, controllers, microcontrollers, computing devices, and/or the like, executing computer-executable instructions stored at memory device 202.

As will be discussed, battery pack 200 may be configured as either a master battery pack or a slave battery pack without any change to the electrical or electronic components.

The power circuitry (including battery cells 203) of battery pack 200 interacts with power bus 151 through power bus interface circuit 206 when battery pack 200 is discharging, charging, and/or being balanced with respect to the other battery packs as will be discussed.

Battery pack 200 also interacts with communication channel 152 via communication channel interface circuit 205. For example, battery pack 200 may support messaging with other configured battery packs, with the end device being powered by the battery packs, or with a charger charging battery cells 203. Exemplary message flows are shown in FIGS. 6A-6B, 8, 10, 12, 14-15, 18A-18B, 21, and 23A-23B as will be discussed in further detail.

Battery pack 200 supports core battery monitoring and/or management functionality via core battery functions circuit 204. For example, core battery functions may include battery cell status, battery cell balancing, short circuit protection, high temperature cut-off, over-current cut-off, and over-charge protection.

Referring to FIG. 2A, battery cells 203 may include a plurality of battery cells that are connected in series to obtain a desired voltage level. For example, with Li-ion technology, each battery cell may have a nominal voltage of approximately 3.6 volts. With four battery cells connected in series, the total nominal voltage provided by battery pack 200 is approximately 14.4 volts. When battery cells 203 comprises a plurality of battery cells, core battery functions circuit 204 may internally balance the charge among the different battery cells. In addition, battery pack 200 may be charge balanced with respect to the other battery packs in a battery system. The battery packs are often configured in a parallel fashion so that the resultant electrical current offered to an end device is the sum of electrical currents of the battery packs at an approximate voltage level of an individual battery pack.

Status information may include the state of charge (SoC) information, state of health (SoH) information, temperature information, charging time information, discharge time information, and/or capacity information of the battery cells and/or of the battery pack.

As one with skill in the art would appreciate, the SoC is understood to be the level of charge of an electric battery relative to its capacity. The units of SoC are typically percentage points (0%=empty; 100%=full).

The SoH typically does not correspond to a particular physical quality since generally there is no consensus in the industry on how SoH should be determined. However, the SoH is indicative of internal resistance, battery storage capacity, battery output voltage, number of charge-discharge cycles, temperature of the battery cells during previous uses, total energy charged or discharged, and/or age of the battery cells to derive a value of the SoH. Knowing the SoH of the battery cells of battery pack 200 and the SoH threshold of a given end device (application) may provide a determination whether the present battery conditions are suitable for an application and an estimate about the battery pack's useful lifetime for that application.

When performing processes associated with battery management, battery pack 200 may receive or send values of at least the SoC and/or SoH from/to other battery packs as will discussed in further detail.

Power bus interface circuit 206 may comprise a switch circuit such as a semiconductor array 210 (for example, a metal oxide semiconductor field effect transistor (MOSFET) array or other power semiconductor switch device, such as an insulated gate bipolar transistor (IGBT) array, a thyristor array, etc.) that allows electrical current flow from battery pack 200 when battery pack 200 is discharging and semiconductor array 211 that allows electrical current flow to battery pack 200 when battery pack 200 is charging. Arrays 210, 211 are appropriately enabled by processor 201 in response to messaging from the master battery pack controller. (In a situation when battery pack is the master battery pack, messaging is internal to battery pack 200 rather via communication channel 152.) The power MOSFET arrays (e.g., N-Channel MOSFETs) may be used as switches to control power flow to and from the battery cells. The gates of the MOSFET arrays may be controlled by signals generated by a microcontroller and/or a battery management IC.

Power bus interface circuit 206 may be configured to prevent battery pack 200 from being charged or discharged through power bus 206 based on the status of battery cells 203 (for example, SoC, SoH, and/or voltage). Typically, arrays 210 and 211 are disabled when a battery pack is inserted into a battery system so that the battery pack does not charge or discharge until instructed and/or controlled by the master battery pack.

Battery pack 200 interacts with power bus 151 via electrical switch 208 (which may comprise one or more semiconductor devices). As shown in FIG. 2A, direct exposure to power bus 151 bypasses converter 207. However, if battery cells are charged when the battery cells have a small SoC, the battery cells may incur an electrical current in-rush, often resulting in damage or degradation. Consequently, when the battery management system detects such a condition, electrical switch 208 may be configured so that charging of the battery pack 200 is controlled to minimize inrush current from the power bus 151 via the converter 207.

Figure 9:
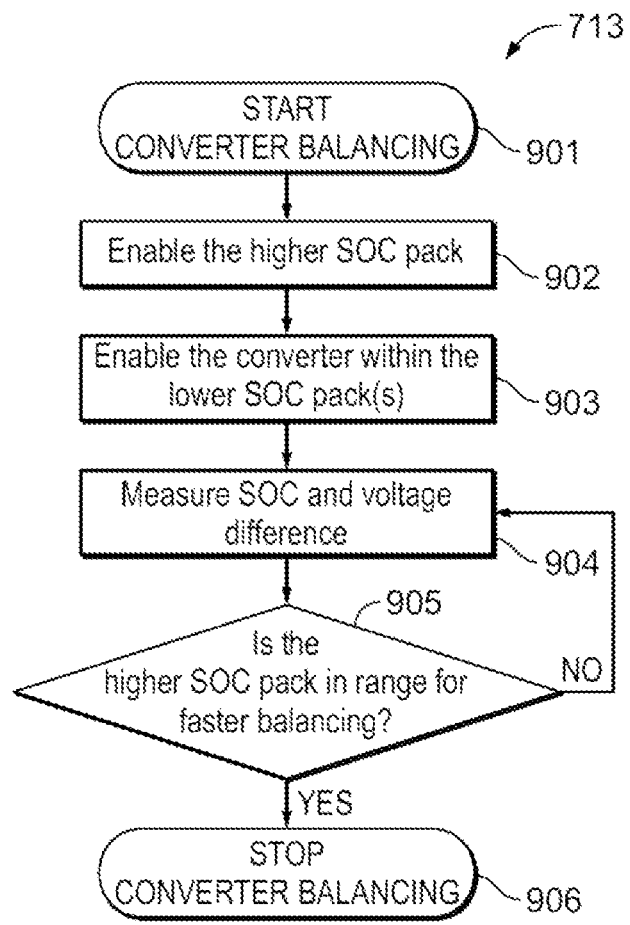
FIG. 9 shows a flowchart for converter balancing with a plurality of battery packs in accordance with an embodiment.
Figure 11:
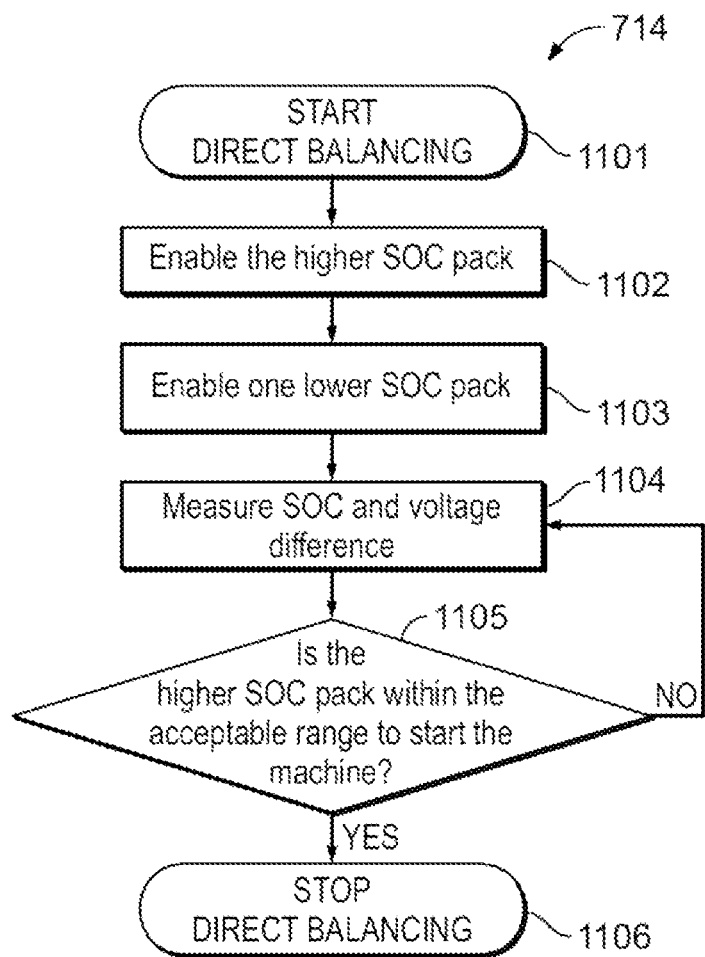
FIG. 11 shows a flowchart for direct balancing with a plurality of battery packs in accordance with an embodiment.

Converter 207 may assume different forms capable of controlling power transfer between the power bus and the cells of the battery pack such as by providing a stepped-down output voltage with respect to the input voltage (e.g., a buck converter, a Ćuk converter, a buck-boost converter, a single-ended primary-inductor converter (SEPIC) converter, etc.) to protect battery cells 203 from an electrical current in-rush and enable battery cells 203 to slowly charge (for example, corresponding to converter balancing flowchart 713 as shown in FIG. 9). However, when converter 207 is bypassed, battery cells 203 may charge at a quicker rate (for example, corresponding to direct balancing flowchart 714 as shown in FIG. 11).

Processor 201 may support battery management processes (for example, processes 500, 700, 713, 714, 715, 1700, 2000, and 2200 as shown in FIGS. 5, 7A, 9, 11, 13, 17, 19, and 22, respectively) discussed herein. Processor 201 may control the overall operation of battery pack 200 and its associated components. Processor 201 may access and execute computer readable instructions from memory device 202, which may assume a variety of computer readable media. For example, computer readable media may be any available media that may be accessed by processor 201 and may include both volatile and nonvolatile media and removable and non-removable media. By way of example, and not limitation, computer readable media may comprise a combination of computer storage media and communication media.

Computer storage media may include volatile and non-volatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

While processor 201 and communication channel interface circuit 205 may be powered by battery cells 203, embodiments may have a separate power source for processor 201 and interface circuit 205. Consequently, battery pack 200 may continue to interact with the other battery packs over the communication channel regardless of the status of battery cells 203.

Figure 2B:
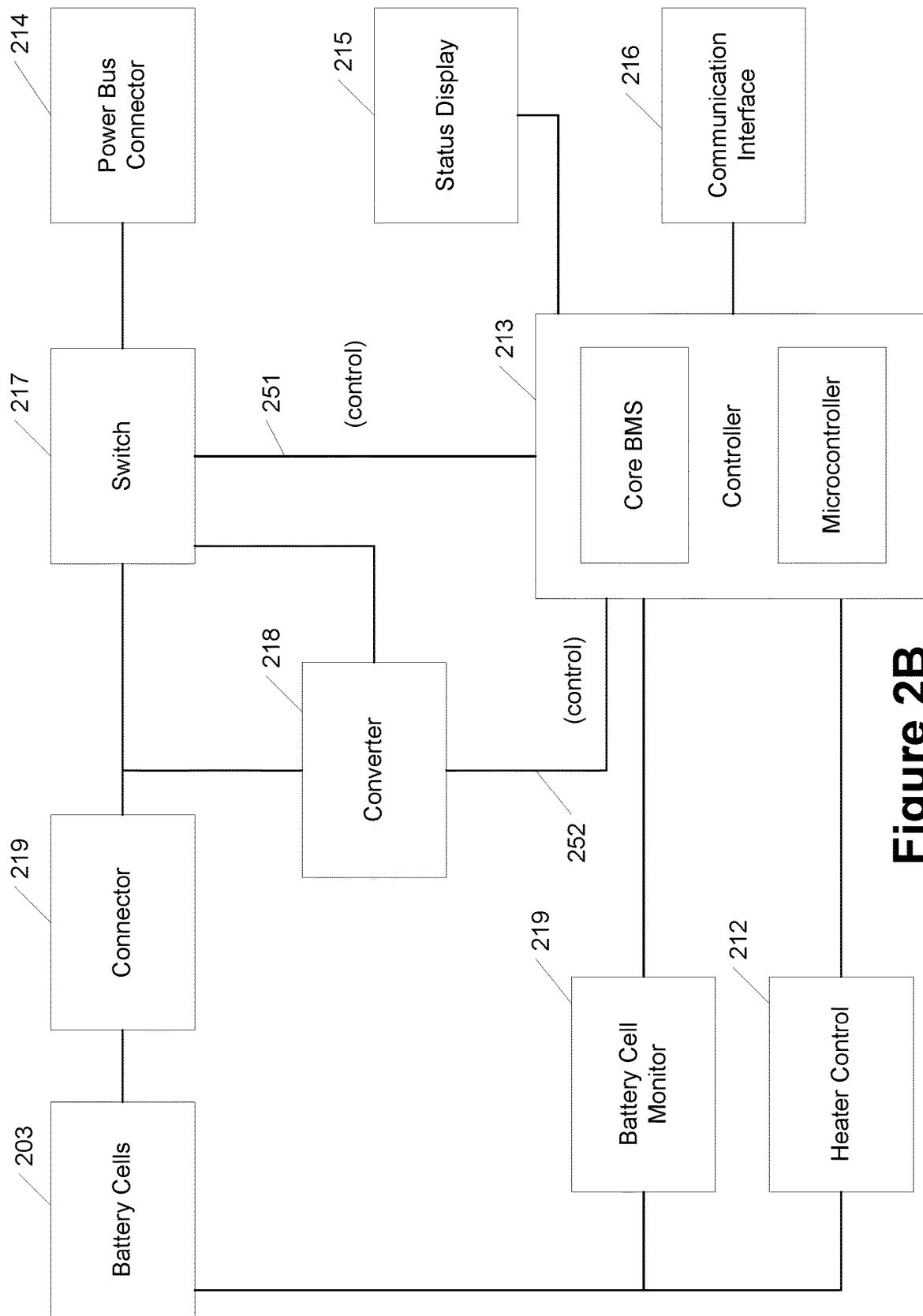
FIG. 2B shows a battery pack with an internal battery management system (BMS) in accordance with an embodiment.

FIG. 2B shows a variation of battery pack 200 shown in FIG. 2A. Battery cells 203 interact with the power bus through power bus connector 214, switch 217, converter 218, and connector 219. Switch 217 may include two sets (arrays) of semiconductor devices (for example, MOSFET's, insulated-gate bipolar transistors (IGBTs), thyristors, and so forth) for allowing electrical current flow in either direction (into the battery pack for charging and out of the battery pack for discharging). Both arrays may be disabled to isolate the battery pack from the power bus. Typically, both arrays are disabled when a battery pack is inserted into a battery system. In addition, enabled converter 218 may be used to reduce an input voltage level to control charging of the battery cells to prevent an electrical current in-rush that may occur in some situations as will be discussed.

Controller 213 executes computer-executable instructions to perform processes discussed herein. For example, controller 213 obtains status information (for example, the SoC value) from battery cells 203 via battery monitor 219, provides battery pack status information via status display 215, and interacts with a communication channel (for example, a CAN bus) via communication bus interface 216.

In addition, a heater control circuit 212 may be used to ensure that the temperature of battery cells 203 does not drop below a minimum value so that battery cells 203 can properly operate as expected.

Figure 3:
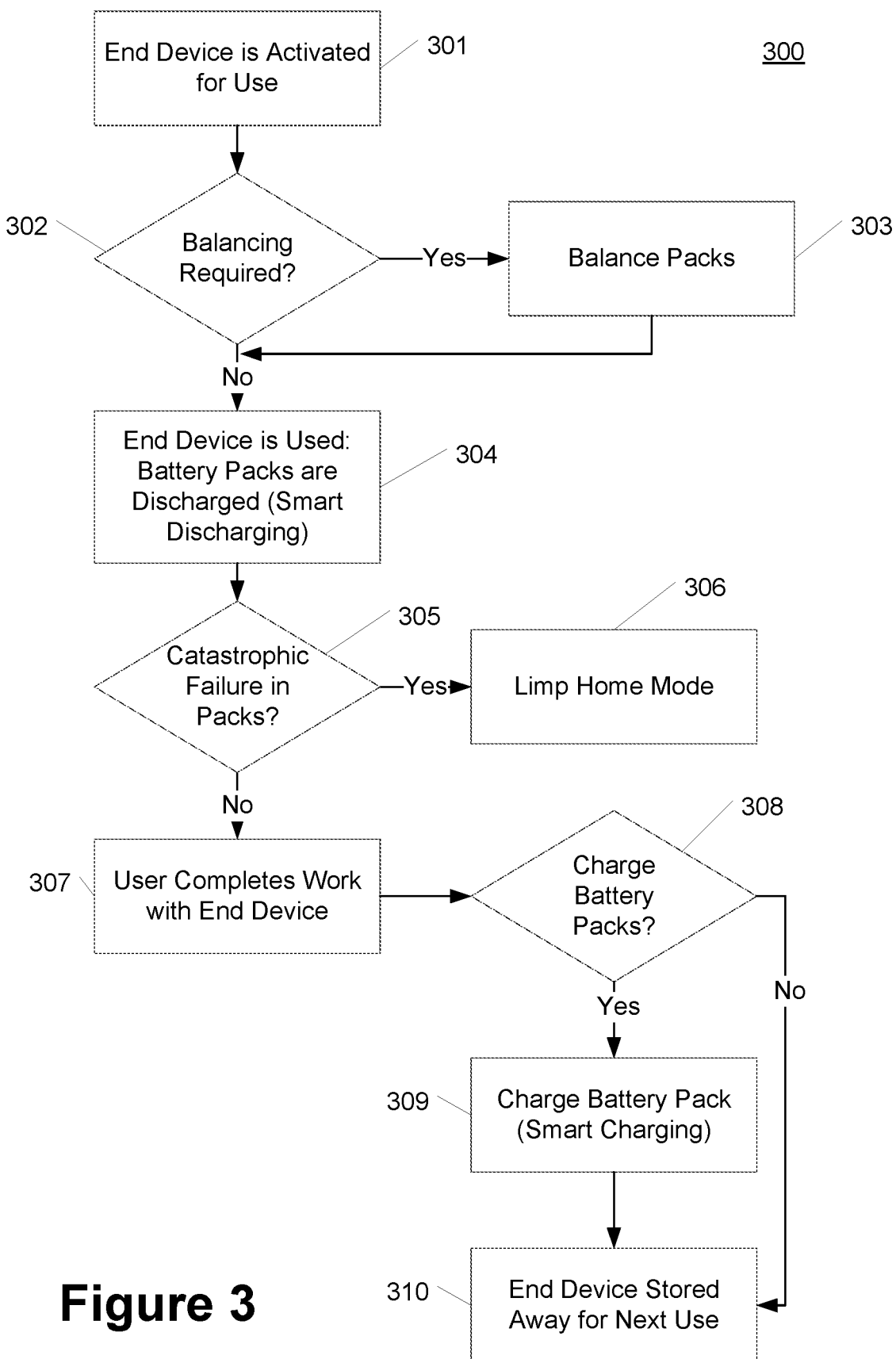
FIG. 3 shows a flowchart for an overall process of electrically powering an end device by a plurality of battery packs in accordance with an embodiment.

FIG. 3 shows flowchart 300 for an overall process of electrically powering an end device (for example, end device 101 as shown in FIG. 1) by a plurality of battery packs (for example, battery packs 100) in accordance with an embodiment.

At block 301, end device 101 is activated. For example, a user may close a battery compartment of end device 101, turn a key, and/or flip a switch to generate an interlock signal.

At block 302, the battery management system of the master battery pack determines whether to balance the battery packs when the battery compartment has more than two battery packs. If so, the difference of charge of the battery packs may be reduced by one or more battery packs discharging to charge one or more of the other battery packs at block 303 as will be discussed in further detail.

After balancing (if needed), the end device is powered by discharging one or more of the battery packs at block 304. For example, based on the power requirements of the end device and the SoC values of the battery packs, the battery management system of the master battery pack may enable the appropriate battery packs.

If a catastrophic failure is detected at block 305 for one of the enabled battery packs while powering the end device, limp home mode operation at block 306 may be initiated in order to continue powering the end device as will be discussed in further detail.

When the user completes using the end device at block 307, block 308 determines whether charging is needed. If so, a charger may be connected to the battery system to restore the battery cells, where charging may be initiated at block 309.

While not explicitly shown, balancing of the battery packs may be performed before charging the battery packs at block 308 when the SoC values of the battery packs are sufficiently different.

With the embodiments, all of the plurality of battery packs may have the same electrical and electronic components. No configuration is typically needed to a battery pack when the battery pack is installed in the battery system. Rather, the battery pack assumes the role of either a master battery pack or a slave battery pack based on processes discussed herein after the battery pack is inserted into the system and the battery pack commences activity on the communication channel. As will be discussed in further detail, a configuration list may be conveyed over the communication channel, where the configuration includes entries for each of the master and slave battery packs.

The processes discussed herein are shown from the perspective of the master battery pack and are typically executed by the master battery pack in the battery system. The other installed battery packs in the battery system serve as slave battery packs. However, the slave battery packs interact with the master battery pack over the communication channel. For example, a slave battery pack provides its battery cell status information and activates/deactivates power switches to interact with the power bus (for example, allowing electrical current (charge) to flow into or from the battery pack) responsive to messaging from the master battery pack. Consequently, while not explicitly shown, there are corresponding processes executed by each of the slave battery packs.

Figure 4:
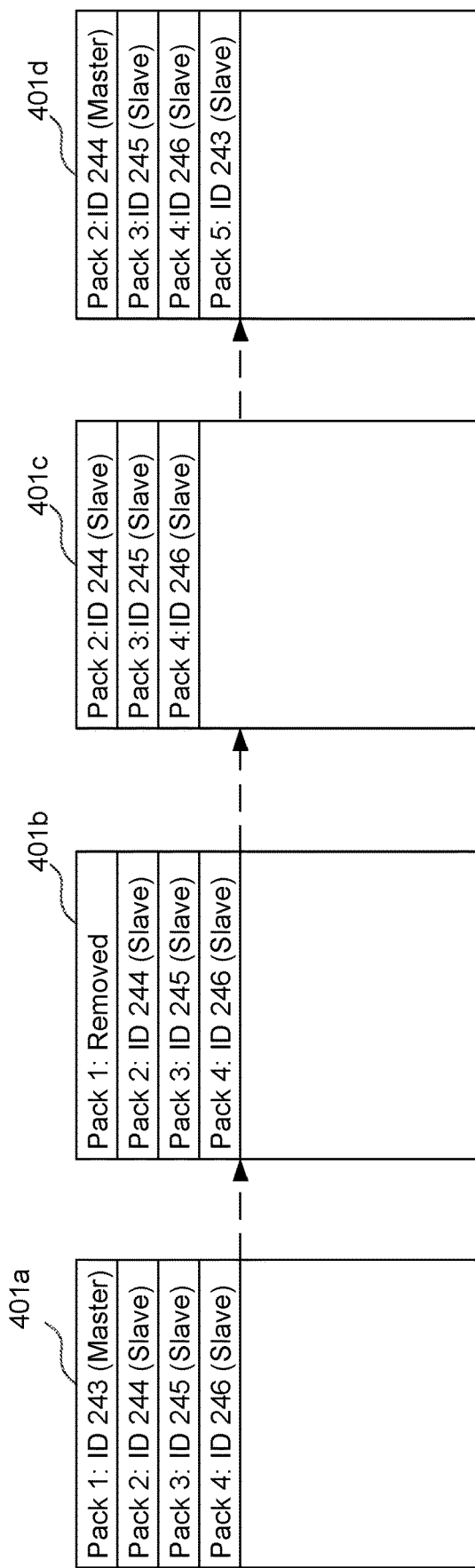
FIG. 4 shows an updating of a configuration list of a plurality of battery packs in accordance with an embodiment.

FIG. 4 shows an updating of configuration list 401a, 401b, 401c, 401d of a plurality of battery packs as different battery packs are inserted into and removed from the battery system. Each battery pack is assigned an identification (ID) in accordance with a standardized process, such as the SAE J1939 Address Claim Procedure and/or the like. For example, configuration list 401a contains four entries: pack 1 (which is configured as the master battery pack) and three slave battery packs (packs 2-4).

As will be discussed in greater detail, the master battery pack gather status information about the other battery packs (the slave battery packs) and consequently instructs the slave battery packs, as well as itself, to discharge or charge in response to the operation situation.

With the embodiment shown in FIG. 4, the first (top) member of configuration list 401a, 401b, 401c, 401d is configured as the master battery pack. When a battery pack is added to the battery system, an entry is created at the bottom of the configuration list for that battery pack. Consequently, the oldest member of configuration list 401a, 401b, 401c, 401d is configured as the master battery pack.

Selecting the oldest (top) member of configuration list 401c may be advantageous to traditional approaches. For example, the number of changes of the master battery packs may be reduced with respect to determining the master battery pack based on the ID value. With the latter approach, a second change would occur from configuration list 401d, where pack 5 would become the master battery pack.

In the installation scenario shown in FIG. 4, pack 1 (which serves as the master battery pack) is removed as shown in configuration list 401b. Consequently, pack 2 (the oldest slave battery pack) becomes the new master battery pack as shown in configuration list 401c. In order to complete the transition, pack 2 may request pack information from the other battery packs to be able to properly instruct the other battery packs.

Subsequently, pack 5 is inserted into the battery system resulting in a new entry being added to configuration list 401d, where ID 243 is the same ID for previously removed pack 1. With embodiment shown in FIG. 4, pack 5 may be old master pack that is reinserted or a new battery pack that is inserted into the battery system.

With some embodiments, when a battery pack is removed from a battery system, battery pack information may be lost. When the battery pack is reinserted, the reinserted battery pack may obtain battery information from the configured battery packs. However, some embodiments may support memory persistence (e.g., flash memory) so that battery pack information is retained at the battery pack even when the battery pack is removed and reinserted.

Figure 5:
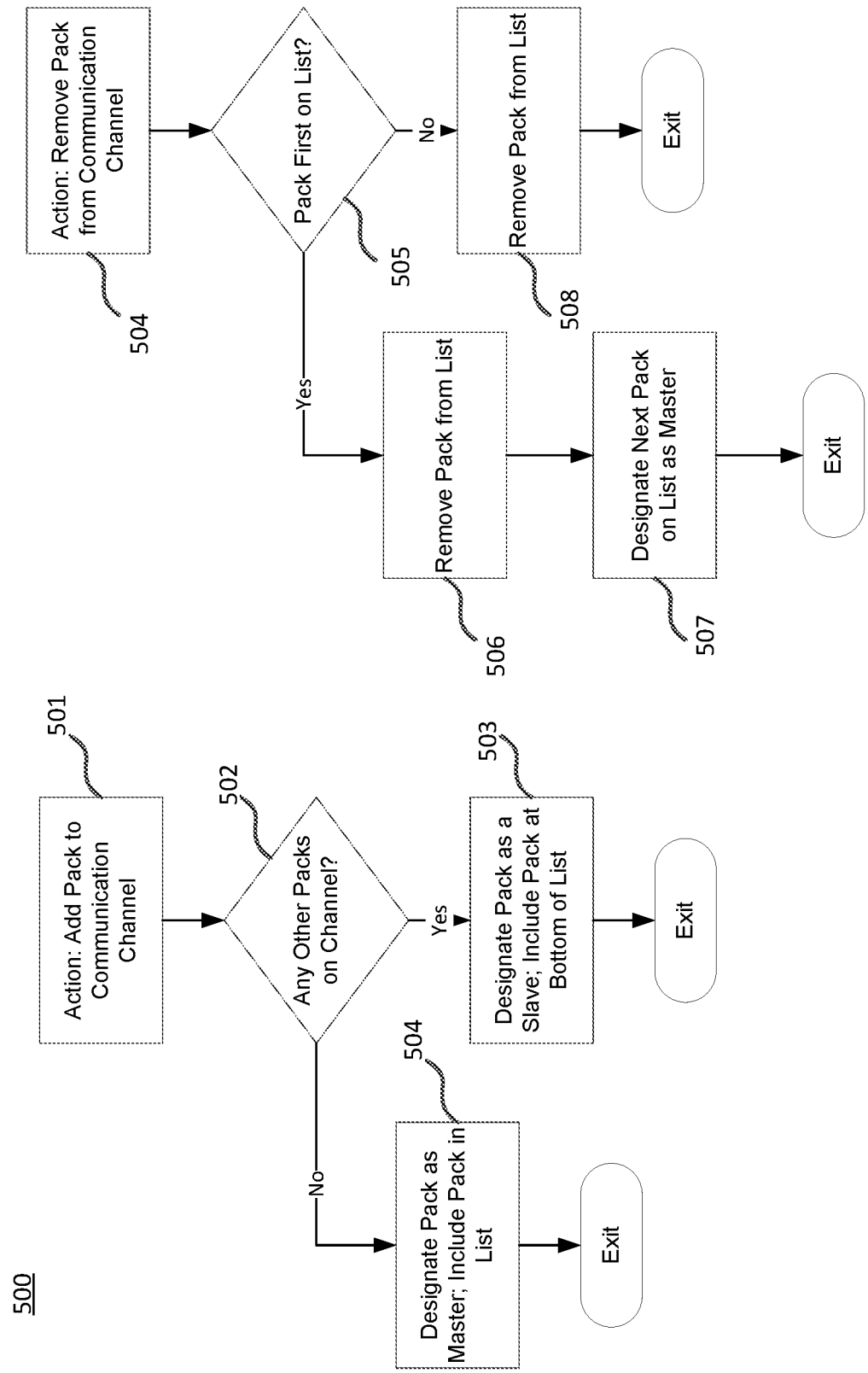
FIG. 5 shows a flowchart for configuring a plurality of battery packs in accordance with an embodiment.

FIG. 5 shows flowchart 500 for configuring a plurality of battery packs in accordance with an embodiment. At block 501, a battery pack is added to the battery system. If no other battery packs are connected to the communication channel, as determined at block 502, an entry is added to the top of the configuration list, and the battery pack becomes the master battery pack at block 504. Otherwise, the added battery pack is added to the bottom of the configuration list and becomes a slave battery pack at block 503.

At block 504, a battery pack is removed from the battery system. If the battery pack is the first member of the configuration list, as determined at block 505, the entry is removed at block 506 and the battery pack corresponding to the next entry is designated as the master battery pack at block 507. Otherwise, the entry for the removed battery pack is deleted at block 508.

Figure 6A:
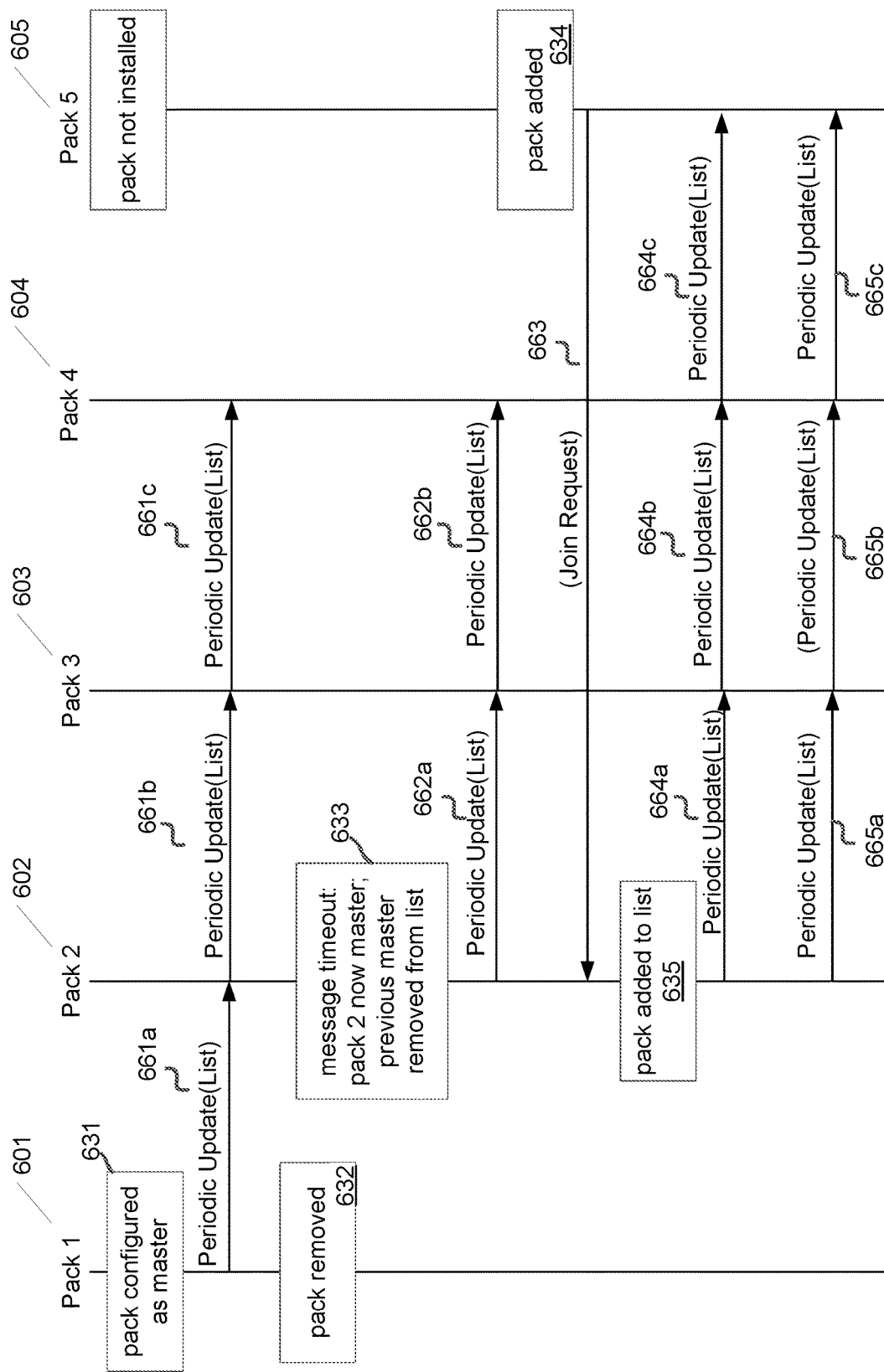
FIG. 6A shows a generic message flow scenario for configuring a plurality of battery packs in accordance with an embodiment.

FIG. 6A shows a generic message flow scenario for configuring a plurality of battery packs in accordance with flowchart as shown in FIG. 5. The generic messages represent messages supported by different communication channels, for example via a controller area network (CAN) bus, Ethernet, Industrial Ethernet, MODBUS, or Bluetooth Low Energy (BLE) and/or the like.

The message flow in FIG. 6A is based on a centralized approach, in which the master battery pack maintains the configuration list and repetitively sends it (for example, periodically) to the other battery packs over a communication channel. However, embodiments (for example, as shown in FIG. 6D) may support a distributed approach, in which each battery pack locally maintains its own configuration list and repetitively broadcasts it over the communication channel. Since a battery pack receives all broadcasts from the other battery packs, the battery pack is able to modify its own configuration list to be consistent with the configuration lists broadcast by the other battery packs.

When pack 601 (pack 1) becomes the master battery pack at event 631, pack 601 sends periodic update messages 661a, 661b, 661c to packs 602, 603, and 604, respectively. If the message protocol supports a single broadcast message (for example, with a global destination address) that is received and processed by all battery packs connected to the communication channel, then only one message is sent by pack 601. Otherwise, pack 601 sends separate messages to packs 602, 603, and 604 (which are configured as slave battery packs).

With some embodiments, messages 661a, 661b, 661c may be sent repetitively but not periodically.

Periodic update message 661a, 661b, 661c may contain configuration information (for example configuration list 401a, 401b, 401c, 401d as shown in FIG. 4). With some embodiments, pack 601 sends broadcast messages periodically. However, if pack 601 were removed (for example, corresponding to event 632), periodic transmission of the update messages would be disrupted.

When the disruption is detected by the oldest slave battery pack (pack 602) at event 633, pack 602 assumes the role of the master battery pack. Consequently, pack 602 removes the top entry of the configuration list (corresponding to pack 601) and periodically sends the revised configuration list via update message 662a, 662b.

When pack 605 (pack 5) is added at event 634, pack 605 sends join request 663 in accordance with the SAE J1939 address claim procedure. Consequently, pack 605 is added by pack 602 (currently the master battery pack) at event 635, and pack 602 periodically sends update messages 664a, 664b, 664c and 665a, 665b, 665c.

Figure 6B:
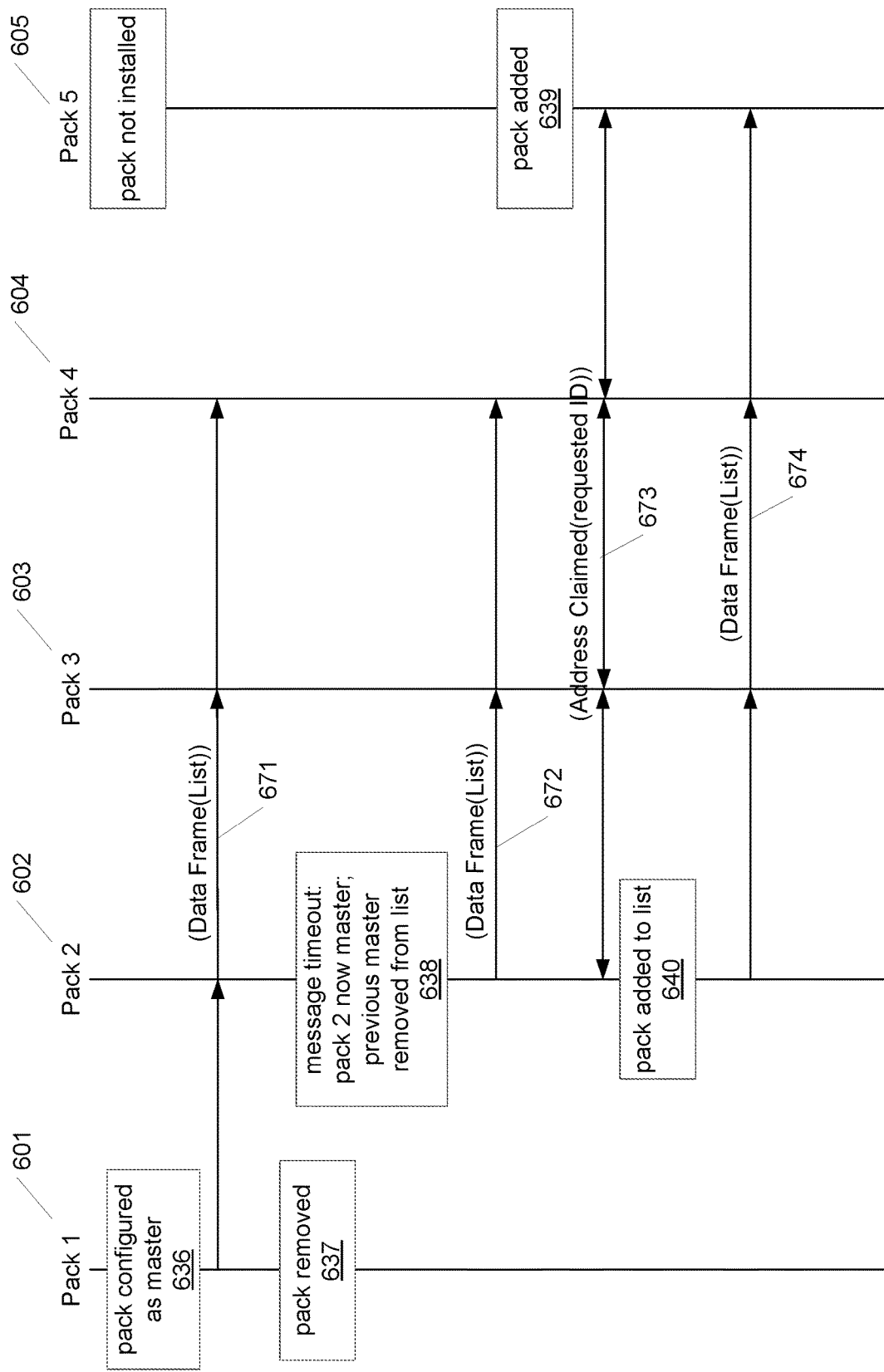
FIG. 6B shows a message flow scenario over a controller area network (CAN) bus for configuring a plurality of battery packs in accordance with an embodiment.

FIG. 6B shows a message flow scenario over a CAN bus for configuring a plurality of battery packs in accordance with an embodiment.

The CAN communications protocol (ISO-11898: 2003) describes how information is passed between devices on a network and conforms to the Open Systems Interconnection (OSI) model that is defined in terms of layers. Actual communication between devices connected by the physical medium is defined by the physical layer of the model. The ISO 11898 architecture defines the lowest two layers of the seven-layer OSI/ISO model referred as the data-link layer and physical layer.

The CAN communication protocol supports both a standard version (11-bit identifier field) and an extended version (29-bit identifier field). However, embodiments typically use the standard version because the supported identifier space is typically more than enough.

The CAN bus is often referred to as a broadcast type of bus, where each message contains a source address (for example, a device ID) but not a destination address. Consequently, all battery packs (corresponding to nodes) can "hear" all transmissions. A battery pack may selectively ignore a message or may process the message by providing local filtering so that each battery pack may respond to pertinent messages.

Embodiments may use the data frame message specified in the CAN protocol. This message type carries a 0-8 byte payload, where the data field is interpreted at a higher protocol layer (typically by a software application executing at the battery packs). For example, the data field may convey SoC and/or SoH information when a slave battery pack sends status information back to the master battery pack.

In order to assign an identification value (address) to a battery pack, end device, or charger, embodiments may utilize an industry standard, such as the SAE J1939 address claim procedure. The SAE J1939 protocol is a higher protocol layer built on top the CAN data-link and physical layers.

Referring to FIG. 6B, when pack 601 (pack 1) becomes the master battery pack at event 636, pack 601 sends periodic data frame message 671 to packs 602, 603, and 604, respectively. (Because the CAN protocol supports only a source address, all battery packs may receive and process a single broadcast message sent via the CAN bus.) Data frame message 671 corresponds to periodic update message 661a, 661b, 661c shown in FIG. 6A. Data frame message 671 contains at least the configuration list in the payload.

When pack 601 is removed (for example, corresponding to event 637), periodic transmission of the periodic data frame messages is disrupted.

When the disruption is detected by the oldest slave battery pack (pack 602) at event 638, pack 602 assumes the role of the master battery pack. Consequently, pack 602 removes the top entry of the configuration list (corresponding to pack 601) and periodically sends the revised configuration list via data frame message 672.

When pack 605 (pack 5) is added at event 639, pack 605 initiates the address claimed procedure 673 claiming its identification (ID) value. When successfully completed, an entry with the identification of pack 605 is added to the bottom of the configuration list by master battery pack 602 at event 640.

Subsequently, pack 602 (now the master battery pack) periodically sends broadcast data frame message 674.

Figure 6C:
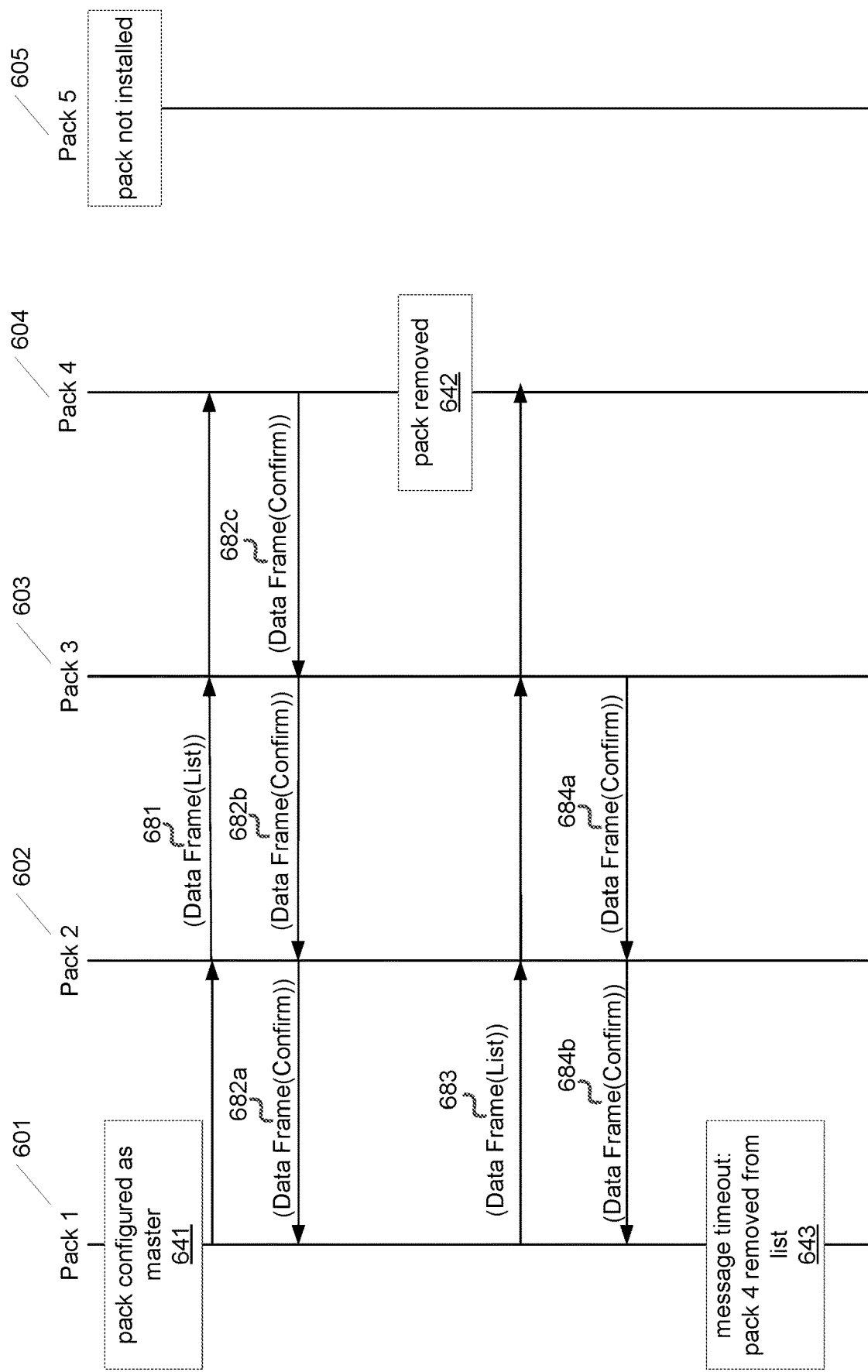
FIG. 6C shows another message flow scenario over a controller area network (CAN) bus for configuring a plurality of battery packs in accordance with an embodiment.
Figure 6D:
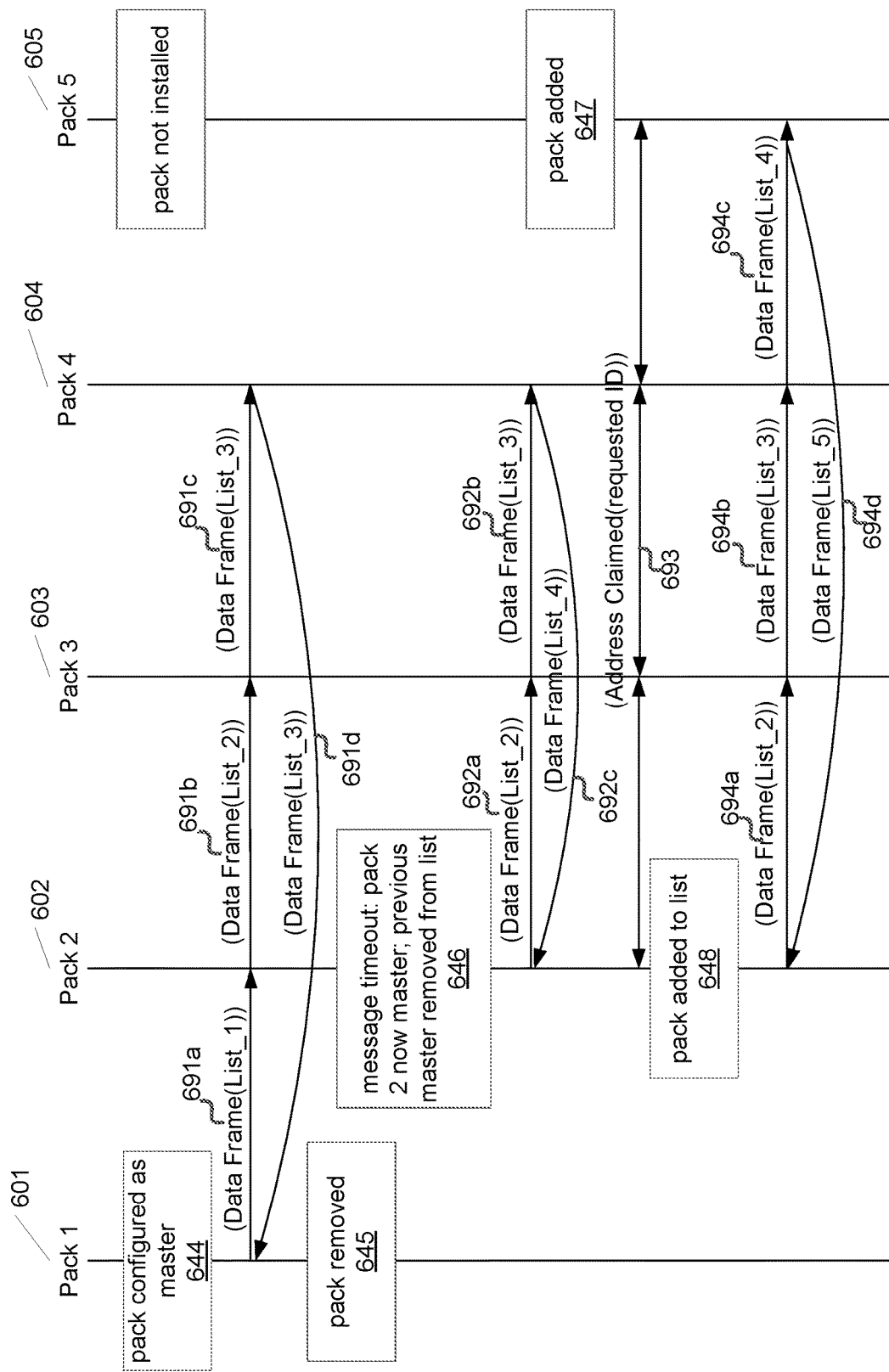
FIG. 6D shows another message flow scenario over a controller area network (CAN) bus for configuring a plurality of battery packs in accordance with an embodiment.

FIG. 6C shows a variation of the message flow scenario shown in FIG. 6B for configuring a plurality of battery packs in accordance with an embodiment. As with FIG. 6B, pack 601 (designated as the master battery pack at event 641) periodically sends the configuration list via message 681. However, slave battery packs 602, 603, and 604 return confirmation messages 682a-c to confirm reception.

At event 642, battery pack 604 is removed from the battery system. When battery pack 601 periodically sends message 683, only messages 684a-b are returned. Consequently, a message timeout occurs at event 643, and master battery pack 601 detects that battery pack 604 has been removed and removes the entry for battery pack 604 from the configuration list. The modified configuration list is included in the next periodic broadcast.

FIG. 6D shows a variation of the message flow scenario shown in FIG. 6B, where the configuration list is maintained in a distributed rather than a centralized fashion.

Battery pack 601 is distributed as the master battery pack at event 644. Rather than the master battery pack maintaining and sending the configuration list to the other battery packs, each of the active battery packs 601-604 maintains its own configuration list and broadcasts it via messages 691a-d to the other battery packs via the CAN bus, where list_1, list_2, list_3, and list_4 correspond to the configuration messages maintained at battery packs 601-604, respectively. As necessary, battery packs 601-604 may modify its own configuration list to be consistent with the configuration lists broadcast by the other battery packs. For example, a battery pack may have been recently inserted into a battery system and may need to revise its configuration list to be consistent with the current configuration.

When pack 601 is removed (for example, corresponding to event 645), periodic transmission of the periodic data frame messages from battery pack 601 terminates.

When the termination is detected by battery packs 602-604 at event 646, pack 602 assumes the role of the master battery pack. Consequently, packs 602-604 remove the top entry of the configuration list (corresponding to pack 601) that is locally maintained at the battery packs 602-604 and periodically send the revised configuration list via data frame messages 692a-c.

When pack 605 (pack 5) is added at event 647, pack 605 initiates the address claimed procedure 693 claiming its identification (ID) value. When successfully completed, battery packs 602-604 adds pack 5 to the bottom of the local copy of the configuration list. 605 at event 648, and subsequently the revised configuration list is broadcast via data frame messages 694a-d. With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand-new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

As previously discussed, some embodiments order a configuration list based on the time that battery packs are connected to the communication channel (for example, CAN bus). With this approach, the oldest battery pack is designated as the master battery pack. However, other embodiments may use different approaches. For example, the members of the configuration list may be ordered from top to bottom by decreasing values of the open circuit voltages of the battery packs. The open circuit voltage of a battery pack may be measured when the battery pack's discharging array is disabled (in other words, the battery pack is not discharging onto the power bus of the battery system).

Each battery pack can share its measured open circuit voltage with the other battery packs that are connected to the communication channel. Based on the measured open circuit voltages, a configuration list is maintained, where entries for each battery pack are listed by decreasing order. The battery pack corresponding to the top entry has the largest open circuit voltage and serves as the master battery pack for battery system. With an exemplary embodiment, a battery system comprises first, second, and third battery packs having open circuit voltages $V_{open1}$, $V_{open2}$, and $V_{open3}$, respectively, where $V_{open2} > V_{open3} > V_{open1}$. The top entry of the configuration list is associated with the second battery pack (the master battery pack) followed by an entry for the third battery pack followed by an entry for the first battery pack. Consequently, if the second battery were to fail, the third battery pack would assume the role of the master battery pack.

With some embodiments, the battery packs in a battery system are assigned an ID and at the same time the open circuit voltage may be measured and stored in the configuration list. In the infrequent situation where the open circuit voltages of two battery packs are equal, one battery pack may be chosen randomly or may be chosen by the highest number ID.

The configuration list may be updated as battery packs are installed into the battery system. For example, a battery pack that is installed after discharging begins would initially enter in a standby mode (where the discharging array is disabled) so that an open circuit voltage can be measured by the battery pack. The newly installed battery pack could than share the measured open circuit voltage with the other battery packs via the communication channel. With some embodiments, the configuration list can then be updated with an entry for the newly installed battery pack based on the measured open circuit voltage. However, with some embodiments, the current configuration list may remain unchanged until the battery packs being discharged are disconnected from the battery system.

With some embodiments, the configuration list may be centrally maintained by the master battery pack. However, with some embodiments, each battery pack in the battery system may maintain its own copy of the configuration list based on information shared via the communication channel.

With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand-new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

With an aspect of the embodiment, different balance techniques for Li-ion battery cells may be supported in a large-format battery pack system. For example, the aspect includes three balancing techniques: "smart converter balancing," "start direct balancing," and "start staggered balancing" that may be used in a medium-large battery pack implementation to ensure the safe use and longevity of the Li-ion battery cells. The aspect may utilize a converter (with a cell pre-charge circuit) for charge balancing each battery pack to prevent and/or limit in-rush electrical current, over-current faults, and/or short-circuit faults.

Figure 7A:
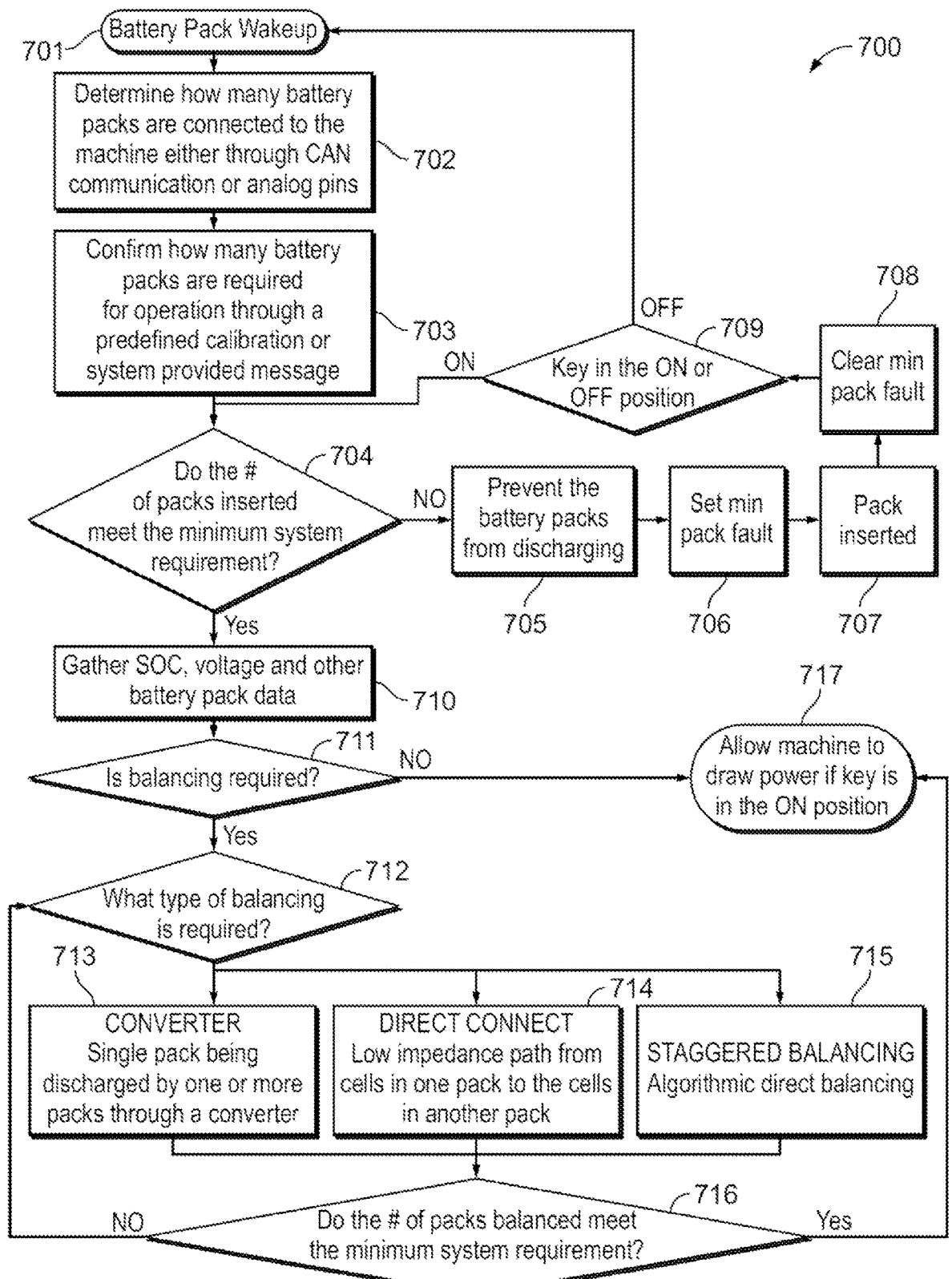
FIG. 7A shows a flowchart for determining a balancing type for a plurality of battery packs in accordance with an embodiment.

FIG. 7A shows flowchart 700 for determining a balancing type for a plurality of battery packs in accordance with an embodiment.

At block 701, the master battery pack transitions from a sleep state. For example, when an end device is not being used, the master battery pack may periodically wake up to determine whether there is a change in the operational state.

At block 702, the master battery pack determines the number of battery packs that are installed in the battery system. For example, the master pack may verify that all battery packs on the confirmation list are active on the communications channel.

At block 704, the master battery pack determines whether a minimum number of battery packs (including itself) are installed based on power requirements of a device (for example, obtained from the end device via the communication channel).

If there are not a minimum number of battery packs available to properly power the end device, then the configured battery packs are prevented from discharging at block 705 by the master battery pack instructing the slave battery packs (as well as itself) to open corresponding discharge arrays. A fault indicator is activated at block 706 that is indicative that not enough battery packs are installed to power the end device. If an additional battery pack is installed at block 707, the fault indicator is cleared at block 708. If the end device is activated or otherwise enabled at block 709 (for example, the key is in the "on" position), process 700 returns to block 704. Otherwise, process 700 returns to block 701.

Returning back to block 704, when the master battery pack determines that there are a sufficient number of battery packs, the master battery pack gathers battery pack information (for example, SoC, SoH, and voltage information) from each of the slave battery packs as well as for itself at block 710. For example, as will be discussed in further detail, the master battery pack may send a "Request for Pack Info" message to each of the configured slave battery packs and receive a "Pack Info" message from each slave battery pack in response with the requested information.

From the gathered SoC data, the master battery pack determines whether balancing is required at block 711. For example, some of the battery packs may have a high SoC while some may have a low SoC. By balancing the battery packs, a sufficient number of battery packs may be available to properly discharge in order to power the end device.

If balancing is not required, the battery system may discharge to power the end device at block 717.

If balancing is required, the type of balancing is determined at block 712. As will discussed in greater detail, embodiments may support three different types of balancing: converter balancing (block 713), direct balancing (block 714), and staggered balancing (block 715).

Tables 1 and 2 present examples of balancing in accordance with embodiments.

TABLE 1

Example of Balancing

| Time | Pack 1 | Pack 2 | Pack 3 | Pack 4 | Type |
|---|---|---|---|---|---|
| T0 | 100% | 15% | 15% | 15% | Converter |
| T1 | 85% | 20% | 20% | 20% | Converter |
| T2 | 65% | 32%* | 32% | 32% | Staggered |
| T3 | 60% | 38% | 33%* | 33% | Staggered |
| T4 | 54% | 39% | 39% | 34%* | Staggered |
| T5 | 49% | 40%* | 40% | 40% | Staggered |
| T6 | 45% | 43% | 41%* | 41% | Staggered |

Continue staggered balancing until completed
Note:
"*" denotes that the battery pack is being direct charged by Pack 1

TABLE 2

Example of Balancing

| Time | Pack 1 | Pack 2 | Type |
|---|---|---|---|
| T0 | 100% | 15% | Converter |
| T1 | 85% | 20% | Converter |
| T2 | 65% | 32% | Direct |
| T3 | 60% | 37% | Direct |
| T4 | 55% | 42% | Direct |
| T5 | 48% | 48% | (Balancing Completed) |

The above to examples illustrate that the type of balancing may change while the battery packs are being balanced. For example, with Table 1 the balancing type changes from converter balancing to staggered balancing while with Table 2 the balancing type changes from converter balancing to direct balancing.

After balancing, if the number of battery packs are available for discharging, as determined at block 716, the end device may be powered at block 717. Otherwise, the battery packs may be rebalanced based on the revised SoC values obtained from the previous balancing.

When rebalancing occurs, as determined at block 716, the rebalancing may utilize a different type of balancing than previously used. For example, converter balancing may be first applied while subsequent rebalancing may utilize staggered balancing.

Figure 7B:
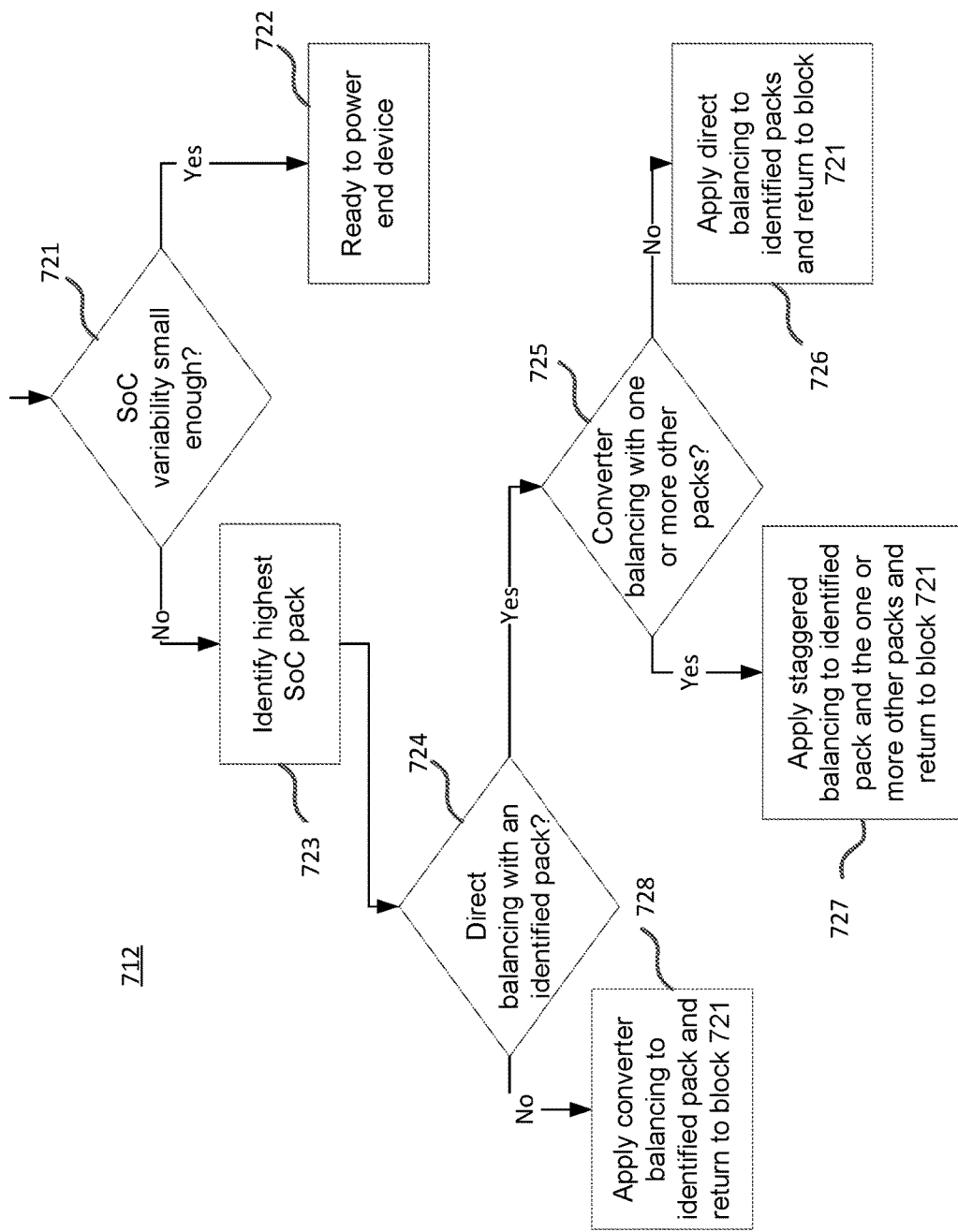
FIG. 7B shows a flowchart for selecting one of three balancing types for a plurality of battery packs in accordance with an embodiment.

FIG. 7B expands on block 712 shown in FIG. 7A for determining the type of charge balancing. For example, an embodiment may support a plurality of balancing types such as direct balancing, converter balancing, and staggered balancing as previously discussed.

At block 721, if the variability of the SoC values among the battery packs is sufficiently small, the battery system is able to power the end device at block 722. (For example, the SoC differences between all pairs of battery packs is less than a predetermined threshold.) Otherwise, process 712 proceeds with balancing the battery packs.

Block 723 identifies the battery pack with the highest SoC value so that the identified battery pack can discharge, thus providing charge to the other battery packs during balancing.

At block 724 process 712 determines whether direct balancing cannot be applied (for example, when the SoC difference between the highest SoC pack and an identified battery pack is above a predetermined SoC threshold). If so, converter balancing is applied to the identified battery pack (where the highest SoC battery pack discharges onto the power bus and the identified battery pack charges through the power bus via its converter) at block 728. When converter balancing is completed, process 712 may revert back to block 721 and determine whether balancing can be applied to a different combination of battery packs, where the balancing type may be the same or may be different (for example, direct balancing or staggered balancing).

Referring back to block 724, if direct balancing can be applied (for example, when the SoC difference between the highest SoC pack and the identified battery pack is below the predetermined SoC threshold), process 712 determines whether converter balancing can be applied to one or more other battery packs at block 725. If so, staggered balancing is applied with the highest SoC pack, the identified pack, and the one or more other packs at block 727. Otherwise, direct balancing is applied between the highest SoC pack and the identified battery pack at block 726.

Figure 7C:
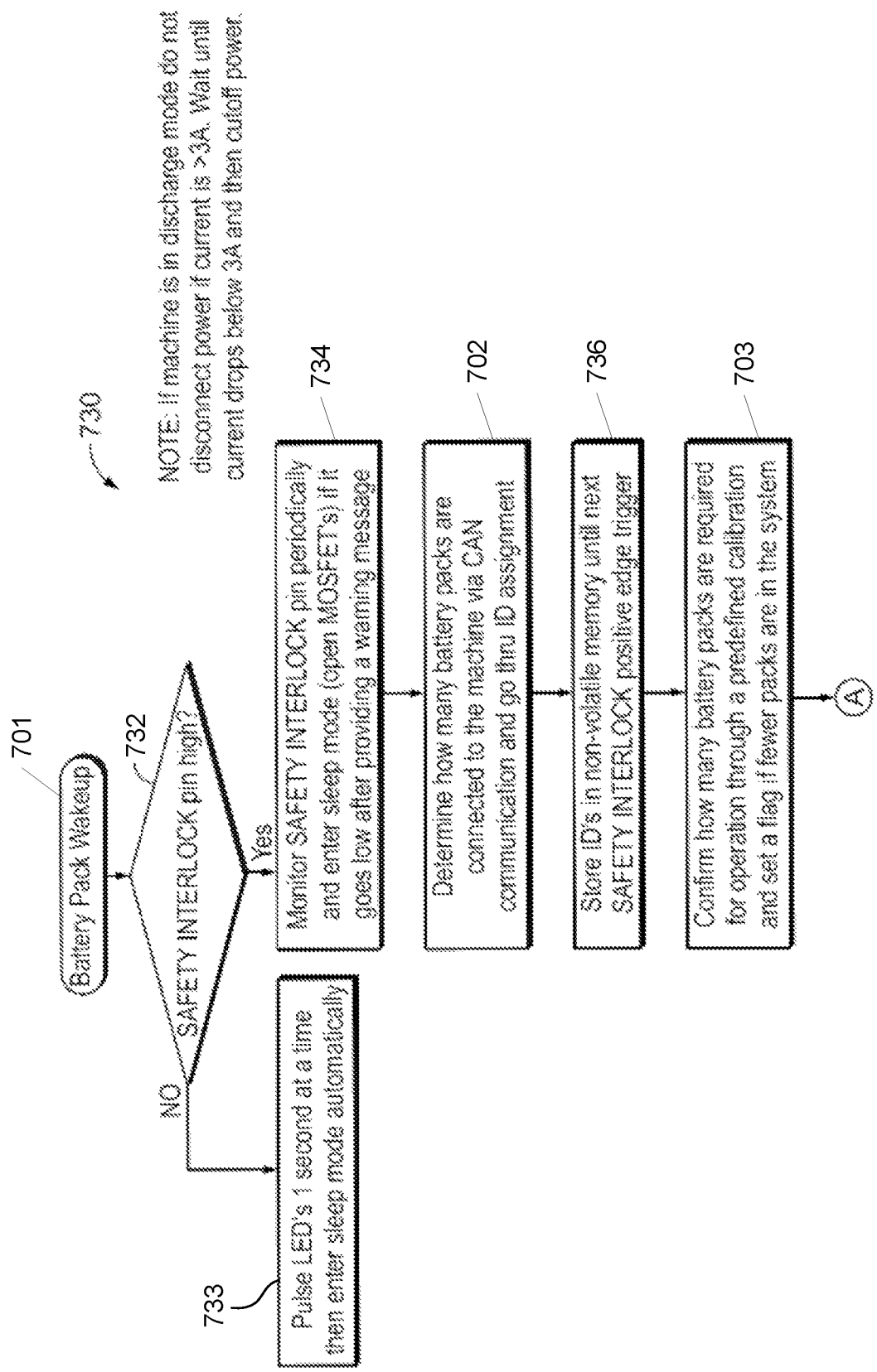
FIG. 7C shows a flowchart for determining a balancing type for a plurality of battery packs in accordance with an embodiment.

FIG. 7C shows flowchart 700 for determining a balancing type for a plurality of battery packs in accordance with an embodiment.

Table 3 shows a relationship between an operational mode of a battery system and a safety interlock lock pin (indicator) and a wake pin (indicator). For example, the safety interlock pin is "On" when the battery packs are properly inserted into the battery system (as sensed by an interlocking connection through the battery pack connectors), and the wake pin is "On" when a user turns a key to activate a powered appliance (end device).

TABLE 3

Mode of Operation

| Wake Pin | Safety Interlock Pin | Mode |
|---|---|---|
| Off | Off | Off (Sleep) |
| Off | On | Balancing |
| On | On | Charging/Discharging |
| On | Off | Off (Sleep) |

When in the off (sleep) mode, the discharging and charging arrays of the battery packs are disabled, and the battery packs consume only enough electrical power so that the battery pack may transition to another state (for example, balancing mode) when the battery pack detects an appropriate signal (for example, a wake indicator).

With some of the embodiments, as shown in Table 3, a battery system may support a plurality of operational modes: Off (Sleep), Balancing, and Charging/Discharging. While a single mode is shown for charging/discharging, charging and discharging are separate operations based on the interaction of the battery system with its external environment. For example, when the wake and safety interlock indicators are on and if charger (typically external to the battery system) is sensed via a CAN bus, the battery system enters the charging state. However, if the battery system senses an end device (for example, an appliance), the battery system enters the discharging state. As will be discussed in further detail, a battery system may support "smart charging" when in the charging mode and "smart discharging" when in the discharging mode.

FIG. 7C is similar to 9A; however, process 730 includes an interaction with sleep, balancing, and charging/discharging modes in accordance with the relationship shown in Table 3. At block 731, when the safety interlock indicator is not detected, the battery system enters the sleep mode. Otherwise, the battery system (typically by the master battery pack) gathers configuration information (for example, SoC information about the different battery packs). At block 732, the battery system determines whether the wake indicator is detected. If not, the battery system enters the balancing mode. Otherwise, the battery system enters the charging/discharging mode.

Figure 8:
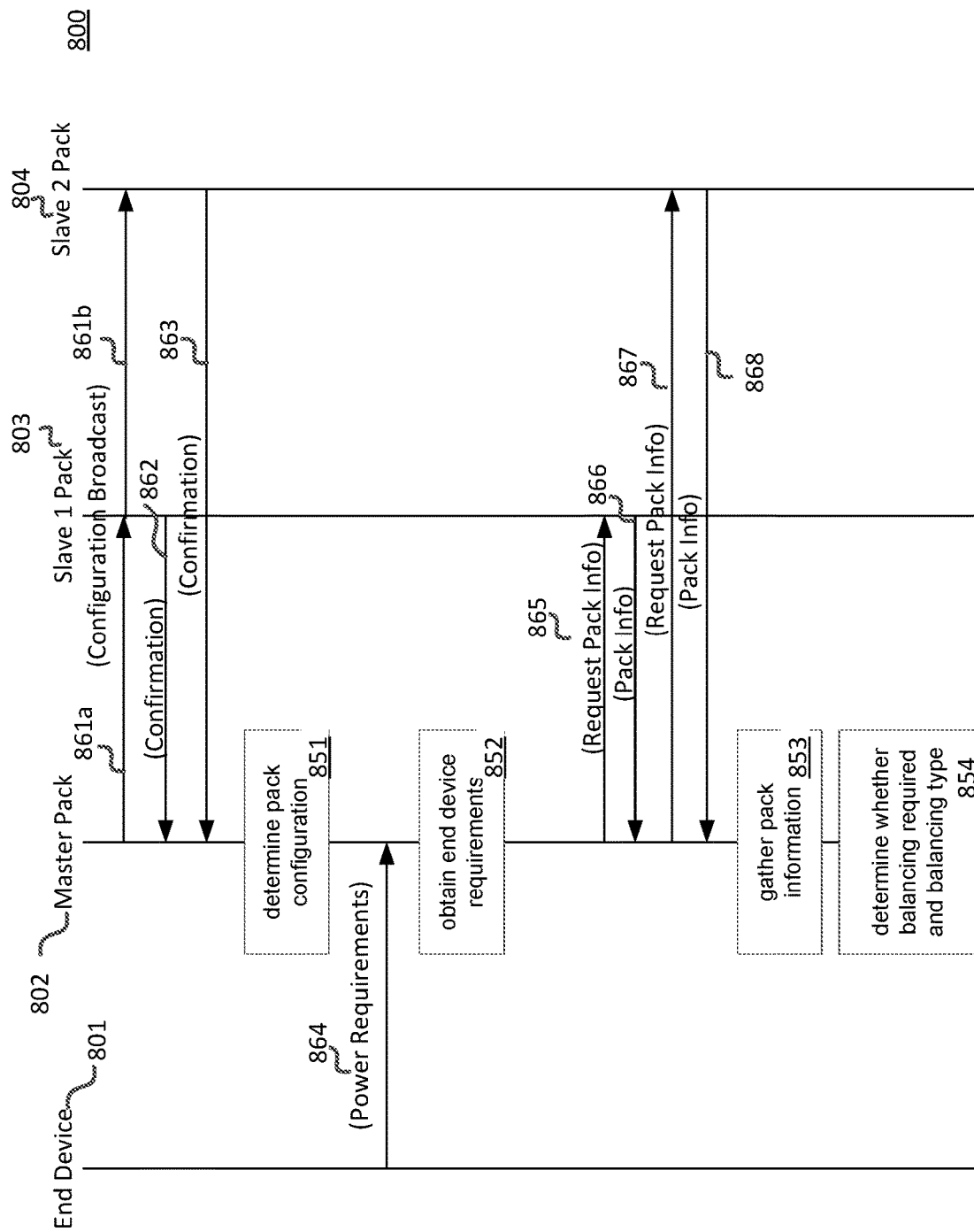
FIG. 8 shows a message flow scenario for determining a balancing type for plurality of battery packs in accordance with an embodiment.

FIG. 8 shows message flow scenario 800 for determining a balancing type for a plurality of battery packs based on flowchart 700 and in accordance with an embodiment. Master battery pack 802, based on the entries of the current confirmation list, confirms the availability of battery packs 803 and 804 at event 851 corresponding to messages 861*a*, 861*b*, 862, and 863. As previously discussed, embodiments may support different messaging protocols. For example, with the CAN protocol a data frame message may contain data in the data field that is indicative of a confirmation request or a confirmation response. As previously discussed, the interpretation of the data is in accordance with the application software executing at end device 801 and battery packs 802-804.

End device 801 provides its power requirements in message 864 so that master battery pack 802 can determine the number of battery packs needed for end device 801 at event 852.

At event 853, master battery pack 802 gathers SoC data about the other battery packs via messages 865-868. (Master battery pack 802 may use internal messaging within the battery pack to obtain SoC about itself.) For example, in accordance with the CAN protocol, data contained in Request Pack Info message 865 may be interpreted as a request from the destination battery pack while the data in Pack Info message 866 may be interpreted as the requested data (for example, SoC data) from the destination battery pack.

Figure 13:
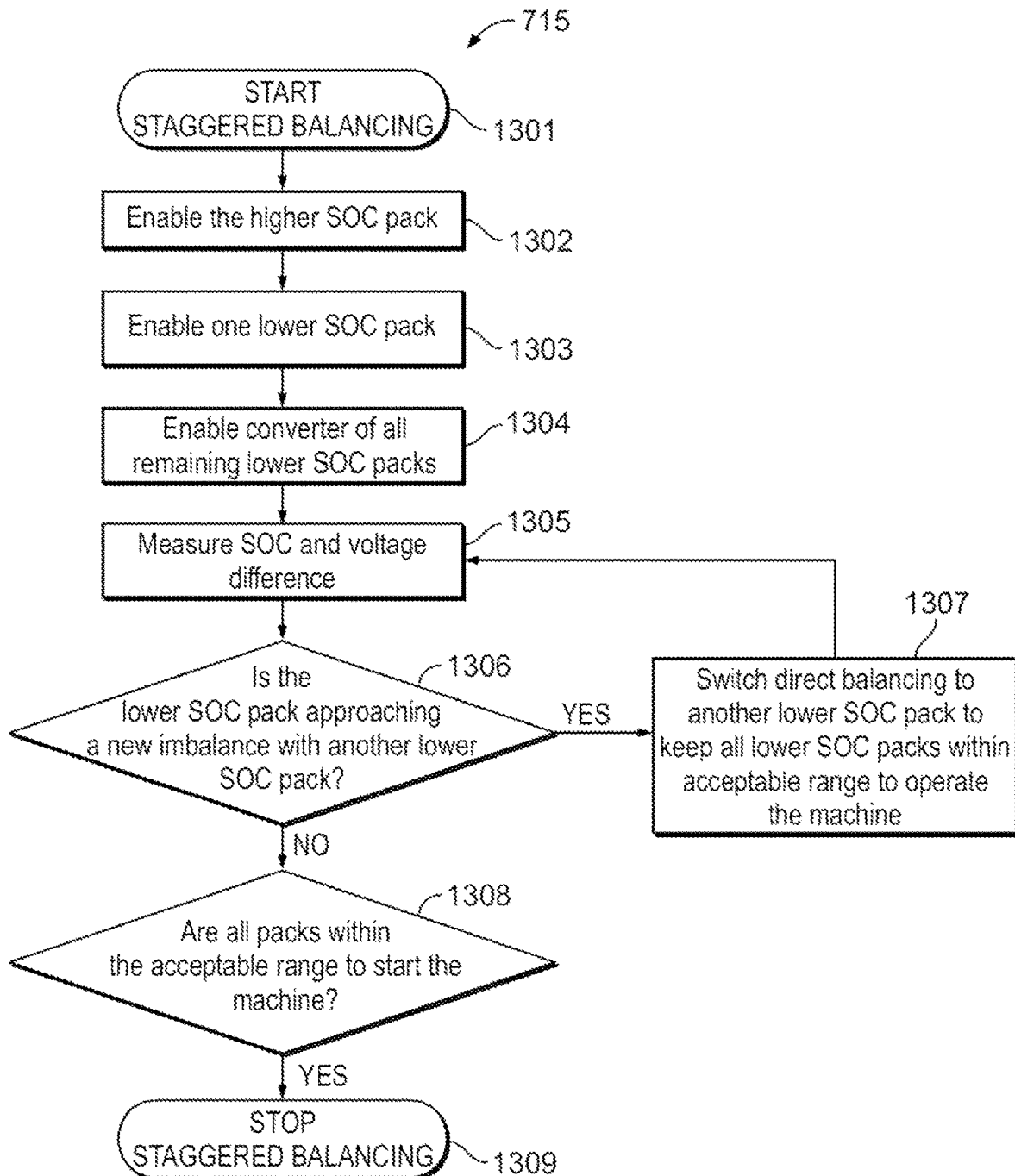
FIG. 13 shows a flowchart for staggered balancing with a plurality of battery packs in accordance with an embodiment.

Based on the gathered SoC data, master battery pack 802 determines the type of balancing required (if needed) and initiates the appropriate balancing process (for example, processes shown in FIGS. 9, 11, and 13).

As previously discussed, embodiments may support different types of balancing, for example): converter balancing, direct balancing, and staggered balancing. Converter balancing typically requires a longer time period than direct balancing, While the processes shown in FIGS. 9, 11, and 13 are typically performed at the master battery pack, the master battery need not be changing or discharging during balancing. This determination is based on the SoC values of battery cells 203 (shown in FIGS. 2A and 2B, respectively) and not on whether a battery pack is a master battery pack or a slave battery pack.

FIG. 9 shows flowchart 713 (referenced in FIG. 7A) for converter balancing with a plurality of battery packs in accordance with an embodiment. Block 901 starts converter balancing, where one of the battery packs (either the master battery pack or one of the slave master packs) charges one or more of the other battery packs.

With converter balancing, charge of a single battery pack is transferred to one or more battery packs via converters on each of the charged battery packs. Consequently, two or more battery packs are involved with this type of balancing.

While not explicitly shown, the master battery pack gathers SoC data about all of the battery packs, including itself. For example, the master battery pack may request battery status information from the other battery packs via the CAN bus and internally obtain its own SoC data.

At block 902, the master battery pack enables the battery pack with the highest SoC for discharging by enabling the discharging array. The master battery pack also enables one or more of the battery packs with the lowest SoC to accept the charge from the discharging battery pack by enabling the charging array and the on-board converter.

The master battery pack obtains SoC values from the above battery packs at block 904 and continues the balancing process at block 905 until a desired charge balance is obtained at block 905. If the charge balance is sufficient, the battery pack may be used to power the end device. However, a faster mode of balancing (for example, direct balancing as will be discussed) may be subsequently applied.

Figure 10:
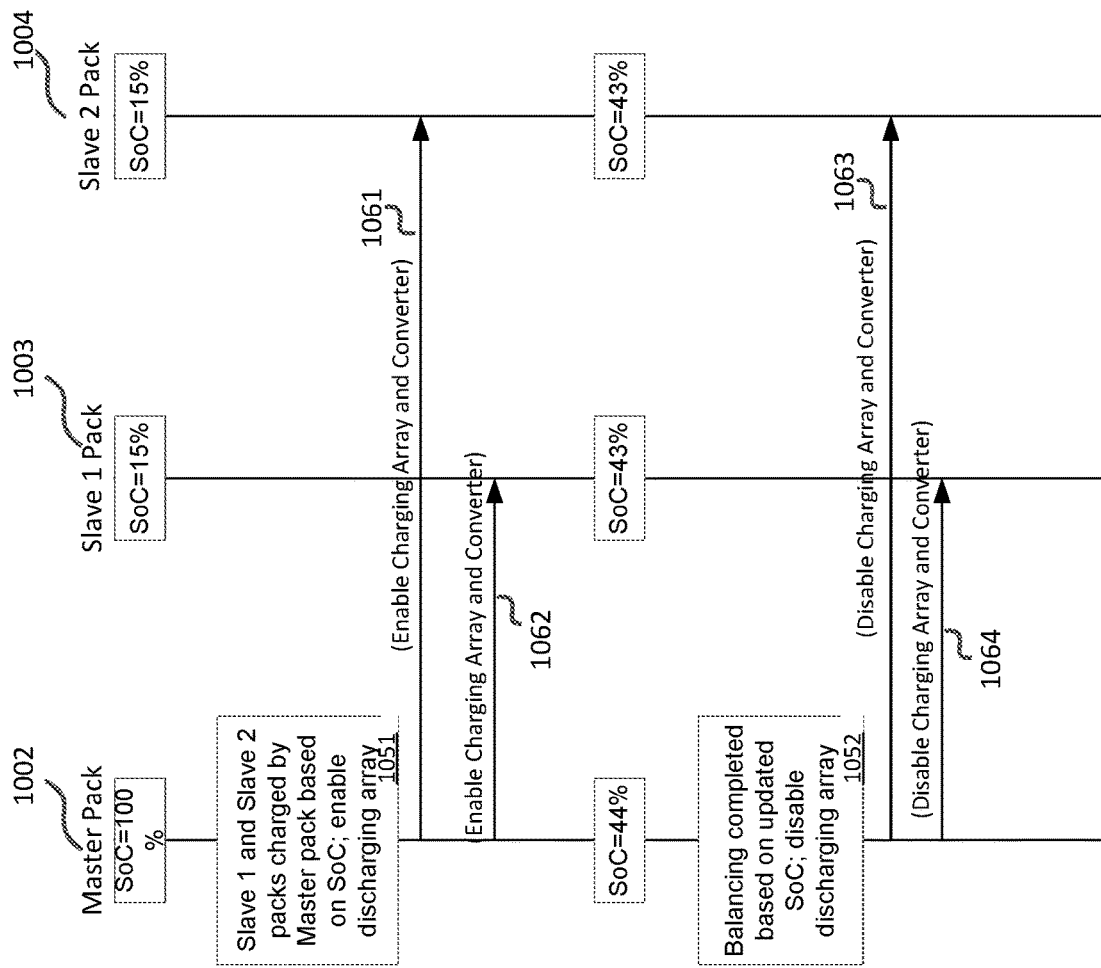
FIG. 10 shows a message flow scenario for converter balancing with a plurality of battery packs in accordance with an embodiment.

FIG. 10 shows a message flow scenario for converter balancing with a plurality of battery packs in accordance with an embodiment. Battery packs 1002, 1003, and 1004 initially have SoC values of 100%, 65%, and 65%, respectively. As previously discussed, master battery pack 1002 may obtain the SoC values by requesting battery status information and receiving the status information via data frame messages over a CAN bus.

At event 1051, master battery pack 1002 determines that packs 1003 and 1004 are to be charged by itself (pack 1002). To do so, master battery pack enables its own discharging array and enables the charging arrays and converters via messages 1061 and 1062. Balancing continues until a desired balancing charge obtained (80%, 75%, and 75%) at event 1052. At that time, the balancing ends so that master battery pack disables its charging array and disables the charging arrays and converters of battery packs 1003 and 1004 via messages 1063 and 1064.

FIG. 11 shows flowchart 714 for direct balancing with a plurality of battery packs in accordance with an embodiment. When process 700, as shown in FIG. 7A, determines that direct balancing should be performed, the master battery pack initiates direct balancing at block 1101.

With direct balancing, one of the battery packs is charging another battery pack through a low impedance electrical path. Consequently, only two battery packs are involved with type of balancing.

While not explicitly shown, the master battery pack obtains SoC values for all installed battery packs in the battery system. In order to do so, the master battery pack sends status requests to the slave battery packs and receives status information (for example, SoC values) from the slave battery packs via messaging on the communication channel. However, because the master battery knows about its own battery cell status, only internal messaging for the master battery is needed.

At block 1102 the master battery pack instructs the battery pack with the higher SoC to start discharging by enabling its discharging array and at block 1103 instructs one of the battery pack with the lower SoC to start charging by enabling its charging array.

At block 1104, the master battery pack gathers SoC data from the batter packs being charge balanced. When an acceptable SoC is reached at block 1105, direct balancing is terminated at block 1106.

Figure 12:
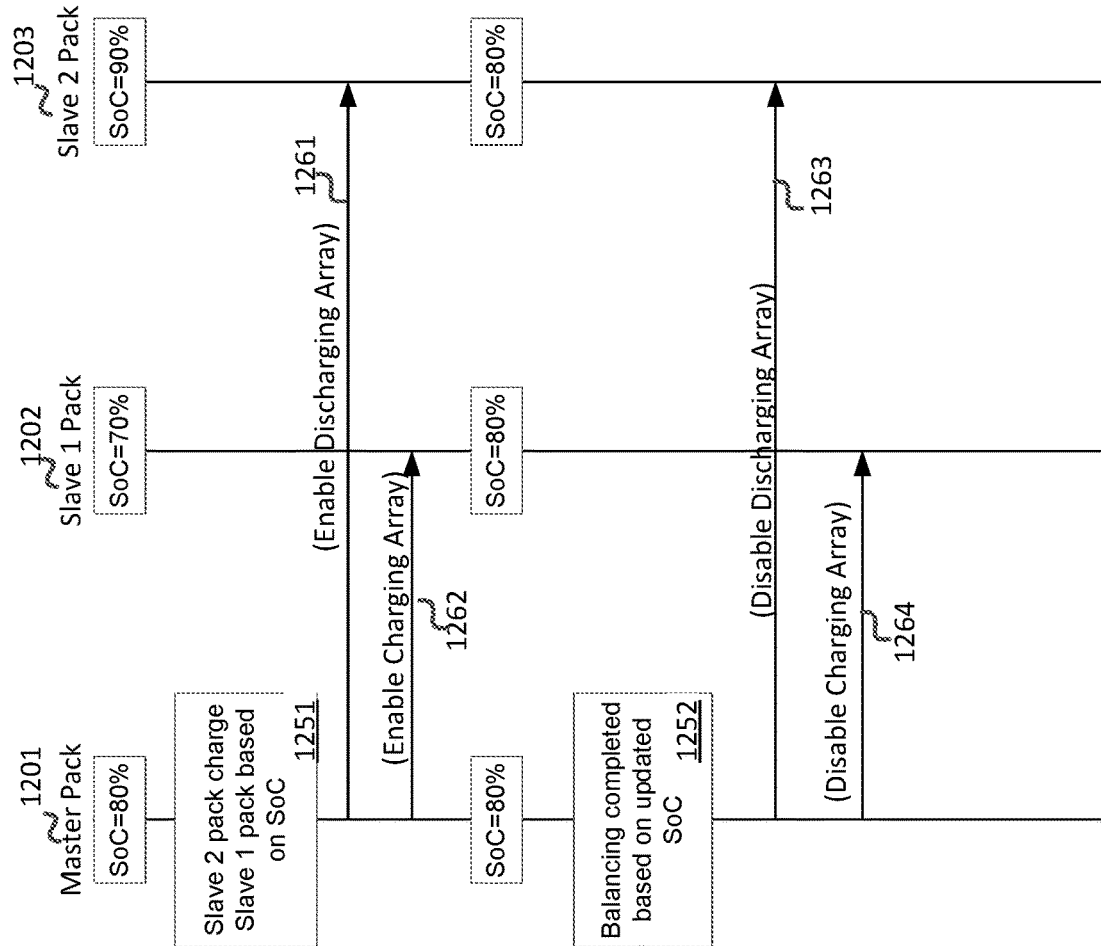
FIG. 12 shows a message flow scenario for direct balancing with a plurality of battery packs in accordance with an embodiment.

FIG. 12 shows a message flow scenario for direct balancing with a plurality of battery packs in accordance with an embodiment. The master battery pack (pack 1201) gathers initial SoC values 80%, 70%, and 90% for battery packs 1201, and 1202, and 1203, respectively.

Because pack 1202 has the lowest SoC and pack 1203 has the highest SoC, the master battery pack instructs battery pack 1202 to enable its charging array and battery pack 1203 to enable its discharging array via messages 1261 and 1262, respectively.

When the SoC values of battery packs 1202 and 1203 reach 80%, the master battery pack (pack 1202) determines that direct balancing is competed at event 1251 and consequently disables the charging array and the discharging array via messages 1263 and 1264, respectively.

FIG. 13 shows flowchart 714 for staggered balancing with a plurality of battery packs in accordance with an embodiment. When process 700, as shown in FIG. 7A, determines that staggered balancing should be performed, the master battery pack initiates staggered balancing at block 1301.

Staggered balancing utilizes algorithmic direct balancing. With staggered balancing, one of the battery packs (typically the highest SoC value) direct charges another battery pack with a lower SoC while charges one or more other lower SoC battery packs through converter balancing (where the converter located on the charged battery pack is enabled). In order to keep the other lower SoC battery packs within an acceptable range, direct balancing may switch to a different lower SoC battery pack while the previous lower SoC battery pack is now converter balanced.

At blocks 1301 and 1302, direct balancing is established with a battery pack with the highest SOC with another battery pack in the group with a low SoC similar to blocks 1101 and 1102 as shown in FIG. 11. However, converter balancing is established with some or all of the battery packs in the low SoC group at block 1304.

At block 1305, the master battery pack gathers the updated SoC values of the participating battery packs. When the battery pack being directed charge reaches a determined SoC threshold (for example, when an imbalance occurs one of the battery packs in the low SoC group), direct balancing is established with another battery pack in the low SoC group at block 1307.

When all of the battery packs are within an acceptable SoC range, as determined at block 1308, staggered balancing is terminated at block 1309.

Figure 14:
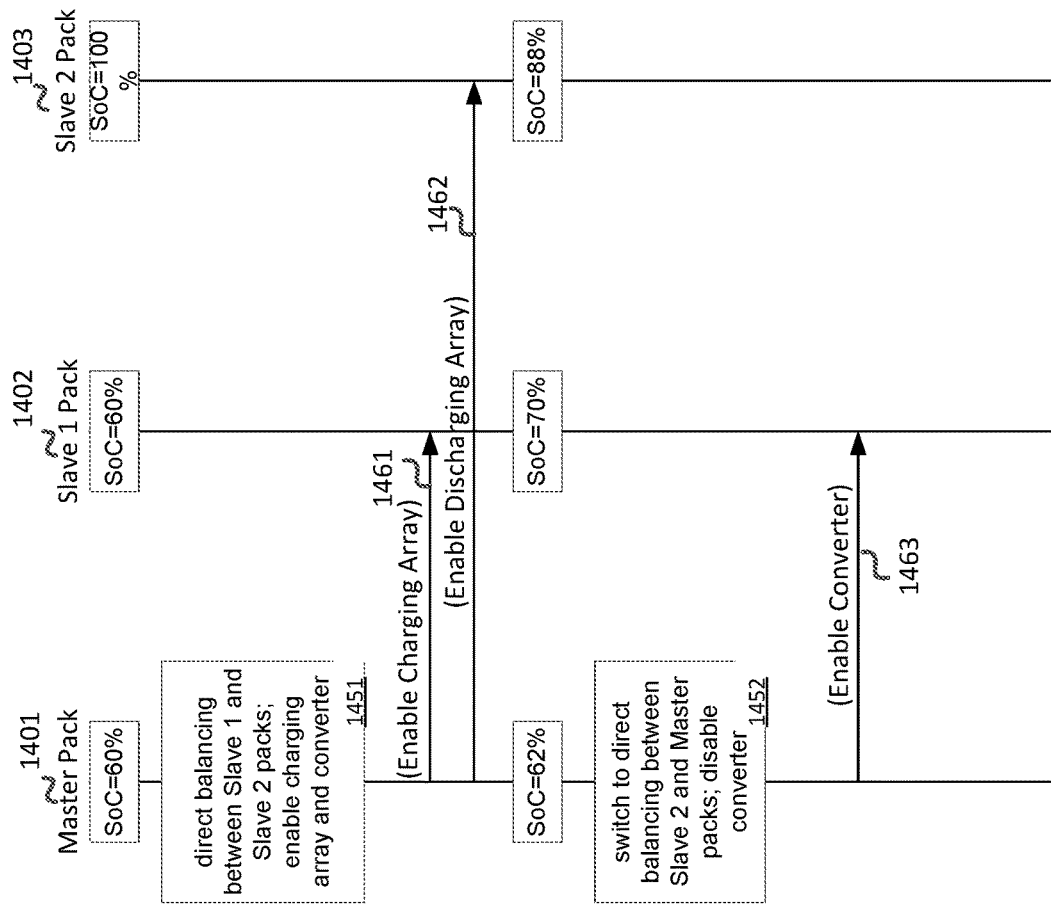
FIGS. 14-15 show a message flow scenario for staggered balancing with a plurality of battery packs in accordance with an embodiment.
Figure 15:
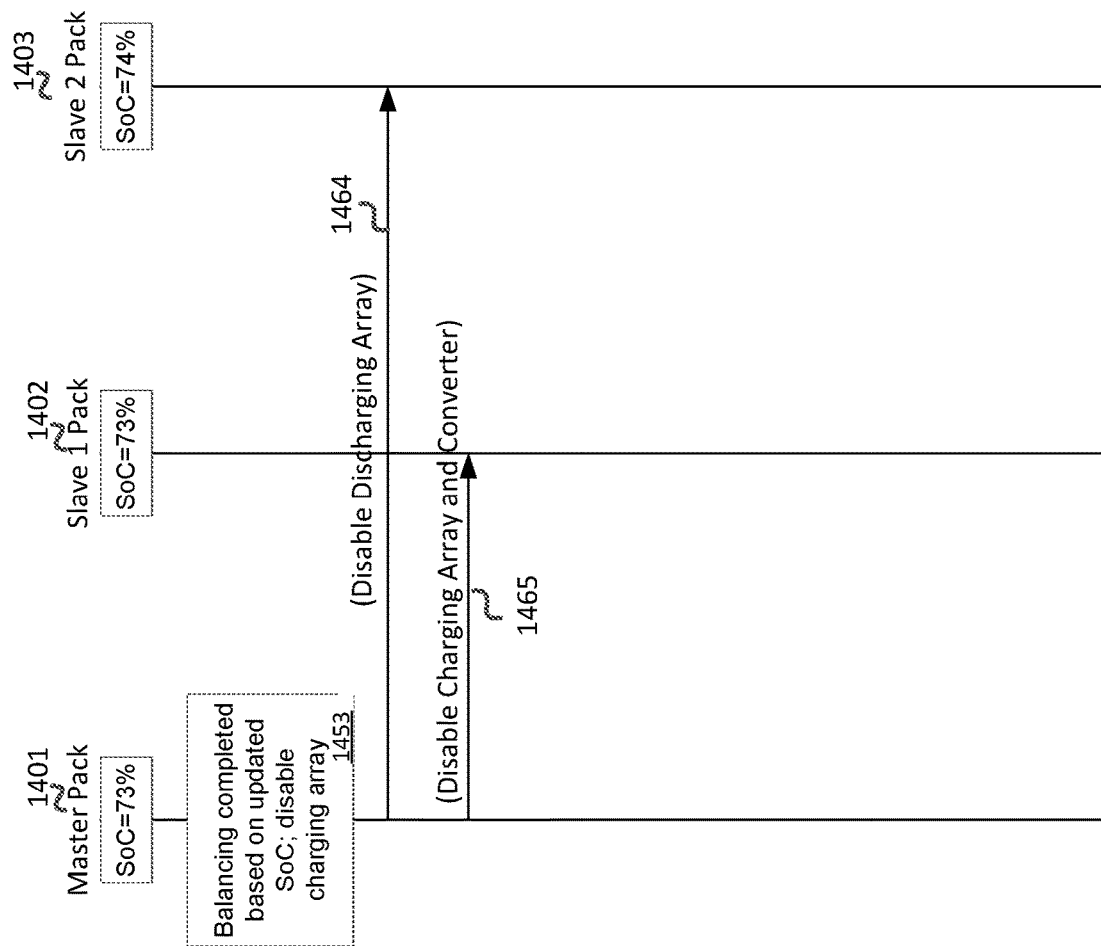

FIGS. 14-15 show a message flow scenario for staggered balancing with a plurality of battery packs in accordance with an embodiment. Referring to FIG. 14, the master battery pack (pack 1401) gathers initial SoC values 60%, 60%, and 100% at battery packs 1401, and 1402, and 1403, respectively.

At event 1451, master battery pack 1401 initiates direct balancing between battery packs 1402 (in the low SoC group) and 1403 (the highest SoC) and to establish converter balancing between battery 1403 and itself (also in the low SoC group). Consequently, master battery pack 1401 sends messages 1461 and 1462, corresponding to battery packs 1402 and 1403, respectively, over the communication channel and to generate any internal messaging, as necessary, to enable its charging array and converter.

As a result of the balancing, the SoC values of battery packs 1401, 1402, and 1403 change to 62%, 70%, and 88%, respectively. Because of the charge imbalance between battery packs 1401 and 1402, master battery pack 1401 establishes direct balancing between battery pack 1403 and itself and establishes converter balancing for pack 1402. Consequently, at event 1452, master battery pack 1401 instructs battery pack 1402 to enable its converter (so that charging occurs now via the converter rather than directly) via message 1463 and to disable its own converter so that its battery cells are directly exposed to charging.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Figure 17:
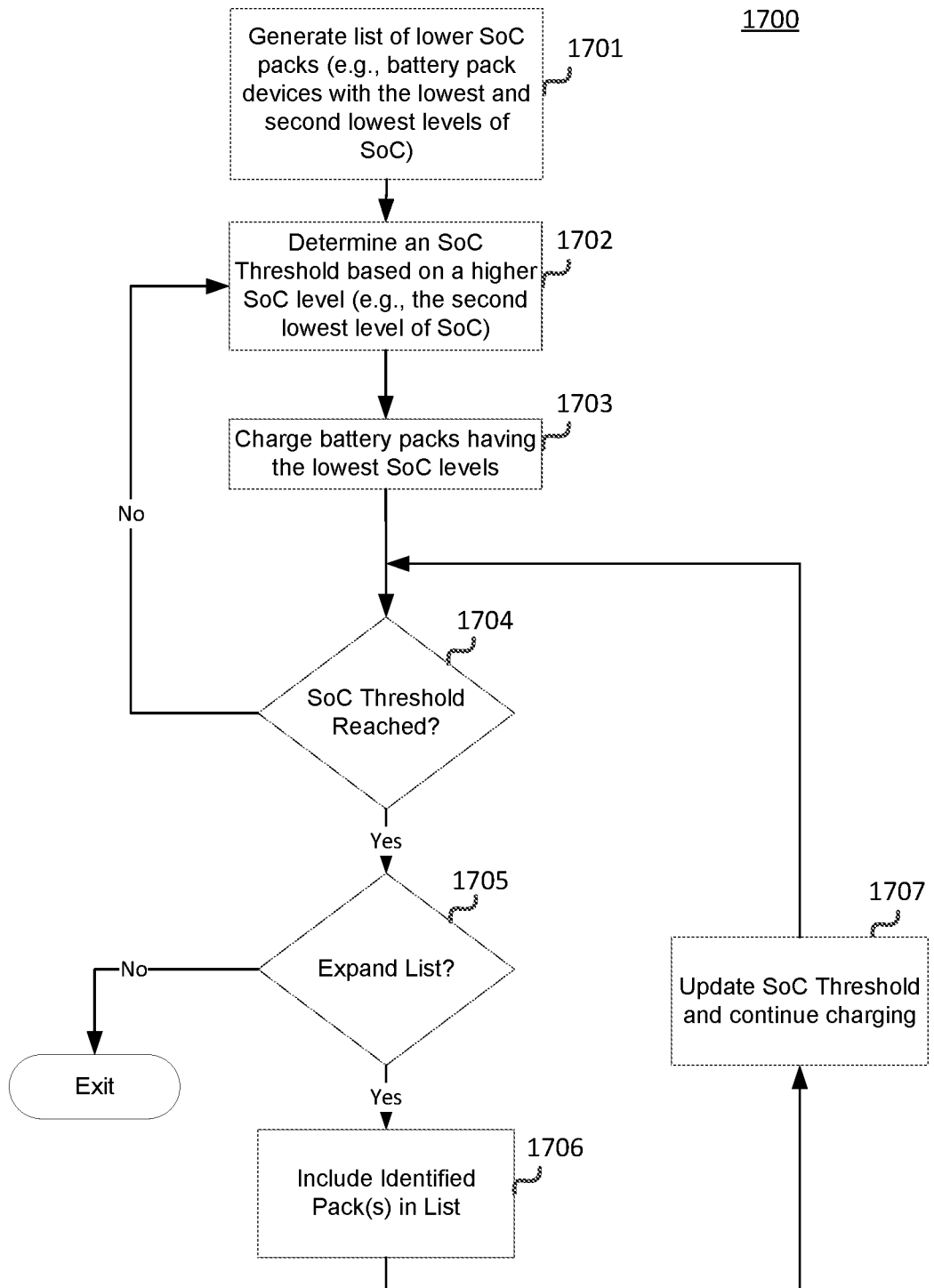
FIG. 17 shows a flowchart for charging a plurality of battery packs in accordance with an embodiment.

Intelligent systems and algorithmic methods (for example, process 1700 as shown in FIG. 17) may ensure that SoC's corresponding to the plurality of battery packs may become more balanced, e.g., to ensure that the plurality of battery packs can be charged together. In various embodiments, a battery pack may include one or more batteries and/or may comprise a device that may include one or more batteries. The one or more batteries of a battery pack may share various characteristics (e.g., a state of charge, a state of health, etc.). Furthermore, each battery pack can be enabled or disabled, e.g., in their ability to charge or discharge other battery packs or end devices.

Still referring to FIG. 16, battery packs that have a large SoC variation may not be immediately connected with charger 1601. For example, as shown in FIG. 16, battery packs 1602a and 1603a, which each have lower SoC's (e.g., 20% and 20%, respectively) than other battery packs, may be charged earlier (e.g., before the other battery packs) until a set threshold can be reached at which a batter pack with a higher SoC (e.g., battery pack 1604b) can be charged. Prioritizing the charging of battery packs with lower SoC's before the charging of battery packs with higher SoC's may be necessary, e.g., because otherwise, charging the higher battery pack with the higher SoC first may cause a fast in-rush electrical current to the lower SOC pack. In some aspects, systems and devices presented herein may cause the charging of the various battery packs by enabling the flow of electric discharge arrays between a charger and the respective battery packs.

As shown in FIG. 16, initially charging battery packs 1602*a* and 1603*a* causes their SoC's to increase from 20% to 40% (e.g., as shown in 1602*b* and 1603*b*). Charging may continue for battery packs 1602*b*-1604*b* until the SoC level of battery pack 1605*b* is reached. At that point, battery pack 1605*b* may be enabled so that charging can continue for battery packs 1602*b*-1605*b*.

FIG. 17 shows an example flowchart of a method 1700 for charging a plurality of battery packs in accordance with an embodiment. Method 1700 may be performed by a computing device having one or more processors, which may be communicatively linked to one or more of the plurality of battery packs and/or to the charger. Also or alternatively, the computing device performing method 1700 may comprise a battery pack (e.g., a "master battery pack" or a "master battery pack") that has a capability of managing one or more functions of other battery packs of the plurality of battery packs. After obtaining the SoC values of the battery packs in a battery system, a subset of the battery packs may be grouped into a lower SoC group at block 1701. For example, the obtained SoC values (e.g., SoC readings) may be sorted into various levels, e.g., based on predetermined ranges. Those battery packs having the lowest SoC values may be grouped into the lowest level. Battery packs within a specified level may have SoC values that are within a specified or predetermined range of one another. Those battery packs having the second lowest of SoC values (e.g., SoC values that are higher than those of the lowest level but lower than the rest of the battery packs) may be placed into the second lowest level. As used herein, a "Lower SoC Packs" may refer to the battery packs of a list comprising (1) the group of battery packs of the lowest level of SoC values and (2) the group of battery packs of the second lowest level of SoC values.

At block 1702, an SoC threshold may be determined. The SoC threshold may be approximately equal to the SoC value of the group of one or more battery packs having SoC values just above the group of battery packs with the lowest SoC values. For example, the SoC threshold may be based on the SoC values of the second lowest level (e.g., an average of the SoC values of the battery packs of the second lowest level).

The battery packs of the group with the lowest levels of SoC can be enabled for charging at block 1703, e.g., facilitating the charging of the battery packs having the lowest level of SoC. In some aspects, the charging may be enabled if one or both of the safety interlock pin or the wake pin is set to "on," as discussed previously.

When the SoC values of the charged battery packs reach the SoC threshold, as determined at block 1704, process 1700 may include determining whether to enlarge the list (e.g., the "Lower SoC Packs" list of step 1701) for subsequent charging at block 1705. The determination of whether to enlarge the list may be based on whether there is significant variability in to SoC of the battery packs (e.g., whether the SoC variability of the battery packs satisfies an SoC variability threshold), as will be described further in relation to FIG. 18C. If the list is to be enlarged, the SoC threshold may be updated (e.g., based on determining the second lowest level of SoC's in the updated list), the selected battery packs may be enabled, and charging may continue at blocks 1706 and 1707.

Figure 18A:
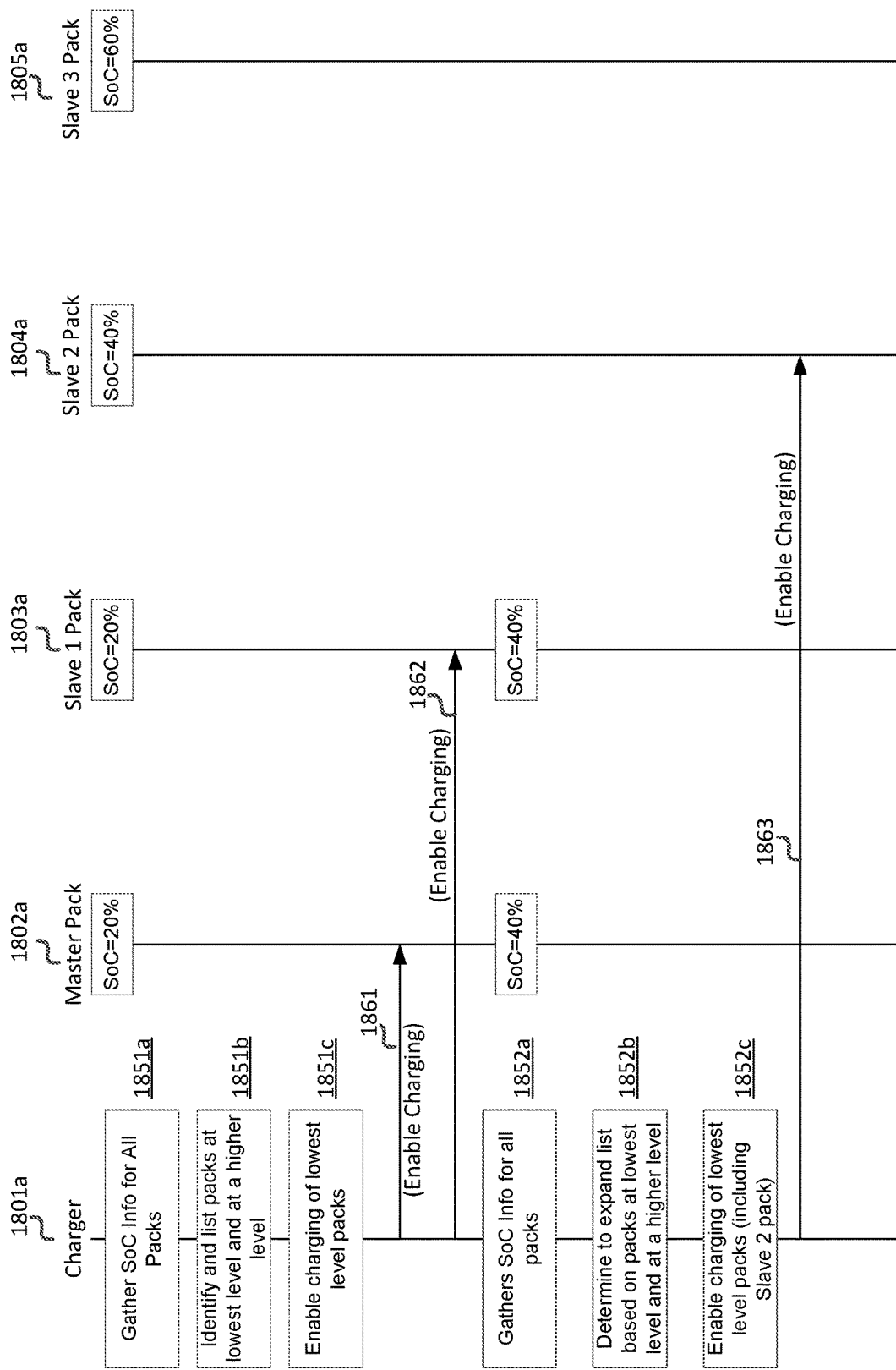
FIG. 18A shows a message flow scenario for charging a plurality of battery packs in accordance with an embodiment.

FIG. 18A shows a message flow scenario for charging a plurality of battery packs for the example shown in FIG. 16. In this scenario, charger 1801*a* may perform one or more iterations of gathering SoC data (e.g., receive SoC readings) from a plurality of battery packs (e.g., battery packs 1802*a*-1805*a*), identifying SoC levels to form lists based on the SoC levels, and enabling the charging of selected battery packs to SoC thresholds via the communication channel (for example, a CAN bus). For example, at event 1851*a*, charger 1801*a* may gather initial SoC values 20%, 20%, 40%, and 60% from battery packs 1802*a*, 1803*a*, 1804*a*, and 1805*a*, respectively.

At event 1851*b*, charger 1801*a* may determine that the group of battery packs with the lowest level of SoC values includes battery packs 1802*a* and 1803*a*, and that the group of battery packs with a higher (e.g., second lowest) level of SoC values includes battery pack 1804*a*. A list of battery packs may be formed and may include the battery packs at the lowest levels of SoC and the battery pack at the higher (e.g., second lowest level).

At event 1851*c*, the charger 1801*a* may enable the charging of group of the battery packs with the lowest level of SoC values (e.g., battery packs 1802*a* and 1803*a*) via messages 1861 and 1862. Charging may continue until the SoC values for these battery packs satisfy an SoC threshold based on a group of one or more battery packs having higher SoC values (e.g., the battery pack having the second lowest level of SoC values (e.g., battery pack 1804*a* at 40%)).

At event 1852*a*, the charger 1801*a* may gather SoC values for all packs. As shown in FIG. 18A, the SoC values for battery packs 1802*a* and 1803*a* will have increased to 40% as a result of the aforementioned charging at event 1851*c*. At event 1852*b*, charger 1801*a* may determine to expand the list of battery packs determined at event 1851*a*. For example, an SoC variability may be determined for battery packs 1802*a*-1805*a*, and the list may be expanded based on the SoC variability being significant enough to satisfy a SoC variability threshold. In the scenario depicted in FIG. 18A, battery pack 1806*a* has an SoC value of 60%, which is different from the updated SoC value if 40% for battery packs 1802*a*, 1803*a*, and 1804*a*. Thus, battery packs 1802*a*, 1803*a*, 1804*a*, and 1805*a* exhibit SoC variability, which may cause the charger 1801*a* to enlarge the list. The enlarged list may include an updated group of one or more battery packs with the lowest level of SoC values (e.g., battery packs 1802*a*, 1803*a*, 1804*a*) and an updated group of one or more battery packs with a higher level of SoC values (e.g., battery pack 1805*a*). The former group (e.g., the group of battery packs with the lowest level of SoC values) may thus include battery pack 1804*a*. At event 1852*c*, the charger 1801*a* may thus enable the charging of battery packs 1802*a*, 1803*a*, and 1804*a* via message 1863.

Figure 18B:
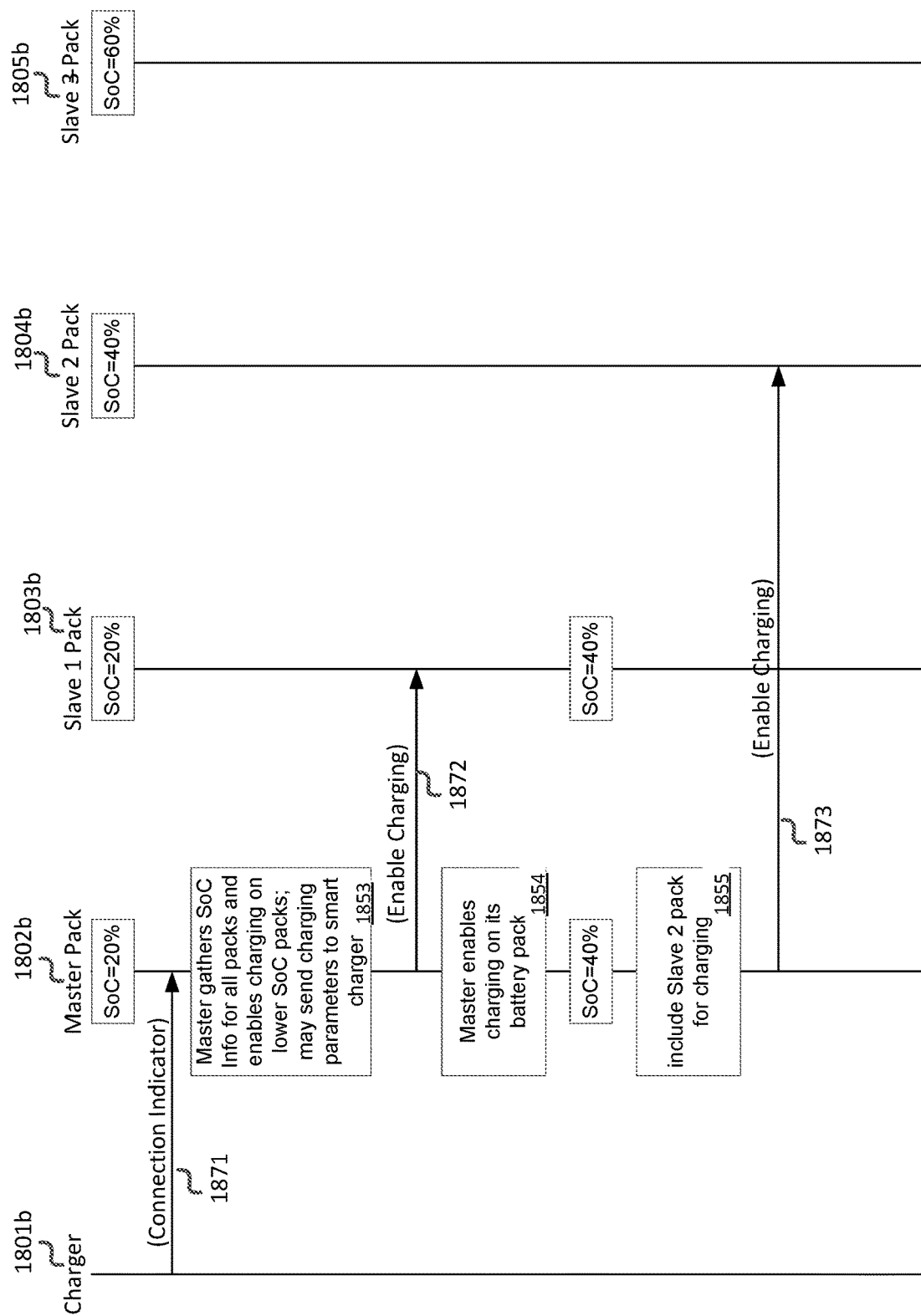
FIG. 18B shows a message flow scenario for charging a plurality of battery packs in accordance with an embodiment.

FIG. 18B shows an example message flow scenario for charging a plurality of battery packs for the example shown in FIG. 16. However, rather than charger 1801*b* gathering SoC data and enabling the battery packs, master battery pack 1802*b* does so when charger 1801*b* is detected via connection indicator 1871. Connection indicator 1871 may be obtained by different approaches, including messaging over a communication channel, a pin, and so forth.

Figure 18C:
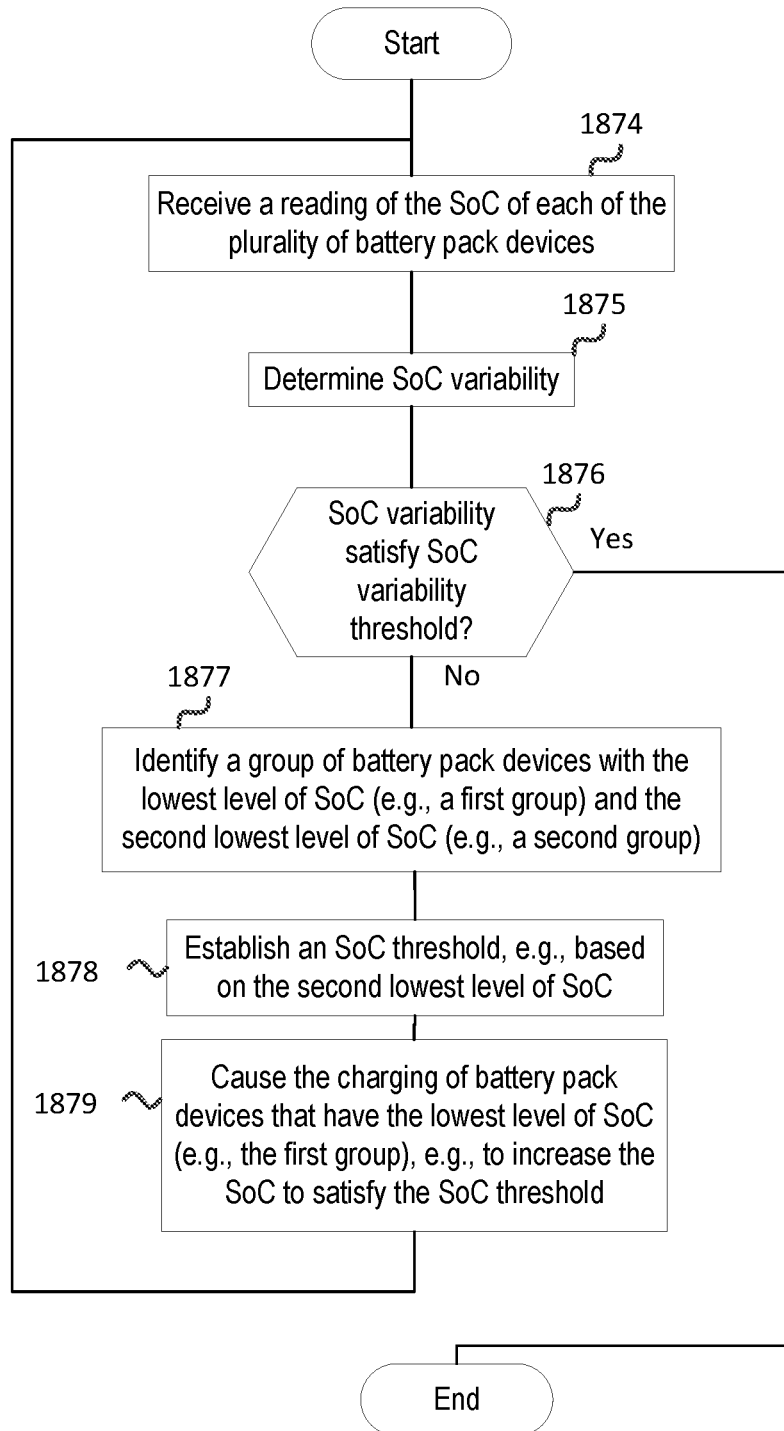
FIG. 18C shows a flowchart of a method for intelligently charging a plurality of battery packs in accordance with an embodiment.

FIG. 18C shows an example flowchart of a method 1800C for intelligently charging a plurality of battery packs, in accordance with a non-limiting embodiment. Method 1800C may be performed by a computing device having one or more processors. The computing device may be a standalone device communicatively linked to one or more of the battery packs and/or to the charger. Also or alternatively, the computing device may comprise one of the battery packs (e.g., a master battery pack) that has the capability of managing one or more functions of the other battery packs of the plurality of battery packs. Also or alternatively, the computing device may comprise the charger.

As discussed previously, each battery pack may have a state of charge (SoC) indicating, e.g., a degree or level of charge relative to its capacity. At step 1874, the computing device may receive a reading (e.g., first reading) of the SoC of each of the plurality of battery packs. The reading may be obtained via a sensor or a monitor at each battery pack. As discussed previously, the SoC's may vary among a plurality of battery packs or may remain relatively constant. An SoC variability (e.g., a first SoC variability) may be computed to indicate a degree of variability of the SoC of the plurality of battery packs (e.g., as in step 1875).

The SoC variability may be based on the SoC's of each of the respective battery packs obtained in step 1874. For example, an SoC variability may be based on one or more of a variance, a standard deviation, a range (e.g., an interquartile range), a mean absolute difference, a median absolute deviation, an average absolute deviation, a distance standard deviation, or a like metric based on the SoC values of each of the plurality of battery packs. For example, in Table 1 discussed above, which comprises a plurality of battery packs (e.g., Pack 1, Pack 2, Pack 3, and Pack 4), there is greater SoC variability at time T0 than there is at time T6. In one aspect, where SoC variability is determined on the basis of a computed range of SoC values, the SoC variability of the battery packs at T0 is 85 (i.e., 100%-15%), whereas the SoC variability at T6 is only 4 (e.g., 45%-41%). If "5" is set as an SoC variability threshold, then the SoC variability at T6 may be said to have satisfied (e.g., fall below) the threshold.

In some aspects, before the computing device can receive the SoC readings, an interlock safety pin may need to allow interaction with the battery packs to occur. For example, the computing device may initially determine that the interlock safety pin allows the receiving the SoC readings from the plurality of battery packs.

The computing device may store, e.g., in memory device 202, a metric indicating an SoC's variability threshold, e.g., to indicate whether variability of the SoC's is insignificant. For example, if an SoC of a battery pack (e.g., first battery pack) is significantly lower than an SoC of another battery pack (e.g., a second battery pack), it is likely that the SoC variability will be significant and therefore not satisfy the SoC variability threshold. At step 1876, the computing device may thus determine whether the SoC variability (e.g., as computed in step 1875) satisfies the SoC variability threshold.

If the SoC variability does not satisfy the SoC variability threshold (e.g., the variation in SoC's among the plurality of battery packs is significant) the computing device may establish an SoC threshold (e.g., as in step 1878) The SoC threshold may be based on the SoC reading of battery pack having the next higher SoC reading (e.g., the second battery pack) after the battery pack with the lowest SoC (e.g., the first battery pack). Thus, the computing device may identify the lowest SoC readings in order to determine the next higher SoC reading (e.g., as in 1877). For example, as discussed in relation to FIG. 16, battery pack 1604a had an SoC of 40%, which is the next higher SoC after the lowest SoC of the battery packs of 20% belonging to battery packs 1602a and 1603a. Thus, based on the example show in relation to FIG. 16, an SoC threshold may be set to 40%.

Furthermore, at step 1879, the computing device may cause the charging of battery packs that have lower SoC's than the established SoC threshold, e.g., by enabling electric charge arrays from the charger to the battery packs. The charging may cause the SoC's of the battery packs to increase, e.g., so that it approaches, matches, and/or satisfies the SoC threshold.

In some aspects, before the computing device can cause the charging of any battery packs, a wake pin, as discussed previously, may need to allow for the charging to occur. For example, the wake pin may need to be set to "on" before a charging can occur. The computing device may initially determine that the wake pin is set to "on" before causing the charging of the battery packs.

This can be detected by the computing device via an additional reading (e.g., a second reading) of the SoC's of each of the plurality of battery packs. Furthermore, the computing device may determine or compute, based on the additional reading, a second SoC variability of the plurality of battery packs. The second SoC variability may be found to satisfy the SOC variability threshold.

If the second SoC variability is not found to satisfy the SoC variability threshold, one or more steps of method 1800C may be repeated until the SoC variability threshold is satisfied. For example, a new SoC threshold may be set based on the next higher SoC after the lowest SoC, and causing the charging of the battery packs with the lowest SoC's.

Thus, one or more iterations of the following can be performed after an updated SOC variability of the plurality of battery packs satisfies the SOC variability threshold: The computing device may identify an Nth group of one or more battery packs within the plurality of battery back devices, wherein the Nth group may have the lowest level of a previous reading of the SOC of the plurality of battery packs; the computing device may also identify an (N+1) group of one or more battery packs of the plurality of battery back devices, wherein the (N+1) group can have the second lowest level of the previous reading of the SOC of the plurality of battery packs; and the computing device may generate a list comprising the n group and the N+1 group. In each iteration, the computing device may determine that the SOC variability of the list in the current iteration does not satisfy the SOC variability threshold. If the SoC variability does satisfy the SoC threshold, the computing device may exit the iterations loop. However, assuming the SoC variability at each iteration does not satisfy the SoC variation threshold, the computing device may an SOC threshold using the previous reading of the SOC of the N+1 group. Subsequently, the computing device may cause, via electric charge arrays, the charging of the N group of battery packs to cause the SOC of the N group to increase and satisfy the SOC threshold. The computing device may receive a subsequent reading of an SOC of each of the plurality of battery packs. An updated SoC variability of the plurality of battery packs may thus be determined based on the subsequent reading of the SoC of each of the plurality of battery packs. As discussed, the above steps may be repeated until the SoC variability (updated at each iteration) satisfies the SoC variability threshold (e.g., the SoCs of the battery packs vary less than a specified range).

The following FIGS. 19A and 19B show two examples of a battery system powering an end device based on power requirements of the end device. In FIG. 19A, only one battery pack is needed to power end device 1901a, b while in FIG. 19B, more than one battery pack is needed to power end device 1911a, b.

FIG. 19A shows an example of a plurality of battery packs discharging in order to electrically power an end device in accordance with an embodiment. The initial SoC values of battery packs 1902a-1905a are 40%, 40%, 40%, and 60%, respectively. As shown in FIG. 19A, a single battery pack (e.g., battery pack 1905a having an SoC of 60%) may initially be used to power end device 1901a until the SoC value of the single battery pack reaches 40% (the same SoC values as the other battery packs) (e.g., as in battery pack 1905b). Using only a group of one or more battery packs having the highest or higher SoC level (in this case the single battery pack 1905a) to initially power an end device, until the SoC values of the group reaches those of the rest of the pack, may be a more efficient and/or safe method of utilizing battery packs to power an end device. As shown in FIG. 19A, after the single battery pack with the initially higher SoC value has been used to initially power the end device, and its SoC readings reach those of the other battery packs (e.g., battery packs 1902b-1905b), the other battery packs may join in powering the end device 1901b.

FIG. 19B shows another example of a plurality of battery packs discharging in order to electrically power an end device in accordance with an embodiment. As shown in FIG. 19B, the initial SoC values of battery packs 1912a-1915a are 40%, 40%, 40%, and 60%, respectively. In some aspects, more than one battery pack may be needed to power end device 1911a-b. In such aspects, various systems and methods presented herein may be used to balance the battery packs before powering end device 1911a-b. The balancing of battery packs 1912a-1914a may be performed, e.g., to safeguard against the risk of an undesired electrical current in-rush from battery pack 1915a, which may occur in the absence of the balancing. When balancing is achieved, battery packs 1912b-1915b can then power end device 1911b.

When powering an end device (for example, a machine), connecting battery packs with varying SoC's may be problematic. Consequently, to prevent such problematic situations, a process (often implementing an intelligent method) may be needed to ensure that a required number of battery packs are connected for system discharge and enabled when appropriate.

Typically, when multiple battery packs are needed to power an end device, it may be advisable for battery packs with large SoC variations to not be connected at the same time. Rather, balancing of the battery packs may be performed initially.

Discharging may use one or more battery packs with higher SoC values first until passing a set threshold for lower SoC battery packs, at which point the lower SoC battery packs may be enabled.

Figure 20A:
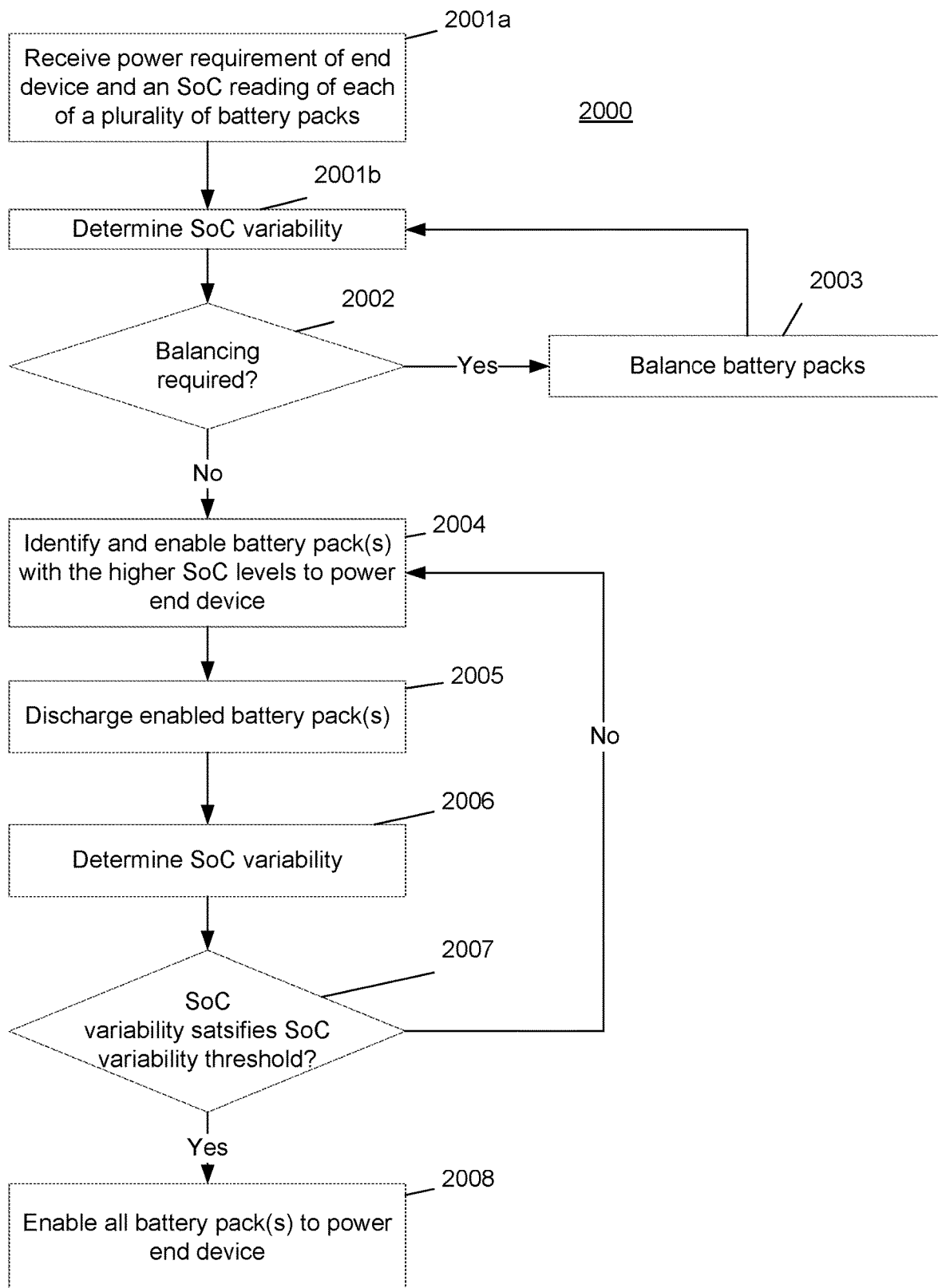
FIG. 20A shows a flowchart for discharging a plurality of battery packs in accordance with an embodiment.
Figure 20B:
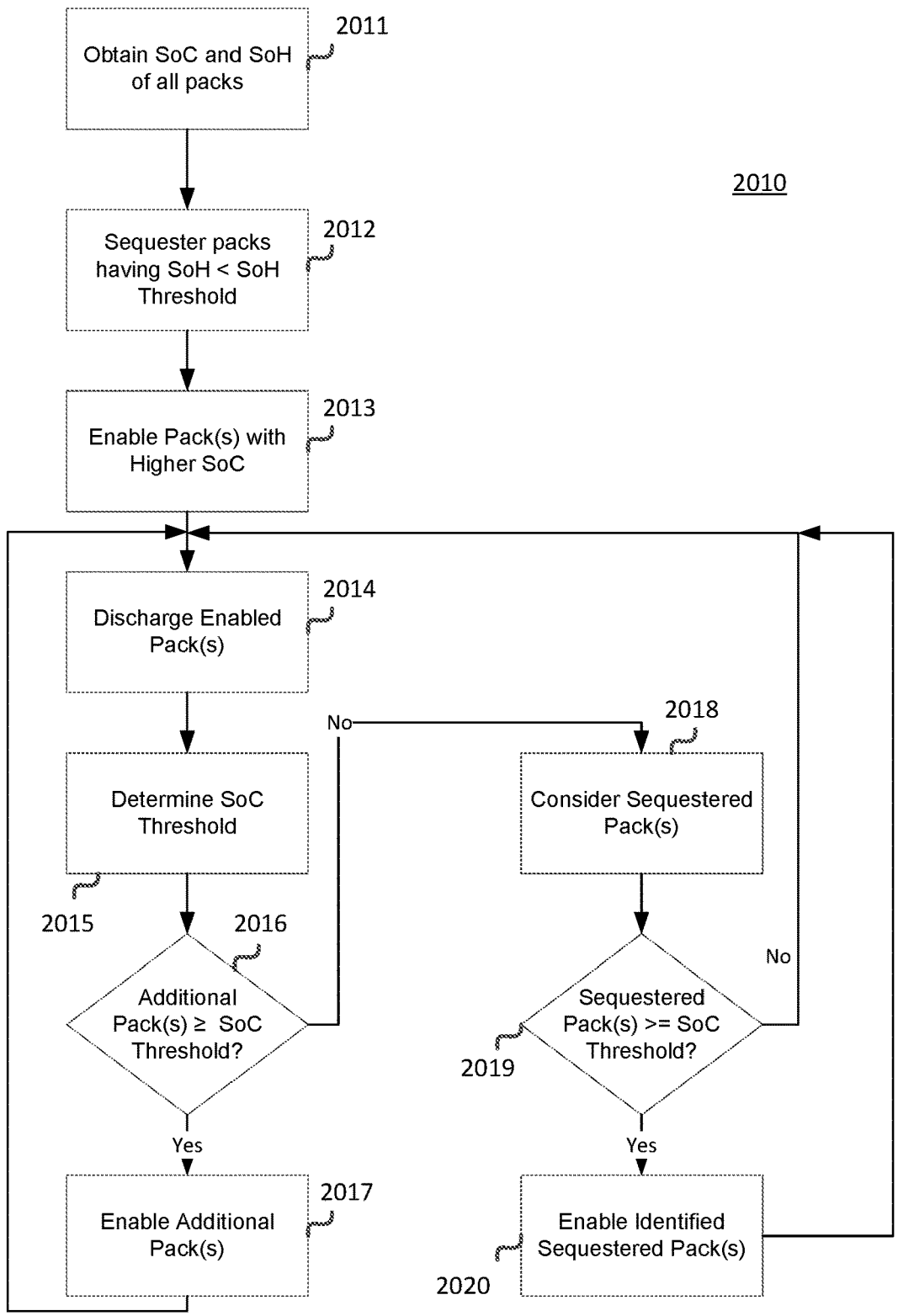
FIG. 20B shows a flowchart for discharging a plurality of battery packs in accordance with an embodiment.

Processes 2000 and 2010 shown in FIGS. 20A and 20B, respectively, are based on the above guidelines.

FIG. 20A shows process 2000 for discharging a plurality of battery packs in order to power an end device. At blocks 2001-2003, initial SoC values of the battery packs are gathered and balancing may be performed based on the SoC variation and the power requirements of the end device. FIG. 19B, as discussed previously, is an example illustration of the process of balancing the battery packs, as described in blocks 2001-2003. However, as will be described in blocks 2004-2008, some aspects of the present disclosure may involve the initial powering of an end device by a single or limited number of battery packs having a higher SoC level, before other battery packs can join in the powering of the end device. FIG. 19A, as discussed previously, is an example illustration of the process of powering an end device by a limited number of battery packs initially and expanding the list of battery backs that can power the end device.

Referring now to block 2001a, a power requirement of the end device may be obtained, and a first reading of a SoC of each of the plurality of battery packs may be obtained. The plurality of battery packs may include various battery packs or groups of battery packs with varying SoC values. At block 2001b, an SOC variability may be calculated to determine a degree to which the SoC values vary among the plurality of battery packs. Also or alternatively, the highest SoC level may be identified, and the computing device may determine that not all of the battery packs have SoC values the highest SoC level.

Depending on the SoC variability, the plurality of battery packs may pose a risk if they are used to concurrently power the end device. As discussed previously in relation to FIG. 19A, if a group of one or more of the plurality of battery packs has SoC values at a level that is significantly greater than the SoC's of the rest of the plurality of battery packs, it may be advisable to initially power the end device only using the group with the significantly greater SoC values (e.g., without the concurrent powering by the other battery packs of the plurality of battery packs). The computing device may allow a group of a single or a restricted number of battery packs to power an end device by only enabling the corresponding discharge arrays of the group. The pathway of allowing the group to power the end device is shown in blocks 2004-2008.

Another way to address the above-described and similar risks may be to balance the battery packs, and thereby reduce the SoC variability of the plurality of battery packs, as discussed previously in relation to 21B. For example, one group of battery packs (e.g., a first group) may have SoC values that are at a level lower than another group of battery packs (e.g., a second group). An SoC variability of the plurality of devices may be calculated and found to not satisfy an SoC variability threshold (e.g., the range between the highest and lowest SoC values is too high) based on the variation in SoC between the first group and second group. The computing device may thus determine that a balancing is required (e.g., "Yes" at block 2002) based on the SoC variability not satisfying (e.g., falling within) the SoC variability threshold. The battery packs may thus be balanced according to previously discussed methods as shown in FIG. 19B.

The computing device may consequently determine whether or not a balancing is not required (e.g., "No" at block 2002). The decision may be a preference provided (e.g., configured) to the computing device by an operator of the computing device. Also or alternatively, the decision may be based on two or more SoC variability thresholds. For example, if the SoC variability of the plurality of battery packs is higher than a higher SoC variability threshold (e.g., a first SoC variability threshold), the pathway of balancing the battery packs may be triggered. If the SoC variability is not higher than the first SoC variability threshold but is still higher than a second SoC variability threshold (which is not as high as the first SoC variability threshold), the pathway depicted in blocks 2004-2008 may be triggered (e.g., causing battery pack(s) with higher SoCs to initially power the end device).

Referring now to blocks 2004-2005, a group of one or more battery packs may be identified and enabled (e.g., by enabling the corresponding discharge arrays) to power the end device. The group may be identified by identifying the battery packs with SoCs at the highest level, or at least at a higher level than other battery packs. The computing device may thus cause the group to power the end device, thereby beginning the discharging of the group of battery packs (e.g., as in block 2005). The group of discharging battery packs may reach a lower SoC level. The resulting lower SoC level of the group, which initially had a higher SoC level, may result in a lower SoC variability for the plurality of battery packs. The computing device may thus determine the updated SoC variability at block 2006. If the updated SoC variability fails to satisfy the SoC variability threshold (e.g., there are still battery packs with higher SoC levels), the additional battery packs may be similarly identified and enabled to power the end device at blocks 2004-2005. After the SoC variability of the plurality of battery packs satisfies the SoC variability threshold (e.g., there is not much variation in the SoC levels of the plurality of battery packs), the computing device may allow all battery packs to power the end device.

Also or alternatively, both of the above-described pathways (e.g., blocks 2002-2003 and blocks 2004-2008, respectively) may be combined. For example, after balancing has been performed at block 2003, a second reading of the SoC's of each of the plurality of battery packs may be obtained, and a second SoC variability may be calculated. The SoC variability may satisfy the SoC variability threshold, e.g., the SoC's of the plurality of battery packs may vary less and/or have a reduced range. Subsequently, the plurality of battery packs may concurrently power the end device.

FIG. 20B shows process 2010 for discharging a plurality of battery packs in accordance with an exemplary embodiment. Process 2010 is similar to process 2000; however, some of the battery packs may be sequestered based on a state of health (SoH) of the battery packs. Battery packs with a low SoH may be sequestered and used only when needed.

At blocks 2011-2013, the SoC and SoH values of the battery packs may be gathered. The battery packs with SoH values that do not satisfy a predetermined SoH threshold may be sequestered, and in order to enabled after non-sequestered battery packs have been used. Non-sequestered battery packs (e.g., battery packs with SoH levels that satisfy the SoH threshold) may be used to initially power the end device based on the end device requirements and SoC values of the battery packs, as explained herein.

For example, at block 2013, the battery packs with SoC values that satisfy an SoC threshold (e.g., the SoC values are above the next highest level of SoC among the plurality of battery packs) may be enabled to power an end device, thereby resulting in the discharging of these battery packs at block 2014. As shown in blocks 2014-2016, the enabled battery packs can be discharged until a lower SoC value is reached (e.g., the SoC fail to satisfy the SoC threshold). At that time, additional non-sequestered battery packs may be enabled at block 2017. However, when no non-sequestered battery packs are available, the sequestered battery packs may be considered at 2018-2020.

Sequestering low SoH battery packs may be beneficial since usage of older battery packs (often associated with a low SoH value) may be reduced, thus extending the life of those battery packs.

Figure 21:
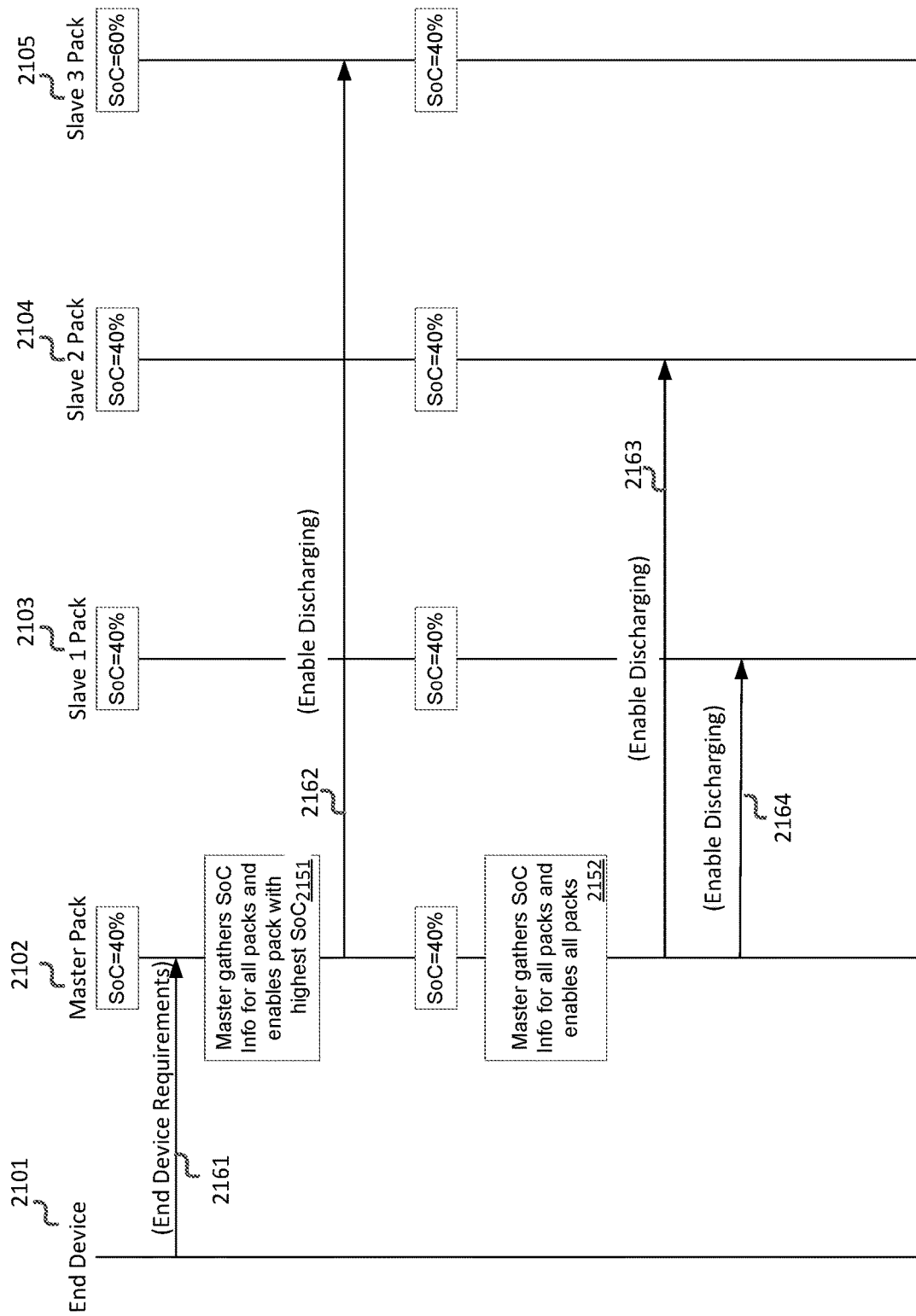
FIG. 21 shows a message flow scenario for discharging a plurality of battery packs in accordance with an embodiment.

FIG. 21 shows a message flow scenario for discharging a plurality of battery packs for the example shown in FIG. 19A. Battery packs 2002-2005 initially have SoC values of 40%, 40%, 40%, and 60%, respectively. Power requirements of end device 2101 may be obtained from master battery pack 2102 via message 2161 over the communication channel (for example, a CAN bus), where only one battery pack is needed to power end device 2101. Consequently, in accordance with process 2100, master battery pack 2102 may enable battery pack 2105 for discharging via message 2162.

When battery pack 2105 reaches the SoC value of the other battery packs, master battery pack 2102 enables battery packs 2103 and 2104 via messages 2163 and 2164 and may enable itself via internal messaging.

In some aspects, a process (for example, process 2200 as will be discussed) may be directed to a "limp home mode" operation for a failed Li-ion battery cell in a large-format battery pack system. A "Limp home mode" operation can safely mitigate a catastrophic failure in a system. For example, the voltage of a battery cell may become very low (e.g., below a predetermined voltage threshold), indicative of a failing battery cell. With a medium-large battery pack implementation, the internal battery management system may preemptively diagnose a failure and consequently may mitigate the failure by initiating a partial shutdown of the battery pack such that the equipment (end device) being powered by the battery system does not require a total shutdown and can still "limp home."

Figure 22:
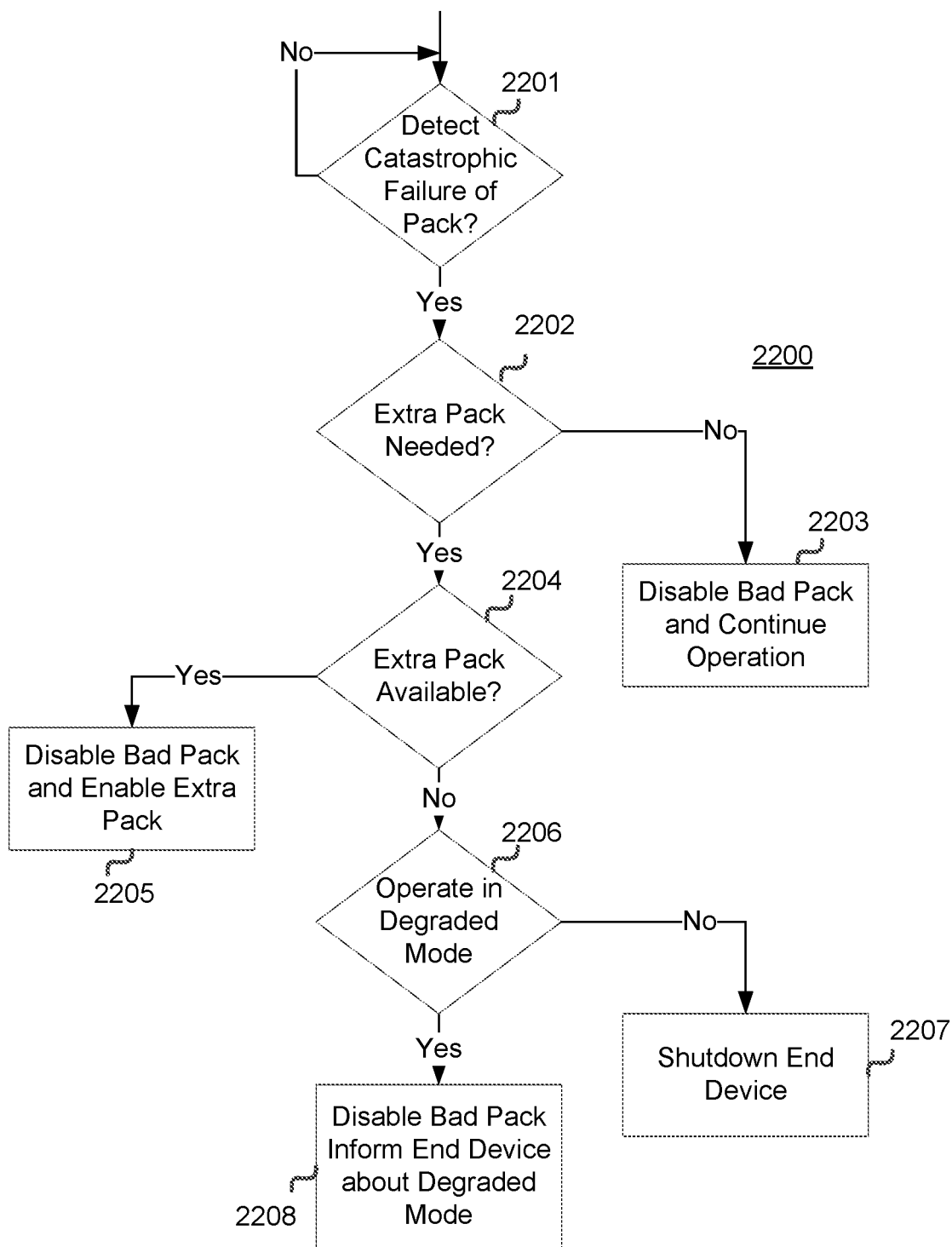
FIG. 22 shows a flowchart for limp home mode operation in accordance with an embodiment.

FIG. 22 a flowchart for limp home mode operation in accordance with an embodiment. At block 2201, the master battery pack detects a catastrophic failure of one or more of the battery cells of one of the battery packs powering the end device. For example, a cell voltage in the battery pack may drop below an acceptable minimum threshold, a maximum current is exceeded, and/or a battery cell temperature is above an allowable range.

When the master battery pack detects the catastrophic failure, the master battery pack determines whether an extra battery pack is needed at block 2202. For example, a battery system may have activated four battery packs when an end device needs only three battery packs with a given SoC level. If so, process 2200 disables the bad battery pack and continues operation at block 2203.

However, if the extra battery pack is needed, the master battery pack determines whether an unused battery pack (which may be the master battery pack itself) in the battery system is available at block 2204. If so, the master battery pack disables the bad battery pack (for example, disabling the discharging array) and enables the extra battery pack (for example, enabling the discharging array) at block 2205. If more than one extra battery pack is available, the master battery pack may select the extra battery pack having the largest SoC value in order to continue service for the largest possible time. However, when no extra battery packs are available and degraded operation of the end device is permitted, as determined at block 2206, the master battery pack disables the bad battery pack and sends a failure alert message to the end device about degraded operation at block 2208. However, if degraded operation is not acceptable for the end device, power is removed from the end device at block 2207 to shut down the end device.

When a fault occurs at a slave battery pack, it is possible that the slave battery pack does not send a message to the master battery pack under various failure modes. However, the master battery pack may determine that there is no longer communication from the slave battery pack and adjust a power level (derate) to the end device.

While the bad battery pack may be a slave battery pack, the master battery pack itself may be the bad battery pack. For example, a fault may occur with one of its battery cells while the processing capabilities of the master battery pack is not compromised. If so, the master battery pack may internally disable its own discharging array, attempt to enable the discharging array of a spare battery pack, and continue operating as the master battery pack.

With some embodiments, when the master battery pack has faulted, a new master battery pack may be assigned even if the faulty master battery pack is still operational. This approach ensures that the faulty master battery pack does not compromise the integrity of the overall handling of the other battery packs.

With some embodiments, when the master battery pack has faulted, a new master battery pack may be assigned to allow continued derated performance when communication to the faulty master battery is lost.

Figure 23A:
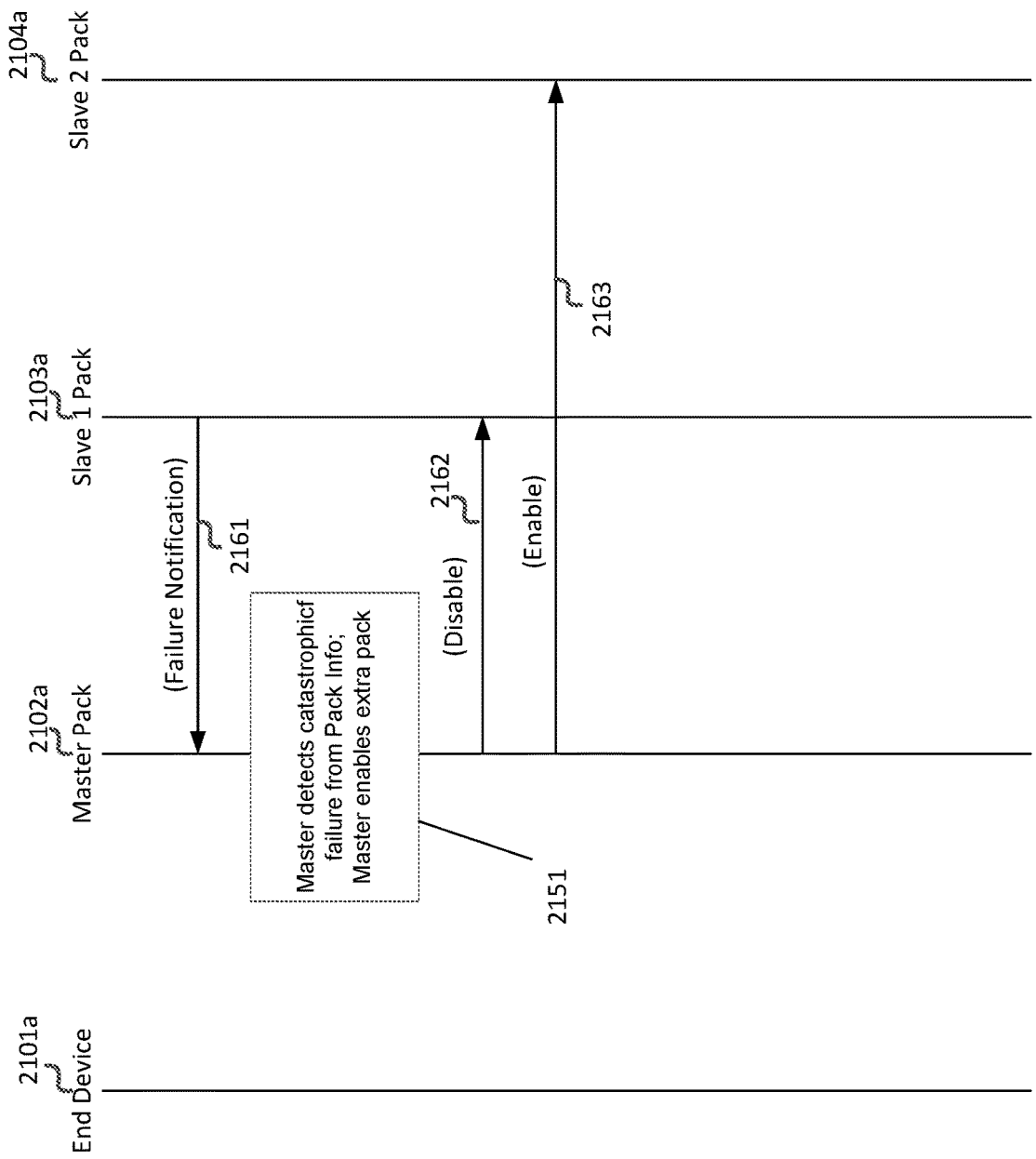
FIG. 23A shows a message flow scenario for limp home mode operation in accordance with an embodiment.

FIG. 23A shows a message flow scenario for limp home mode operation in accordance with an embodiment. With this scenario, a spare battery pack (e.g., pack 2104a) is available when a catastrophic failure is detected at battery pack 2103a.

At event 2151a, master battery pack 2102a detects a catastrophic failure at battery pack 2103a in response to failure notification message 2161. For example, battery pack 2103a may provide battery status information indicative of a low battery cell voltage. The status information may be in response to a query from master battery pack 2102a or may be autonomously sent when a catastrophic event occurs. Consequently, master battery pack 2102a enables spare battery pack 2104a and disables bad battery pack 2103a via messages 2163 and 2162, respectively.

FIG. 23A shows a message flow scenario for limp home mode operation in accordance with an embodiment. With this scenario, a spare battery pack is not available.

At event 2152, similar to the message scenario in FIG. 23A, master battery pack 2102b detects a catastrophic failure at battery pack 2103b when receiving failure notification message 2164 from 2103b. Because master battery pack 2102b determines that no spare battery pack is available, master battery pack 2102b disables battery pack 2103b via message 2165 and sends degradation message 2166 to end device 2101b, where end device 2101b is able to operate in a degradation mode.

Figure 23B:
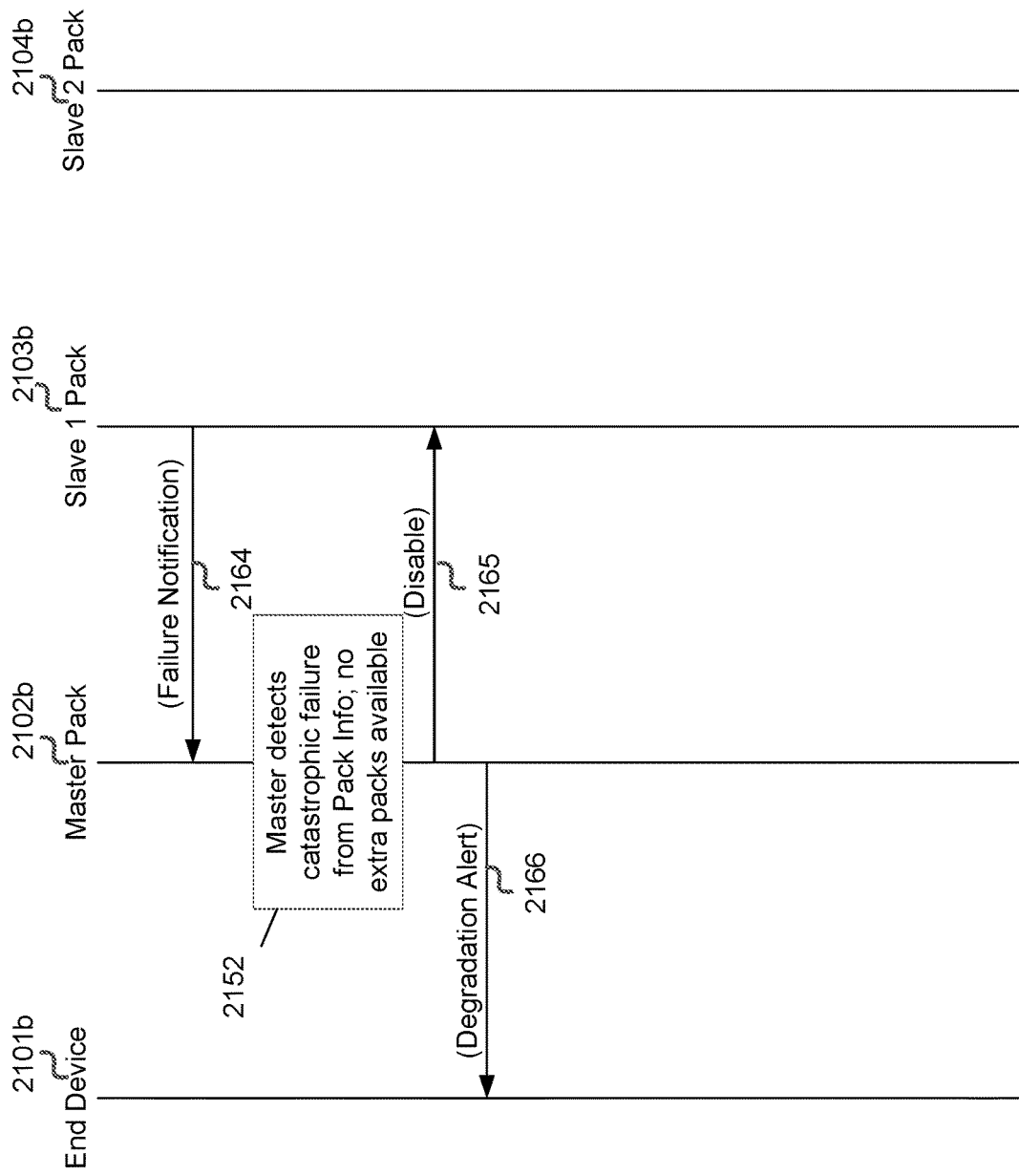
FIG. 23B shows a message flow scenario for limp home mode operation in accordance with an embodiment.

Referring to FIGS. 23A-23B, failure notification messages 2161 and 2163 may be autonomously sent from the battery pack incurring the catastrophic failure or may be sent in response to a request for battery status information from master battery pack 2102a,b. When sent autonomously, the battery pack may detect when a battery parameter (for example, SoH or cell voltage) drops to a predetermined threshold and then sends the failure notification message to master battery pack 2102a,b. When sent in response to a status request, master battery pack 2102a,b, the status request repetitively (for example, periodically). The battery pack receives the status requests and, in response, provides current battery status information. When one or more of the returned battery parameters drops below a predetermined threshold, master battery pack 2102a,b detects a catastrophic failure at the battery pack.

With some embodiments, master battery pack 2102a,b may receive periodic battery status information from the other battery packs. When master battery pack 2102a,b detects a sudden drop (for example, more than a predetermined difference with respect to the previous value) in one of the battery parameters (for example, cell voltage), master battery pack 2102a,b may determine that a catastrophic failure at the corresponding battery pack is predicted or imminent and take preemptive action and/or generate a warning notification.

With some embodiments, battery cells 203 (shown in FIGS. 2A and 4B, respectively) may have a cell structure (for example, a parallel structure) so that the battery pack may deactivate the failing battery cells while the other battery cells remain enabled. In such a situation, the battery pack may operate in a degraded mode and report that the battery pack is operating in the degraded mode to master battery pack 2102a,b.

Some battery chemistries are self-limiting in that, as a first battery reaches a higher state of charge, a rate of increase in the voltage across that battery begins to slow, allowing other batteries with lower states of charge to receive more power and increase their states of charge more quickly while the battery with the higher state of charge increases more slowly. However, other battery chemistries experience a different type of voltage change as their SOCs increase. For example, when quickly charging battery cells that have a Li-Ion phosphate (LFP) battery chemistry, the battery cells that have a higher SOC may experience a faster rise in voltage across them than cells that have a lower SOC. Other battery chemistries that exhibit similar fast rises in voltages across cells with a high SOC include Lithium Nickel Manganese Cobalt Oxide (NMC), Lithium Nickel Cobalt Manganese Oxide (NCM), and Lithium Nickel Cobalt Aluminum oxide (NCA). Because overcharging any individual battery cell can lead to failure of that cell in an overall array of battery cells, it is desirable to prevent overcharging of any individual battery cell in an array. Because of the divergent nature of voltages across batteries of different SOCs of the LFP battery chemistry when being charged, an individual battery cell may be inadvertently overcharged despite having overvoltage protection algorithms programmed into a controller that controls a voltage applied across the battery cells. Because of the fast increase in a voltage level across one battery cell compared to others and the need to rapidly reduce the charging voltage across that battery cell, fast charging of batteries with these battery chemistries has been avoided in favor of only slowly charging batteries with these battery chemistries.

Figure 24:
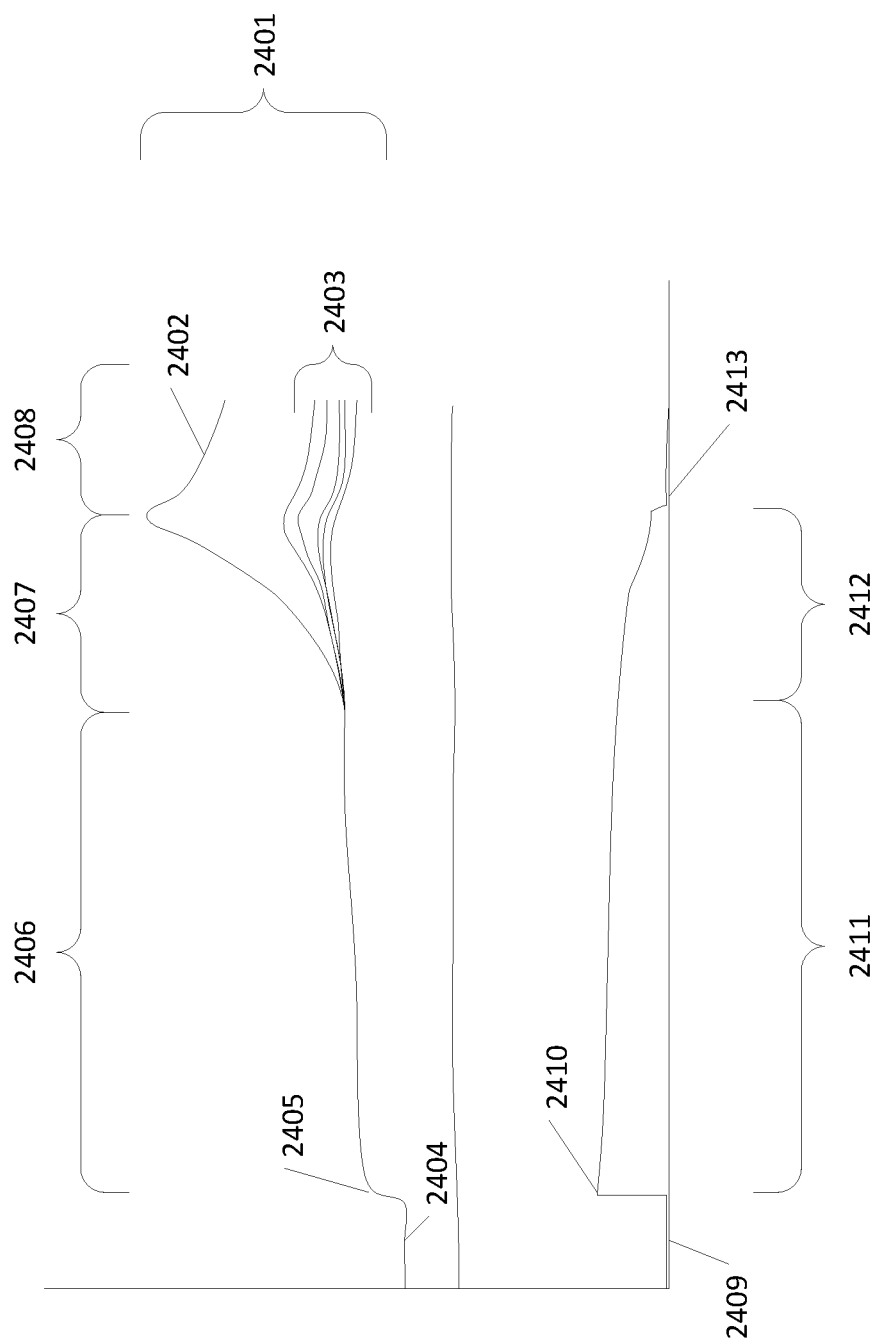
FIG. 24 shows an example of battery states of charge while charging with batteries of certain chemistries.

FIG. 24 shows an example of states of charge (SOC) of battery cells of certain chemistries while being charged. FIG. 24 is a prophetic example only used to generally illustrate issues with having chemistries with voltages that quickly increase when approaching their fully charged state. Voltage levels 2401 are shown in FIG. 24 over time. Initially, during a first interval, states of charge of the batteries are relatively constant as voltage level 2404. During that first interval, a current draw for charging the batteries is also low as shown by current level 2409. Next, a higher voltage is applied to the batteries shown by an increase in the voltage 2405 across the batteries as well as an increase in the current 2410 consumed by charging the batteries. As the batteries gradually charge with the rising voltage level 2406 across them, the current consumed decreases 2411. During a next interval the voltages 2407 across individual batteries begin to change at different rates. A battery cell with a high charge 2402 may experience a fast rise in its voltage level while the remaining battery cells 2403 do not experience the same fast rising voltage level. As the voltages across the batteries are increasing, the current drawn by the battery cells decreases during interval 2412. To prevent the battery cell with the highest voltage level 2402 from being overcharged while the other battery cells have not yet reached their desired SOC, the current flowing into the battery cells may be reduced at 2413. During interval 2414, the voltage across the battery cell 2402 with the highest SOC may decrease by providing the energy stored within it to the remaining battery cells

2403. To change the voltage level applied across the battery cells, a buck converter may be used to reduce a higher voltage level of the power charging the cells to a lower voltage level. This reduction may help prevent one battery cell from reaching an overcharged state while continuing to permit the remaining battery cells to charge.

Figure 25A:
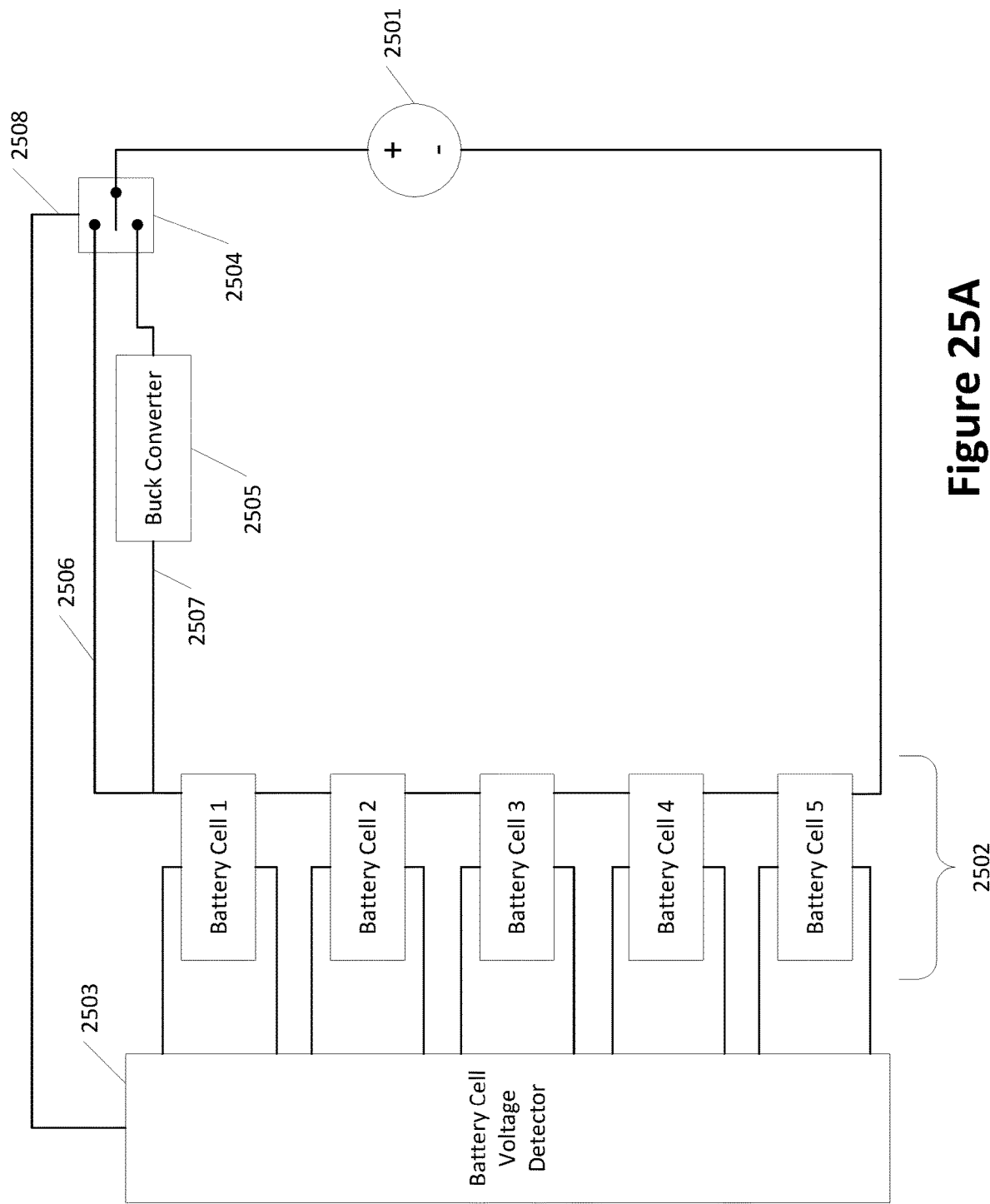
FIGS. 25A and 25B show examples of implementations of a buck converter in a battery pack.
Figure 25B:
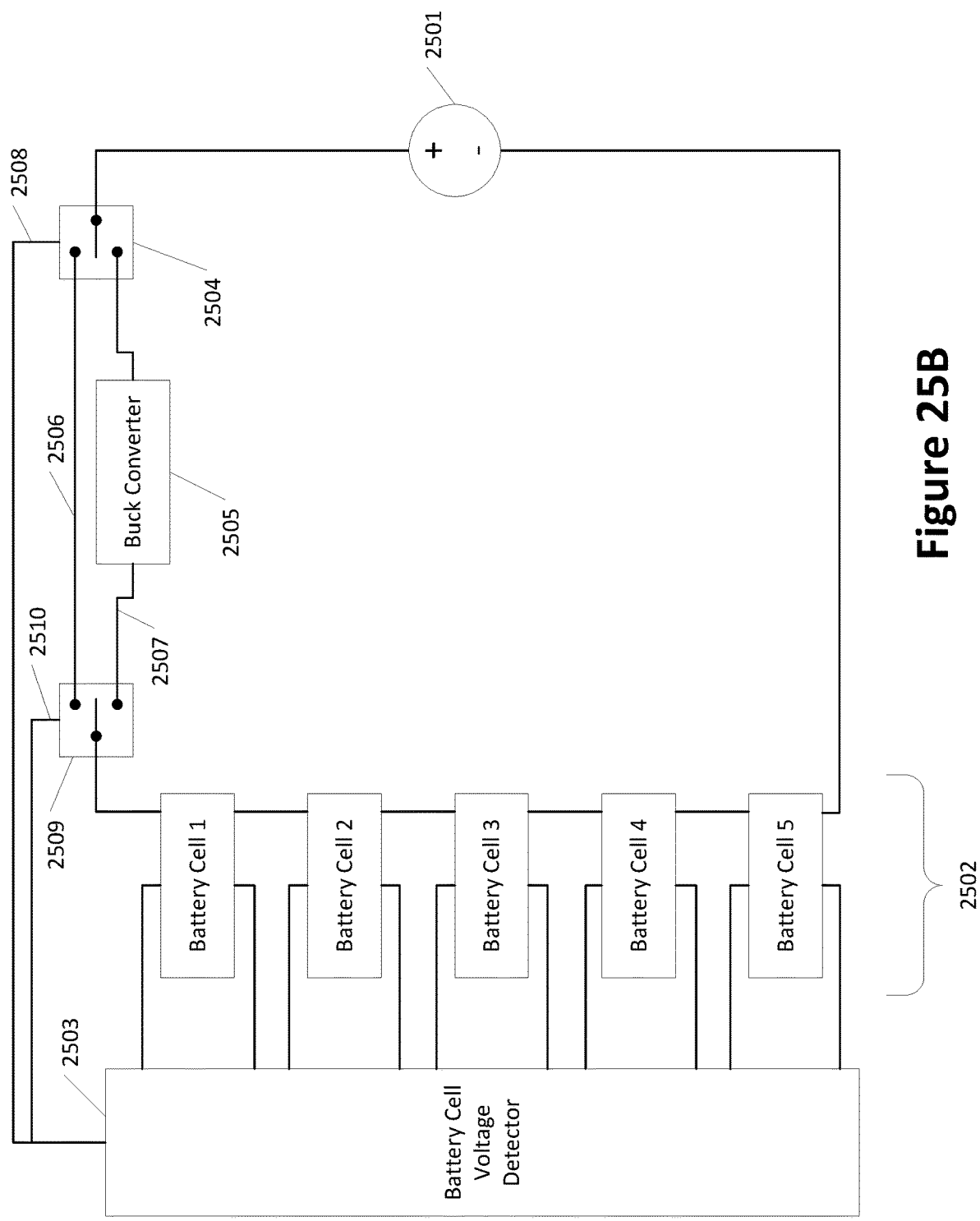

FIGS. 25A and 25B show examples of implementations of a buck converter in a battery pack. FIG. 25A shows an example of a buck converter being used to reduce a voltage across an array of battery cells to prevent an overvoltage state of one or more of the cells. FIG. 25A shows a power source 2501, an array of battery cells 2502, a battery cell voltage detector 2503, a switch 2504, and a buck converter 2505. FIG. 25A also shows two pathways 2506 and 2507 for power to flow from the power source 2501 to the array of battery cells 2502.

The battery cell voltage detector 2503 may detect voltages across each of the battery cells in the battery cell array 2502. Based on at least one of the voltages across the battery cells in the battery cell array 2502 reaching or exceeding a threshold voltage, the cell voltage detector 2503 may control switch 2504, via signal line 2508, to change which pathway 2506 or 2507 is being used to charge the array of battery cells 2502.

The selected threshold voltage may be at or near a maximum voltage level for a battery cell or below the maximum voltage level to account for switching delays. Some battery chemistries are susceptible to degradation and/or failure based on a voltage across a battery cell reaching a certain high voltage. To prolong the life of a battery cell and/or an array of battery cells, it is desirable to prevent any cell from experiencing a degrading high voltage. The threshold voltage, used by the battery cell voltage detector 2503, may be set at the degrading high-voltage level or lower than the degrading high-voltage level (e.g., to prevent the fast rising voltage from reaching the overcharging voltage state). By setting the threshold voltage lower than the degrading high-voltage level, switching delays may be accounted for by the circuits of FIG. 25A and FIG. 25B. In one or more examples, a comparator may be used to determine whether a voltage across any battery cell has reached or exceeded the threshold voltage. A comparator (e.g., an operational amplifier connected as a comparator and/or various discrete components connected as a comparator) may be used to respond quickly to the change in voltage across any battery cell. In some battery chemistries, the rate of change of the voltage may be high such that an integrated circuit may be too slow to respond before a battery cell reaches an over-voltage state. Because of the high likelihood of failure of an individual battery cell after reaching the over-voltage state, ensuring that voltages across all battery cells are kept below the over-voltage state is beneficial. As described herein, some battery chemistries experience very fast increases in their SOCs over a short period of time. As some cells may have a higher SOC than others, these types of battery chemistry, when performing a fast charge of the cells, may create diverging SOC levels in a short time interval where voltages across cells with the higher SOCs increase faster than voltages across cells with lower SOCs. Because those cells with higher voltages across them may reach an overvoltage state (possibly negatively affecting those cells' lifespan and/or creating a catastrophic situation) in a very short period of time, an integrated circuit with its internal logic may be too slow to prevent an overvoltage situation. As described herein, one or more aspects address this extremely fast rise of voltages in some cell chemistries by using a fast-acting circuit to reduce a high charging voltage to a lower level, thereby preventing the cells with the fast rising charges from reaching an overvoltage state. In one or more examples, the fast-acting circuit may be coupled with the slower-acting controller to maintain the charging voltage level at a lower level. For instance, with the fast-acting circuit quickly dropping the charging voltage, a possibility exists that, once the voltage across the higher-voltage cells decreases, the fast-acting circuit may permit the cells to begin charging at the higher voltage level (e.g., creating an undesired oscillation of charging levels). By enabling the controller to determine when the overvoltage protection for one or more cells has been triggered, the controller may continue to maintain the lower charging voltage across the cells despite the cell with the highest voltage dropping below the triggering threshold voltage level.

Examples of battery chemistries that may benefit from fast charging at a high level with a fast drop in charging voltage once one cell is at or near an overvoltage protection threshold include Li-Ion phosphate (LFP), Lithium Nickel Manganese Cobalt Oxide (NMC), Lithium Nickel Cobalt Manganese Oxide (NCM), and Lithium Nickel Cobalt Aluminum oxide (NCA). These are examples and are not considered exhaustive of battery chemistries exhibiting the fast rise in voltages across cells when reaching a high SOC. Because of the fast increase in a voltage level across one battery cell compared to others and the need to rapidly reduce the charging voltage across that battery cell, fast charging of batteries with these battery chemistries may be performed safely.

In a first state, the switch 2504 may connect power source 2501 to pathway 2506 that is connected to a power terminal of the array of battery cells 2502. In the first state, the array of battery cells 2502 are charged with a full voltage from power source 2501. In a second state, the switch 2504 may connect power source 2501 to pathway 2507 that is also connected to the power terminal of the array of battery cells 2502. In the second state, the buck charger 2505 may reduce a high-voltage from power source (e.g., a "first voltage" or "first voltage level") 2501 to a lower voltage (e.g. a "second voltage" or a "second voltage level").

In FIG. 25A, the array of battery cells 2502 is shown including five battery cells (identified in FIG. 25A as battery cells 1-5). It is appreciated that a greater number of battery cells may be used or fewer battery cells may be used as desired.

In the above description, the switch 2504 starts in the first state where the full voltage level is provided to the array of battery cells 2502. Additionally or alternatively, the switch 2504 may start in the second state where a lower voltage is provided to the array of battery cells 2502, and later, by switching from the second state to the first state, provide the higher voltage to the array of battery cells 2502.

FIG. 25B shows another example of a buck converter being used to reduce a voltage across an array of battery cells to prevent an overvoltage state of one or more of the cells. FIG. 25B includes a number of the elements of FIG. 25A including a power source 2501, an array of battery cells 2502, a battery cell voltage detector 2503, a switch 2504, and a buck converter 2505. FIG. 25B also shows the two pathways 2506 and 2507 for power to flow from the power source 2501 to the array of battery cells 2502. In addition to the contents of FIG. 25A, FIG. 25B also includes a second switch 2509 that selectively connects one of pathway 2506 or pathway 2507 to the array of battery cells 2502.

The battery cell voltage detector 2503 may detect voltages across each of the battery cells in the battery cell array 2502.

Based on at least one of the voltages across the battery cells in the battery cell array 2502 reaching or exceeding a threshold voltage, the cell voltage detector 2503 may control each of switch 2504, via signal line 2508, and switch 2509, via signal line 2510, to change which pathway 2506 or 2507 is being used to charge the array of battery cells 2502.

In the first state, the switch 2504 may connect the power source 2501 to pathway 2506 and the switch 2509 may connect the pathway 2506 to a power terminal of the array of battery cells 2502. In the first state, the array of battery cells 2502 are charged with a full voltage from power source 2501. In the second state, the switch 2504 may connect power source 2501 to pathway 2507 and the switch 2509 may connect the pathway 2507 to a power terminal of the array of battery cells 2502.

In the second state, the buck charger 2505 may reduce a high-voltage from power source (e.g., a "first voltage" or "first voltage level") 2501 to a lower voltage (e.g. a "second voltage" or a "second voltage level"). In FIG. 25B, as in FIG. 25A, the array of battery cells 2502 is shown including five battery cells (identified as battery cells 1-5). It is appreciated that a greater number of battery cells may be used or fewer battery cells may be used as desired.

In the above description, the switch 2504 starts in the first state where the full voltage level is provided to the array of battery cells 2502. Additionally or alternatively, the switch 2504 may start in the second state where a lower voltage is provided to the array of battery cells 2502, and later, by switching from the second state to the first state, provide the higher voltage to the array of battery cells 2502.

While not explicitly shown in FIG. 25A or FIG. 25B, a controller may also be included to maintain the use of the buck converter pathway 2507 after the detected high voltage across the battery cell drops below the threshold voltage.

FIG. 26 shows a battery pack having a buck converter with multiple voltage detectors. A power source 2601 provides charging power to an array of battery cells 2602 where the voltage level associated with the power provided to the array of battery cells 2602 is controlled by voltage detectors 2603. FIG. 26 includes a switch 2604 configured to switch between a first pathway 2606 and 2607 where pathway 2607 also includes a buck converter 2605. Power transmitted through pathway 2606 is at a high-voltage level, near the supply voltage level of power source 2601, accounting for voltage drops across switches (e.g. switch 2604 and others) and/or across other connections. Power transmitted through pathway 2607 is modified by buck converter 2605 to reduce the supplied voltage from the high-voltage level of pathway 2606 to a lower voltage of 2607.

A voltage across each battery cell in the array of battery cells 2602 is monitored by a voltage detector of the voltage detectors 2611, 2612, 2613, 2614 and 2615. Five battery cells are shown in FIG. 26. It is appreciated that a greater number of or fewer battery cells may be used in the quantity of voltage detectors modified accordingly. With respect to the lowest battery cell in the series connection of the array of battery cells 2602, the voltage across the battery cell is monitored by voltage detector 2611. Voltage detector 2611 may comprise a comparator 2609, a reference voltage 2608, and a voltage 2610 from the first battery cell, as passed through a voltage divider. In the example of FIG. 26, the voltage divider is a pair of resistors with values selected to properly compare a voltage across the battery cell with the reference voltage. The reference voltage may be selected such that, when the battery cell is at the threshold voltage described above, the reference voltage reflects that threshold voltage adjusted via the voltage divider. In other words, from the perspective of the battery cell itself, its voltage is being compared with the threshold voltage. In short, the voltage detector 2611 is configured to compare a voltage across the battery cell with the threshold voltage.

The output of the voltage detectors 2603 may control a gate of the switch 2618 (e.g., a MOSFET, power MOSFET, and/or other switch), in which a terminal of its conduction path (e.g., a source terminal of an n-type MOSFET) is connected to a negative terminal of the power source 2601 and another terminal of its conduction path (e.g., a drain terminal of the n-type MOSFET) is pulled up to a voltage supply (e.g., Vcc) by a resistor 2616. The drain terminal of switch 2618 may also be connected to switch 2604. As shown in FIG. 26, switch 2604 may comprise a pair of switches of different types. For instance, switch 2620 may be an n-type MOSFET connected between power source 2601 and pathway 2606 and turned on when its gate 2617A is at a high voltage (e.g. when pulled up by pull-up resistor 2616 when switch 2618 is off). When gate 2617A is at a low-voltage, the switch 2620 is turned off. The gate 2617A is pulled down by switch 2618 when switch 2618 is turned on by at least one of voltage detectors 2603 having detected that at least one of the battery cells 2602 is at a threshold voltage.

In one example, switch 2621 may comprise a p-type MOSFET (or other switch) of an opposite polarity than switch 2620. With the opposite polarity, switch 2621 may be off when switch 2620 is on as well as switch 2621 may be on when switch 2620 is off. With respect to FIG. 26, the gate 2617B of switch 2621 is tied to the gate 2617A, such that switch 2621 varies inversely with the state of switch 2620. It is appreciated that other types of switches may be used in place of or in addition to the switches described in FIG. 26 and in other figures. While not explicitly shown in FIG. 26, a controller may also be included to maintain the use of the buck converter pathway 2607 after the detected high voltage across the battery cell drops below the threshold voltage.

Figure 27:
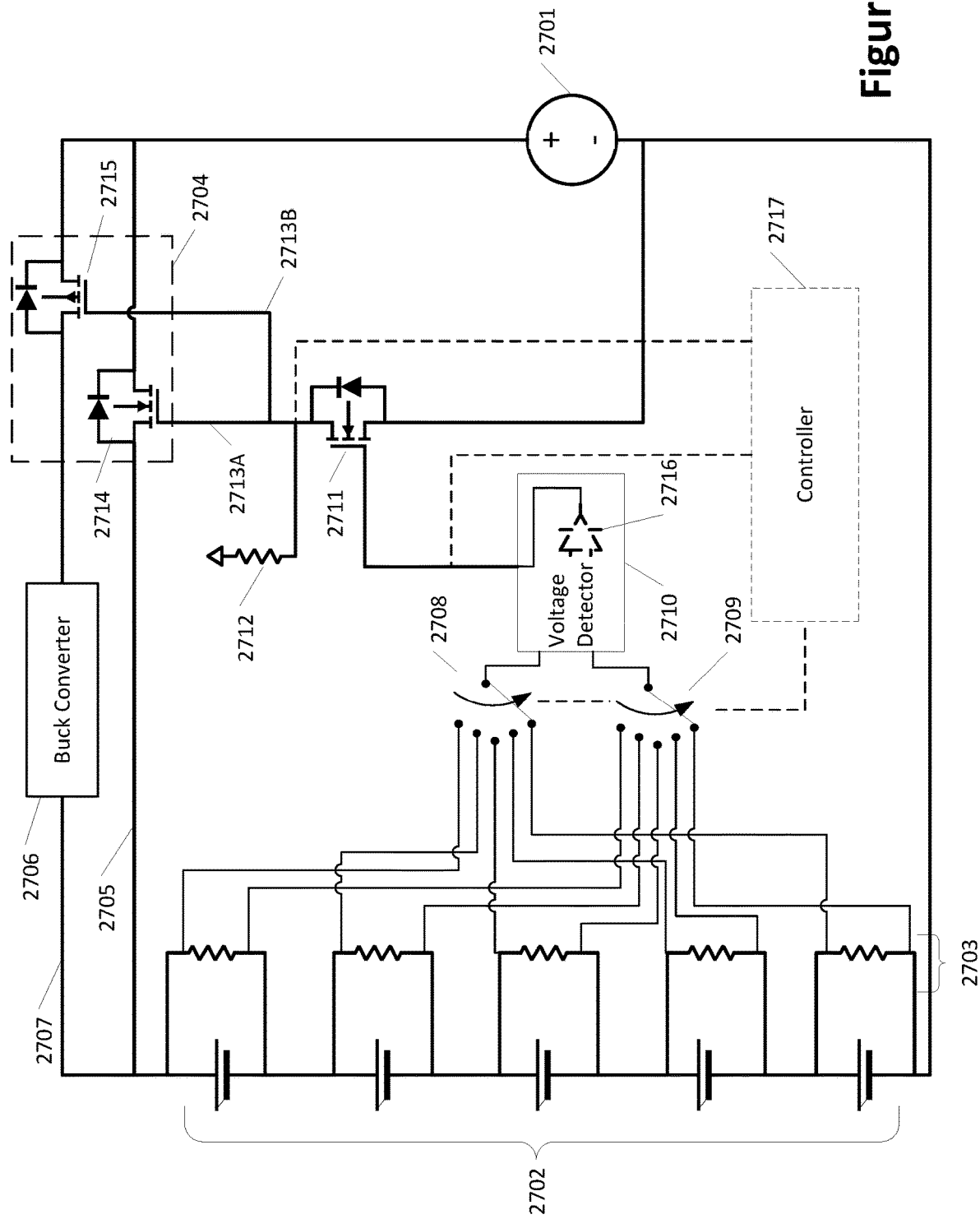
FIG. 27 shows a battery pack having a buck converter with a single voltage detectors.

FIG. 27 shows a battery pack having a buck converter with a single voltage detector detecting voltages across battery cells. A power source 2701 provides charging power to an array of battery cells 2702. Based on a state of a switch 2704, a first pathway 2705 may be used to provide a high voltage across the series connected battery cells 2702 or a second pathway 2707 may be used to provide a lower voltage (e.g., reduced via buck converter 2706) across the series connected battery cells 2702. A voltage across each battery cell may be compared with a threshold voltage by a voltage detector 2710. The voltage detector 2710 may include two cycling inputs 2708 and 2709 that cycle together across resistors 2703 to compare, via comparator 2716, the voltage across resistors 2703 with a reference voltage. Based on that comparison, the voltage detector 2710 may determine whether a voltage level across any of batteries 2702 exceeds a threshold voltage. Based on that determination, a switch 2711 may be turned on (e.g., via an output of voltage detector 2710 being high and turning on n-type MOSFET 2711). Once switch 2711 is turned on, the switch 2704 may change which pathway 2705 or 2707 is used to power the array of battery cells 2702.

As shown in FIG. 27, switch 2704 may comprise in n-type MOSFET 2714 with its gate 2713A pulled up by resistor 2712 to Vcc. Once switch 2711 is turned on, gate 2713A is pulled low and turns off switch 2714. Similarly switch 2704 may also include a switch 2715 of an opposite polarity type than switch 2714 (e.g., switch 2715 may comprise a p-type MOSFET) that is normally in an off state when it is gate line 2713B is high and, when it is gate line 2713B pulled low, is turned on to allow buck converter 2706 to reduce of voltage level of the power charging the array of battery cells 2702.

Controller 2717 may control the cycling of switches 2708 and 2709 to control them to sample the voltages across resistors 2703. Additionally or alternatively, controller 2717 may also determine when voltage detector 2710 has detected a voltage across one of battery cells 2702 having exceeded the threshold voltage and may maintain switch 2704 in a state such that the pathway 2707 with the buck converter 2706 is used to continue to charge the battery cells 2702 at the lower voltage level.

Figure 28:
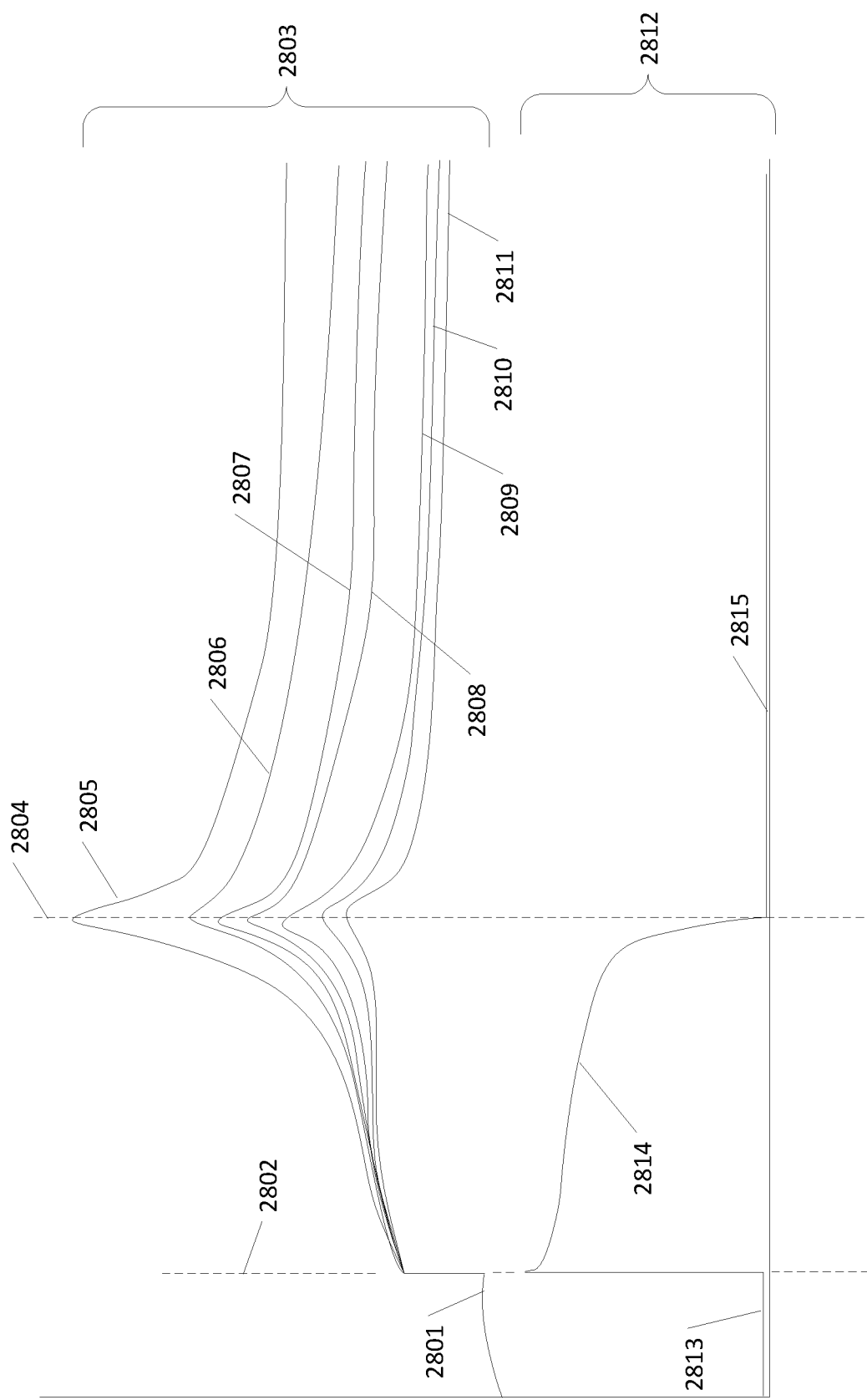
FIG. 28 shows another example of battery states of charge while charging with batteries of certain chemistries.

FIG. 28 shows another example of battery states of charge while charging with batteries of certain chemistries. FIG. 28 shows a prophetic example of voltage levels 2805-2811 across individual battery cells 2803 and an overall current 2812 consumed by the battery cell array. During an initial charge interval 1801, voltages 2803 of the battery cells may be slowly increased using lower voltage power. During that initial charge interval 1801, the current consumed is also low 2813. At time 2802, a power supply voltage is increased and the voltages across the individual battery cells begin to increase as well. As the voltages across the battery cells increase, the current consumed by the battery cells decrease 2814. At time 2804, a voltage detector determines that a voltage 2805 across one of the cells has reached a threshold voltage. To prevent that cell from reaching an over-voltage state, the voltage across the battery cells may be reduced to gradually charge the remaining cells while preventing the overvoltage state of the battery with the highest charge. After the charging voltage has been reduced, the current consumed is also low 2015.

Figure 29A:
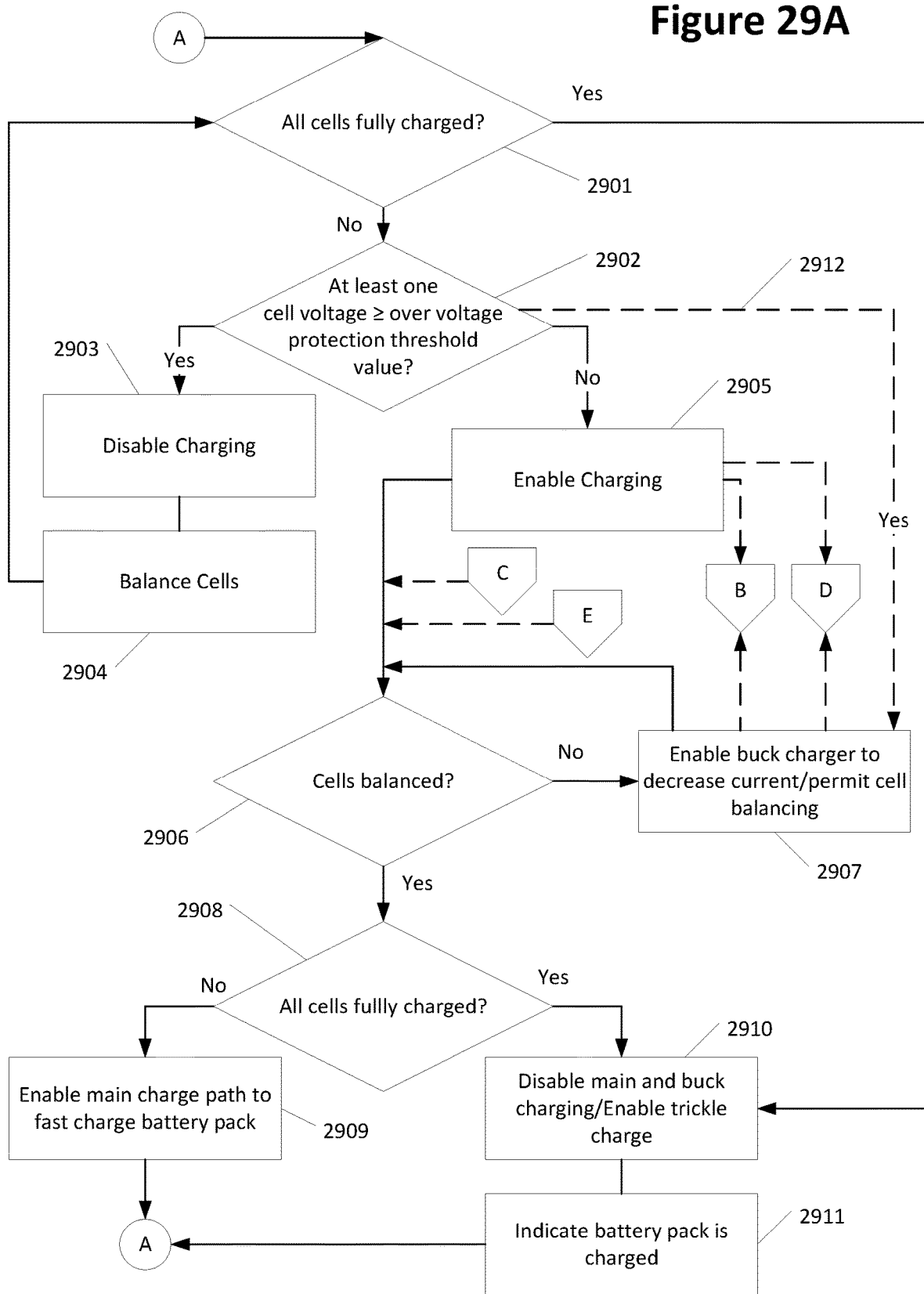
FIGS. 29A, 29B, 29C, and 29D show flow charts for determining when to use a buck charger.
Figure 29B:
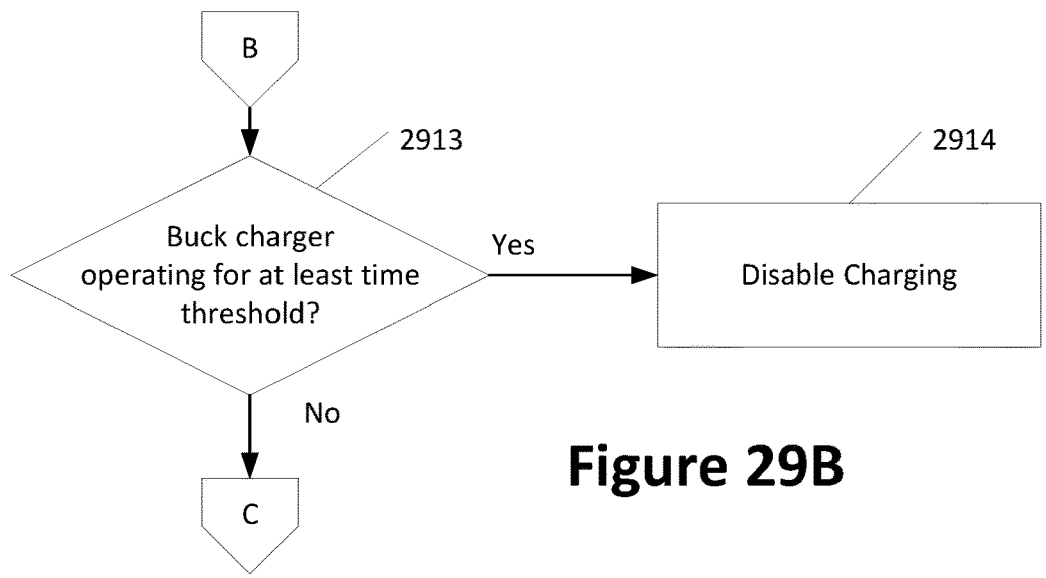
Figure 29C:
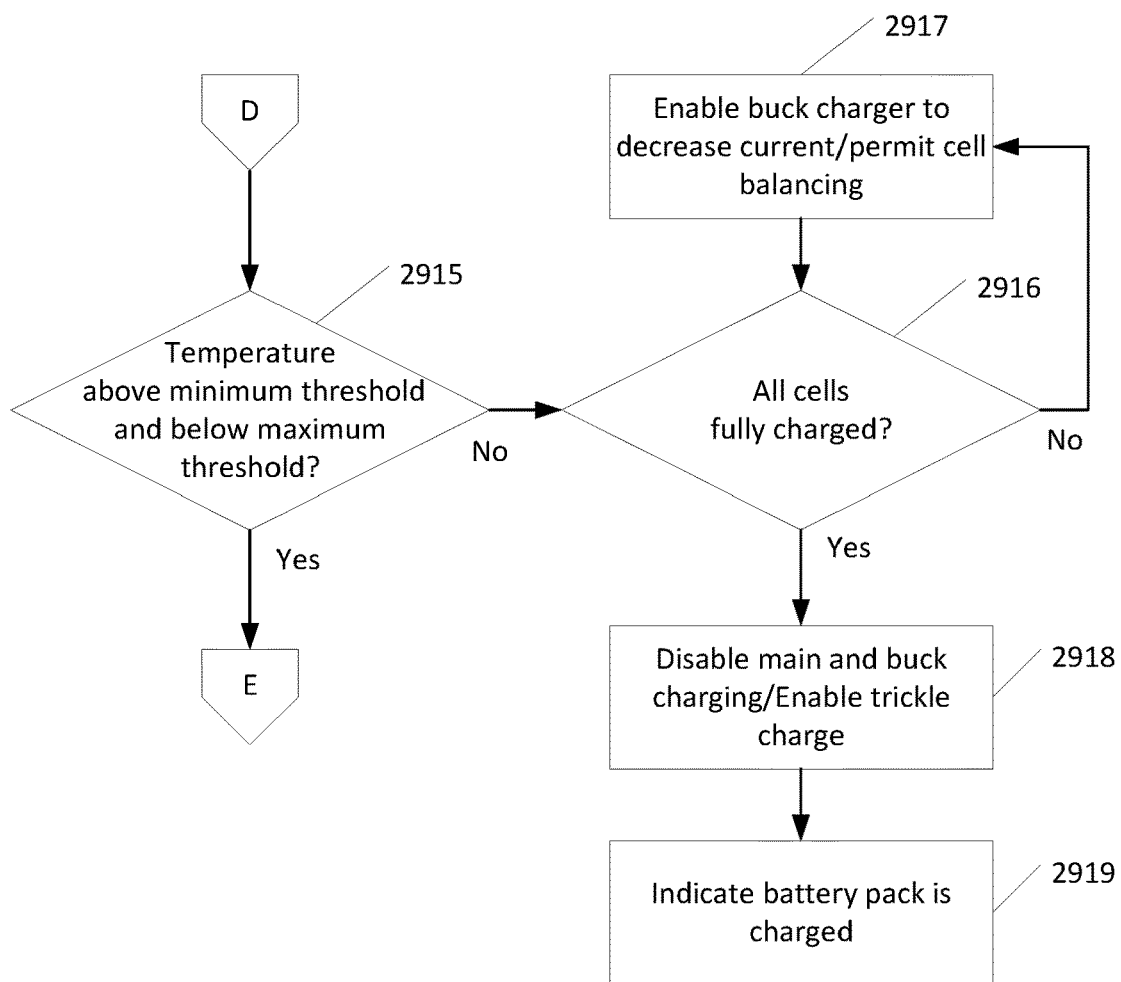

FIGS. 29A, 29B, 29C, and 29D show flow charts for determining when to use a buck charger for charging battery cells with a chemistry that discourages fast charging. FIG. 29A shows a first flowchart for charging battery cells. In step 2901, a voltage detector determines whether all cells are fully charged. If all cells are fully charged, then the system may stop charging (main and/or buck charging) and/or enable a trickle charge as described in step 2910. If less than all cells are fully charged, the system determines in step 2902 whether at least one cell's voltage is greater than or equal to an overvoltage protection threshold value. Because the voltage detector is looking for any cell near the overvoltage protection threshold value and triggers based on that action, the voltage detector is effectively checking the voltage of the cell with the highest voltage across it against the overvoltage protection threshold value. If the voltage of any cell is greater than or equal to the over voltage protection threshold value, the system disables charging in step 2903 and balances the cells in step 2904. For instance, the higher voltage cell or cells may be controlled to charge the lower voltage cells. After balancing in step 2904, the system determines, in step 2901, whether all cells are fully charged.

If the voltage of no cell is greater than or equal to the overvoltage protection threshold value, the system enables charging in step 2905. The system determines, in step 2906 whether the cells are balanced. If the cells are not balanced, the system enables the buck charger in step 2907 to decrease the current and permit cell balancing while the cells are charged with a lower current. During or after the use of the buck charger in step 2907, the system determines whether the cells are balanced in step 2906. If the cells are balanced, the system determines, in step 2908, whether all cells are fully charged. If all cells are not fully charged, the system enables the main charge path to fast charge the battery pack. After or during charging using the main charge path in step 2909, the system determines, in step 2901, whether all cells are fully charged.

If the system determines in step 2908 that all cells are fully charged, the system disables the main charge path at the fully charging current and enables charging with a nominal current to maintain the charged state of the cells. In step 2911, the system may generate an indication (e.g., powering an indicator light) to indicate to a user that the battery pack is fully charged. The process returns to step 2901 to determine whether all cells are fully charged.

Additionally or alternatively, if, in step 2902, the system determines that at least one cell is greater than or equal to the over voltage protection threshold value and has repeatedly attempted to disable charging in step 2903 and balance the cells in step 2904, the system may, in lieu of further disabling and balancing, enable the buck charger in step 2907 to permit charging of all cells at a lower rate. In some situations, the remaining cells may become balanced while the over voltage cell remains at its over charged state.

There may be instances where one or more cells, despite having been charged by the buck charger for an extended period of time, are not balancing (e.g., their states of charge are not beginning to approximate the states of charge of the remaining cells). To prevent the system from remaining in the buck charging state, the system may, via step B, from either the enable charging step 2905 and/or from the enable buck charger step 2907, proceed to step 2913 of FIG. 29B where the system determines whether the buck charger has been operating for a time threshold. If the buck charger has been operating for the time threshold (e.g., operating and the cells remain unbalanced), the system may disable charging in step 2914. Optionally, an alert may be provided to a user via, for instance, a warning light illuminated on the battery or charging system indicating that charging has been disabled. If the buck charger has not been operating for the time threshold of step 2913, the system may return to FIG. 29A via reference C and determine whether the cells are balanced in step 2906.

Further, there may be instances where battery cells are charged at a lower rate via the buck charger to protect the health of the battery cells. For instance, where an ambient temperature or a temperature of a battery pack is below 0° C., charging at a high current may damage the battery cells. Similarly, where an ambient temperature or a temperature of a battery pack is above 45° C., charging at a high current may likewise damage the battery cells. The system may include a temperature check to determine to charge at the full current or to charge at the reduced current from the buck charger. The system may, via step D, from either the enable charging step 2905 and/or from the enable buck charger step 2907, proceed to step 2915 of FIG. 29C where the system determines whether the temperature is above a minimum temperature threshold and is below a maximum temperature threshold. For instance, the minimum temperature threshold may be 0° C. or a few degrees higher or lower as desired to balance reduced charging rates against reduced charging times. Similarly, the maximum temperature threshold may be 45° C. or a few degrees higher or lower as desired to balance reduced charging rates against reduced charging times. In step 2915, the system determines whether the temperature (ambient and/or a battery pack) is within the temperature range between the minimum temperature threshold and the maximum temperature threshold. If the temperature is between the minimum and maximum temperature thresholds, the system proceeds via reference E to step 2906 of FIG. 29A to determine whether the cells are balanced. If the temperature (ambient and/or a battery pack) is not between the minimum temperature threshold and the maximum temperature threshold, the system determines, in step 2916, whether all cells are fully charged. If the cells are not fully charged, then, in step 2917, the buck charger is enabled to charge the cells with a decreased current while permitting the cells to balance. If the cells are fully charged as determined in step 2916, then in step 2918 the main and/or buck charging is disabled and a trickle charge enabled. The system may, in step 2919, indicate the battery pack has been charged.

Figure 29D:
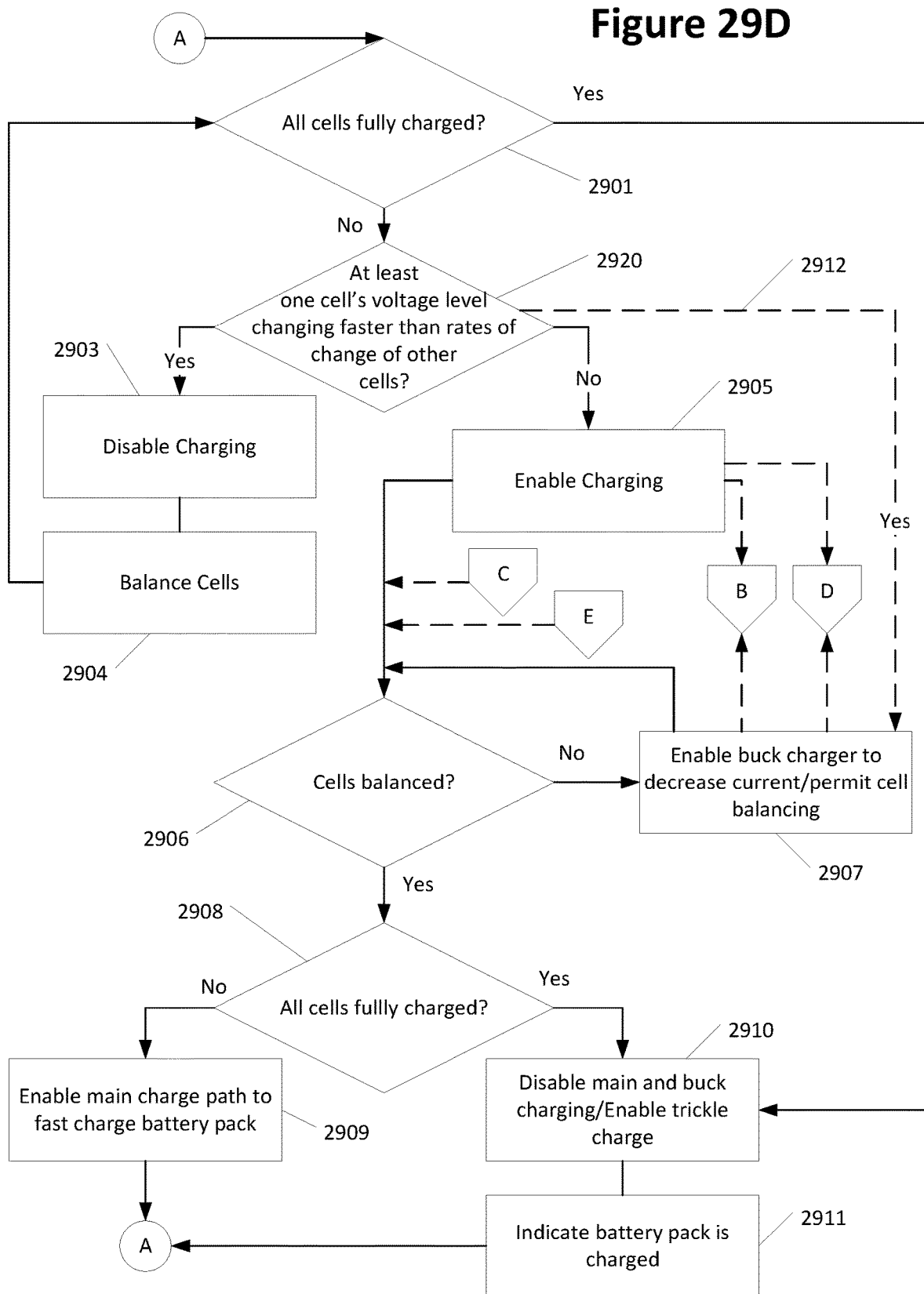

FIG. 29D shows an alternative example for charging battery cells having a battery chemistry that discourages fast charging. As FIG. 29D includes similar steps to those of FIG. 29A, commonly referenced steps are described above with respect to FIG. 29A. In step 2920, in place of FIG. 29A's step 2902, the system determines whether a least one cell's voltage level is changing faster than rates of change of other cells. If the rate is changing faster, then the system disables charging in step 2903 (or enables the buck charger in step 2907). If the rates are the same, then the system enables charging in step 2905. The references at B, C, D, and E refer to the corresponding references B, C, D, and E on FIGS. 29B and 29C.

Figure 30:
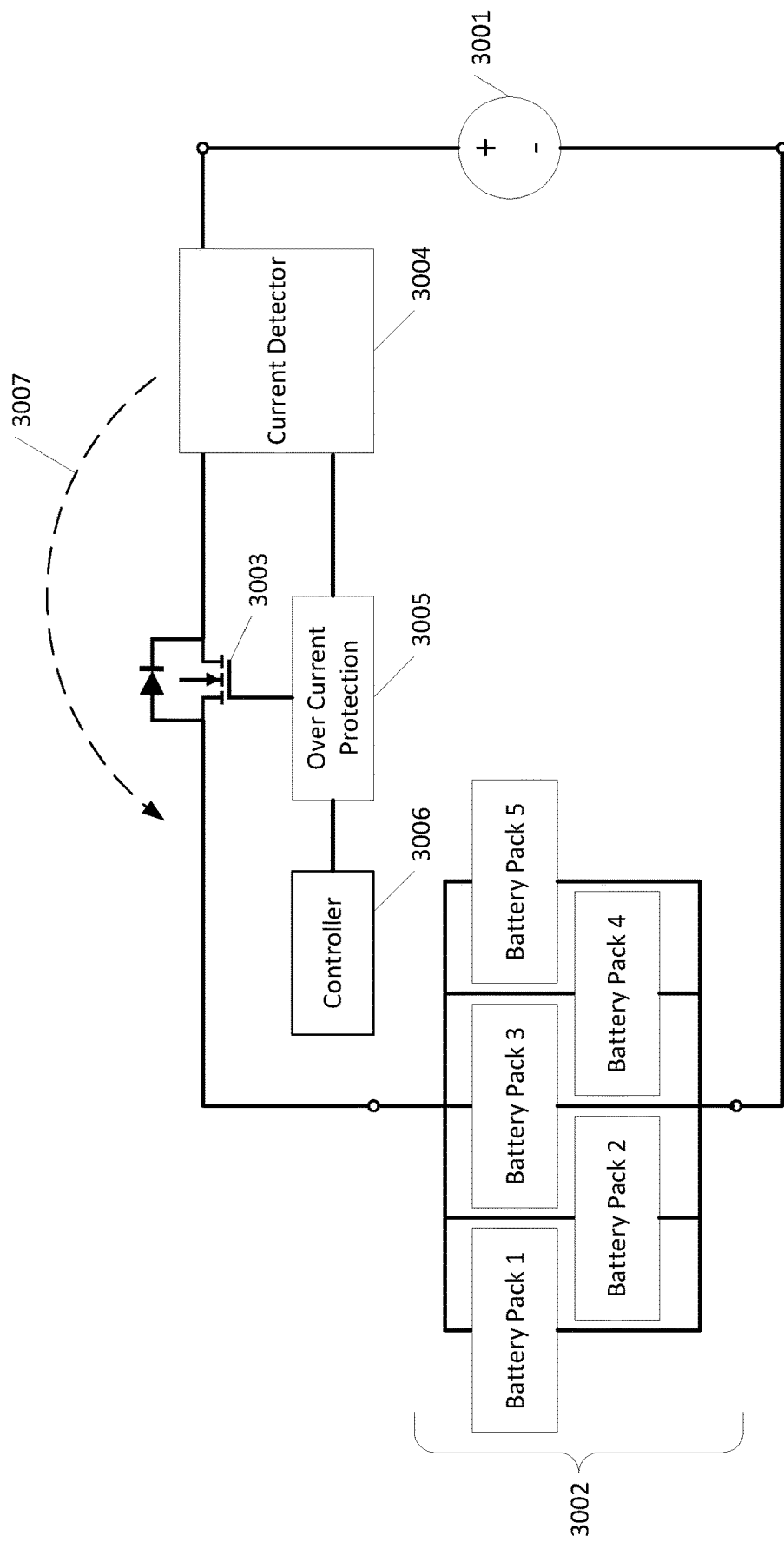
FIG. 30 shows a first example of an over-current protection system for use with batteries.

FIG. 30 shows a first example of an over-current protection system for use with batteries. In FIG. 30, a power supply 3001 provides power to charge battery packs 3002 arranged in parallel. The power pathway from the power supply 3001 to the array of battery packs includes a switch 3003 and a current detector 3004. The switch 3003 is controlled by a signal from an over-current protection circuit 3005. The over-current protection circuit 3005 may be controlled by one or more of the current detector 3004 and a controller 3006. As represented by dashed arrow 3007, the current detector may be located between the switch 3003 and the battery packs 3002 instead of between the switch 3003 and the power source 3001.

An issue associated with sets of batteries is preventing a short circuit within a battery from damaging the other batteries and/or overall system. In the example of FIG. 30, if one battery pack experiences a short, the current for the collection of battery packs increases. The current detector 3004 detects the elevated current and disables the main power charging path.

In a related example, batteries 3002 of FIG. 30 may represent individual cells of a single battery pack. When one of the individual battery cells 3002 experiences a short, the current detector 3004 detects a rise in current and disables the charging path.

Figure 31:
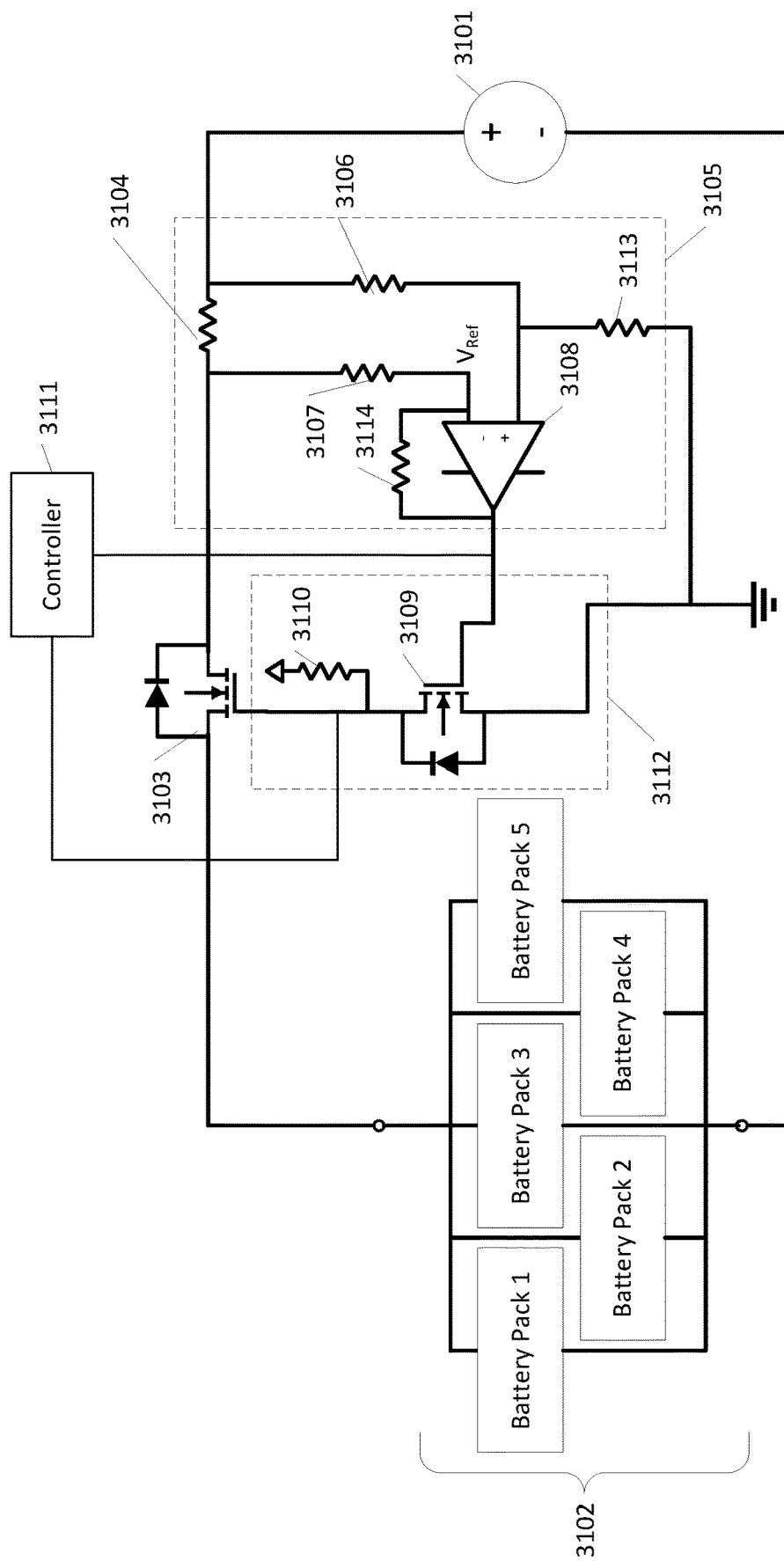
FIG. 31 shows a second example of an over-current protection system for use with batteries.

FIG. 31 shows a second example of an over-current protection system for use with batteries. A power source 3101 provides power to a parallel array of battery packs 3102. The pathway from the source 3101 to the parallel array of battery packs 3102 may include a switch 3103 and a current detector 3104. The current detector 3105 may comprise a resistor 3104 in the current pathway with a comparator 3108 configured to detect a voltage across the resistor 3104. With the resistor 3104 having known resistance, the comparator may compare the voltage across that resistor 3104 with a reference voltage and trigger when the voltage across the resistor 3104 exceeds a threshold voltage, indicating the current through the resistor 3104 has exceeded a threshold current. Various additional resistors 3106, 3113, 3107, and 3114 are shown as an example of a configuration of a comparator. The resistance values may be selected to trigger the comparator 3108 when the voltage across resistor 3104 exceeds a voltage threshold. Other configurations for current detectors are known and within the scope of the disclosure. The output of comparator 3108 may control a switch 3109 to ground a gate of switch 3103 by turning it off. If switch 3109 is off, the gate of switch 3103 is pulled high by resistor 3110 being connected to a supply voltage (e.g., Vcc).

It is appreciated that different polarity switches and pull-up and/or pull-down resistors may be used alone or in combination in the example of FIG. 31, without departing from the scope of the disclosure. For example, switch 3103 may be changed to a P-type MOSFET, resistor 3110 connected between the gate of switch 3103 and ground, and switch 3109 configured to connect the gate of switch 3103 to Vcc when turned on. These and other modifications are considered within the scope of the disclosure of FIG. 31 as well as other figures described herein.

The change in state of the output of the current detector 3105 may turn off switch 3103. Once the current across resistor 3104 drops below the current threshold, the voltage output of the current detector 3105 may also drop. This may lead to an undesired cycling of power being applied to/removed from/reapplied to the battery packs 3102 despite no correction of the short-circuiting of a given battery pack. To prevent the cycling, controller 3111 may detect the change in state of the output of the current detector 3105 (having turned on switch 3109) and ensure switch 3103 does not turn back on until a subsequent event (e.g. including but not limited to a replacement of one or more of the battery packs 3102, a reset button is pressed, and/or a subsequent command to resume charging of the array of battery packs 3102).

Figure 32A:
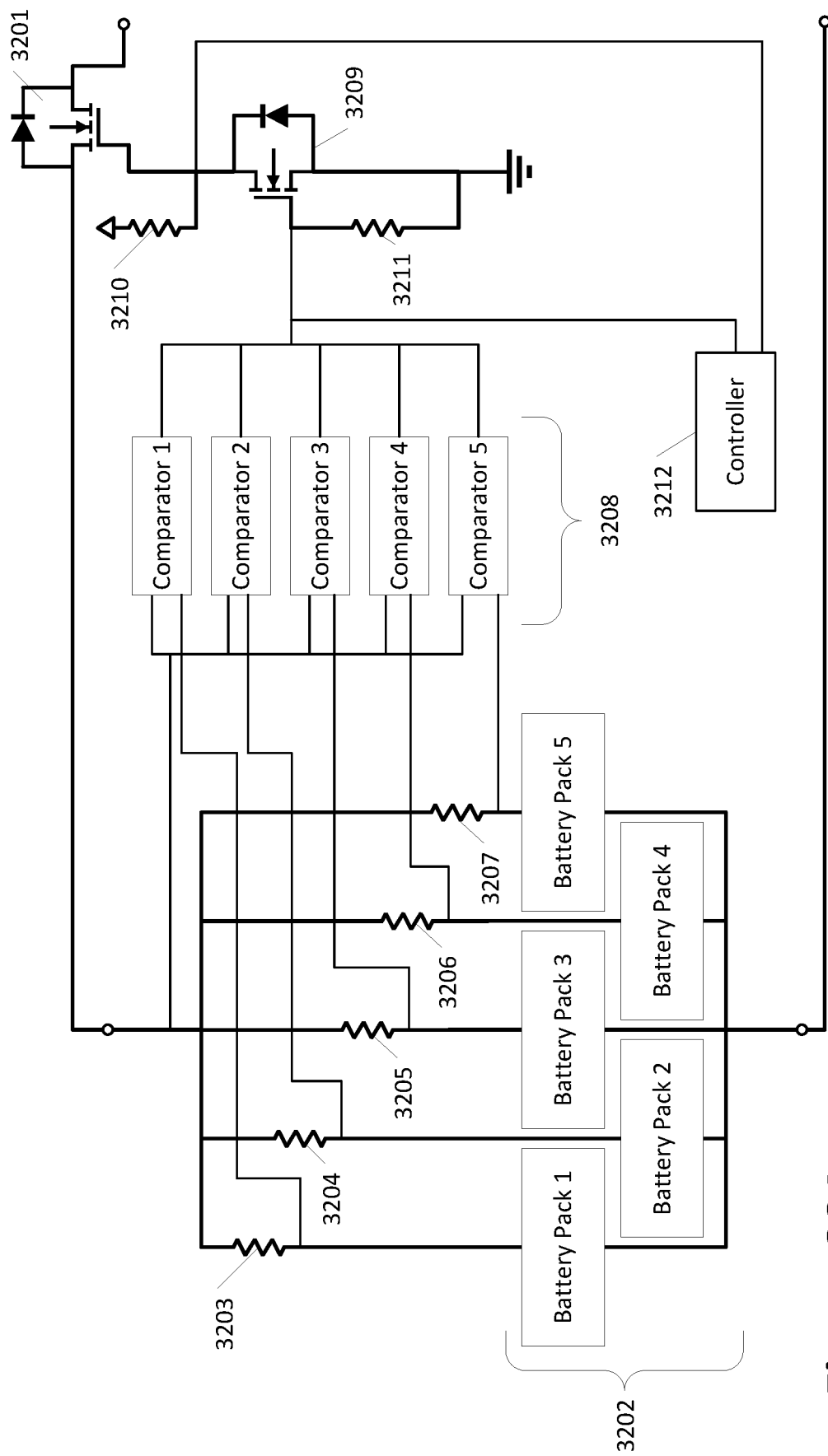
FIG. 32A shows a third example of an over-current protection system for use with batteries.

FIG. 32A shows a third example of an overcurrent protection system for use with batteries. For simplicity, a power source is not shown in FIG. 32A. FIG. 32A comprises a current cut off switch 3201 and an array of battery packs 3202. Each battery pack is connected between an output of the current cut off switch 3201 and a power bus. In series with each battery pack 3202 is a resistor 3203-3207 that permits sensing of a current flowing into a respective battery pack. FIG. 32A also comprises a number of comparators 3208 connected across specific resistors 3203-3207 to determine whether a current flowing into a given battery pack exceeds a current threshold (e.g. by determining whether a voltage drop across a resistor associate with that battery pack exceeds a threshold voltage. Outputs of the comparators 3208 control a gate of switch 3209. The gate of switch 3209 is generally pulled up by pull-up resistor 3210 to Vcc but, upon one or more of comparators 3208 indicating a current through the battery pack exceeds a threshold current, switch 3209 is turned on and switch 3201 is turned off. In the example of FIG. 32A, a gate of switch 3209 is normally low as pulled down by pulldown resistor 3211 but, upon one or more comparators 3208 turning on, the gate of switch 3209 is brought to a high state and 3209 is turned on. It is appreciated that other polarities of switches may be used as well as other combinations of pull-up and/or pulldown resistors. Further other configurations of the various components of FIG. 32A are within the scope of the disclosure (e.g., including a greater quantity of switches or fewer quantity of switches as desired).

FIG. 32A, with its individual current detectors per battery pack, is similar to the additional example of FIG. 30 where 3002 refers to individual battery cells of a given battery pack. In addition to current detectors herein that respond to current spikes where a batter pack or battery cell experiences a short, the current detectors may also respond to instantaneous current spikes that may be caused by other sources. For example, where inductance exists between the power source and the battery array (when using long lengths of cables between the power source and the batteries), a removal of a battery pack may cause an instantaneous spike in current at the remaining battery packs. Specifically, if a current of six amps is flowing into three batteries arranged in parallel, an average of two amps may be flowing into each battery. However, removing one of the three batteries from the power distribution arrangement may create an instantaneous current spike of three amps for each of the remaining batteries (an increase in current of 50% over the original two amps). If one of those two batteries reacts while the other does not, the inductance in the power pathway may result in an instantaneous current of six amps (an increase in current of 200% over the original two amps) in the remaining battery. These current spikes may quickly exceed any of the batteries' rated currents and cause irreversible harm to the batteries. The circuit of FIG. 32A provides a solution by detecting an over-current event per battery pack and stops the current flow for each individual battery pack.

Figure 32B:
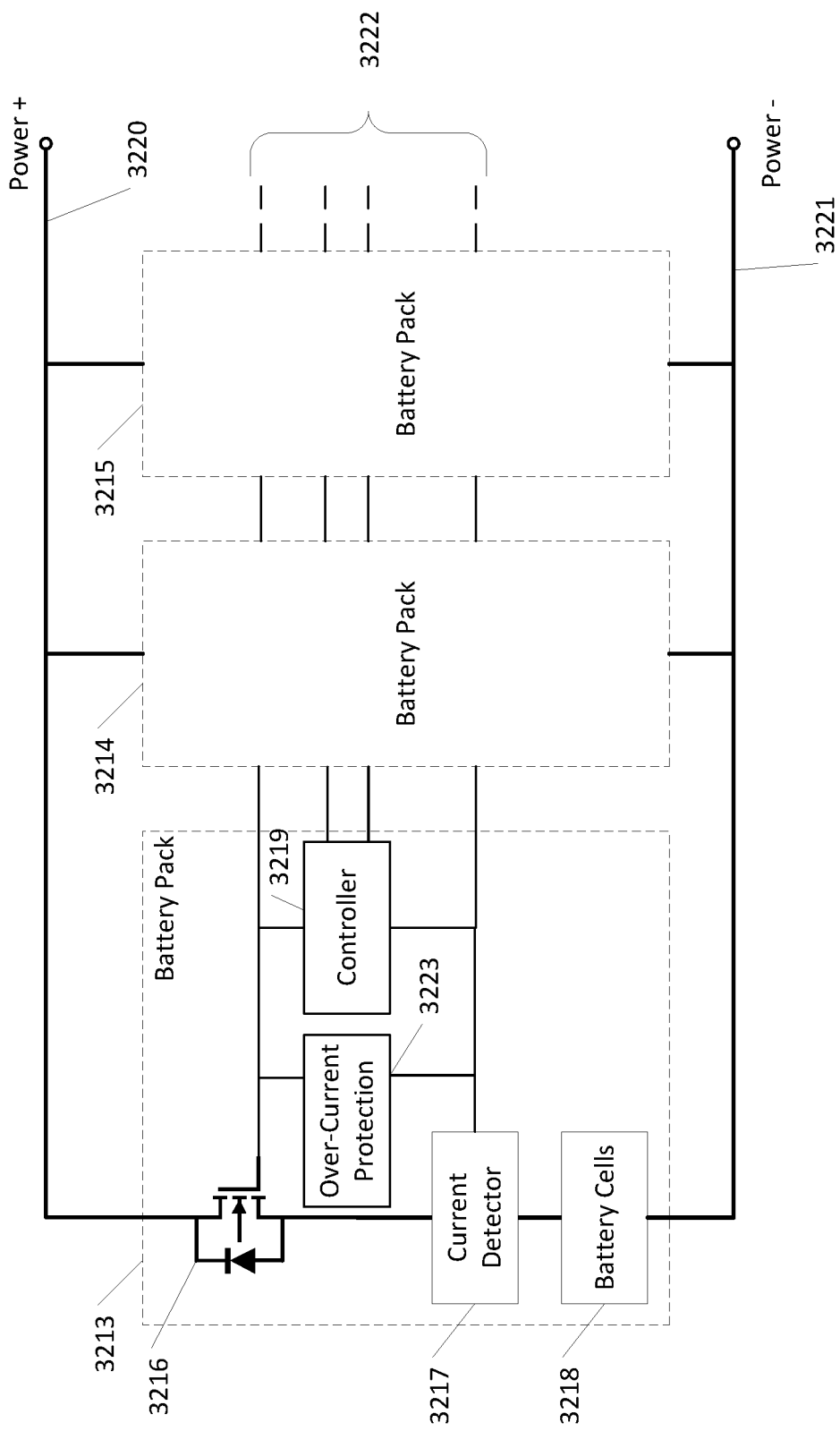
FIG. 32B shows a fourth example of an over-current protection system for use with batteries.

FIG. 32B shows a fourth example of an overcurrent protection system for use with batteries. FIG. 32 B includes three battery packs 3213-3215. It is appreciated that a greater quantity or fewer battery packs may be used as desired. Each battery pack is connected between a positive power bus line 3220 and a negative power bus line 3221. A controller area network (CAN) 3222 connects controllers of each of the battery packs together. Each battery pack may comprise a switch 3216, a current detector 3217, and battery cells 3218. The current detector 3217 determines whether a current flowing into battery cells 3218 is equal to or greater than a threshold current level. Upon detection of the current being equal to or exceeding the threshold current level, the current detector 3217 controls an overcurrent protection circuit 3223 to disable switch 3216 from providing current to the battery cells 3218. To prevent a cascading overcurrent situation, the triggering of a first current detector in a first battery pack may also control overcurrent protection circuits in other battery packs. For instance, an output of current detector 3217 may also be provided to the CAN 3222 such that overcurrent protection circuits 3223 in other battery packs (e.g., battery packs 3214 and 3215) may also be triggered to turn off switches 3216 in each of those battery packs. Further, FIG. 32 B may further comprise a controller 3219 that detects a change in state of current detector 3217 and maintains switch 3216 in an off state until occurrence of another event (e.g., replacement of a battery pack, a reset button being pushed, a reset instruction being received over CAN 3222, and the like).

Figure 33:
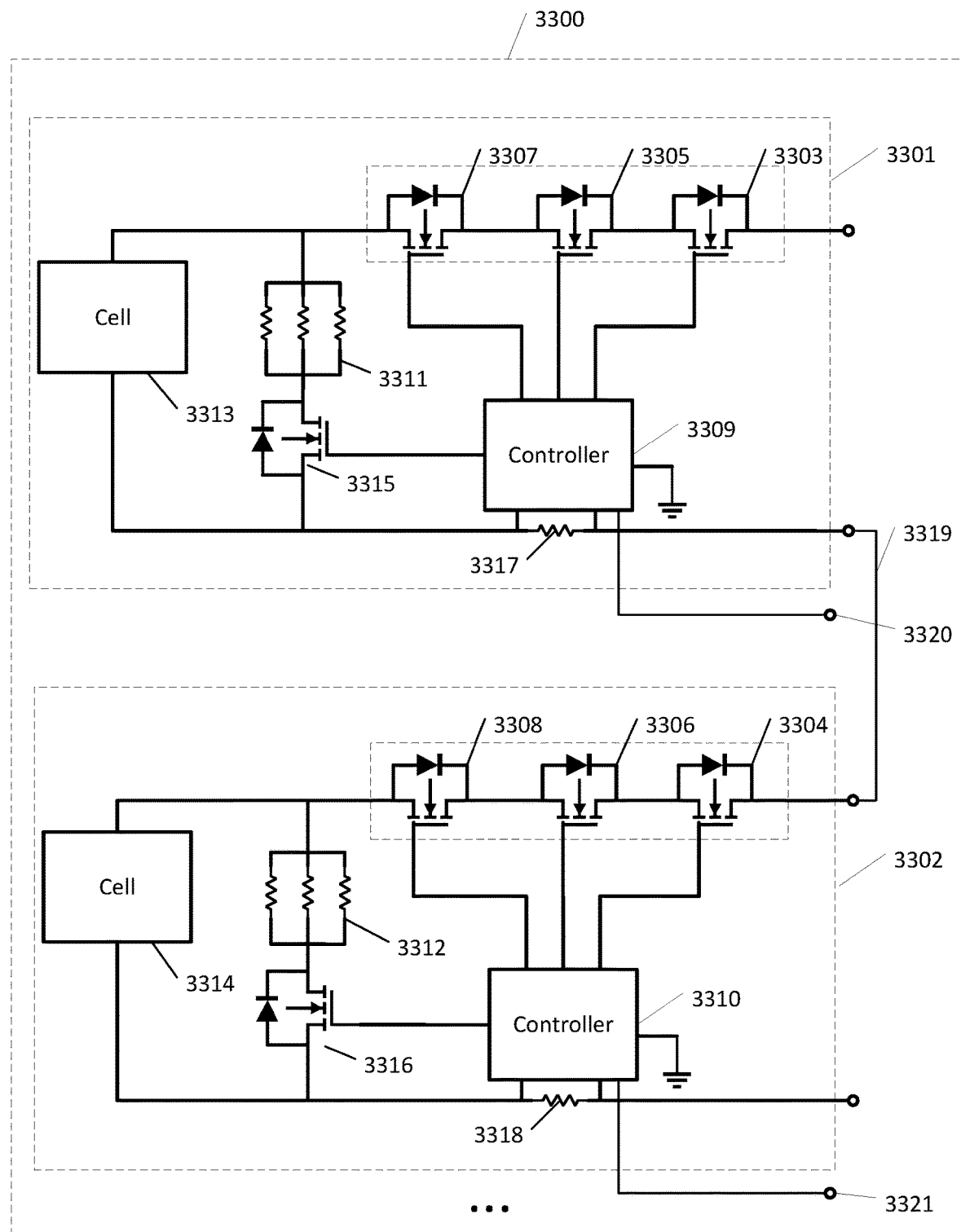
FIG. 33 shows a first example of balancing battery packs in series.

FIG. 33 shows a first example of balancing battery packs in series. FIG. 33 comprises an array 3300 of battery packs 3301 and 3302 in series as joined by connector 3319. The battery packs 3301 and 3302 may comprise one or more switches 3303-3308 as controlled by controllers 3309-3310 to provide power to one or more cells 3313-3314. Controllers 3309-3310 may also selectively enable or disable bypass switches 3315-3316. The bypass switches 3315-3316 permit a controller of one of the battery packs to remove it from being charged by incoming power when the cell or cells have reached a high state of charge (SOC) while a cell or cells of other battery packs have not reached the same high SOC. For instance, if cell 3313 of battery pack 3301 has reached a high SOC, the controller 3309 may selectively control switch 3315 to bypass cell 3313 of battery pack 3301 in the series connection between the battery packs of array 3300. As shown in FIG. 33, each of the battery packs have an internal resistance 3311-3312 that may limit the efficiencies of bypassing any given cell 3313-3314. Various other impedances are shown as resistors 3317-3318 to model voltage drop across each battery pack. CAN connections to each controller 3309-3310 are generally shown as connections 3320-3321, respectively.

In other words, the circuit of FIG. 33 includes current limiting resistors 3311-3312 that limit the current provided to the next battery pack when the battery packs are in series. The bypass circuit of FIG. 33 effectively uses current limiting resistors 3311-3312 to consume the power that would have been used had the cells not been bypassed. This forced power drain limits the efficiency of the arrangement of FIG. 33 and causes an undesirable rise in the temperature of a battery pack being bypassed as the resistors 3311-3312 are dissipating as heat the power that could have otherwise been used to charge the remaining battery packs.

Figure 34A:
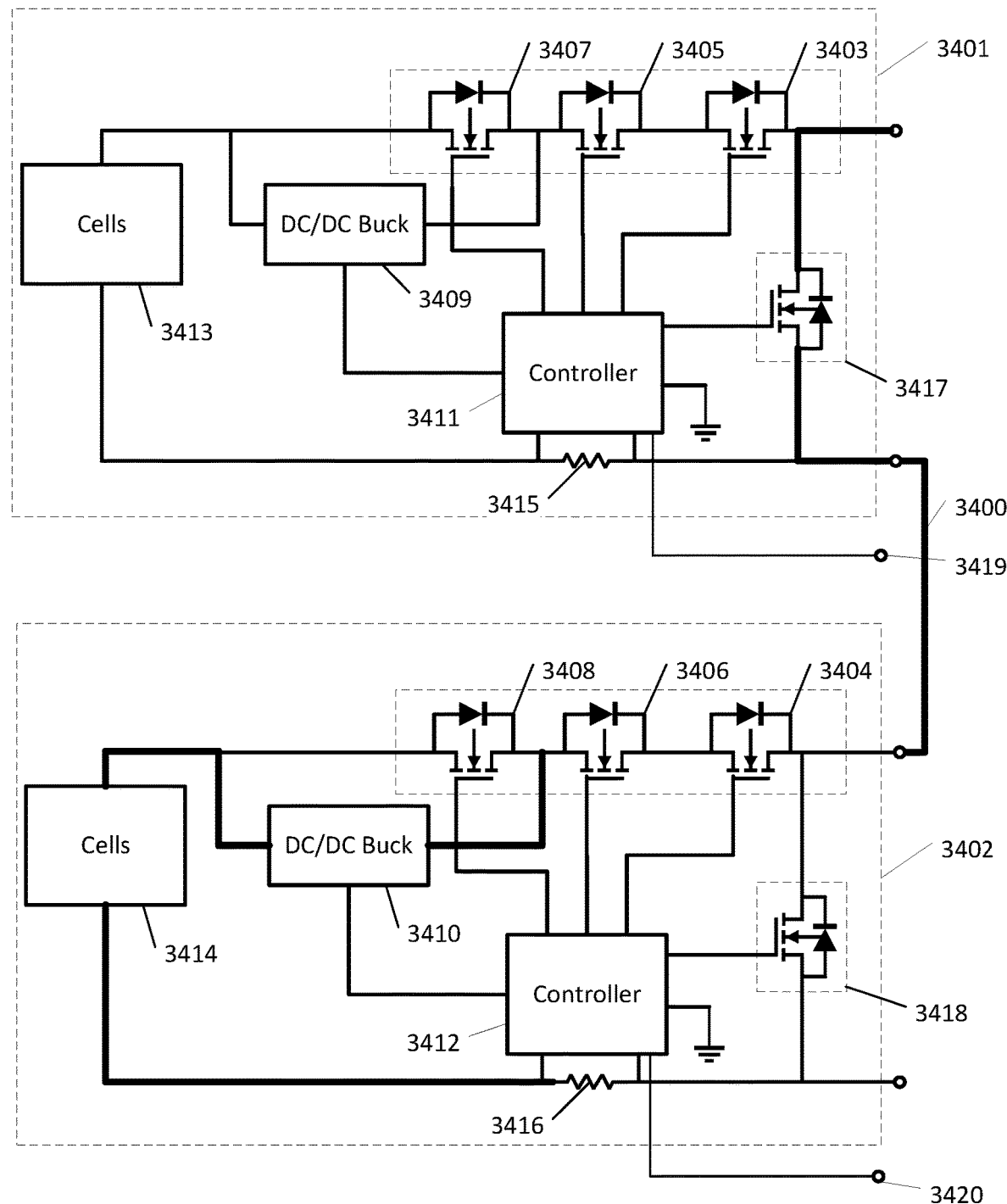
FIG. 34A shows a second example of balancing battery packs in series.

FIG. 34 shows a second example of balancing battery packs in series. FIG. 34 comprises two or more battery packs 3401-3402 in series as connected by line 3400. The battery packs 3401-3402 may comprise one or more switches 3403-3408 that control how power is transmitted to cells 3413-3414. For example, each battery pack 3401-3402 may further comprise DC/DC buck converters 3409-3410 that reduces a voltage level of supplied power from a high level to a lower level. For instance, when switches 3407-3408 are enabled, the supplied power at its full voltage level is applied to cells 3413-3414. However, when switches 3407-3408 are disabled, power flows through the DC/DC buck converters 3409-3410 where the voltage level of the supplied power is reduced. For instance, as shown in FIG. 34, switch 3408 of battery pack 3402 has been disabled and power flowing through connector 3400 is routed to DC/DC buck converter 3410, where the voltage of the supplied power is reduced, before charging cells 3414. As shown in FIG. 34, the battery packs 3401-3402 may further comprise bypass circuits 3417-3418 located across the input and output power supply lines of each battery pack—e.g., before switches 3403-3408, before the DC/DC buck converters 3409-3410, and before internal resistances of each battery pack.

As an example, controller 3411 of battery pack 3401 may determine that cells 3414 have reached a high SOC and should no longer be receiving charging power. To permit the cells 3414 of the remaining battery pack 3402 to be charged, the controller 3411 may enable switch 3417 to permit charging power to bypass battery pack 3401. Depending on the SOC of cells 3414, the controller 3412 of battery pack 3402 may selectively control one or more of switches 3404, 3406, 3408, and/or 3418 to control the power being applied to cells 3414. For instance, if the SOC of cells 3414 is low, switches 3404, 3406, and 3408 may be enabled to allow the cells to be charged at the full voltage received by battery pack 3402. Additionally or alternatively, if the SOC of cells 3414 is at a medium level, switches 3404 and 3406 may be enabled while switch 3408 is disabled, thereby routing power through the DC/DC buck converter 3410 to reduce the voltage level of the supplied power from the received voltage level to a lower voltage level for charging the battery cells 3414. Additionally or alternatively, if the SOC of cells 3414 is also at a high level like the SOC of cells 3413, bypass circuit 3418 may also be enabled, permitting the power received by battery pack 3402 to be transmitted to the next battery pack in series. The status of the various switches including bypass switches 3417-3418 may be provided by controllers 3411-3412 onto the CAN to permit, for instance, the master battery pack to provide the SOC of individual battery packs and/or all battery packs to an external device.

In other words, when two or more battery packs are used in series in FIG. 34 and one pack has a higher voltage than the other pack, then the higher voltage pack will turn on its bypass circuit and, for example, interact with the master controller of the master battery pack to control the buck circuit of the other battery pack to turn on, thereby providing a lower voltage to the other battery pack. Here, the buck charger is used to account for the voltage drop of the bypassed battery pack instead of using the heat dissipating resistors of FIG. 33, thereby reducing an unnecessary rise in temperature of the higher voltage battery pack. For instance, the battery management system may determine to place battery pack 3401 in bypass mode. To put battery pack 3401 in bypass mode, the BMS may instruct controller 3411 to turn on bypass switch 3417 in battery pack 3401 and instruct controller 3412 in battery pack 3402 to turn on its buck converter (e.g., DC/DC buck 3410) to provide a reduced voltage to cells 3414 such that the reduced voltage reflects the voltage drop that would have been seen by battery pack 3402 if battery pack 3401 was not in bypass mode and charging cells 3413.

Figure 34B:
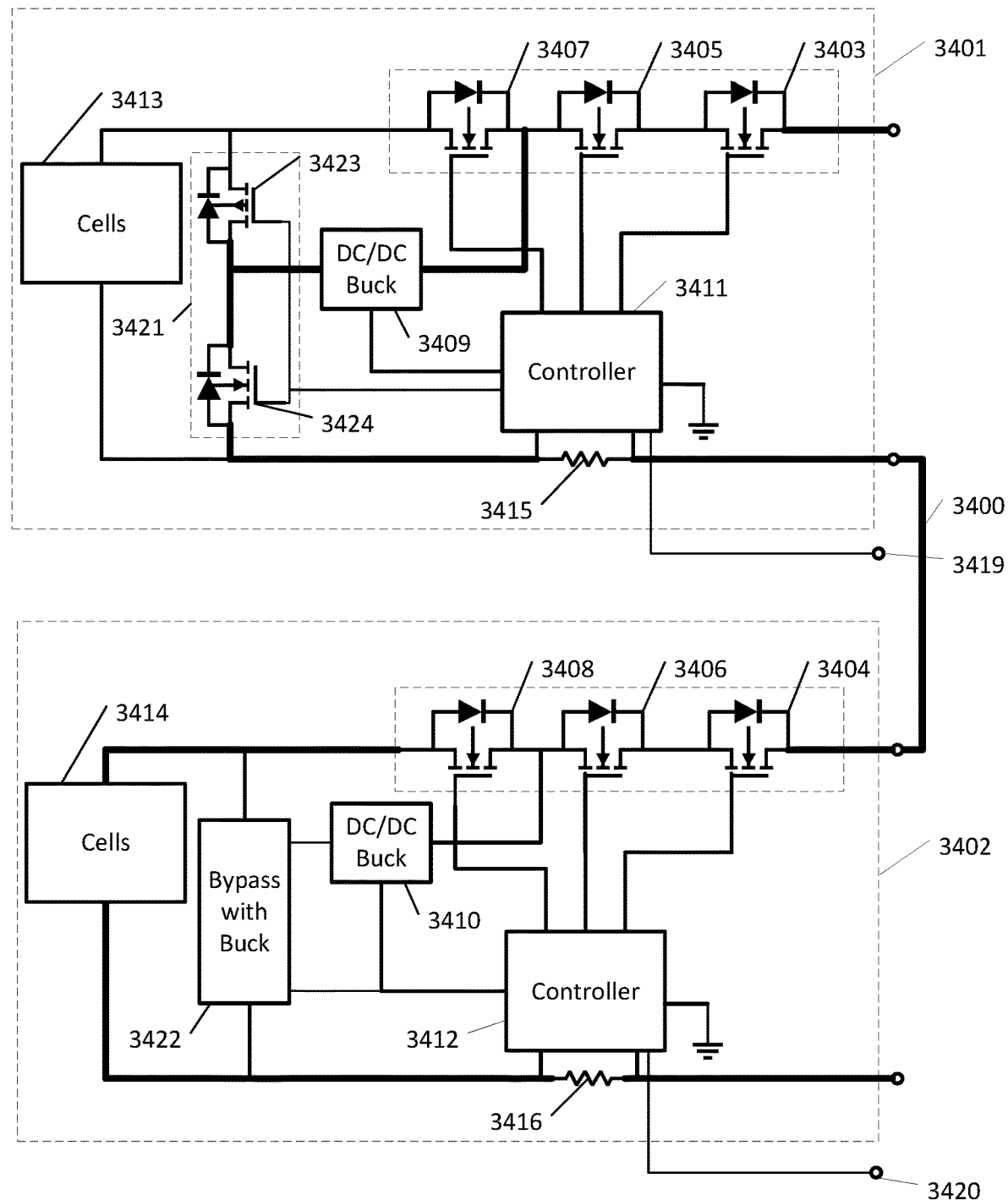
FIG. 34B shows an alternative to the second example of balancing battery packs in series.

FIG. 34B shows an alternative to the second example of balancing battery packs in series. In FIG. 34B, the bypass circuits 3417-3418 have been removed and replaced by bypass circuits 3421 (in battery pack 3401) and 3422 (in battery pack 3402). For reference, the bypass circuits 3421-3422 are shown to in FIG. 34B as "Bypass with Buck". As shown in bypass circuit 3421, a first switch 3423 may be placed in the conduction path between the output of the DC/DC buck converter 3409 and the cells 3413. Another switch 3424 may be placed between the output of the DC/DC buck converter 3409 and the output terminal of battery pack 3401. In one example, switches 3423 and 3424 may be of an opposite polarity to permit a single control line from controller 3411. In other examples, the switches 3423 and 3424 may be of the same polarity and controlled by separate control lines from controller 3411. Other variations are possible including one or more of the switches via different sources. In a normal charging operation, switch 3407 may be controlled to permit the charging voltage at its full range to charge cells 3413. In a buck converter mode, switch 3407 may be turned off, DC/DC buck converter 3409 turned on, switch 3424 turned off, and switch 3423 turned on to permit a lower voltage from the DC/DC buck converter 3409 to charge the cells 3413. To put battery pack 3401 in bypass mode, the BMS may instruct controller 3411 to turn off switch 3407, turn on DC/DC buck converter 3409, turn off switch 3423 turned off, and turn on switch 3424 to permit a lower voltage from the DC/DC buck converter 3409 to be output, via connector 3400, to battery pack 3402. Alternatively or additionally, bypass circuits 3421 and 3422 may also include one or more PTCs to further reduce voltages as temperatures of the battery packs increase.

In short, in FIG. 34B, to place battery pack 3401 in bypass mode, the BMS instructs only battery pack 3401 to modify its operations. In contrast, in FIG. 34A, to place battery pack 3401 in bypass mode, the BMS instructs battery pack 3401 to modify its operations to enable the bypass circuit 3417 as well as instructs battery pack 3402 to turn on its DC/DC buck converter 3410 (and also turn off switch 3408).

Figure 35:
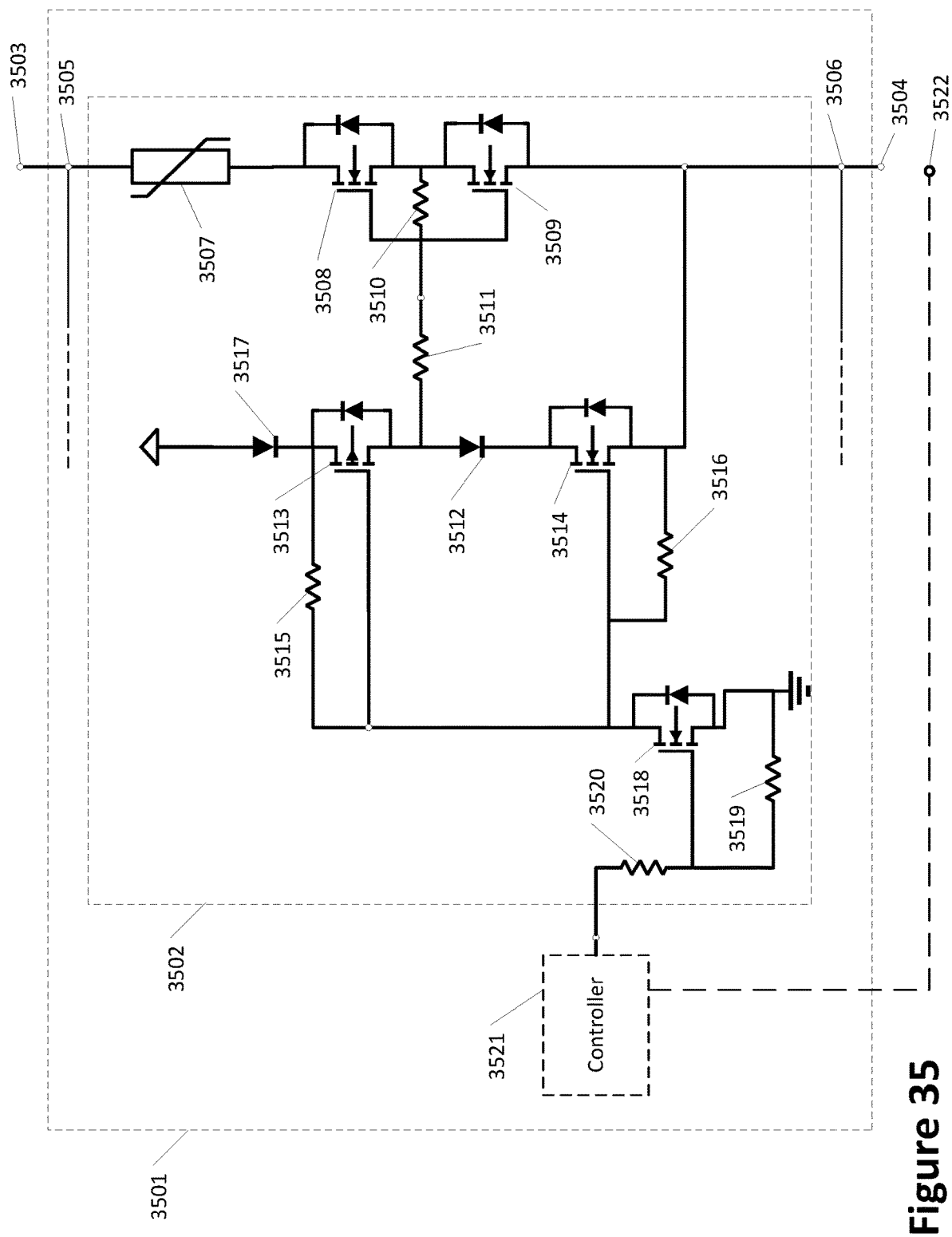
FIG. 35 shows a bypass circuit for battery packs in series.

FIG. 35 shows a bypass circuit for battery packs in series. FIG. 35 shows an example of a battery pack 3501 with a bypass circuit 3502. The battery pack 3501 receives power across power terminals 3503 and 3504. Received power may be provided to the rest of the battery pack 3501 by connections 3505 and 3506. The bypass circuit 3502 may comprise a positive temperature control (PTC) thermistor 3507 in series with one or more switches 3508-3509. An advantage of using PTC thermistor 3507 includes controlling the power provided to other battery packs based on a temperature of a current battery pack. For instance, if a current battery pack is relatively cool, the PTC thermistor 3507 may only provide a limited resistance to the power being provided to other battery packs. Alternatively, if a current battery pack is relatively warm or hot, the PTC thermistor 3507 provides an increased resistance to the current flow and provides a greater voltage drop across the PTC thermistor 3507, thereby reducing the voltage of power being supplied to the next battery pack. Accordingly, the inclusion of the PTC thermistor 3507 may help accommodate battery packs of different temperatures as being charged to help cool a charging environment where one or more of the battery packs is relatively hot while also permitting a faster charging of other battery packs when a bypassed pack is relatively cool.

FIG. 35 shows switches 3508 and 3509 in a series connection between PTC 3507 and power terminal 3506. When a controller 3521 outputs a high signal to enable one or more switches 3508-3509, the high signal passes through resistor 3522 to enable switch 3518, whose gait is normally held low by pulldown resistor 3519. Upon switch 3518 being enabled, gates of opposite polarity transistors 3513 and 3514 are raised to high level. In the example of FIG. 35, switch 3513 is shown as a p-type MOSFET that is normally on when its gate is at a low level and switch 3514 is shown as an n-type MOSFET that is normally off when gate is at the low level. When switch 3518 is off, pulldown resistor 3516 pulls the gates of the p-type MOSFET 3513 and the n-type MOSFET 3514 to a low level, thereby turning off switch 3514 and turning on switch 3513. When switch 3518 is off, the gates of switches 3513 and 3514 are high, resulting in an output level between the switches (e.g., above diode 3512) to be low, thereby turning off switches 3508 and 3509. When switch 3518 is on, the gates of switches 3513 and 3514 are low, resulting in the output being high, thereby turning on switches 3508 and 3509. As shown in FIG. 35, various pull-up and pulldown resistors as well as biasing diodes are shown. It is appreciated that the values and locations of the resistors 3520, 3519, 3516, 3015, 3511, and 3510 and/or locations of the diodes 3512 and 3517 may be adjusted to properly bias the switches of FIG. 35.

Figure 36:
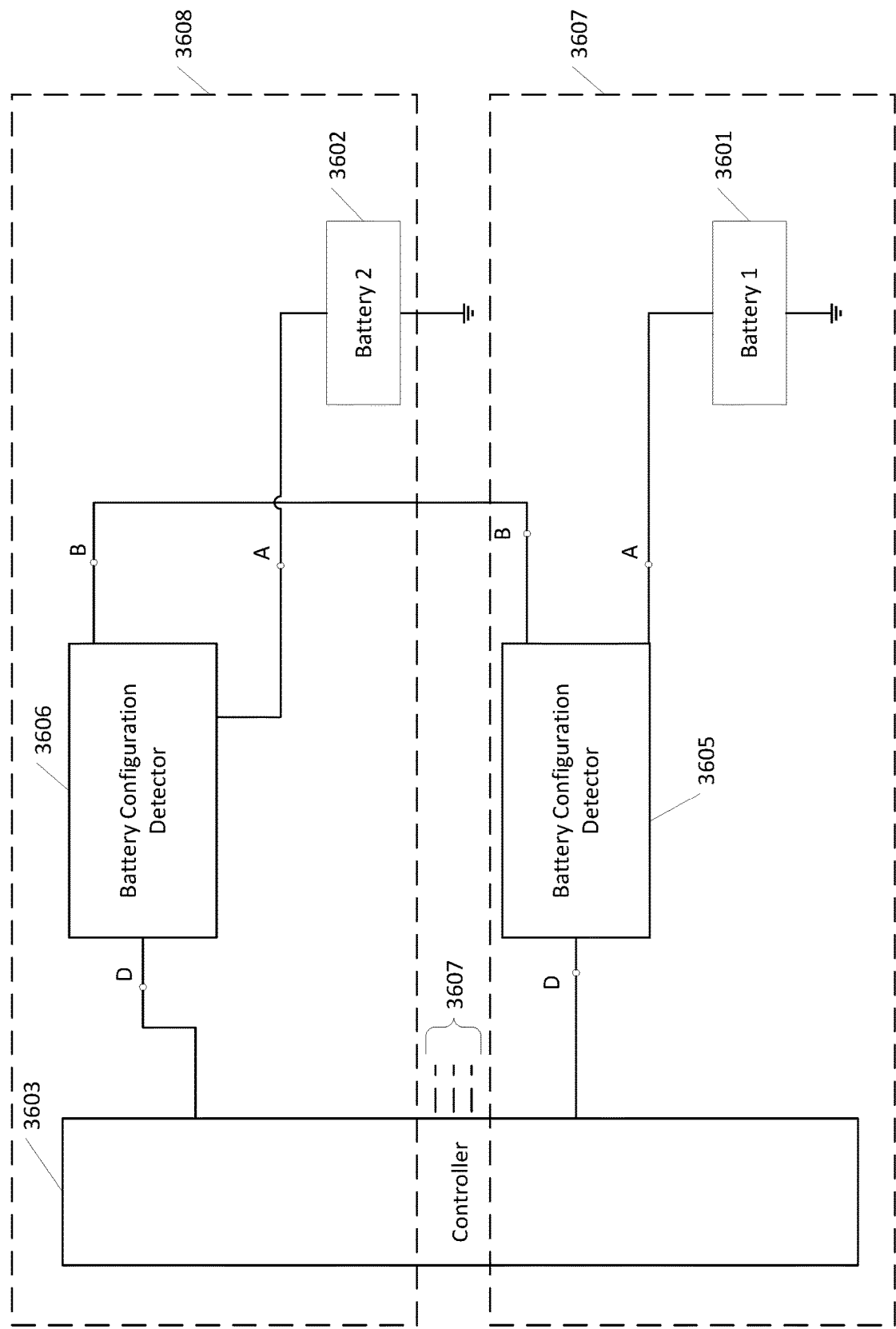
FIG. 36 shows a first example of detecting an arrangement of batteries.

FIG. 36 shows a first example of detecting an arrangement of batteries. FIG. 36 comprises batteries 3601 and 3602 that may be in a series arrangement or in a parallel arrangement. With additional batteries, additional arrangements may be possible. FIG. 36 further comprises a battery configuration detector 3605 and a battery configuration detector 3606, e.g., one for each battery). FIG. 36 further includes a controller 3603 connected to CAN 3607 and receiving, as inputs, outputs of each of the battery configuration detectors 3605-3606. Each battery configuration detector 3605-3606 may include a first terminal (shown in FIG. 36 as terminal A) connected to a battery, a second terminal (shown in FIG. 36 as terminal B), and an output terminal (shown in FIG. 36 as terminal D). Based on interactions between battery configuration detector 3605 and 3606 via connected terminals B, the battery configuration detectors 3505 and 3506 may indicate to controller 3603 information regarding the arrangement of the batteries 3601-3602. Each battery configuration detector may be configured to provide an output based on whether current flows through connecting terminal B. If no current flows, then the batteries may be determined to be in parallel. If current flows through at least one terminal B, then the batteries may be determined to be in series.

Figure 37A:
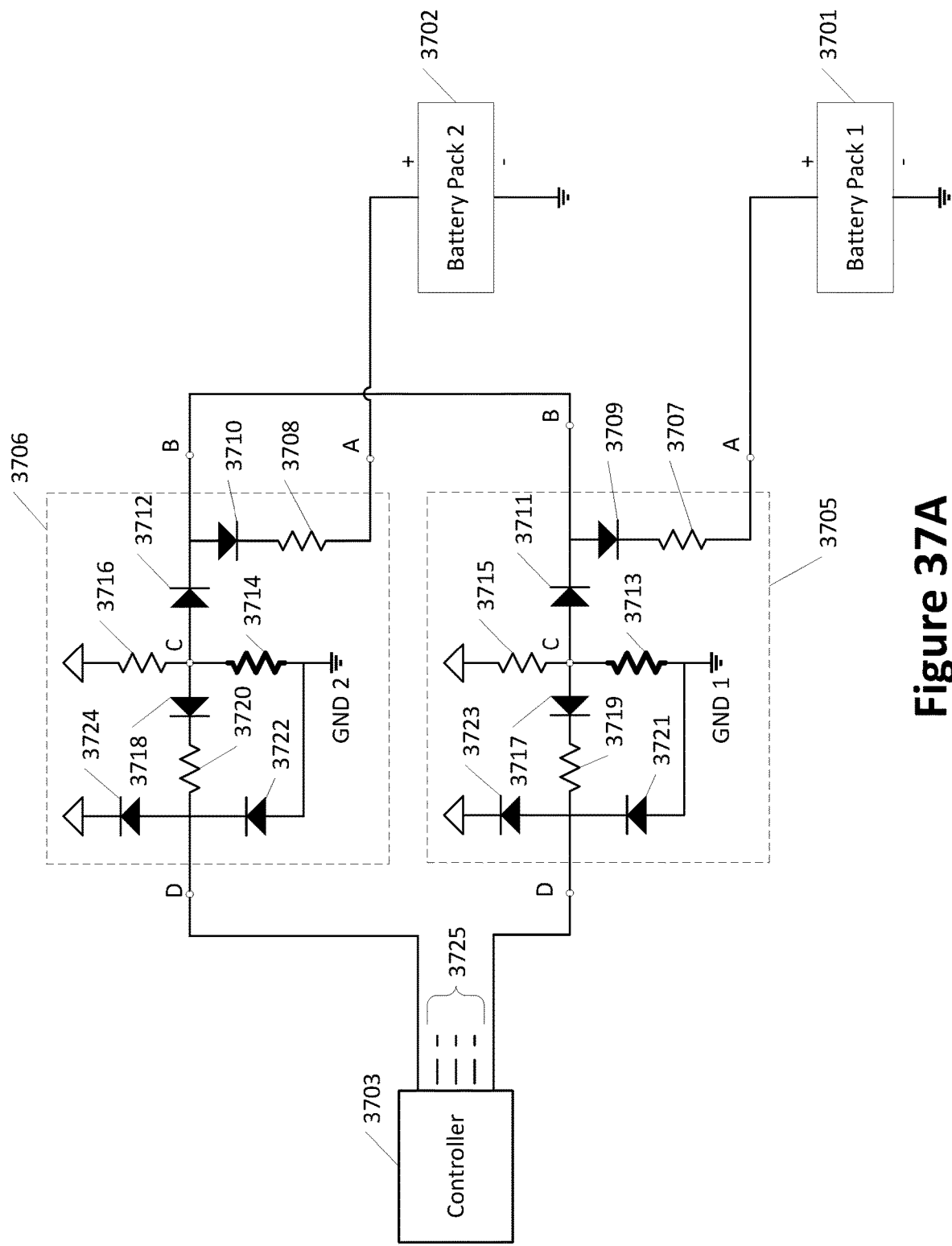
FIGS. 37A, 37B, and 37C show additional examples of detecting an arrangement of batteries.
Figure 37B:
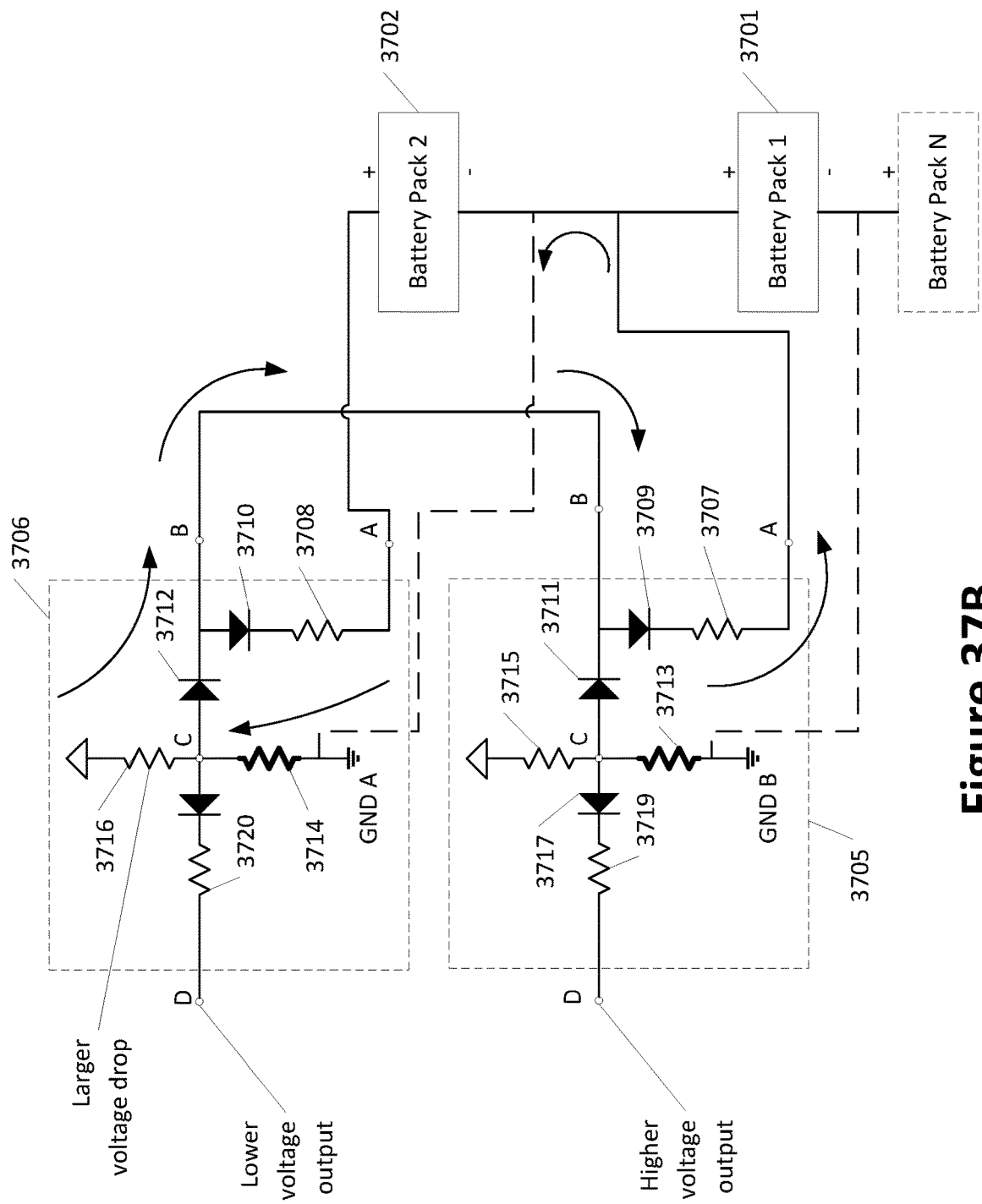
Figure 37C:
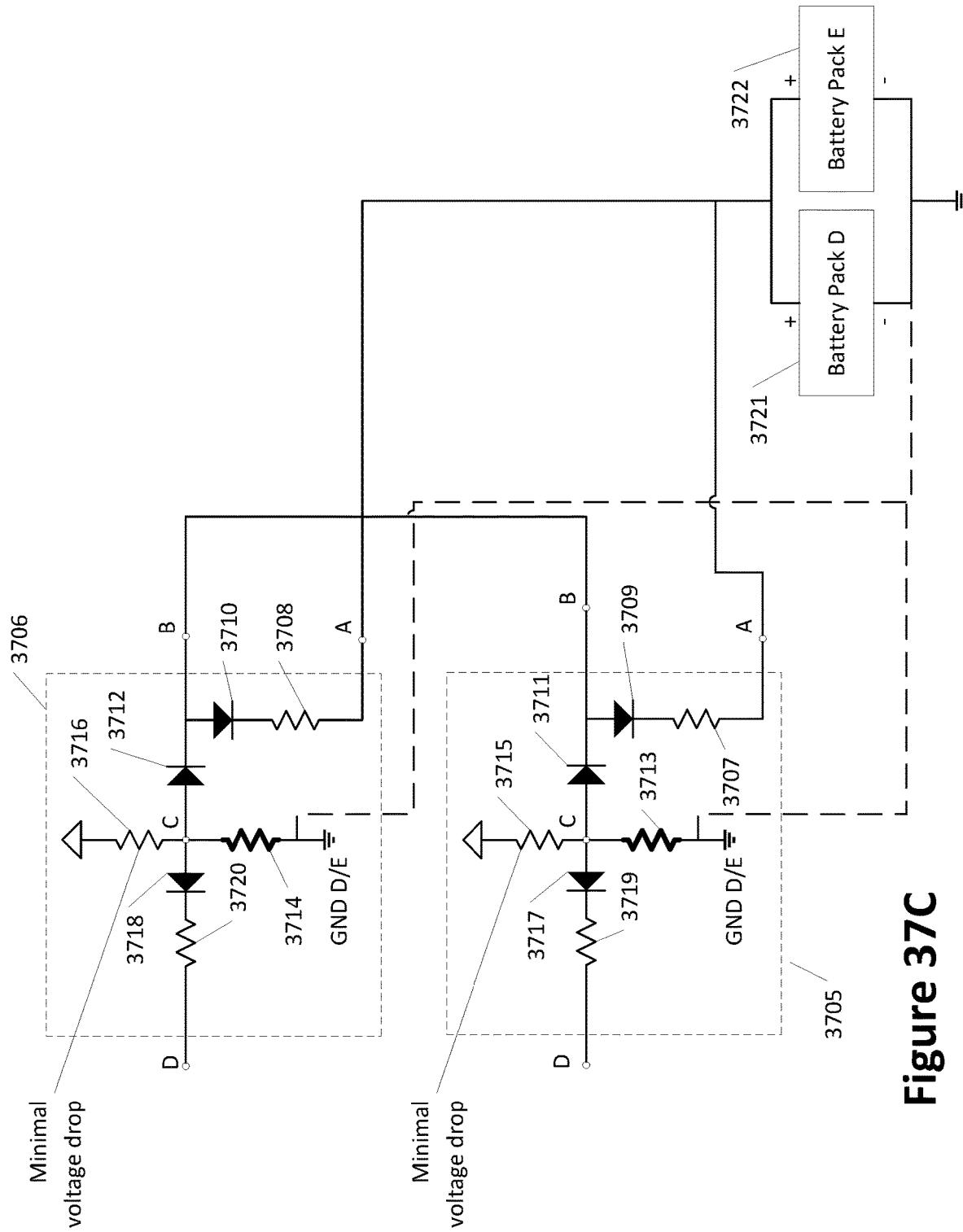

FIGS. 37A, 37B, and 37C show an example circuit for the configuration detectors and operations when the batteries are in serial or in parallel. In FIG. 37A, battery configuration detector circuits 3705 and 3706 provide information regarding how battery packs 3707-3708 are arranged. As with FIG. 36, each battery configuration detector 3705-3706 includes terminals A connected to respective batteries 1 and 2, 3701-3702, terminals B connected to other terminals B of the battery configuration detectors 3705-3706, and output terminals D connected to controller 3703. Controller 3703 is also connected to CAN 3725. Controller 3703 is shown as a single controller in FIG. 37A as it may be a single controller, a controller in each battery pack, and/or a single controller in each battery pack and an extra controller that integrates each battery pack's controller. In various examples, the CAN may connect each controller together.

The battery configuration detectors 3705-3706 contain a diode and resistor series pair 3709, 3707 and 3710, 3708 between terminal B and terminal A and diodes 3711, 3712 between internal nodes C and terminals B. Internal nodes C are located between pull-up resistors 3715, 3716 and pull-down resistors 3713, 3714. For purposes of explanation, resistors 3713, 3714 are assumed to be larger than resistors 3715, 3716. Another series connection of a diode and resistor pair 3718, 3720 and 3717, 3719 connect the internal nodes C to output terminals D. Pulldown resistor 3713 is connected to the negative terminal of battery 1 3701. Pull-down resistor 3714 is connected to the negative terminal of battery 2 3702.

The battery configuration detectors 3705-3706 may be configured to identify when current flows through each battery configuration detectors' terminal B. When the output voltage levels at terminals D are the same, the controller 3703 determines that the batteries are in parallel.

When battery packs 3707, 3708 are in series, current may flow from one terminal B into another terminal B based on a voltage difference between terminals A and B in at least one battery configuration detector. Based on that current, internal node C drops in voltage based on current flowing through one of resistor 3715 or 3716. The corresponding output terminal D of that battery configuration detector. The controller 3703 interprets a low terminal D as indicative that the batteries are in series. Further, battery associated with the low terminal D may be considered the first battery in the series connection.

FIG. 37B provides an example of battery configuration detectors 3705 and 3706 where the battery packs 3707 and 3708 are in series. Various components are removed for simplicity from the Figure. For battery configuration detector 3706, its terminal A is connected to the positive terminal of battery 2 3702. For purposes of explanation, the following describes the negative terminal of battery 2 3702 as at a ground voltage level. Because of the series connection of the battery packs 3707 and 3708, the negative terminal of battery 1 3701 is assumed to have a negative voltage value. Because terminal A of battery configuration detector 3705 is at ground (the negative terminal of battery 2 3702) while terminal A of battery configuration detector 3706 is higher than ground, current flows from terminal B of battery configuration detector 3706 to terminal B of battery configuration detector 3705. Because the ground terminal of resistor 3713 is connected to the negative terminal of battery pack 1 3701 (which is lower in potential than the negative terminal of battery pack 2 3702), the current flows through diode 3709, resistor 3707, the common connection of terminal A of battery configuration detector 3705 and the ground of resistor 3714 of battery configuration detector 3706, and pulls down terminal C of battery configuration detector 3706. The current flows across resistor 3716, reducing the voltage of internal node C of battery configuration detector 3706. As the output terminal D of battery configuration detector 3706 follows the voltage of internal node C of battery configuration detector 3706, terminal D of battery configuration detector 3706 is low while terminal D of battery configuration detector 3705 is higher. Based on this difference, the controller (not shown) may determine that the batteries are in series.

FIG. 37C shows an example of battery configuration detectors 3705 and 3706 where the batteries packs 3707 and 3708 are in parallel. Various components are removed for simplicity from the Figure. For battery configuration detector 3706, its terminal A is connected to the positive terminals of batteries 1 and 2, 3701 and 3702. For battery configuration detector 3705, its terminal A is also connected to the positive terminals of batteries 1 and 2, 3701 and 3702. Because there is no difference in the relative voltage between terminals A, there is no current flowing across either of resistor 3715 or 3716. As such, the voltages at output terminals D are the same and both are high. Accordingly, because no output terminal D has a low voltage, the controller determines the batteries to be in parallel.

Figure 38:
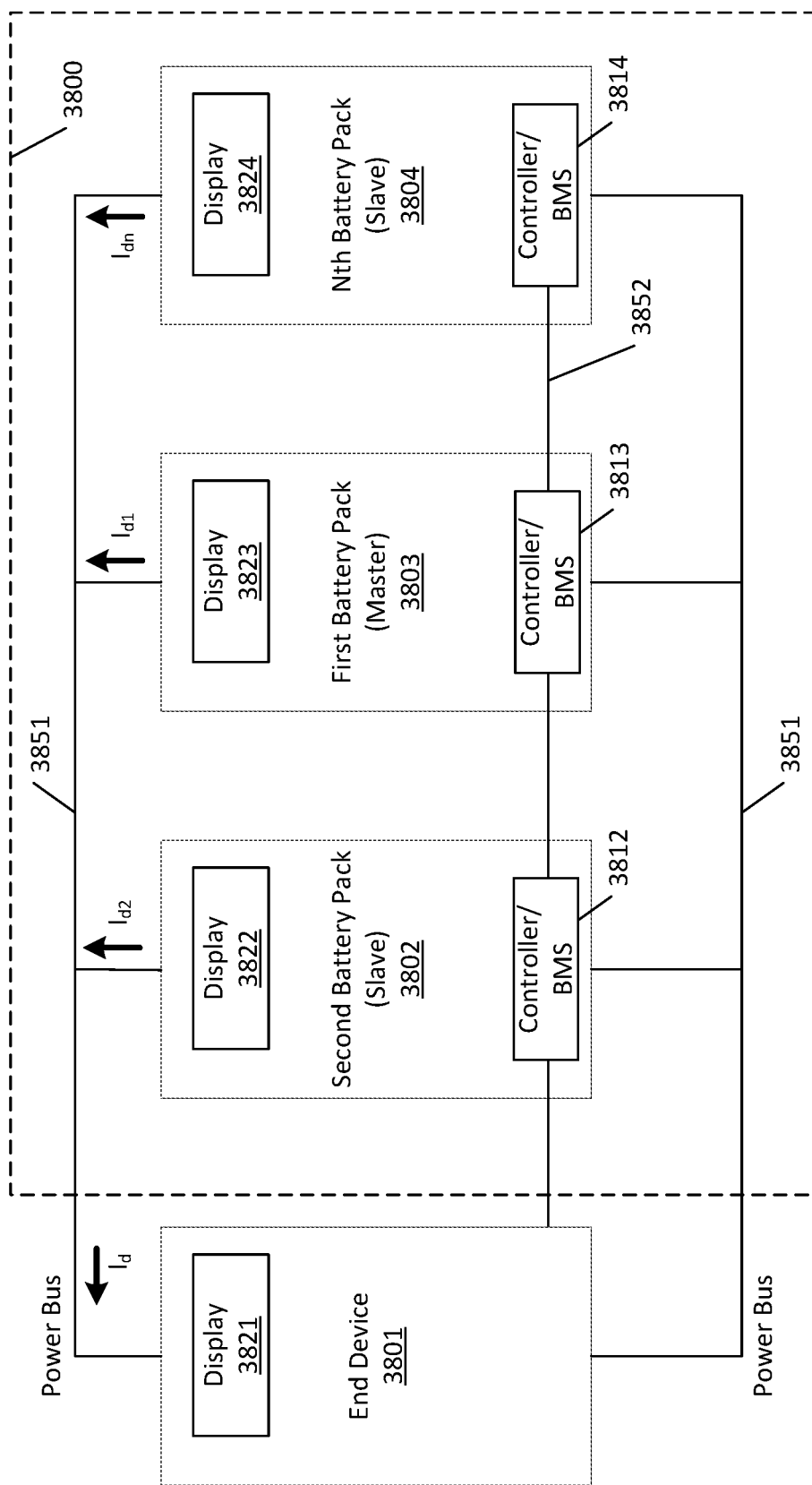
FIG. 38 shows an example of a battery system comprising multiple battery packs.

FIG. 38 shows an example of a battery system comprising multiple battery packs. For example, an end device 3801 is electrically powered by a battery system 3800 that includes a plurality of battery packs 3802, 3803, and 3804. Each battery pack 3802, 3803, and 3804 may include its own internal controller/BMS 3812, 3813, and 3814, respectively. Battery packs 3802, 3803, and 3804 are electrically connected to a DC power bus 3851 that comprises comprising positive and negative connections. The DC power bus presents a voltage to end device 3801 is essentially the same as the voltage provided by each parallel connected battery pack 3802, 3803, and 3804, while the electrical current supplied to end device 3801 is the sum of individual electrical currents provided by each battery pack. Battery system 3800, or portions thereof, may be housed within end device 3801, mounted to end device 3801, and/or may be externally situated with respect to end device 3801. End device 3801 (e.g., a power tool, a lawn mower, a garden tool, an appliance, a vehicle, etc.) may communicate to the battery system 3800 via a communication channel 3852.

Battery health is related to a condition of the battery pack and/or a condition required by the end device (e.g., a supplied current). The master battery pack 3803 may provide a determination whether present battery system conditions are suitable for powering an end device and/or an estimate about a battery pack's useful lifetime for powering the end device.

When performing processes associated with battery management, each battery pack 3802, 3803, 3804 may receive/send values of at least the SoH from/to other battery packs as will discussed in further detail. Status information, including SoH, may be generated for each battery pack by an integrated controller and/or battery management system (controller/BMS 3812, 3813, and 3814). The controller/BMS 3812, 3813, 3814 may include memory storing historical values corresponding to battery health and/or battery use over time.

Each battery pack 3802, 3803, 3804 includes a BMS (as shown in FIGS. 2A and 2B) that allows communication between all of the battery packs and end device 3801 over communication channel 3852. As discussed above, communication channel 3852 may comprise a serial communication channel (e.g., a CAN bus) or a parallel communication channel, may a wired, wirelessly connected, or optically connected, and may support one or more communication protocols (e.g., Ethernet, Industrial Ethernet, CAN, I²C, Microwire, BLE, etc.), and may support synchronous or asynchronous communication.

Embodiments may support different messaging protocols. For example, a protocol may support node to node communication by supporting both a source address and a destination address. The destination address may specify a particular node address or may be a global address so that a message may be broadcast to more than one node. In some cases, a protocol (such as the CAN protocol, the Modbus protocol, etc.) may support only a single source address (e.g., a master address) so that all nodes may process a message broadcast over a communication channel. Battery packs 3802, 3803, and 3804 may each connect to communication channel 3852 in a parallel fashion. However, embodiments may support different arrangements such as pack-to-pack communication on separate busses or a daisy chain connection through each battery pack.

Battery packs 3802, 3803, and 3804 may have similar or identical electrical and electronic components, such as those as described in reference to FIGS. 2A and 2B. After being inserted into the battery system 3800, one of the battery packs (e.g., battery pack 3803) may be configured as a master battery pack and one or more battery packs (e.g., battery pack 3801 and 3804) may be configured as a slave battery pack. Moreover, if a battery pack initially serves as a slave battery pack, it may subsequently serve as a new master battery pack if the current master battery pack is removed or disabled.

When performing processes associated with battery management, a battery pack may receive or send values of at least the SoH from/to other battery packs as discussed in further detail herein. Status information may include the SoC information, SoH information, temperature information, charging time information, discharge time information, discharge current information, and/or capacity information of the battery cells and/or of the battery pack.

SoH does not correspond to particular physical qualities of a battery. Rather SoH is used as a relative measure that reflects a general condition of a battery in its current condition in relation to its condition when new. While methods of calculating SoH differ, algorithms used to quantify SoH are based on parameters such as internal resistance, voltage, charge acceptance, internal capacitances, self-discharge factors and the like. Because SoH is a measure of the battery's long-term capacity, SoH provides an indication of the health of the battery and is not used as an absolute measurement of remaining available battery life. In general, SoH provides an indication of battery use, rather than being an absolute measure of remaining capacity. For example, SoH is indicative of internal resistance, battery storage capacity, battery output voltage, number of charge-discharge cycles, temperature of the battery cells during previous uses, total energy charged or discharged, and/or age of the battery cells to derive a value of the SoH.

As discussed above, SoC provides a measure of short-term capacity of a battery, such as an indication of the level of charge, in relation to the battery's capacity, during charge and discharge cycles. As such, SoC may be obtained from different battery backs of the battery system and used to manage charge balancing between the different battery packs to ensure sufficient energy is available to power the end device. Similarly, SoH may be used for monitoring and/or managing utilization of the battery packs 3802, 3803, and 3804 during long-term use of the battery system 3800.

For example, SoH may be used to provide an indication of the performance of each battery pack with respect to other battery packs of the battery system 3800. In doing so, SoH may be used to provide a relative measure of whether a battery pack 3802 is providing more current than another battery pack of the battery system 3800.

Additionally, by monitoring SoH values of the different battery packs of the battery system 3800 over time, the master battery pack may be able to predict an upcoming failure of a particular battery pack before the failure occurs, which may allow the master battery pack to initiate preemptive measures to avoid a catastrophic failure causing shutdown of the end device. Additionally, historical records of SoH values for battery systems may allow for improvements for troubleshooting and identifying which battery pack of the battery system experienced (or is predicted to experience) a failure.

The controller/BMS 3812, 3813, and 3814 calculates the SoH of its respective battery pack 3802, 3803, and 3804 based on an algorithm, which may be proprietary to a BMS chipset manufacturer. Because no consensus exists regarding SoH calculation, SoH values may differ based on the particular algorithm used for calculations. As such, different manufacturers and/or BMS chipset providers may use different algorithms which may result in differences in the resulting SoH values. Additionally, characteristics of different battery types, battery chemistries, battery packages, manufacturers may also affect the SoH calculation.

SoH determination algorithms may utilize one or more parameters and/or battery characteristics that change with age, such as battery cell resistance, impedance or conductance, can be used as a basis for providing an indication of the SOH of the cell. Changes to these battery characteristics signify that other changes have occurred which may be of more importance to the user. These could be changes to the external battery performance such as the loss of rated capacity or increased temperature rise during operation or internal changes such as corrosion. Because SoH is relative to the condition of the battery when new, the controller/BMS 3812, 3813, and 3814 stores a record of an initial battery pack condition and/or a standard condition of a battery pack or type of battery pack. Thus if battery pack impedance is a characteristic of interest, the controller/BMS 3812, 3813, and 3814 may generate an impedance record including, at least, an impedance value corresponding to a new battery pack. Other characteristics may also be considered when determining SoH, including, for example, a count of charge/discharge cycles of each battery pack.

Some SoH determination algorithms may be calculated based on measurements of one or more battery pack characteristics (e.g., impedance, conductance, etc.). While SoH algorithms may be proprietary to a BMS chipset manufacturer, the SoH value received from a battery pack may be used to provide an estimate of one or more battery pack characteristics, such as impedance. As the battery pack's SoH changes over time, estimates of the changing battery characteristics may be monitored and/or used to predict an operating condition of the battery pack. As such, SoH may be used to determine a battery pack characteristic (e.g., impedance) that may be used, in turn, for monitoring a present operational state and/or for predicting a future condition of each battery pack 3802, 3803, and 3804 of battery system 3800.

Impedance is a useful characteristic and corresponds to an operational condition of the battery pack and, over time, may be representative of a weakening battery and/or an indicator of general deterioration of the battery pack. Impedance of a battery pack, as an AC measurement, is associated to a particular test frequency (e.g., 1 kHz, etc.) and is expressed in milliohms (mOhm). While impedance may be directly measured, such measurements require an addition of an AC test source, which may or may not be compatible with the end device and may add an additional cost, weight and/or complexity to each battery pack. As such, a controller, such as the controller/BMS 3813 of master battery pack 3803, may obtain SoH values calculated by each battery pack of the battery system 3800 and use the SoH values to determine characteristics, current operating conditions and/or a predicted condition of each battery pack 3802, 3803, and 3804.

SoH of a battery pack may be defined over a range of values (e.g., 0-100), where full SoH (e.g., 100) corresponds to a new battery pack and SoH of under a specified value (e.g., 0, under 5, under 10, etc.) may correspond to a failed battery pack. By comparing the SoH of the battery packs 3802, 3803, and 3804 of battery system 3800, to each other and/or to a SoH threshold, the master battery pack 3803 may determine a relative age of each battery pack 3802, 3803, and 3804. For example, when each battery pack have a same SoH, (or are within a defined range e.g., +/−5%) the battery packs may be the same age. A greater SoH between battery packs may be representative of a new battery pack being added or otherwise activated.

In an illustrative example, when battery system 3800 includes battery packs of a similar age, the SoH of each battery pack 3802 (SoH$_1$=85), 3803 (SoH$_2$=86), and 3804 (SoH$_n$=84) may be the same or substantially similar. However, when a replacement for a failed battery pack is added (or a new pack is activated), the SoH value for the newly added pack may be substantially different from the SoH value(s) of the existing battery packs. For example, battery packs 3802 and 3803 may have been operational for some time and battery pack 3804 may have been added to replace a failed battery pack. Here, the SoH of battery packs 3802 and 2803 may be near 75, while the newly added pack 3804 may have a SoH of (or near) 100. In some cases, a newly added pack may be a previously used battery pack and may have a lower SoH corresponding to the age of the pack (e.g., 92, 85, 74, 68, etc.) In some cases, the battery system 3800 may include one or more spare or otherwise disabled battery packs, such as an activated pack that has been previously operated and disabled. This older pack may have a SoH less than the SoH of other active battery packs of battery system 3800 (e.g., 62).

Impedance of the battery packs may be determined from the SoH values of each battery pack, such as by use of an equation, a lookup table, etc. Equations and/or lookup tables provided in memory of each battery pack 3802, 3803, and 3804. Lookup table values may be predetermined (e.g., determine experimentally, pre-calculated, etc.) and stored in memory of the controller/BMS. Memory of the controller/BMS 3812, 3813, and 3814 may store multiple lookup tables, where each table may be associated with a particular battery pack type, battery cell package, battery chemistry, manufacturer, etc. The controller/BMS 3812, 3813, and 3814 may identify a particular table for use by a pack identifier that may be stored locally to the battery pack (e.g., memory of the master battery pack 3802) and/or battery pack identifier(s) received via the communication channel 3852 from the other battery packs 3802 and 3804 of the battery system 3800. For example, master battery pack 3802 may obtain SoH information from each battery pack of battery system 3800. For example, master battery pack 3802 may receive SoH values via the communication channel 3852 (e.g., a CAN bus) and its own SoH value via local communication buses or memory.

Using the determined inductances of each battery pack 3802, 3803, and 3804, the master battery pack 3803 may calculate an indication of health of battery system 3800. For example, the master battery pack 3803 may calculate a "virtual" current of the battery system based on the battery pack voltage and battery pack impedances. For example, referring to FIG. 38, a battery system virtual output current ($I_d$) provided to end device 3801 may be a combination of the virtual output currents (e.g., a sum of $I_{d1}$, $I_d$, and $I_{d4}$). When battery system 3800 includes battery packs having the same or similar age, the virtual currents from each battery pack will provide an approximately equal virtual current contribution. However, when battery packs have a more significant age difference (e.g., a SoH difference greater than a threshold, such as +/−10%), the difference in battery pack impedance may cause an unbalanced virtual current contribution from each battery pack 3802, 3803, and 3804. When the current contributions are unbalanced, the battery pack (or packs) providing a greater virtual current to the load (e.g., end device 3801) may reach a failure condition before the battery packs providing a lower current value.

Tables 4-6 show illustrative SoH values obtained from battery packs 3802, 3803, and 3804 and a relationship of the SoH values to battery pack impedance and virtual system currents for battery system 3800.

TABLE 4

Battery Packs of a Same Age and a Spare

| Pack | SoH | Pack Impedance | Virtual Current |
|---|---|---|---|
| 3802 | 75 | 30 mOhm | 5 A |
| 3803 (master) | 75 | 30 mOhm | 5 A |
| 3804 (spare) | 63 | 31 mOhm | N/A |
| (end device) | | | 10 A |

As can be seen, the SoH of the three battery packs 3802 and 3803 are substantially similar, thus the pack impedance and virtual currents sourced by each battery pack are also substantially similar. Because all active battery packs 3802 and 3803 are sourcing equal or approximately equal currents to end device 3801, the master battery pack 3803 may not monitor the virtual current output or communicate the virtual load current via the communication channel 3852. In some cases, the master battery pack 3803 may communicate an indication of the virtual load current (e.g., 10A) via the communication channel 3852

TABLE 5

Battery Packs with a new Replacement Pack and a Spare

| Pack | SoH | Pack Impedance | Virtual Current |
|---|---|---|---|
| 3802 (replacement) | 100 | 20 mOhm | 5.2 A |
| 3803 (master) | 75 | 30 mOhm | 4.8 A |
| 3804 (spare) | 63 | 31 mOhm | N/A |
| (end device) | | | 10 A |

Table 5 shows, after a battery pack failure, a new battery pack 3802 is added to the battery system 3800 and has a SoH of 100, while the older battery pack 3803 has a lower SoH of 75. In this illustrative example, the older battery pack 3803 may have a higher pack impedance (30 mOhm) and the new battery pack has a lower impedance (20 mOhm). Because of the impedance difference, the newer replacement battery pack 3802 may source a higher virtual current (e.g., 5.2 A) vs the older battery pack 3803 (e.g., 4.8 A). Because of this current imbalance, the older pack may provide a greater current contribution to the end device 3801 than battery pack 3803. A SoH imbalance (e.g., a difference greater than a difference threshold) may be indicative of situation where a newer battery pack (one with a higher SoH) sources more current than older battery packs. As such, the master battery pack 3803 may enable SoH monitoring when a SoH difference is greater than a difference threshold. When SoH monitoring is enabled, the master battery pack 3803 may communicate the virtual load current to the end device and, optionally, an indication of the highest current sourced from the battery pack having the highest SoH value (e.g., 5.2 A). A battery pack may have one or more defined current thresholds (e.g., a maximum current threshold, a current warning threshold, etc.). The master battery pack may additionally monitor the virtual output currents sourced by the newest battery pack in such situations because the higher currents may cause the replacement battery pack 3802 to fail faster than the older battery pack 3803. In the illustrative example, the old battery pack 3803 may source 4.8 A, of a 10 A virtual load current, while the replacement battery pack 3802 may source 5.2 A. However, this 5.2 A may be substantially closer to a current limit (e.g., 5.3 A).

Operation at or near a current limit may cause the battery pack 3803 to fail before the older battery pack 3802 and/or may cause the replacement battery pack 3802 to age faster. Additionally, the virtual output current of the battery pack 3802 (e.g., 5.2) may be greater than a threshold (e.g., a current warning condition), where operation may continue, but the master battery pack 3803 may augment the communication to include both the virtual load current (e.g., 10 A) and the higher virtual battery pack output current (5.2 A), along with an identifier of the battery pack 3802 subject to the current warning condition. These currents may be logged and/or otherwise monitored for further error prediction and/or future troubleshooting. In addition, when a current warning condition is communicated, the information may be used to trigger presentation of a current warning indication via a visual output (e.g., a display, a light emitting diode (LED), etc.) at the end device and/or on one or more battery packs. The warning indication may include one or more of a warning indicator, a battery pack identifier indication, a current value, etc. In some cases, the identification of a battery pack sourcing a higher current (e.g., outside a range, near a current threshold) than other battery packs in the system may be predictive of a future failure condition.

TABLE 6

Battery Packs with an Enabled Spare Pack

| Pack | SoH | Pack Impedance | Virtual Current |
|---|---|---|---|
| 3802 (spare) | 100 | 20 mOhm | N/A |
| 3803 (master) | 75 | 30 mOhm | 5.1 A |
| 3804 (re-enabled) | 63 | 31 mOhm | 4.9 A |
| (end device) | | | 10 A |

Table 6 shows an illustrative example, where an older spare battery pack 3804 may be enabled after a pack failure of pack 3802 (which may or may not be replaced with a spare new battery pack). Here, the older re-enabled battery back 3804 (e.g., 63) may have a lower SoH than the existing master battery pack 3803 (e.g., 75). Here the SoH differential (e.g., 12) between the two active battery packs may be greater than a threshold (e.g., 10), so that the master enables SoH monitoring and enables communication of the virtual load current via the communication channel 3852. However, the virtual output currents of both battery packs 3803 and 3804 may be outside of a threshold range or under a threshold condition. As such, SoH-based monitoring of the operation of the battery system 3800 continues. A visual indicator that SoH monitoring may be provided to the user via an LED, a display or the like. Additionally, logging of SoH monitoring information may be performed for use in troubleshooting and/or other processes to predict a future failure of a battery pack.

TABLE 7

Battery Packs with a new Replacement Pack and a Spare

| Pack | SoH | Pack Impedance | Virtual Current |
|---|---|---|---|
| 3802 (replacement) | 100 | 20 mOhm | 4.1 |
| 3803 (master) | 65 | 31 mOhm | 3.1 A |
| 3804 (re-enabled) | 63 | 32 mOhm | 2.8 A |
| (end device) | | | 10 A |

Table 7 shows an illustrative case where a new replacement pack 3802 (e.g., SoH=100) and an older spare battery pack (e.g., SoH=63) is re-enabled. Here, the SoH differential is large (e.g., 37), so that SoH monitoring may be enabled. Here, the existing master battery pack 3803 may have aged additionally, such that if only replacement battery pack 3802 and master battery pack 3803 are enabled, the virtual current output by the replacement battery pack may be at or near the current limit defined for the battery system, thereby causing the battery system to fault before causing a catastrophic failure of the new replacement battery pack 3802. However, by adding additional capacity to the battery system, by enabling a spare battery pack 3804, even if older than other battery packs in battery system 3800.

Controller/BMS 3813 (and/or controller/BMS 3812 and 3814) may support battery management processes (for example, processes 3900, 4000, and 4000 of FIGS. 38, 40, and 41, respectively) discussed herein. Controller/BMS 3813 may control the overall operation of battery pack 3803 and its associated components. Controller/BMS 3813 may access and execute computer readable instructions from a (e.g., memory device 202 of FIG. 2A), which may assume a variety of computer readable media. For example, computer readable media may be any available media that may be accessed by controller/BMS 3813 and may include both volatile and nonvolatile media and removable and non-removable media. By way of example, and not limitation, computer readable media may comprise a combination of computer storage media and communication media.

Computer storage media may include volatile and non-volatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

While controller/BMS 3813 and a communication channel interface circuit (e.g., communication channel interface circuit 205) may be powered by battery cells of battery pack 3803, embodiments may have a separate power source. Consequently, battery pack 3803 may continue to interact with the other battery packs over the communication channel regardless of the status of battery cells.

A CAN bus may enable messages to flow among a plurality of battery packs in accordance with an embodiment. The CAN bus is sometimes referred to as a broadcast type of bus, where each message contains a source address (for example, a device ID) but might only optionally include a destination address. The CAN bus may convey SoH information when a slave battery pack sends status information back to the master battery pack.

As used herein, the term "virtual current" may be understood as the current from a pack as adjusted for an internal impedance of each battery pack (i.e., capacitive/inductive effects of each battery pack). Additionally or alternatively, the term "virtual current" may be understood as an "anticipated maximum" current based solely on the internal impedance associated with the battery pack and ignoring current limiting effects of a load—e.g., a short circuit peak, instantaneous current.

Figure 39:
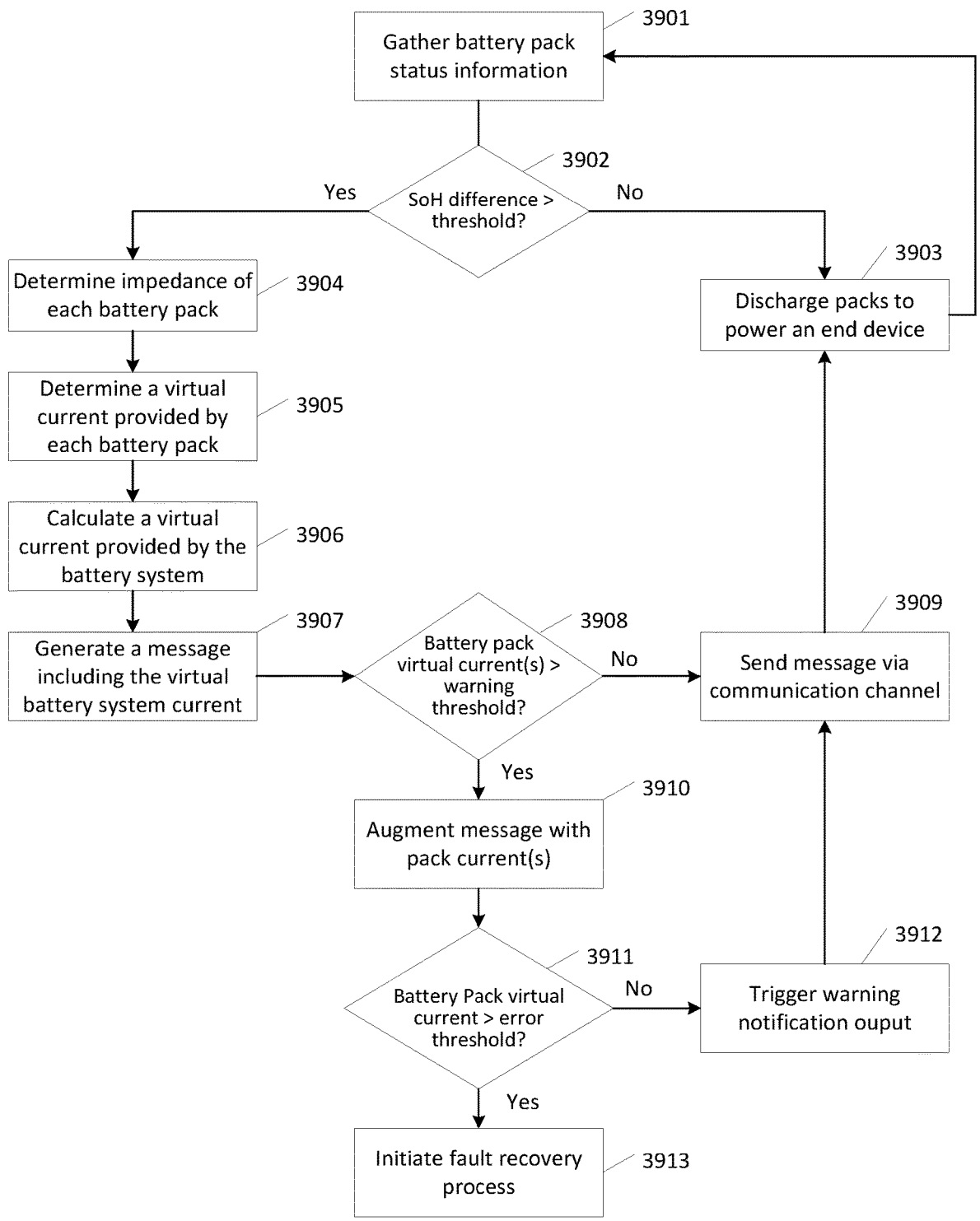
FIG. 39 shows a flow chart of a first example of monitoring and responding to changes in states of health of battery packs.

FIG. 39 shows a flow chart of a first example of monitoring and responding to changes in states of health of battery packs. In step 3901, battery pack status information is gathered. The information gathered may comprise identification information of each battery pack, SoH information, of each battery pack, SoC information of each battery pack, and the like. In step 3902, the system determines whether a difference in SoH between any two battery packs exceeds (or is equal to) a difference threshold. If the difference in SoH across all battery packs is less than the difference threshold, then, in step 3903, the packs are discharged as normal to power an end device.

If the SoH difference between any two battery packs is greater than or equal to the SoH difference threshold, then the system determines, in step 3904, the impedance of each battery pack. For instance, the impedance of each battery pack may be determined through a variety of processes including, but not limited to, determining a current through a load of a known value while determining the voltage across the load (and solving for an internal impedance of the battery pack using a Thévenin Equivalent model or a Norton Equivalent model). Other algorithmic-based processes are possible and considered within the scope of this disclosure. Additionally or alternatively, the system may look up in a table of known impedances the SoH of each battery pack to obtain an impedance for each battery pack. Based on the determined impedance from step 3904, a virtual current that may be provided by each pack is determined in step 3905. The determination of the virtual current may be based on a direct measurement and/or based on looking up the impedance in a table of impedances and retrieving a virtual current for each impedance.

In step 3906, the system determines the total virtual current providable by the battery system. In step 3907, the system generates a message indicating the virtual battery system current. In step 3908, the system determines whether a virtual current from any of the battery packs exceeds an individual pack warning threshold and/or whether the combined virtual current from the battery packs exceeds a combined pack warning threshold. The determination of step 3908 may relate to either individual pack warning threshold or the combined pack warning threshold or both. If one threshold is not met (if only one threshold is compared) or if both thresholds are not met (if both thresholds are being compared), then in step 3909, the message is sent via the communication channel. If one or more of the thresholds are met in step 3908, then in step 3910, the message is augmented with the specific pack current and/or combined pack currents. In step 3911, the system determine whether the battery pack virtual current exceeds an error threshold. If the threshold is not exceeded by the battery pack virtual current, then in step 3912, the system triggers a warning notification output and then sends the notification, in step 3909, via the communication channel. If the threshold is exceeded in step 3911, then the system initiates a fault recovery process (as described herein) in step 3913. The fault process may comprise reducing power output from the battery packs, limiting a maximum current from the battery packs, limiting a maximum voltage from the battery packs, disabling one or more battery packs while permitting other battery packs to operate, swapping one or more battery packs for spare battery packs, and the like.

Figure 40:
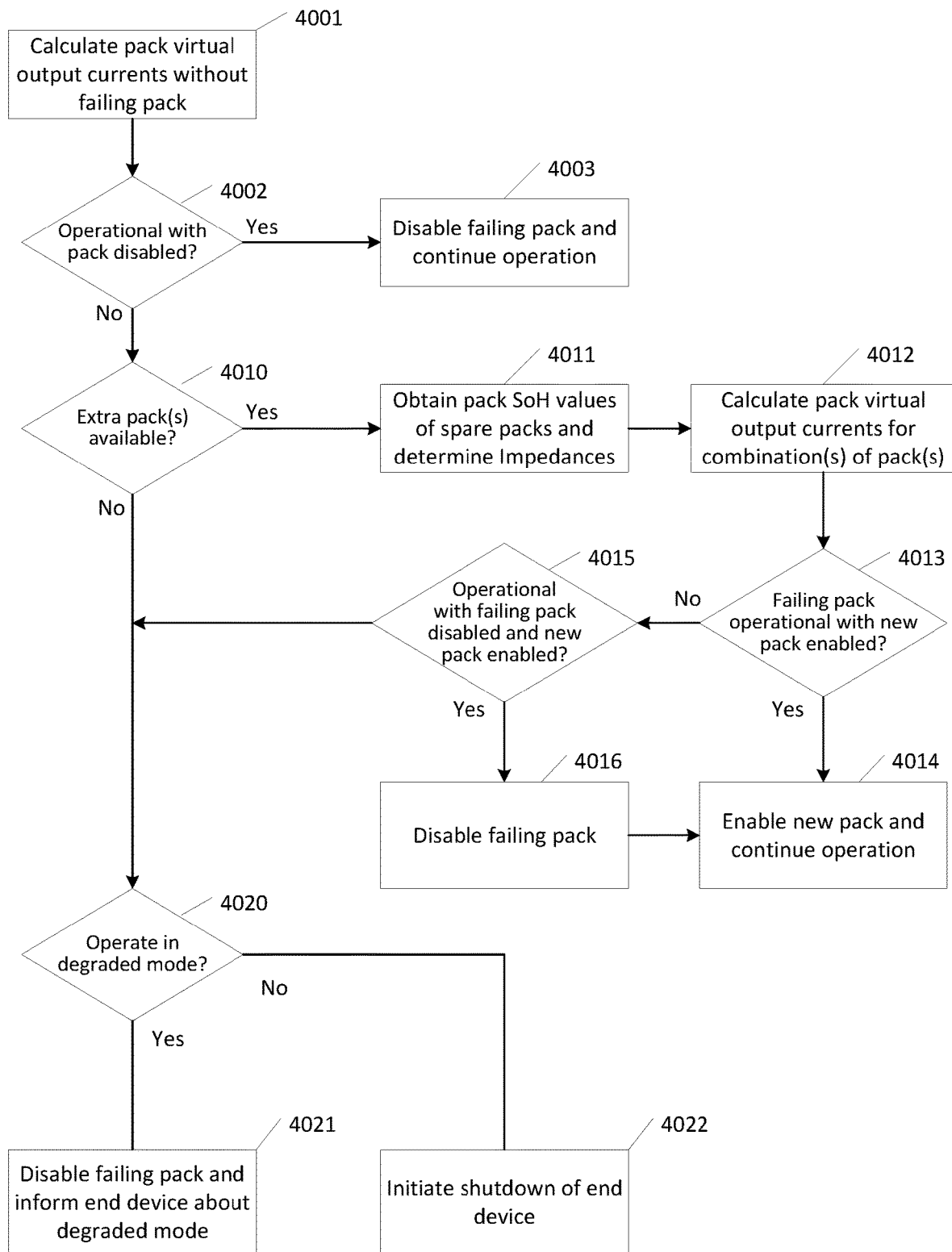
FIG. 40 shows a flow chart of a second example of monitoring and responding to changes in states of health of battery packs.

FIG. 40 shows a flow chart of a second example of monitoring and responding to changes in states of health of battery packs. In step 4001, pack virtual output currents are calculated without the failing pack. In step 4002, the system determines whether operation with the disabled pack is possible (e.g., whether a minimum desired current is possible without the failing pack). If the system is operational without the failing pack, then in step 4003 the system disables the failing pack and continues operation. If the systems is not operational without the failing pack as determined in step 4002, then in step 410 the system determines whether one or more extra packs are available. If one or more extra packs are available, in step 4011 the system obtains the SoH values of the one or more battery packs and determines their impedances. In step 4012, the system calculates the pack virtual output currents for one or more combinations of the pack or packs. In step 4013, the system determines whether operation with the failing pack and the new pack or packs is possible. If operation is possible (e.g., meeting a minimum desired current), the system enables the new pack and continues operation in step 4014. If operation with the failing pack and the new pack is not possible as determined in step 4013, the system determines whether operation is possible by disabling the failing pack and enabling the new pack. If operation is possible, then in step 4016, the system disables the failing pack and, in step 4014, enables the new pack and continues operation.

If no packs are available (from step 4010) or operation is not possible with the failing pack (from step 4015), then the system determines whether operation in a degraded mode is possible in step 4020. If operation is possible, then in step 4021 the failing pack is disabled and the end device is informed of the possibility of operation in the degraded mode (and awaits instructions and continues operation as instructed). If operation is not possible in the degraded mode from step 4020, then the system initiates shutdown of the end device in step 4022.

Figure 41:
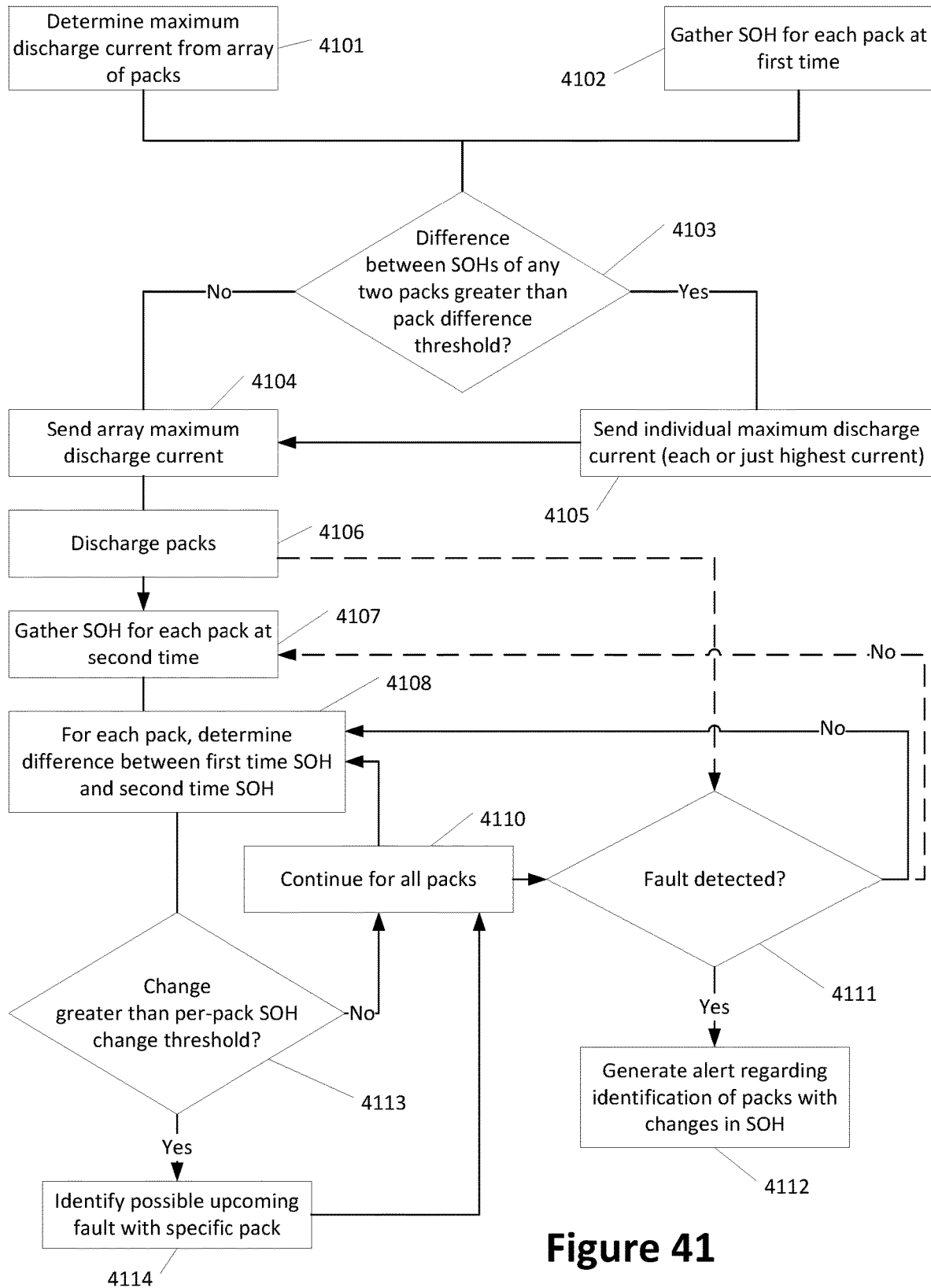
FIG. 41 shows a flow chart of a third example of monitoring and responding to changes in states of heath of battery packs.

FIG. 41 shows a flow chart of a third example of monitoring and responding to changes in states of heath of battery packs. In step 4101, the system determines the maximum discharge current from an array of battery packs. In step 4102, the system gathers the state of health for each pack at a first time. In step 4103, the system determines whether a difference between the states of health of any two packs are greater than a pack difference threshold. If the difference between the states of health of all packs are less than the pack difference threshold then in step 4104, the system sends the maximum discharge current of the array of battery packs to an external device. If at least two battery packs have a difference in states of health that is greater than the pack difference threshold as determined in step 4103, then the system sends an individual maximum discharge current in step 4105. The individual maximum discharge current may be for each battery pack, for a battery pack with a highest state of health, or a combination of battery packs.

In step 4106, the battery packs are discharged. In step 4107, the states of health are gathered for each pack at a second time. In step 4108, the system determines, for each pack, a difference between the first time state of health and the second time state of health. In step 4113, the system determines whether a change in the per-pack states of health exceeds a change threshold. If all changes in the states of health of the battery packs are below the state of health change threshold from step 4113, then in step 4110, the system continues to monitor the states of health for each battery pack.

From step 4113, if a change in the states of health for any pack exceeds the state of health change threshold, then in step 4114, the system identifies a possible upcoming fault with the specific pack having the state of health change greater than the state of health change threshold. The identification may be maintained in the master battery pack, distributed to all battery packs, and/or sent to the external device. Next, the system continues to monitor the states of health for all battery packs in step 4110.

While monitoring the states of health for the battery packs from step 4110, the system checks for faults in battery packs. In step 4111, if a fault is detected, the system generates an alert regarding the fault. In some examples, the battery pack having created the fault may be known and provided to the external device. Additionally or alternatively, the battery pack that created the fault may not be known. To permit the user to identify which battery pack may have created the fault, in step 4112, the system may identify the pack and/or packs with their changes in their states of health. For instance, the states of health and/or changes in states of health for all battery packs may be provided to the external device Additionally or alternatively, only those packs that have experienced a larger change in state of health may be identified. If no false detected in step 4111, then the system continues to monitor for differences in the states of health in step 4108.

Additionally or alternatively, fault may be detected in step 4111 (via the broken line output from step 4106 without monitoring the states of health for each pack (e.g., without repeatedly performing step 4107). Rather while discharging packs from step 4106, the system may monitor in step 4111 for faults. If faults are detected in step 4111, alerts are generated in step 4112 including changes in states of health information (e.g., determined while the battery packs are discharging and/or independently of when the battery packs discharge). If no-fault detected in step 4111, the system may gather the states of health for the packs at that time in step 4107 (e.g., shown by the broken line from step 4111 to step 4107).

Many illustrative embodiments are listed below in accordance with one or more aspects disclosed herein. Although many of the embodiments listed below are described as depending from other embodiments, the dependencies are not so limited.

For example, embodiment #5 (below) is expressly described as incorporating the features of embodiment #1 (below), however, the disclosure is not so limited. For example, embodiment #5 may depend any one or more of the preceding embodiments (i.e., embodiment #1, embodiment #2, embodiment #3, and/or embodiment #4). Moreover, that any one or more of embodiments #2-#12 may be incorporated into embodiment #1 is contemplated by this disclosure. Likewise, any of embodiments #1, 14, 17, 22 may be combined with one or more of the features recited in embodiments #2-13, 15-16, 18-21, and/or 23-26. Further likewise, any of embodiments #27, 39, 43 may be combined with one or more of the features recited in embodiments #28-38, 40-42, 44-46. Further likewise, any of embodiments #47, 59, 64 may be combined with one or more of the features recited in embodiments #48-58, 60-63, 65-69. Further likewise, any of embodiments #70, 87, 92 may be combined with one or more of the features recited in embodiments #71-86, 88-91, 93-94. Further likewise, any of embodiments #95, 105, 109 may be combined with one or more of the features recited in embodiments #96-104, 106-108, 110-114. Further likewise, any of embodiments #116 and #125 may be combined with one or more of the features recited in embodiments #117-124 and 126-135. Further likewise, any of embodiments #136 and #146 may be combined with one or more of the features recited in embodiments #137-145 and #147-155. Further likewise, any of embodiments #156 and #166 may be combined with one or more of the features recited in embodiments #157-165 and #167-171. Further likewise, any of embodiments #172 and #183 may be combined with one or more of the features recited in embodiments #173-182 and #184-189. Further likewise, any of embodiments #190, #205, and #209 may be combined with one or more of the features recited in embodiments #191-204 and #206-208. In addition, that any one or more of the features in embodiments #1, 14, 17, 22, 27, 39, 43, 47, 59, 64, 70, 87, 92, 95, 105, 109, 116, 125, 136, 146, 156, 166, 172, 183, 190, 205, and 209 may be combined is contemplated by this disclosure. Moreover, that any one or more of the features in embodiments #1-209 can be combined is contemplated by this disclosure.

Embodiment #1. A first battery pack configured for installation in a battery system for electrically powering an end device, wherein all installed battery packs installed in the battery system have substantially identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

obtain a configuration list of installed battery packs in the battery system, wherein a first entry corresponds to the first battery pack;

when the first entry of the configuration list has a top priority position in the configuration list, configure the first battery pack to serve as a master battery pack of the battery system, wherein the top priority position is indicative that the first battery pack was installed before any other active battery packs in the battery system;

revise the configuration list when a second battery pack is installed or removed from the battery system; and repetitively broadcast the configuration list to all said installed battery packs over the communication channel via the communication interface circuit.

Embodiment #2. The first battery pack of Embodiment #1, wherein the controller instructions, when executed by the at least one processor, further cause the controller to:

when a third battery pack is added to the battery system, detect an insertion of the third battery pack; and create a third entry for the third battery pack in the configuration list, wherein the third entry is at a bottom position of the configuration list.

Embodiment #3. The first battery pack of Embodiment #2, wherein the controller instructions, when executed by the at least one processor, further cause the controller to:

when the second battery pack is removed from the battery system, detect removal of the second battery pack; and delete a second entry for the second battery pack in the configuration list.

Embodiment #4. The first battery pack of Embodiment #3, wherein the controller instructions, when executed by the at least one processor, further cause the controller to:

advance a list position of the third entry for the third battery pack in the configuration list.

Embodiment #5. The first battery pack of Embodiment #1, wherein the controller instructions, when executed by the at least one processor, further cause the controller to:

when the first entry for the first battery pack is not at the top priority position in the configuration list, configure the first battery pack to serve as a first slave battery pack.

Embodiment #6. The first battery pack of Embodiment #5, wherein the controller instructions, when executed by the at least one processor, further cause the controller to:

when another battery pack is removed from the battery system and the first entry moves to the top priority position of the configuration list, configure the first battery pack to serve as the master battery pack.

Embodiment #7. The first battery pack of Embodiment #1, wherein the communication channel comprises a controller area network (CAN) bus and wherein the controller instructions, when executed by the at least one processor, further cause the controller to:

utilize a SAE J1939 Address Claim Procedure to obtain an identification (ID) for the first battery pack, wherein the ID is included in the first entry.

Embodiment #8. The first battery pack of Embodiment #5, wherein the controller instructions, when executed by the at least one processor, further cause the controller to:

when the first battery pack serves as the first slave battery pack:

receive a first request from the master battery pack; and in response to the receiving the first request, respond to the first request from the master battery pack.

Embodiment #9. The first battery pack of Embodiment #1, wherein the controller instructions, when executed by the at least one processor, further cause the controller to:

when the first battery pack serves as the master battery pack:

send a second request to a second slave battery pack; and in response to the sending, receive a response message from the second slave battery pack.

Embodiment #10. The first battery pack of Embodiment #1, wherein the controller instructions, when executed by the at least one processor, further cause the controller to:

when the first battery pack is removed from the battery system and reinserted into the battery system, send a join request over the communication channel; and receive the configuration list with a fourth entry at a bottom position in the configuration list, wherein the fourth entry is associated with the first battery pack.

Embodiment #11. The first battery pack of Embodiment #1, the first battery pack comprising non-volatile memory and wherein the controller instructions, when executed by the at least one processor, further cause the controller to:

store battery pack information in the non-volatile memory; and when the first battery pack is removed from the battery system and reinserted tin to the battery system, retain the battery pack information.

Embodiment #12. The first battery pack of Embodiment #2, wherein the controller instructions, when executed by the at least one processor, further cause the controller to:

when the first battery pack serves as the master battery pack:

send a repetitive broadcast message to all said installed battery packs over the communication channel via the communication interface circuit; and when a repetitive broadcast message is not received from the third battery pack, remove the third entry from the configuration list.

Embodiment #13. The first battery pack of Embodiment #12, wherein the repetitive broadcast message is sent periodically and wherein the controller instructions, when executed by the at least one processor, further cause the controller to:

when a timer set to a predetermined time expires without receiving the repetitive broadcast message, remove the third entry from the configuration list.

Embodiment #14. A battery system configured for electrically powering an end device and comprising a plurality of battery packs, the battery system comprising:

a first battery pack including:

a first communication interface circuit configured to interface to a controller area network (CAN) bus;

a first controller comprising at least one processor; and a first memory storing controller instructions that, when executed by the at least one processor, cause the first controller to:

obtain a configuration list of installed battery packs in the battery system, wherein a first entry corresponds to the first battery pack;

when the first entry of the configuration list has a top priority position in the configuration list, configure first battery pack to serve as a master battery pack of the battery system, wherein the top priority position is indicative that the first battery pack was installed before any other active battery packs in the battery system;

when the first battery pack serves as the master battery pack, revise the configuration list when a third battery pack is installed or removed from the battery system; and repetitively broadcast the configuration list to all installed battery packs over the CAN bus via the first communication interface circuit; and a second battery pack, wherein the second battery pack has electrical and electronics components identical to the first battery pack.

Embodiment #15. The battery system of Embodiment #14, wherein the second battery pack comprises:
   a second communication interface circuit configured to interface to the controller area network (CAN) bus;
   a second controller comprising one or more processors; and
   a second memory storing controller instructions that, when executed by the one or more processors, cause the second controller to:
      obtain the configuration list of the installed battery packs in the battery system, wherein a second entry corresponds to the second battery pack;
      when the second entry of the configuration list has the top priority position in the configuration list, configure the second battery pack to serve as the master battery pack of the battery system, wherein the top priority position is indicative that the second battery pack was installed before said any other active battery packs in the battery system;
      revise the configuration list when the third battery pack is installed or removed from the battery system; and
      repetitively broadcast the configuration list to all said installed battery packs over the CAN bus via the second communication interface circuit.

Embodiment #16. The battery system of Embodiment #15, wherein the first controller instructions, when executed by the one or more processors, further cause the first controller to:
   when the second battery pack previously served as the master battery pack when the first entry is in a second position from the top priority position in the configuration list, configure the first battery pack to serve as the master battery pack.

Embodiment #17. A method of powering an end device by a battery system, the method comprising:
   obtaining a configuration list of installed battery packs in the battery system, wherein a first entry corresponds to a first battery pack;
   when the first entry of the configuration list has a top priority position in the configuration list, configuring the first battery pack to serve as a master battery pack of the battery system, wherein the top priority position is indicative that the first battery pack was installed before any other active battery packs in the battery system;
   revising the configuration list when a second battery pack is installed or removed from the battery system; and
   repetitively broadcasting the configuration list to all installed battery packs over a communication channel via a communication interface circuit.

Embodiment #18. The method of Embodiment #17 further comprising:
   when a third battery pack is added to the battery system, detecting an insertion of the third battery pack;
   creating a third entry for the third battery pack in the configuration list, wherein the third entry is at a bottom position of the configuration list; and
   in response to the creating, broadcasting the configuration list to said all installed battery packs configured in the battery system via the communication channel.

Embodiment #19. The method of Embodiment #18 further comprising:
   when the second battery pack is removed from the battery system, detecting removal of the second battery pack; and
   deleting a second entry for the second battery pack in the configuration list.

Embodiment #20. The method of Embodiment #17 further comprising:
   when the first entry for the first battery pack is not at the top priority position in the configuration list, configure the first battery pack to serve as a slave battery pack.

Embodiment #21. The method of Embodiment #20 further comprising:
   when another battery pack is removed from the battery system and the first entry moves to the top priority position of the configuration list, configuring the first battery pack to serve as the master battery pack.

Embodiment #22. A battery system configured for electrically powering an end device and comprising a plurality of battery packs, the battery system comprising:
   a power bus coupled to the end device to provide electrical power to the end device;
   a communication channel coupled to the plurality of battery packs;
   a first battery pack including:
   a first communication interface circuit configured to interface to the communication channel;
   a first discharging array;
   a first processor; and
   a first memory storing computer-executable instructions that, when executed by the first processor, cause the first battery pack to:
   disable the first discharging array to prevent discharging onto the power bus from the first battery pack;
   obtain a first open circuit voltage measurement of the first battery pack; and
   share the first open circuit voltage measurement with the plurality of battery packs via the communication channel;
   maintain a first copy of a configuration list based on the first open circuit voltage measurement and shared open circuit voltage measurements from the plurality of battery packs; and
   enable the first discharging array to allow discharging onto the power bus; and a second battery pack including:
   a second communication interface circuit configured to interface to the communication channel;
   a second discharging array electrically connected to the power bus of the battery system;
   a second processor; and
   a second memory storing computer-executable instructions that, when executed by the second processor, cause the second battery pack to:
   disable the second discharging array to prevent discharging onto the power bus from the second battery pack;
   obtain a second open circuit voltage measurement of the second battery pack; and
   share the second open circuit voltage measurement with the plurality of battery packs via the communication channel;
   maintain a second copy of the configuration list based the second open circuit voltage measurement and the shared open circuit voltage measurements from the plurality of battery packs, wherein the configuration list is ordered based on decreasing open circuit voltage measurements and wherein the top member of the configuration list is designated as a master battery pack of the battery system; and enable the second discharging array to allow discharging onto the power bus.

Embodiment #23. The battery system of Embodiment #22 comprising:

a third battery pack, wherein the third battery pack is installed in the battery system when the first and second battery packs are discharging onto the power bus, the third battery pack including:

a third communication interface circuit configured to interface to the communication channel;

a third discharging array;

a third processor; and a third memory storing computer-executable instructions that, when executed by the third processor, cause the third battery pack to:

disable the third discharging array to prevent discharging onto the power bus from the third battery pack;

obtain a third open circuit voltage measurement of the third battery pack; and share the third open circuit voltage measurement with the plurality of battery packs via the communication channel.

Embodiment #24. The battery system of Embodiment #23, wherein the third memory storing computer-executable instructions that, when executed by the third processor, cause the third battery pack to:

update a third copy of the configuration list based the third open circuit voltage measurement and the shared open circuit voltage measurements from the plurality of battery packs.

Embodiment #25. The battery system of Embodiment #24, wherein the updating occurs after the first and second battery packs are disconnected from the battery system.

Embodiment #26. The battery system of Embodiment #24, wherein the updating occurs while the first and second battery packs are discharging onto the power bus.

Embodiment #27. A method of powering an end device by a battery system, the battery system comprising a plurality of previously installed battery packs, wherein the plurality of previously installed battery packs include a master battery pack, the method comprising:

inserting an additional battery pack into the battery system establishing a first connection to a power bus and a second connection to a communication bus;

interacting, by the additional battery pack, with the master battery pack; and in response to the interacting, preventing an in-rush current from the additional battery pack to one of the plurality of previously installed battery packs.

Embodiment #28. The method of Embodiment #27, wherein the preventing comprises:

receiving, by the additional battery pack from the master battery pack, a first disable message via the communication bus, wherein the first disable message instructs the additional battery pack to disable charging and discharging through the power bus.

Embodiment #29. The method of Embodiment #27, further comprising:

in response to the inserting, providing an insertion indication by the additional battery pack via the communication bus, wherein the insertion indication includes an identification (ID) of the additional battery pack.

Embodiment #30. The method of Embodiment #29, further comprising:

in response to the providing, receiving a configuration message, wherein the configuration message includes a configuration list indicative of a battery system configuration, wherein an entry in the configuration list for the additional battery pack is located at a bottom position of the configuration list, and wherein the additional battery pack serves as a slave battery pack in the battery system.

Embodiment #31. The method of Embodiment #30, further comprising:

obtaining, by the additional battery pack, first battery status information about battery cells located at the additional battery pack, wherein the first battery status information includes a first state of charge (SoC) value for the battery cells;

receiving, by the additional battery pack from the master battery pack over the communication bus, a first status request for the first battery status information; and in response to the receiving the first status request, sending the first SoC value to the master battery pack over the communication bus.

Embodiment #32. The method of Embodiment #31, further comprising:

receiving, from the additional battery pack, the first SoC value;

determining, by the master battery pack, whether to initiate charge balancing that includes the additional battery pack based on the first SoC value; and in response to the determining, sending, by the master battery pack to the additional battery pack an enable message to configure the additional battery pack with the power bus.

Embodiment #33. The method of Embodiment #32, further comprising:

receiving, by the additional battery pack from the master battery pack, the enable message via the communication bus; and configuring the additional battery pack to interact with the power bus in accordance with the enable message.

Embodiment #34. The method of Embodiment #32, wherein the determining whether to initiate charge balancing comprises:

when the first SoC value is a high SoC value relative to the plurality of previously installed battery packs, sending, by the master battery pack, the enable message instructing the additional battery pack to enable discharging of the battery cells onto the power bus; and when the first SoC value is a low SoC value relative to the plurality of previously installed battery packs, sending, by the master battery pack, the enable message instructing the additional battery pack to enable charging of the battery cells from the power bus.

Embodiment #35. The method of Embodiment #34, wherein the determining whether to initiate charge balancing further comprises:

when the first SoC value equals the low SoC value and a difference between the high SoC value and the low SoC value is greater than a predetermined amount, sending the enable message instructing the additional battery pack to enable the charging of the battery cells from the power bus through a converter located at the additional battery pack.

Embodiment #36. The method of Embodiment #34, further comprising:

after receiving the enable message by the additional battery pack from the master battery pack, obtaining a second SoC value of the battery cells;

receiving, by the additional battery pack from the master battery pack over the communication bus, a second status request for second battery status information; and in response to the receiving the second status request, sending the second SoC value to the master battery pack over the communication bus.

Embodiment #37. The method of Embodiment #36, further comprising:

receiving, from the additional battery pack, the second SoC value;

when the first SoC value equals the high SoC value and the second SoC value is below a first threshold, sending, by the master battery pack, a second disable message instructing the additional battery pack to terminate discharging of the battery cells onto the power bus; and when the first SoC value equals the low SoC value and the second SoC value is greater than a second threshold, sending, by the master battery pack, the second disable message instructing the additional battery pack to terminate charging of the battery cells from the power bus.

Embodiment #38. The method of Embodiment #27, wherein the communication bus comprises a controller area network (CAN) bus.

Embodiment #39. A first battery pack configured for installation in a battery system for electrically powering an end device, wherein all installed battery packs installed in the battery system have identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

when the first battery pack is inserted into the battery system, generate an insertion indication via the communication channel, wherein the insertion indication includes an identification (ID) of the first battery pack.

in response to the generating the insertion indication, receive from a master battery pack of the battery system, a disable message over the communication channel via the communication interface circuit; and in response to the receiving the disable message, disable charging and discharging through the power bus.

Embodiment #40. The first battery pack of Embodiment #39, wherein the controller instructions, when executed by the at least one processor, further cause the controller to:

in response to the generating the insertion indication, receive a configuration message, wherein the configuration message includes a configuration list indicative of a battery system configuration, wherein an entry in the configuration list for the first battery pack is located at a bottom position of the configuration list, and wherein the first battery pack serves as a slave battery pack in the battery system.

Embodiment #41. The first battery pack of Embodiment #40, wherein the controller instructions, when executed by the at least one processor, further cause the controller to:

obtain battery status information about battery cells located at the first battery pack, wherein the battery status information includes a state of charge (SoC) value for the battery cells;

receive, from the master battery pack over the communication channel, a status request for the battery status information; and in response to the receiving the status request, send the SoC value to the master battery pack over the communication channel.

Embodiment #42. The first battery pack of Embodiment #41, wherein the controller instructions, when executed by the at least one processor, further cause the controller to:

in response to the sending the SoC value, receive, from the master battery pack, an enable message via the communication channel; and configure the power bus interface circuit to interact with the power bus in accordance with the enable message.

Embodiment #43. A battery system configured for electrically powering an end device and comprising a plurality of battery packs, the battery system comprising:

a first battery pack including:

a power bus interface circuit configured to interface with a power bus and to provide electrical power to the end device;

a first communication interface circuit configured to interface to a controller area network (CAN) bus;

a first controller comprising at least one processor; and a first memory storing controller instructions that, when executed by the at least one processor, cause the first controller to:

when the first battery pack is inserted into the battery system, provide an insertion indication via the CAN bus, wherein the insertion indication includes an identification (ID) of the first battery pack;

in response to the providing, receive from a master battery pack of the battery system a first disable message over the CAN bus via the first communication interface circuit; and in response to the receiving, disable charging and discharging through the power bus; and a second battery pack serving as the master battery pack of the battery system.

Embodiment #44. The battery system of Embodiment #43, wherein the first memory storing controller instructions that, when executed by the at least one processor, cause the first controller to:

obtain battery status information about battery cells located at the first battery pack, wherein the battery status information includes a state of charge (SoC) value for the battery cells;

receive, from the master battery pack over the CAN bus, a status request for the battery status information; and in response to the receiving the status request, send the SoC value to the master battery pack over the CAN bus.

Embodiment #45. The battery system of Embodiment #44, wherein the second battery pack includes:

a second communication interface circuit configured to interface to the CAN bus;

a second controller comprising one or more processors; and a second memory storing controller instructions that, when executed by the one or more processors, cause the second controller to:

receive, from the first battery pack, the SoC value;

determine, by the master battery pack, whether to initiate charge balancing that includes the first battery pack based on the SoC value; and in response to the determining whether to initiate charge balancing, send, by the master battery to the first battery pack an enable message to configure the first battery pack with the power bus.

Embodiment #46. The battery system of Embodiment #45, wherein the second memory storing controller instructions that, when executed by the one or more processors, further cause the second controller to:
  when the SoC value is a high SoC value relative to a plurality of previously installed battery packs, send, by the master battery pack, the enable message instructing the first battery pack to enable discharging of the battery cells onto the power bus; and
when the SoC value is a low SoC value relative to the plurality of previously installed battery packs, send, by the master battery pack, the enable message instructing the first battery pack to enable charging of the battery cells from the power bus.

Embodiment #47. A first battery pack configured for installation in a battery system for electrically powering an end device, wherein all installed battery packs installed in the battery system have identical electrical and electronic components, the first battery pack comprising:
  one or more battery cells;
  a communication interface circuit configured to interface to a communication channel;
  a power bus interface circuit configured to interface with a power bus and to provide electrical power to the end device;
  a controller comprising at least one processor; and
  a memory storing controller instructions that, when executed by the at least one processor, cause the controller to:
    determining that the first battery pack is a master battery pack of the battery system;
    when the first battery pack receives a first failure notification message from a second battery pack over the communication channel via the communication interface circuit and when an extra battery pack is needed, determine whether a first spare battery pack is available, wherein the first failure notification message is indicative of a first catastrophic failure at the second battery pack;
    when the first spare battery pack is an only spare battery pack and when the extra battery pack is needed, send a first enable message to the first spare battery pack over the communication channel, wherein the first enable message instructs the first spare battery pack to discharge onto the power bus; and
    when the first battery pack receives the first failure notification message from the second battery pack, send a first disable message to the second battery pack over the communication channel, wherein the first disable message instructs the second battery pack to terminate discharging onto the power bus.

Embodiment #48. The first battery pack of Embodiment #47, wherein the controller instructions, when executed by the at least one processor, further cause the controller to:
  when the first battery pack is the master battery pack of the battery system:
    when no spare battery packs are available, send a degradation alert message to the end device.

Embodiment #49. The first battery pack of Embodiment #48, wherein the controller instructions, when executed by the at least one processor, further cause the controller to:
  when the first battery pack is the master battery pack of the battery system:
    when degraded operation is not acceptable to the end device, initiate shutdown of the battery system.

Embodiment #50. The first battery pack of Embodiment #49, wherein the controller instructions, when executed by the at least one processor, further cause the controller to:
  when the first battery pack is the master battery pack of the battery system:
    instructing all battery packs of the battery system from discharging onto the power bus.

Embodiment #51. The first battery pack of Embodiment #47, wherein the controller instructions, when executed by the at least one processor, further cause the controller to:
  when the first battery pack is the master battery pack of the battery system:
    when a plurality of spare battery packs are available, select a highest SoC spare battery pack from the plurality of spare battery packs, wherein the highest SoC spare battery pack is characterized by a highest state of charge (SoC) value of all of the plurality of spare battery packs; and
    send a second enable message to the highest SoC spare battery pack, wherein the second enable message instructs the highest SoC spare battery pack to discharge onto the power bus.

Embodiment #52. The first battery pack of Embodiment #47, wherein the communication channel comprises a controller area network (CAN) bus.

Embodiment #53. The first battery pack of Embodiment #47, wherein the controller instructions, when executed by the at least one processor, further cause the controller to:
  when the first battery pack is the master battery pack of the battery system:
    monitor the one or more battery cells;
    based on the monitoring, determine whether a second catastrophic failure has occurred;
    when the second catastrophic failure has occurred, determine whether the first spare battery pack is available;
    when the first battery pack is available, send the first enable message to the first spare battery pack, wherein the first enable message instructs the first spare battery pack to discharge onto the power bus; and
    disable itself from discharging onto the power bus.

Embodiment #54. The first battery pack of Embodiment #47, wherein the controller instructions, when executed by the at least one processor, further cause the controller to:
  when the first battery pack is a slave battery pack of the battery system:
    monitor the one or more battery cells;
    based on the monitoring, determine whether a third catastrophic failure has occurred; and
    when the third catastrophic failure has occurred, send a second failure notification message to the master battery pack of the battery system.

Embodiment #55. The first battery pack of Embodiment #54, wherein the controller instructions, when executed by the at least one processor, further cause the controller to:
  in response to the sending, receive a second disable message from the master battery pack; and
  in response to the receiving, terminate discharging onto the power bus.

Embodiment #56. The first battery pack of Embodiment #47, wherein the controller instructions, when executed by the at least one processor, further cause the controller to:
  when the first battery pack detects an internal catastrophic failure, internally terminate discharging onto the power bus;
  when at least one spare battery pack is available, enable one of the at least one spare battery packs;
  when no spare battery pack is available, send a degradation alert message to the end device; and
  continue to operate as the master battery pack of the battery system.

Embodiment #57. The first battery pack of Embodiment #47, wherein the controller instructions, when executed by the at least one processor, further cause the controller to:

when the first battery pack detects an internal catastrophic failure, internally terminate discharging onto the power bus; and reassign one of the slave battery packs as a new master battery pack.

Embodiment #58. The first battery pack of Embodiment #47, wherein the controller instructions, when executed by the at least one processor, further cause the controller to:

when the first battery pack fails to receive any messages from the second battery pack over the communications channel, attempt to disable the second battery pack from discharging onto the power bus; and adjust a power level over the power bus to the end device.

Embodiment #59. A method of powering an end device by a battery system, the method comprising:

when a master battery pack receives a failure notification message from a slave battery pack over a communication channel and when an extra battery pack is needed, determining whether a first spare battery pack is available, wherein the failure notification message is indicative of a catastrophic failure at the slave battery pack;

when the first spare battery pack is an only spare battery pack and when the extra battery pack is needed, sending, by the master battery pack, an enable message to the first spare battery pack, wherein the enable message instructs the first spare battery pack to discharge onto a power bus; and when the master battery pack receives the failure notification message from the slave battery pack, sending, by the master battery pack, a disable message to the slave battery pack, wherein the disable message instructs the slave battery pack to terminate discharging onto the power bus.

Embodiment #60. The method of Embodiment #59, comprising:

when degraded operation is not acceptable to the end device, initiating shutdown of the battery system.

Embodiment #61. The method of Embodiment #59, comprising:

when a plurality of spare battery packs are available, selecting a highest SoC spare battery pack from the plurality of spare battery packs, wherein the highest SoC spare battery pack is characterized by a highest state of charge (SoC) value of all of the plurality of spare battery packs; and sending the enable message to the highest SoC spare battery pack, wherein the enable message instructs the highest SoC spare battery pack to discharge onto the power bus.

Embodiment #62. The method of Embodiment #59, comprising:

monitoring, by the slave battery pack, one or more battery cells;

based on the monitoring, determining whether the catastrophic failure has occurred; and when the catastrophic failure has occurred, sending the failure notification message to the master battery pack of the battery system.

Embodiment #63. The method of Embodiment #62, comprising:

in response to the sending, receiving, by the slave battery pack, the disable message from the master battery pack; and in response to the receiving the disable message, terminating discharging onto the power bus.

Embodiment #64. A battery system configured for electrically powering an end device and comprising a plurality of battery packs, the battery system comprising:

a slave battery pack; and a master battery pack including:

a first communication interface circuit configured to interface to a controller area network (CAN) bus;

a first controller comprising at least one processor; and a first memory storing controller instructions that, when executed by the at least one processor, cause the first controller to:

when the master battery pack receives a failure notification message from the slave battery pack over the CAN bus via the first communication interface circuit and when an extra battery pack is needed, determine whether a first spare battery pack is available, wherein the failure notification message is indicative of a catastrophic failure at the slave battery pack;

when the first spare battery pack is an only spare battery pack and when the extra battery pack is needed, send an enable message to the first spare battery pack, wherein the enable message instructs the first spare battery pack to discharge onto a power bus; and when the master battery pack receives the failure notification message from the slave battery pack, send a disable message to the slave battery pack, wherein the disable message instructs the slave battery pack to terminate discharging onto the power bus.

Embodiment #65. The battery system of Embodiment #64, wherein the first memory storing controller instructions that, when executed by the at least one processor, cause the first controller to:

when degraded operation is not acceptable to the end device, initiate shutdown of the battery system.

Embodiment #66. The battery system of Embodiment #65, wherein the first memory storing controller instructions that, when executed by the at least one processor, cause the first controller to:

instruct all battery packs of the battery system from discharging onto the power bus.

Embodiment #67. The battery system of Embodiment #64, wherein the first memory storing controller instructions that, when executed by the at least one processor, cause the first controller to:

when a plurality of spare battery packs is available, select a highest SoC spare battery pack from the plurality of spare battery packs, wherein the highest SoC spare battery pack is characterized by a highest state of charge (SoC) value of all of the plurality of spare battery packs; and send the enable message to the highest SoC spare battery pack, wherein the enable message instructs the highest SoC spare battery pack to discharge onto the power bus.

Embodiment #68. The battery system of Embodiment #64, wherein the slave battery pack includes:

a second communication interface circuit configured to interface to a controller area network (CAN) bus;

a second controller comprising one or more processors;

one or more battery cells; and a second memory storing controller instructions that, when executed by the one or more processors, cause the first controller to:

monitor the one or more battery cells;
based on the monitoring, determine whether the catastrophic failure has occurred; and
when the catastrophic failure has occurred, send the failure notification message to the master battery pack of the battery system.

Embodiment #69. The battery system of Embodiment #68, wherein the second memory storing controller instructions that, when executed by the one or more processors, cause the second controller to
in response to the sending the failure notification message, receive the disable message from the master battery pack; and
in response to the receiving the disable message, terminate discharging onto the power bus.

Embodiment #70. A method of powering an end device by a battery system, the battery system comprising a plurality of battery packs, the method comprising:
gathering, by a master battery pack of the battery system, battery status information from the plurality of battery packs, wherein the plurality of battery pack comprises the master battery packs and all slave battery packs and wherein the battery status information includes a state of charge (SoC) data;
determining, by the master battery pack and based the battery status information, whether a first subset of the plurality of battery packs needs to be balanced in charge;
selecting, by the master battery pack, a first type of balancing from a plurality of balancing types appropriate for the first subset of the plurality of battery packs; and
applying, by the master battery pack, the selected first type of balancing via a power bus until desired SoC values are obtained for the first subset of the plurality of battery packs.

Embodiment #71. The method of Embodiment #70, wherein the plurality of balancing types comprise a converter balancing technique, a direct balancing technique, and a staggered balancing technique.

Embodiment #72. The method of Embodiment #71, comprising:
identifying, by the master battery pack, a first battery pack having a high SoC value from the gathered battery status information; and
comparing, by the master battery pack, the high SoC value with SoC values of all remaining battery packs.

Embodiment #73. The method of Embodiment #72, comprising:
in response to the comparing, when a first SoC difference between the first battery pack and a second battery pack is greater than a first predetermined amount, initiating, by the master battery pack, the converter balancing technique for the first and second battery packs.

Embodiment #74. The method of Embodiment #73, comprising:
sending, by the master battery pack, to the first battery pack a first enable message over a communication channel, wherein the first enable message instructs the first battery pack to discharge over the power bus; and
sending, by the master battery pack, to the second battery pack a second enable message over the communication channel, wherein the second enable message instructs the second battery pack to enable its converter and to charge from the power bus.

Embodiment #75. The method of Embodiment #73, comprising:
in response to the comparing, when a second SoC difference between the first battery pack and a third battery pack is greater than the first predetermined amount, initiating, by the master battery pack, the converter balancing technique for the first, second, and third battery packs.

Embodiment #76. The method of Embodiment #75, wherein one of the first, second, and third battery packs serves as the master battery pack of the battery system.

Embodiment #77. The method of Embodiment #72, comprising:
in response to the comparing, when a third SoC difference between the first battery pack and a fourth battery pack is less than a second predetermined amount, initiating, by the master battery pack, the direct balancing technique for the first battery pack and the fourth battery pack.

Embodiment #78. The method of Embodiment #77, comprising:
sending, by the master battery pack, to the first battery pack a third enable message over a communication channel, wherein the third enable message instructs the first battery pack to discharge over the power bus; and
sending, by the master battery pack, to the fourth battery pack a fourth enable message over the communication channel, wherein the fourth enable message instructs the fourth battery pack to charge from the power bus.

Embodiment #79. The method of Embodiment #77, wherein one of the first and fourth battery packs serves as the master battery pack.

Embodiment #80. The method of Embodiment #72, comprising:
in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiating the staggered balancing technique to the first battery pack, the fifth battery pack, and the sixth battery pack.

Embodiment #81. The method of Embodiment #80, comprising:
sending, by the master battery pack, to the first battery pack a fifth enable message over a communication channel, wherein the fifth enable message instructs the first battery pack to discharge over the power bus;
sending, by the master battery pack, to the fifth battery pack a sixth enable message over the communication channel, wherein the sixth enable message instructs the fifth battery pack to charge from the power bus, wherein the direct balancing technique is applied for the first battery pack and the fifth battery pack; and
sending, by the master battery pack, to the sixth battery pack a seventh enable message over the communication channel, wherein the seventh enable message instructs the sixth battery pack to enable its converter and to charge from the power bus, wherein the converter balancing technique is applied for the first battery pack and the sixth battery pack.

Embodiment #82. The method of Embodiment #81, comprising:
obtaining current SoC values for the fifth and sixth battery packs; and
in response to the obtaining, when an eighth difference between a first current SoC value of the fifth battery pack and a second current SoC value of the sixth battery pack is greater than a fifth predetermined value, switching the direct balancing technique to the first battery pack and the seventh battery pack from the first battery pack and the sixth battery pack.

Embodiment #83. The method of Embodiment #82, comprising:
  sending, by the master battery pack, to the fifth battery pack an eighth enable message over the communication channel, wherein the eighth enable message instructs the fifth battery pack to enable its converter and charge from the power bus, wherein the converter balancing technique is applied for the first battery pack and the fifth battery pack; and
  sending, by the master battery pack, to the sixth battery pack a ninth enable message over the communication channel, wherein the ninth enable message instructs the sixth battery pack to disable its converter and to charge from the power bus, wherein the direct balancing technique is applied for the first battery pack and the sixth battery pack.

Embodiment #84. The method of Embodiment #75, wherein one of the first, fifth, and sixth battery packs serves as the master battery pack of the battery system.

Embodiment #85. The method Embodiment #70, further comprising:
  obtaining, by the master battery pack, current SoC values from the plurality of battery packs;
  determining, by the master battery pack and based the current SoC values, whether a second subset of the plurality of battery packs needs to be balanced in charge;
  selecting, by the master battery pack, a second type of balancing from the plurality of balancing types appropriate for the second subset of the plurality of battery packs, wherein the first type and second type of balancing are different; and
  applying, by the master battery pack, the selected second type of balancing for the second subset of the plurality of battery packs.

Embodiment #86. The method Embodiment #70, wherein the applying comprises:
  obtaining a safety interlock indicator and a wake indicator; and
  only when the safety interlock indicator is indicative of being on and the wake indicator is indicative of being off, enabling the applying.

Embodiment #87. A first battery pack configured for installation in a battery system for electrically powering an end device, wherein all installed battery packs installed in the battery system have identical electrical and electronic components, the first battery pack comprising:
  a communication interface circuit configured to interface to a communication channel;
  a power bus interface circuit configured to interface with a power bus and to provide electrical power to the end device;
  a controller comprising at least one processor; and
  a memory storing controller instructions that, when executed by the at least one processor, cause the controller to:
    when the first battery pack serves as a master battery pack of the battery system:
      gather battery status information from a plurality of battery packs, wherein the plurality of battery pack comprises the master battery packs and all slave battery packs and wherein the battery status information includes a state of charge (SoC) data;
      determine, based the battery status information, whether a first subset of the plurality of battery packs needs to be balanced in charge;
      select a first type of balancing from a plurality of balancing types appropriate for the first subset of the plurality of battery packs; and
      apply the selected first type of balancing until desired SoC values are obtained for the first subset of the plurality of battery packs.

Embodiment #88. The first battery pack of Embodiment #87, wherein the memory storing controller instructions that, when executed by the at least one processor, cause the controller to:
  identify a first battery pack having a high SoC value from the gathered battery status information; and
  compare the high SoC value with SoC values of all remaining battery packs.

Embodiment #89. The first battery pack of Embodiment #88, wherein the memory storing controller instructions that, when executed by the at least one processor, cause the controller to:
  in response to the comparing, when a first SoC difference between the first battery pack and a second battery pack is greater than a first predetermined amount, initiate, by the master battery pack, a converter balancing technique for the first and second battery packs.

Embodiment #90. The first battery pack of Embodiment #88, wherein the memory storing controller instructions that, when executed by the at least one processor, cause the controller to:
  in response to the comparing, when a third SoC difference between the first battery pack and a fourth battery pack is less than a second predetermined amount, initiate, by the master battery pack, a direct balancing technique for the first battery pack and the fourth battery pack.

Embodiment #91. The first battery pack of Embodiment #88, wherein the memory storing controller instructions that, when executed by the at least one processor, cause the controller to:
  in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiate a staggered balancing technique to the first battery pack, the fifth battery pack, and the sixth battery pack.

Embodiment #92. A battery system configured for electrically powering an end device and comprising a plurality of battery packs, the battery system comprising:
  a plurality of slave battery packs; and
  a master battery pack including:
    a first communication interface circuit configured to interface to a controller area network (CAN) bus;
    a controller comprising at least one processor; and
    a memory storing controller instructions that, when executed by the at least one processor, cause the controller to:
      gather battery status information from all battery packs of the battery system, wherein said all battery packs comprises the master battery packs and the plurality of slave battery packs and wherein the battery status information includes a state of charge (SoC) data;

determine, based the battery status information, whether a first subset of said all battery packs needs to be balanced in charge;

select a first type of balancing from a plurality of balancing types appropriate for the first subset of said all battery packs; and apply the selected first type of balancing until desired SoC values are obtained for the first subset of said all battery packs.

Embodiment #93. The battery system of Embodiment #92, wherein the memory storing controller instructions that, when executed by the at least one processor, cause the controller to:

identify a first battery pack having a high SoC value from the gathered battery status information, wherein the plurality of; and compare the high SoC value with SoC values of all remaining battery packs.

Embodiment #94. The battery system of Embodiment #93, wherein the memory storing controller instructions that, when executed by the at least one processor, cause the controller to:

in response to the comparing:

when a first SoC difference between the first battery pack and a second battery pack is greater than a first predetermined amount, initiate a converter balancing technique for the first and second battery packs;

when the first SoC difference between the first battery pack and the second battery pack is less than a second predetermined amount, initiate a direct balancing technique for the first battery pack and the second battery pack; and when the first SoC difference between the first battery pack and the second battery pack is less than the second predetermined amount, a second SoC difference between the first battery pack and a third battery pack is greater than the first predetermined amount, and a third SoC difference between the first battery pack and a fourth battery pack is greater than the first predetermined amount, initiate a staggered balancing technique to the first, second, third, and fourth battery packs.

Embodiment #95. A method comprising:

receiving, by a computing device having one or more processors, a first reading of a state of charge (SOC) of each of a plurality of battery packs, wherein the plurality of battery packs comprises at least a first group of one or more battery packs and a second group of one or more battery packs;

identifying, by the computing device, based on the received first reading of the SOC of each of the plurality of battery packs, and based on an identification of a lowest level for a first reading of an SOC and a second lowest level for a first reading of an SOC, the first group as having the lowest level for the first reading of the SOC, and the second group as having the second lowest level for the first reading of the SOC;

generating, by the computing device and based on the identification of the lowest level and the second lowest level, a first list comprising of the first group and the second group;

determining, by the computing device, based on the first reading of the SOC of the first group, and based on the first reading of the SOC of the second group, a first SOC variability of the first list;

determining, by the computing device and based on the first SOC variability, that the first SOC variability does not satisfy a SOC variability threshold;

establishing, by the computing device, a first SOC threshold using the first reading of the SOC of the second group;

causing, by the computing device and via electric charge arrays, the charging of the first group to cause the SOC of the first group to increase;

receiving, by the computing device, a second reading of the SOC of each of the plurality of battery packs;

determining, by the computing device and based on a second reading of the SOC of the first group, that the second reading of the SOC of the first group satisfies the first SOC threshold.

Embodiment #96. The method of Embodiment #95, further comprising:

determining, by the computing device and based on the received second reading of the SOC of each of the plurality of battery packs, an updated first SOC variability of the first list;

determining, by the computing device, that the updated first SOC variability satisfies the SOC variability threshold.

Embodiment #97. The method of Embodiment #95, wherein the receiving the first reading of the SOC of each of the plurality of battery packs further comprises:

identifying, by the computing device, a master battery pack as one of the plurality of battery packs; and receiving, by the computing device and from the master battery pack, the first reading of the SOC of each of the plurality of battery packs.

Embodiment #98. The method of Embodiment #95, wherein the causing the charging further comprises enabling an electric discharge array from a charger to the one or more battery packs of the first group of one or more battery packs via a converter.

Embodiment #99. The method of Embodiment #95, wherein the plurality of battery packs further comprises at least a third group of one or more battery packs, and wherein the method further comprises:

identifying, by the computing device, based on the received second reading of the SOC of each of the plurality of battery packs, and based on an identification of a lowest level for a second reading of an SOC and a second lowest level for a second reading of an SOC, the first group and the second group as having the lowest level for the second reading of the SOC, and the third group as having the second lowest level for the second reading of the SOC;

generating, by the computing device and based on the lowest level for the second reading of the SOC and the second lowest level for the second reading of the SOC, a second list comprising the first group, the second group, and the third group;

determining, by the computing device, based on the second reading of the SOC of the first group, based on the second reading of the SOC of the second group, and based on the second reading of the SOC of the third group, a second SOC variability of the second list.

Embodiment #100. The method of Embodiment #99, wherein the generating the second list comprises expanding the first list to include battery packs having the second lowest level for the second reading of the SOC.

Embodiment #101. The method of Embodiment #99, further comprising:
    determining, by the computing device, that the second SOC variability does not satisfy the SOC variability threshold;
    establishing, by the computing device, a second SOC threshold based on a second reading of the SOC of the third group;
    causing, by the computing device and via electric charge arrays,
        the charging of the first group to cause the SOC of the first group to increase, and
        the charging of the second group to cause the SOC of the second group to increase;
    receiving, by the computing device, a third reading of the SOC of each of the plurality of battery packs;
    determining, by the computing device, that a third reading of the SOC of the first group and a third reading of the SOC of the second group each satisfy the second SOC threshold.

Embodiment #102. The method of Embodiment #101, further comprising:
    performing one or more iterations of the following until a determined updated SOC variability of the plurality of battery packs satisfies the SOC variability threshold:
        identifying, by the computing device,
            an Nth group of one or more battery packs of the plurality of battery back devices, wherein the nth group has a lowest level of a previous reading of the SOC of the plurality of battery packs, and
            an (N+1) group of one or more battery packs of the plurality of battery back devices, wherein the (N+1) group has the second lowest level of the previous reading of the SOC of the plurality of battery packs, and
        generating, by the computing device, a list comprising the n group and the N+1 group;
        determining, by the computing device, that an SOC variability of the list does not satisfy the SOC variability threshold;
        establishing, by the computing device, an SOC threshold using the previous reading of the SOC of the N+1 group;
        causing, by the computing device and via electric charge arrays, the charging of the n group to cause the SOC of the n group to increase and satisfy the SOC threshold;
        receiving, by the computing device, a subsequent reading of an SOC of each of the plurality of battery packs; and
        determining, by the computing device and based on the subsequent reading of the SOC of each of the plurality of battery packs, the updated SOC variability of the plurality of battery packs.

Embodiment #103. The method of Embodiment #95, further comprising:
    prior to the receiving the first reading of the SOC of each of the plurality of battery packs, determining that an interlock safety pin associated with the plurality of battery packs is set to on, wherein the interlock safety pin allows the receiving the first reading of the SOC of each of the plurality of battery pack to occur.

Embodiment #104. The method of Embodiment #95, further comprising:
    prior to the causing the charging, determining that a wake pin associated with the plurality of battery packs is set to on, wherein the wake pin allows the charging to occur.

Embodiment #105. A method comprising:
    receiving, by a computing device having one or more processors and communicatively linked to an end device, a power requirement of the end device;
    receiving, by the computing device, a first reading of a state of charge (SOC) of each of a plurality of battery packs,
        wherein the plurality of battery packs comprises at least a first group of one or more battery packs and a second group of one or more battery packs, and
        wherein a first reading of an SOC of the second group is greater than a first reading of an SOC of the first group;
    determining, by the computing device and based on the received first reading of the SOC of each of the plurality of battery packs, a first SOC variability of the plurality of battery packs;
    determining, by the computing device and based on the first SOC variability not satisfying an SOC variability threshold, to enable the second group to initially power the end device without a concurrent powering of the end device by other battery packs of the plurality of battery packs; and
    causing, by the computing device and via an electric charge array, the second group to power the end device to a first power level, wherein the powering the end device causes the SOC of the second group to decrease.

Embodiment #106. The method of Embodiment #105, further comprising:
    receiving, by the computing device, a second reading of an SOC of each of the plurality of battery packs; and
    determining, by the computing device and based on the received second reading of the SOC of each of the plurality of battery packs, a second SOC variability of the plurality of battery packs;
    determining, by the computing device, that the second SOC variability satisfies the SOC variability threshold; and
    causing, by the computing device and via one or more electric charge arrays, the first group and the second group to power the end device to a second power level, wherein the powering the end device causes the second reading of the SOC of the first group and the second reading of the SOC of the second group to decrease.

Embodiment #107. The method of Embodiment #105, further comprising:
    receiving, by the computing device, a second reading of the SOC of each of the plurality of battery packs,
        wherein the plurality of battery packs further comprises a third group of one or more battery packs,
        wherein the second reading of the SOC of the second group and the second reading of the SOC of the third group are within a predetermined reading of each other, and
        wherein the second reading of the SOC of the second group and the second reading of the SOC of the third group are each greater than the second reading of the SOC of the first group,
    determining, by the computing device and based on the received second reading of the SOC of each of the plurality of battery packs, a second SOC variability of the plurality of battery packs;
    determining, by the computing device, that the second SOC variability does not satisfy the SOC variability threshold; and
    causing, by the computing device and via one or more electric charge arrays, the second group and the third group to concurrently power the end device to a second power level, wherein the powering the end device causes the SOC of the second group and the SOC of the third group to decrease.

Embodiment #108. The method of Embodiment #105, wherein the receiving the first reading of the SOC of each of the plurality of battery packs further comprises:
identifying, by the computing device, a master battery pack as one of the plurality of battery packs; and
receiving, by the computing device and from the master battery pack, the first reading of the SOC of each of the plurality of battery packs.

Embodiment #109. A method comprising:
receiving, by a computing device having one or more processors and communicatively linked to an end device, a power requirement of the end device;
receiving, by the computing device, a first reading of a state of charge (SOC) of each of a plurality of battery packs,
wherein the plurality of battery packs comprises at least a first group of one or more battery packs and a second group of one or more battery packs,
wherein a first reading of an SOC of the second group is greater than a first reading of an SOC of the first group, and
determining, by the computing device and based on the received first reading of the SOC of each of the plurality of battery packs, a first SOC variability of the plurality of battery packs;
determining, by the computing device, that the first SOC variability does not satisfy an SOC variability threshold; and
causing, by the computing device, and via one or more electric charge arrays, the second group to charge the first group, wherein the charging the first group decreases the SOC of the second group and increases the SOC of the first group.

Embodiment #110. The method of Embodiment #109, further comprising:
receiving, by the computing device, a second reading of the SOC of each of the plurality of battery packs;
determining, by the computing device and based on the received second reading of the SOC of each of the plurality of battery packs, a second SOC variability of the plurality of battery packs; and
determining, by the computing device, that the second SOC variability satisfies the SOC variability threshold.

Embodiment #111. The method of Embodiment #110, further comprising:
causing, by the computing device and via one or more electric charge arrays, the plurality of battery packs to power the end device, wherein the powering causes the SOC of the plurality of battery packs to decrease.

Embodiment #112. The method of Embodiment #109, further comprising:
receiving, by the computing device, a first reading of a state of health (SOH) of each of the plurality of battery packs, wherein the plurality of battery packs further comprises a third group of one or more battery packs;
determining, by the computing device, that the first reading of the SOH of the third group does not satisfy a SOH threshold; and
sequestering, by the computing device, the third group from powering the end device until a subsequent reading of an SOC of each of the plurality of battery packs other than the one or more battery packs of the third group do not satisfy an SOC threshold.

Embodiment #113. The method of Embodiment #109, wherein the receiving the first reading of the SOC of each of the plurality of battery packs further comprises:
identifying, by the computing device, a master battery pack as one of the plurality of battery packs; and
receiving, by the computing device and from the master battery pack, the first reading of the SOC of each of the plurality of battery packs.

Embodiment #114. The method of Embodiment #109, wherein the causing the second group to charge the first battery pack occurs via one or more of a converter balancing, a direct connect balancing, or a staggered balancing.

Embodiment #115. The method of Embodiment #109, further comprising:
receiving, by the computing device, a first reading of a state of health (SOH) of each of the plurality of battery packs, wherein the plurality of battery packs further comprises a third group of one or more battery packs;
determining, by the computing device, that the first reading of the SOH of the third group does not satisfy a SOH threshold; and
sequestering, by the computing device, the third group from powering the end device until a subsequent reading of an SOC of each of the plurality of battery packs other than the one or more battery packs of the third group do not satisfy an SOC threshold.

Embodiment #116. A device comprising:
a plurality of series-connected battery cells of a battery chemistry;
a first pathway between a power source and the plurality of series-connected battery cells, wherein the first pathway is configured to supply the plurality of series-connected battery cells with current at a first voltage;
a second pathway between the power source and the plurality of series-connected battery cells, wherein the second pathway is configured to supply the plurality of series-connected battery cells with current at a second voltage, wherein the second voltage is lower than the first voltage; and
a pathway control circuit configured to select, based on states of charge (SOC) of battery cells of the plurality of series-connected battery cells, between the first pathway and the second pathway,
wherein, based on the battery chemistry, a first voltage across a first battery cell having a higher SOC increases faster than a second voltage across a second battery cell having a lower SOC than the first battery cell.

Embodiment #117. The device of Embodiment #116, wherein the battery chemistry of the series-connected battery cells is selected from the group of:
lithium iron phosphate (LFP);
lithium nickel manganese cobalt oxide (NMC); and
lithium nickel cobalt aluminum oxides (NCA).

Embodiment #118. The device of Embodiment #116, wherein the second pathway comprises a buck converter configured to receive the first voltage and output the second voltage.

Embodiment #119. The device of Embodiment #116, further comprising:
a voltage detector configured to detect a voltage across each cell of the plurality of series-connected battery cells, wherein the voltage detector is configured to determine whether a cell voltage of at least one cell of the plurality of series-connected battery cells satisfies a cell threshold voltage, wherein the pathway control circuit comprises a pathway switch configured to receive a power supply voltage and output the first voltage to the first pathway, and wherein the pathway switch is controlled to connect, based on a determination by the voltage detector that at least one cell of the plurality of series-connected battery cells is greater than or equal to the cell threshold voltage, the power supply voltage to the second pathway.

Embodiment #120. The device of Embodiment #119, further comprising:

a second pathway switch configured to selectively connect one of the first pathway or the second pathway to the plurality of series-connected battery cells, wherein the second pathway switch is controlled based on the determination by the voltage detector that at least one cell of the plurality of series-connected battery cells greater than or equal to the cell threshold voltage.

Embodiment #121. The device of Embodiment #119, wherein the voltage detector further comprises one or more comparators configured to compare a voltage across an individual battery cell with a reference voltage, and wherein the pathway control circuit further comprises a comparator-controlled switch configured to, based on a comparison by one or more comparators that the voltage of the individual battery cell is greater than or equal to the reference voltage, control the operation of the pathway switch.

Embodiment #122. The device of Embodiment #119, wherein the voltage detector comprises:

a plurality of individual voltage detectors, wherein each individual voltage detector is configured to detect a voltage across an individual battery cell of the plurality of series-connected battery cells.

Embodiment #123. The device of Embodiment #122, wherein each individual voltage detector comprises:

a comparator configured to compare a reference voltage and the voltage across the individual battery cell of the plurality of series-connected battery cells.

Embodiment #124. The device of claim Embodiment #119, further comprising:

one or more selectable connectors configured to selectively connect the one or more voltage detectors to individual battery cells; and a controller configured to control the one or more selectable connectors to selectively connect to the individual battery cells.

Embodiment #125. A method comprising:

providing, via a first pathway, power at a first voltage level to series-connected battery cells;

detecting, across each battery cell of the series-connected battery cells, a cell voltage;

comparing each cell voltage with a reference voltage;

determining, based on the comparison, that at least one cell voltage is greater than or equal to the threshold voltage;

disconnecting, based on a determination that at least one cell voltage is greater than or equal to the threshold voltage and via at least a first switch, the first pathway from the series-connected battery cells;

providing, via at least a second switch and via a second pathway, power at a second voltage level to the series-connected battery cells, wherein the second voltage level is lower than the first voltage level.

Embodiment #126. The method of Embodiment #125, wherein providing the power at the second voltage level comprises:

reducing, via a buck converter, the first voltage level to the second voltage level.

Embodiment #127. The method of Embodiment #125, wherein determining the voltage across each cell is performed simultaneously for each battery cell of the series-connected battery cells.

Embodiment #128. The method of Embodiment #125, wherein determining the voltage across each cell is performed sequentially across the series-connected battery cells.

Embodiment #129. The method of Embodiment #125, further comprising:

determining, based on the based on the comparison, that all cell voltages are higher than a second threshold voltage;

providing, based on the determination that all cell voltages are higher than the second threshold voltage, power at a third voltage level to the series-connected battery cells.

Embodiment #130. The method of Embodiment #129, wherein providing power at the third voltage level comprises providing a trickle charge to the series-connected battery cells.

Embodiment #131. The method of Embodiment #125, further comprising:

determining, based on the based on the comparison, that all cell voltages are higher than a second threshold voltage;

providing, based on the determination that all cell voltages are higher than the second threshold voltage, an indication that the battery cells are charged.

Embodiment #132. The method of Embodiment #125, wherein the determining that the at least one cell voltage is greater than or equal to the threshold voltage further comprises:

determining that other series-connected cells are below a second threshold voltage.

Embodiment #133. The method of Embodiment #125, wherein determining that at least one cell voltage is greater than or equal to the threshold voltage further comprises:

determining that the at least one cell's voltage level is increasing faster than the voltage level of other cells.

Embodiment #134. The method of Embodiment #125, wherein a determination that that at least one cell voltage is greater than or equal to the threshold voltage indicates that the at least one cell's voltage level is increasing faster than the voltage level of other cells.

Embodiment #135. The method of Embodiment #125, wherein providing power via the second pathway at the second voltage level permits balancing of the series-connected battery cells.

Embodiment #136. A device comprising:

a plurality of battery packs connected in parallel to a power source;

a shut-off switch connected between the plurality of battery packs and the power source;

a current detector configured to determine whether a current, from the power source to the plurality of battery packs, is greater than a threshold current;

an over-current protection circuit configured to disconnect, via the shut-off switch and based on the current detector determining that the current is greater than the threshold current, the power source from the plurality of battery packs;

a controller configured to maintain the disconnection, via the over-current protection circuit, of the power source from the plurality of battery packs after the current drops below the current threshold.

Embodiment #137. The device of Embodiment #136, wherein the current detector comprises:
a resistor between the shut-off switch and one of the power source or the plurality of battery packs, wherein the current flows through the resistor; and
a comparator configured to compare a voltage across the resistor with a threshold voltage,
wherein the over-current protection circuit is further configured to disconnect the power source from the plurality of battery packs based on an output of the comparator.

Embodiment #138. The device of Embodiment #136, wherein the over-current protection circuit comprises:
a second switch controlled by the current detector,
wherein a conduction path of the second switch is connected between a gate of the shut-off switch and a voltage level,
wherein, based on the current detector turning on the second switch, the second switch connects the gate of the shut-off switch to the voltage level, and
wherein, based on the gate of the shut-off switch being pulled to the voltage level, the shut-off switch disconnects the power source from the plurality of battery packs.

Embodiment #139. The device of claim 3,
wherein the voltage level is a low voltage level, and
wherein the shut-off switch is an n-type MOSFET.

Embodiment #140. The device of claim 3,
wherein the voltage level is a high voltage level, and
wherein the shut-off switch is a p-type MOSFET.

Embodiment #141. The device of Embodiment #136, wherein the current detector comprises:
battery-pack resistors; and
comparators,
wherein, for each battery pack, a battery pack resistor of the battery-pack resistors is in series with each battery pack, wherein a portion of the current flows through each resistor; and
wherein, for each battery pack, a comparator of the comparators is configured to compare a voltage across a respective battery pack resistor with a threshold voltage,
wherein the over-current protection circuit is further configured to disconnect, based on an output of at least one comparator of the comparators being above a threshold voltage and via the shut-off switch, the power source from all battery packs of the plurality of battery packs.

Embodiment #142. The device of Embodiment #141,
wherein each battery pack resistor is located between a positive voltage potential and a respective battery pack.

Embodiment #143. The device of Embodiment #141,
wherein the controller is configured to detect whether at least one comparator indicates the voltage across the respective battery pack resistor is greater than the threshold voltage, and
wherein the controller is configured to, based on the detection of at least one comparator of the comparators indicating the voltage across the respective battery pack resistor being greater than the threshold voltage, maintain the shut-off switch in a state disconnecting the power source from all battery packs.

Embodiment #144. The device of Embodiment #136, wherein the shut-off switch is an n-type MOSFET.

Embodiment #145. The device of Embodiment #138, wherein the second switch is an n-type MOSFET.

Embodiment #146. A method comprising:
receiving power from power source, the power comprising a voltage and current;
conveying, via a shut-off switch, the power to a plurality of battery packs arranged in parallel;
determining, via a current detector, whether the current is greater than a current threshold;
based on a determination that the current is greater than the current threshold, triggering an over-current protection circuit, wherein the triggered over-current protection circuit is configured to prevent the power from being conveyed, via the shut-off switch, to the plurality of battery packs; and
a controller configured to maintain the shut-off switch in a non-conveying state after the voltage drop decreases below the threshold voltage.

Embodiment #147. The method of Embodiment #146,
wherein the determining via the current detector comprises:
determining a voltage drop across a resistor, wherein the current flows through the resistor; and
determining whether the voltage drop is greater than a threshold voltage, wherein the threshold voltage represents the current threshold multiplied by a resistance value of the resistor,
the method further comprising:
based on determining that the voltage drop is greater than the threshold voltage, controlling the shut-off switch, via an over-current protection circuit, to prevent the power from being supplied to all plurality of battery packs; and
maintaining, via a controller, a state of the shut-off switch to prevent the power from being supplied to all of the battery packs after the voltage drop decreases below the threshold voltage.

Embodiment #148. The method of Embodiment #146, wherein controlling the shut-off switch further comprises:
selectively connecting, via a second switch, a gate of the shut-off switch, wherein a conduction path of the second switch is connected between a gate of the shut-off switch and a voltage level,
wherein, based on the current detector turning on the second switch, the second switch connects the gate of the shut-off switch to the voltage level, and
wherein, based on the gate of the shut-off switch being pulled to the voltage level, the shut-off switch disconnects the power source from the plurality of battery packs.

Embodiment #149. The method of Embodiment #148,
wherein the voltage level is a low voltage level, and
wherein the shut-off switch is an n-type MOSFET.

Embodiment #150. The method of Embodiment #148,
wherein the voltage level is a high voltage level, and
wherein the shut-off switch is a p-type MOSFET.

Embodiment #151. The method of Embodiment #146,
wherein the determining via the current detector comprises comparing, for each battery-pack resistor, a voltage drop with a threshold voltage, wherein each battery-pack resistor is in series with a battery pack of the plurality of battery packs connected in parallel,
wherein a portion of the current flows through each resistor, and
wherein the triggering the over-current protection circuit further comprises disconnecting, based on an output of at least one comparator of the comparators being above a threshold voltage and via the shut-off switch, the power source from all battery packs of the plurality of battery packs.

Embodiment #152. The method of Embodiment #151,
wherein a controller configured to maintain the shut-off switch in a non-conveying state after the voltage drop, of the at least one comparator of the comparators being above a threshold voltage, decreases below the threshold voltage.

Embodiment #153. The method of Embodiment #151,
wherein triggering the over-current protection circuit further comprises increasing a gate voltage of a switch to permit the switch to pull down a gate of the shut-off switch.

Embodiment #154. The method of Embodiment #153,
wherein a resistor connects the gate of the switch to ground.

Embodiment #155. The method of Embodiment #153,
wherein the gate of the shut-off switch is pulled to a high voltage by a pull-up resistor.

Embodiment #156. A battery pack comprising:
one or more battery cells;
a controller;
a first external power terminal;
a second external power terminal;
one or more switches connected in series between the first external power terminal and the one or more battery cells;
a buck converter circuit;
a bypass circuit comprising a first bypass terminal connected to the first external power terminal, a second bypass terminal connected to the second external power terminal, and a gate bypass terminal connected to the controller;
a first power pathway between the first external power terminal and the second external power terminal in which a first voltage difference is provided across the one or more battery cells;
a second power pathway between the first external power terminal and the second external power terminal in which a second voltage difference is provided across the one or more battery cells, wherein the second voltage difference is less than the first voltage difference, and wherein the second power pathway includes the buck converter circuit that reduces the first voltage difference to the second voltage difference;
a third power pathway between the first external power terminal and the second external power terminal, wherein the third power pathway includes the bypass circuit,
wherein the controller is configured to selectively enable one of the first power pathway, the second power pathway, and the third power pathway.

Embodiment #157. The battery pack of Embodiment #156,
wherein, based on the controller controlling the bypass circuit to electrically connect the first external power terminal and the second external power terminal, a voltage difference between the first external power terminal and the second external power terminal increases with an increase in a temperature of the battery pack.

Embodiment #158. The battery pack of Embodiment #156, wherein the bypass circuit further comprises:
a positive temperature control (PTC) thermistor with a first terminal and a second terminal; and
a switch,
wherein the switch is connected in series with the PTC thermistor between the first external power terminal and the second external power terminal.

Embodiment #159. The battery pack of Embodiment #156, wherein the bypass circuit further comprises:
a switch connected between a first node and the second external power terminal, wherein the switch comprises a control terminal;
a resistor connected between the controller and the control terminal.

Embodiment #160. The battery pack of Embodiment #159,
wherein the switch further comprises a first conduction terminal and a second conduction terminal, and wherein the bypass circuit further comprises:
a second switch comprising a second conduction terminal and a second switch control terminal, wherein the second switch control terminal is connected to the first node;
a third switch comprising a third conduction terminal and a third switch control terminal, wherein the third switch control terminal is connected to the first node; and
a diode comprising is connected in series between the second conduction terminal and the third conduction terminal.

Embodiment #161. The battery pack of Embodiment #160, wherein the bypass circuit further comprises:
a fourth switch comprising a fourth conduction path connected between the first external power terminal and the second external power terminal, wherein the fourth switch further comprises a fourth control terminal connected to a terminal of the diode and the second conduction terminal.

Embodiment #162. The battery pack of Embodiment #161, wherein the bypass circuit further comprises:
a fifth switch comprising a fifth conduction path connected in series with the fourth conduction path and one of the first external power terminal or the second external power terminal.

Embodiment #163. The battery pack of Embodiment #160, wherein the bypass circuit further comprises:
a second diode, wherein the second diode is connected in series between a voltage supply and a fourth conduction terminal of the second switch.

Embodiment #164. The battery pack of Embodiment #156, further comprising:
an external control terminal electrically coupled to the controller,
wherein the controller is further configured to selectively control the bypass circuit based on commands received via the external control terminal.

Embodiment #165. The battery pack of Embodiment #156, further comprising:
a first pathway/second pathway switch configured to switch between the first power pathway and the second power pathway,
wherein the controller is configured to:
determine a state of charge (SOC) of the one or more battery cells, and
control, based on a determination of the SOC, the first pathway/second pathway switch and the gate bypass terminal.

Embodiment #166. A method comprising:
connecting, in series, a first battery pack with a second battery pack, wherein the first battery pack has a first high voltage terminal and a first low voltage terminal, wherein the second battery pack has a second high voltage terminal and a second low voltage terminal, and wherein the connecting comprises connecting the first low voltage terminal to the second high voltage terminal;
determining a state of charge (SOC) of each of the first battery pack and the second battery pack;
based on the SOC of the first battery pack being higher than the SOC of the second battery pack, controlling a first bypass circuit of the first battery pack to electrically connect, via the first bypass circuit, the first high voltage terminal with the first low voltage terminal;
comparing the SOC of the second battery pack to a first threshold; and
based on the comparison of the SOC of the second battery pack to the first threshold, controlling the second battery pack to charge battery cells of the second battery pack at one of a first voltage level or a second voltage level, wherein the first voltage level is higher than the second voltage level.

Embodiment #167. The method of Embodiment #166, wherein, based on the connection, via the first bypass circuit, between the first high voltage terminal and the first low voltage terminal, a resistance between the first high voltage terminal and the first low voltage terminal changes based on a resistance of a positive temperature control (PTC) thermistor within the first bypass circuit.

Embodiment #168. The method of Embodiment #166, further comprising:
based on a determination that the SOC of the second battery pack is below the first threshold, charging the battery cells of the second battery pack at the first voltage level.

Embodiment #169. The method of Embodiment #168, wherein charging the battery cells of the second battery pack at the first voltage level comprises electrically connecting one or more switches to permit voltage at the second high voltage terminal to charge the battery cells.

Embodiment #170. The method of Embodiment #166, further comprising:
based on a determination that the SOC of the second battery pack is above the first threshold, charging the battery cells of the second battery pack at the second voltage level.

Embodiment #171. The method of Embodiment #170, wherein charging the battery cells of the second battery pack at the second voltage level comprises electrically connecting one or more switches to permit voltage from the second high voltage terminal to be reduced, via a buck converter, to charge the battery cells at the second voltage level.

Embodiment #172. A battery system comprising:
a plurality of batteries;
a controller;
a plurality of detector circuits configured to detect whether the batteries are connected in a series configuration or in a second configuration, wherein each detector circuit comprises at least a battery connection to a battery, a detector connection to at least one other detector circuit, and an output connection to the controller;
wherein, based on whether at least one voltage level of the output connections is different from other voltage levels on the output connections, the controller is configured to determine whether the batteries are connected in the series configuration or in the second configuration.

Embodiment #173. The battery system of Embodiment #172,
wherein, based on a first output connector of a first detector circuit being a higher voltage than a second output connector of a second detector circuit, the controller is configured to determine that the plurality of batteries are in the series configuration.

Embodiment #174. The battery system of Embodiment #172,
wherein, based on a first output connector of a first detector circuit being a same voltage as a second output connector of a second detector circuit, the controller is configured to determine that the plurality of batteries are in the second configuration.

Embodiment #175. The battery system of Embodiment #174,
wherein the second configuration is a parallel configuration.

Embodiment #176. The battery system of Embodiment #174, wherein the controller is configured to determine, for the series-type arrangement type, which battery is first in the series.

Embodiment #177. The battery system of Embodiment #172, wherein each detector circuit comprises:
a first diode and a first resistor in series between the battery connection and the detector connection.

Embodiment #178. The battery system of Embodiment #177,
wherein a first detector circuit is configured to reduce, based on a voltage of a first detector connection of the first detector circuit being lower than a voltage of a second detector connection of a second detector circuit, a voltage at a first output connection of the first detector circuit.

Embodiment #179. The battery system of Embodiment #177, wherein each detector circuit further comprises:
a second resistor connected between a voltage supply and a first internal node;
a third resistor connected between the first internal node and ground potential,
wherein the first internal node is electrically coupled to the detector connection, and
wherein as Embodiment #180. The battery system of Embodiment #179, wherein each detector circuit further comprises:
a diode connected between the first internal node and the detector connection,
wherein a voltage of the output connection varies with a voltage of the first internal node.

Embodiment #181. The battery system of Embodiment #172,
wherein each detector circuit and its respective battery are part of a battery pack.

Embodiment #182. The battery system of Embodiment #172,
wherein each battery is part of a battery pack and each detector circuit is configured to be connected, via each detector circuit battery connection to one battery pack.

Embodiment #183. A method comprising:
receiving, at a first battery connector of a first detector circuit, a first voltage of a first battery;
receiving, at a second battery connector of a second detector circuit, a second voltage of a second battery;
providing, at a first detector connection of the first detector circuit, a third voltage related to the first voltage;
providing, at a second detector connection of the second detector circuit, a fourth voltage related to the second voltage;
outputting, at a first output connection of the first detector circuit, a first output voltage;
outputting, at a second output connection of the second detector circuit, a second output voltage;
determining, based on whether the first output voltage and the second output voltage are equal to each other or not equal to each other, an arrangement type between the first battery and the second battery.

Embodiment #184. The method of Embodiment #183,
wherein the determined arrangement type is series-type connection or a parallel-type connection.

Embodiment #185. The method of Embodiment #183,
wherein the controller is configured to determine, for the series-type arrangement type, which battery is first in the series.

Embodiment #186. The method of Embodiment #183, further comprising:
increasing, based on the first voltage of the first battery being lower than the second voltage of the second battery, a current flowing from a first internal node of the first detector circuit to the first battery.

Embodiment #187. The method of Embodiment #186, further comprising:

increasing, based on the increase in current flowing from the first internal node of the first detector circuit to the first battery, a voltage drop across a first resistor connected between a power supply and the first internal node of the first detector circuit.

Embodiment #188. The method of Embodiment #183, wherein the receiving a first voltage of a first battery occurs before the first detector connection is connected to the second detector connection.

Embodiment #189. The method of Embodiment #183, wherein the receiving a first voltage of a first battery occurs after the first detector connection is connected to the second detector connection.

Embodiment #190. A method comprising:

receiving, by a controller of a master battery pack of a battery system, status information from each battery pack of a plurality of battery packs of the battery system, wherein the status information comprises a first state of health (SoH) value corresponding to a condition of a first battery pack and a second SoH value corresponding to a condition of a second battery pack, wherein the status information from at least one of the battery packs is received via a communication channel;

determining, based on the first SoH value, a first virtual current, corresponding to energy discharged from first battery pack;

determining, based on the second SoH value, a second virtual current, corresponding to energy discharged from the second battery pack;

calculating, by a controller of the master battery pack, a system virtual output current corresponding to energy discharged from the battery system to an end device, wherein the calculation corresponds to a sum of the first virtual current provided from the first battery pack and the second virtual current provided from the second battery pack;

sending, by the master battery pack via the communication channel, a message comprising at least the system virtual output current value; and causing display, at the end device and based on the message received via the communication channel, of an indication of whether one or more of the system virtual output current, the first virtual current, or the second virtual current exceeds a threshold.

Embodiment #191. The method of Embodiment #190, wherein the indication of whether the one of the first virtual current or the second virtual current exceeds a threshold comprises a prediction that one of the first battery pack or the second battery pack will fail first.

Embodiment #192. The method of Embodiment #190, wherein the indication of whether the one of the first virtual current or the second virtual current exceeds a threshold comprises an indication that a corresponding battery pack meets or exceeds a maximum current threshold.

Embodiment #193. The method of Embodiment #190, wherein the first SoH value of the first battery pack corresponds to a relative health of battery cells in the first battery pack, wherein the relative health is based on one or more of:

internal resistance,
internal impedance;
battery storage capacity,
battery output voltage,
a number of charge-discharge cycles,
a temperature of a battery cell during previous uses,
total energy charged or discharged,
age of a battery cell, or
a combination thereof.

Embodiment #194. The method of Embodiment #190, further comprising:

determining, by the controller of the master battery pack and based on the first SoH value, a first impedance of the first battery pack based on the first SoH value;

determining, by the controller of the master battery pack and based on the second SoH value, a second impedance of the second battery pack; and calculating, by the controller of the master battery pack, the first virtual current value based on the first impedance of the first battery pack; and calculating, by the controller of the master battery pack, the second virtual current value based on the second impedance of the second battery pack.

Embodiment #195. The method of Embodiment #190, wherein determining the first virtual current able to be provided by the first battery pack and the second virtual current able to be provided by the second battery pack comprises:

determining, by the controller of the master battery pack, a first impedance of the first battery pack based on the first SoH value and a second impedance of the second battery pack based on the second SoH value.

Embodiment #196. The method of Embodiment #194, comprising determining, by the master battery pack, an impedance of each battery pack of the plurality of battery packs from a lookup table.

Embodiment #197. The method of Embodiment #194, comprising calculating, by the master battery pack, an impedance of each battery pack of the plurality of battery packs using an equation.

Embodiment #198. The method of Embodiment #190, wherein the first battery pack comprises the master battery pack.

Embodiment #199. The method of Embodiment #190, wherein each battery pack of the plurality of battery packs comprises a controller and a battery management system (BMS) and wherein the method comprises:

determining, periodically by the BMS of the first battery pack, the first SoH value; and determining, periodically by the BMS of the second battery pack, the second SoH value.

Embodiment #200. The method of Embodiment #190, comprising:

causing display, at the second battery pack and based on the message received via the communication channel, of an indication that the second virtual current exceeds a current threshold Embodiment #201. The method of Embodiment #190, comprising:

augmenting, based on a comparison of the first virtual current and the second virtual current, the message to include one of a first virtual current value or a second virtual current value.

Embodiment #202. The method of Embodiment #190, further comprising:

triggering, by the master pack and based on a comparison of one of the calculated first virtual current or the calculated second virtual current to the threshold, a preventative action comprising initiating a limp-home mode of operation for the battery system.

Embodiment #203. The method of Embodiment #190, further comprising:

triggering, by the master pack and based on a comparison of one of the calculated first maximum current or the calculated second maximum current to a threshold, a preventative action comprising disabling a corresponding battery pack.

Embodiment #204. The method of Embodiment #200, further comprising:
  enabling a spare battery pack.

Embodiment #205. A battery system comprising:
  a plurality of battery packs, each battery pack of the plurality of battery packs comprising:
    a controller;
    a communication interface;
    a battery management system (BMS); and memory storing instructions that, when executed by the controller, cause a battery pack of the plurality of battery packs to:
      receive, by a controller of a master battery pack of a battery system, status information from each battery pack of a plurality of battery packs of the battery system, wherein the status information comprises a first state of health (SoH) value corresponding to a condition of a first battery pack and a second SoH value corresponding to a condition of a second battery pack, wherein the status information from at least one of the battery packs is received via a communication channel;
      determine, based on the first SoH value, a first virtual current, corresponding to energy discharged from first battery pack;
      determine, based on the second SoH value, a second virtual current, corresponding to energy discharged from the second battery pack;
      calculate, by a controller of the master battery pack, a system virtual output current corresponding to energy discharged from the battery system to an end device, wherein the calculation corresponds to a sum of the first virtual current provided from the first battery pack and the second virtual current provided from the second battery pack;
      send, by the master battery pack via the communication channel, a message comprising at least the system virtual output current value; and
      cause display, at the end device and based on the message received via the communication channel, of an indication of whether one or more of the system virtual output current, the first virtual current, or the second virtual current exceeds a threshold.

Embodiment #206. The system of Embodiment #205, wherein the indication of whether the one of the first virtual current or the second virtual current exceeds a threshold comprises a prediction that one of the first battery pack or the second battery pack will fail first.

Embodiment #207. The system of Embodiment #205, wherein the indication of whether the one of the first virtual current or the second virtual current exceeds a threshold comprises an indication that a corresponding battery pack meets or exceeds a maximum current threshold.

Embodiment #208. The system of Embodiment #205, wherein the first SoH value of the first battery pack corresponds to a relative health of battery cells in the first battery pack, wherein the relative health is based on one or more of:
  internal resistance,
  internal impedance;
  battery storage capacity,
  battery output voltage,
  a number of charge-discharge cycles,
  a temperature of a battery cell during previous uses,
  total energy charged or discharged,
  age of a battery cell, or
  a combination thereof.

Embodiment #209. Computer readable media storing instructions that, when executed by a processor, cause a battery pack of a battery system to:
  receive, by a controller of a master battery pack of a battery system, status information from each battery pack of a plurality of battery packs of the battery system, wherein the status information comprises a first state of health (SoH) value corresponding to a condition of a first battery pack and a second SoH value corresponding to a condition of a second battery pack, wherein the status information from at least one of the battery packs is received via a communication channel;
  determine, based on the first SoH value, a first virtual current, corresponding to energy discharged from first battery pack;
  determine, based on the second SoH value, a second virtual current, corresponding to energy discharged from the second battery pack;
  calculate, by a controller of the master battery pack, a system virtual output current corresponding to energy discharged from the battery system to an end device, wherein the calculation corresponds to a sum of the first virtual current provided from the first battery pack and the second virtual current provided from the second battery pack;
  send, by the master battery pack via the communication channel, a message comprising at least the system virtual output current value; and
  cause display, at the end device and based on the message received via the communication channel, of an indication of whether one or more of the system virtual output current, the first virtual current, or the second virtual current exceeds a threshold.

In additional aspects, a battery system may comprise one or more battery packs. Each battery pack includes a battery management system in which one of the battery packs is flexibly configured as a master (e.g., primary) battery pack while the other battery packs are configured as slave (e.g., secondary) battery packs.

The battery management systems and methods described herein may be implemented in industrial and commercial vehicle applications, such as off-road utility vehicles, hybrid electric vehicles, battery-electric powered vehicles, burden carrier/tow tractors, forklift/pallet jacks, lawn and garden/outdoor power equipment, large mining equipment, automated guided vehicles, aerial work platforms, and other such applications. In addition, the systems and methods described herein may be implemented in other applications including, but not limited to cordless power tools (e.g., drills, saws, grinders, nail drivers, welders, and the like), aerospace/defense applications, appliances, and other such applications. Furthermore, the systems and methods described herein may be implemented in other applications including, but not limited to grid energy storage, solar-generated power storage systems, sustainably generated power storage systems, smart grid systems, telecom and data communication backup systems, uniform power supply (UPS) systems, server applications, and other such applications.

For example, in some industrial and commercial vehicle applications, a battery management system such as disclosed herein may desired to output a wide range of current—e.g., a high current when initially turning on an engine of the vehicle, however, less current during normal operation of the vehicle. The battery management system and methods may also, in some embodiments, include a limp home mode feature, as disclosed herein, to accommodate a failed battery in a large-format battery pack, such as in an industrial or commercial vehicle application. The battery management systems, including various battery pack configurations and one or more buses (e.g., a CAN bus), may integrated into the industrial and commercial vehicle application.

In another example, in some telecom and/or data communication backup systems and/or computer server applications, a battery management system such as disclosed herein may provide an alternative to lead acid battery installations that previously dominated these applications because of their low cost, straightforward scalability, accessible recycling infrastructure, and accessible manufacturers. In some embodiments, the battery management systems and methods disclosed herein provide high energy density, high rate of discharge capabilities, and low self-discharge characteristics that make for desirable integration into telecom and/or data communication backup systems, uniform power supply (UPS) systems, and/or computer server applications. For example, the aforementioned applications desire longer operational time frames that are made possible by the battery management system such as disclosed herein, which extend the usable life of batteries in the battery pack by implementing smart algorithms for charge, discharge, and balancing—e.g., smart converter balancing, start direct balancing, start staggered balancing, and others. In addition, the battery management systems and methods disclosed herein may be used in cooperation with, in some examples, technologies such as fuel cells, ultracapacitors, flywheels, and other electrochemical batteries for use in telecom/data communications backup applications.

In yet another example, in some grid energy storage systems, solar-generated power storage systems, sustainably generated power storage systems, smart grid systems, and/or uniform power supply (UPS) systems, a battery management system such as disclosed herein may optimize electricity grids and enable sustainable energy sources, such as wind and solar power, to be more economical. In one example, the system may be used to store solar energy received from photovoltaic panels and a bi-directional three-phase inverter system may be managed, in some embodiments, using the battery management system disclosed herein. The renewable energy storage system may include a plurality of batteries in a battery pack integrated into a rack mount chassis and enclosure. Solar integrators may use the disclosed battery management systems and methods with large-format battery chemistries to fill the needs of growing renewable energy storage requirements. While lead-acid, ultracapacitors, sodium sulfur, vanadium redox, flywheels, compressed air, fuel cells and pumped hydro have been used in solar energy storage applications, with the disclosed battery management systems and methods, solar integrators may conveniently use Lithium ion for large-format applications. In addition, solar integrators may desire ancillary services for the power markets that uses micro-pulses of energy to maintain the proper frequency of the current on the grid—e.g., frequency regulation, and advanced smart grid functionality such as micro grid operation, demand response, time shifting, and power dispatch. Lithium chemistry over previous battery technologies include weight reduction, volume/footprint reduction, longer cycle-life, ability to use a greater percent of capacity of lithium battery without shortening rated cycle life, faster charge times, and lower effective capacity loss at high rates of discharge. In some examples, an inverter and gateway interoperability may be coupled to the disclosed battery management systems to manage, distribute, and store energy within a smart grid. In some examples, the smart grid system may be housed in a mobile shipping container that is expandable.

In addition to grid energy storage systems, the battery management systems and methods disclosed herein may be integrated with off-grid power products suitable in consumer, recreational, automotive, maritime and/or industrial applications. In the automotive sector, auxiliary power units (APU) may be used for transportation, construction, and/or maintaining vital infrastructure. Battery APUs provides commercial vehicles with a rugged and dependable off-grid power source. Other off-grid power applications include maritime power, remote location power, traffic regulation, security surveillance and emergency power generators. Moreover, Battery APUs may be used for short and long-haul trucks, construction equipment, off-road transport (e.g., logging trucks), and buses. For example, commercial trucks may rely on Battery APUs for overnight comfort (e.g., air conditioning/heat/accessory) loads. For several off-grid applications, reliability is a major concern as failure and/or downtime is exceedingly costly With some embodiments, the term "large-format" encompasses medium-format battery embodiments and use cases. For example, medium-scale and large-scale applications are embodied by the numerous descriptions herein.

Although many of the systems and methods described herein reference Lithium ion battery storage chemistry, the disclosure is not so limited. In many instances, a person of ordinary skill in the art will appreciate that other major chemistries for rechargeable batteries may be appropriated substituted without substantially departing from the spirit of the solution: Lithium-ion (Li-ion), Nickel Cadmium (Ni—Cd), Nickel-Metal Hydride (Ni-MH), Lead-Acid, and other chemistries. With some embodiments, the battery management system disclosed herein may be included with these technology batteries to provide battery protection, provide improved efficiency, and provide a better user experience than previous battery technologies. Variants of the lithium cobalt cathode, such as nickel cobalt aluminum (NCA) and nickel manganese cobalt (NMC), may be desirable in electric vehicles and other applications. Other new cathode chemistries, such as lithium manganese spinel (LMO) and lithium iron phosphate (LFP), may be used where appropriate. Moreover, large-format battery packs offer lower system integration costs because, inter alia, it enables a reduced number of battery interconnections, further improving the reliability of the battery pack and providing for a much higher value proposition.

Further, combinations of battery packs may comprise battery packs sharing a common battery chemistry (e.g., all Li-ion or all Ni—Cd or the like). Alternatively, combinations of battery packs may comprise different battery chemistries. The battery packs of different battery chemistries may be selected at random or may be selected to provide a collective functionality based on the combination of functions of battery chemistries of the disparate battery packs. For example, a first battery pack having a first type of battery chemistry (e.g., a chemistry that is able to provide a high instantaneous current but cannot store significant energy) may be combined with a second battery pack having a second type of battery chemistry (e.g., a chemistry that stores significant energy but cannot provide high peak current) such that the combination of battery packs may provide a high initial current from the first battery pack and then a sustained, albeit lower, current from the second battery pack. Other combinations of aspects of different battery chemistries are possible and considered within the scope of this disclosure.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A battery pack comprising:
   one or more battery cells;
   a controller;
   a first external power terminal;
   a second external power terminal;
   one or more switches connected in series between the first external power terminal and the one or more battery cells;
   a buck converter circuit;
   a bypass circuit comprising a first bypass terminal connected to the first external power terminal, a second bypass terminal connected to the second external power terminal, and a gate bypass terminal connected to the controller;
   a first power pathway between the first external power terminal and the second external power terminal in which a first voltage difference is provided across the one or more battery cells;
   a second power pathway between the first external power terminal and the second external power terminal in which a second voltage difference is provided across the one or more battery cells, wherein the second voltage difference is less than the first voltage difference, and wherein the second power pathway includes the buck converter circuit that reduces the first voltage difference to the second voltage difference;
   a third power pathway between the first external power terminal and the second external power terminal, wherein the third power pathway includes the bypass circuit,
   wherein the controller is configured to selectively enable one of the first power pathway, the second power pathway, and the third power pathway.

2. The battery pack of claim 1,
   wherein, based on the controller controlling the bypass circuit to electrically connect the first external power terminal and the second external power terminal, a voltage difference between the first external power terminal and the second external power terminal increases with an increase in a temperature of the battery pack.

3. The battery pack of claim 1, wherein the bypass circuit further comprises:
   a positive temperature control (PTC) thermistor with a first terminal and a second terminal; and
   a switch,
   wherein the switch is connected in series with the PTC thermistor between the first external power terminal and the second external power terminal.

4. The battery pack of claim 1, wherein the bypass circuit further comprises:
   a switch connected between a first node and the second external power terminal, wherein the switch comprises a control terminal;
   a resistor connected between the controller and the control terminal.

5. The battery pack of claim 4,
   wherein the switch further comprises a first conduction terminal and a second conduction terminal, and
   wherein the bypass circuit further comprises:
      a second switch comprising a second conduction terminal and a second switch control terminal, wherein the second switch control terminal is connected to the first node;
      a third switch comprising a third conduction terminal and a third switch control terminal, wherein the third switch control terminal is connected to the first node; and
      a diode comprising is connected in series between the second conduction terminal and the third conduction terminal.

6. The battery pack of claim 5, wherein the bypass circuit further comprises:
   a fourth switch comprising a fourth conduction path connected between the first external power terminal and the second external power terminal, wherein the fourth switch further comprises a fourth control terminal connected to a terminal of the diode and the second conduction terminal.

7. The battery pack of claim 6, wherein the bypass circuit further comprises:
   a fifth switch comprising a fifth conduction path connected in series with the fourth conduction path and one of the first external power terminal or the second external power terminal.

8. The battery pack of claim 5, wherein the bypass circuit further comprises:
   a second diode, wherein the second diode is connected in series between a voltage supply and a fourth conduction terminal of the second switch.

9. The battery pack of claim 1, further comprising:
   an external control terminal electrically coupled to the controller,
   wherein the controller is further configured to selectively control the bypass circuit based on commands received via the external control terminal.

10. The battery pack of claim 1, further comprising:
    a first pathway/second pathway switch configured to switch between the first power pathway and the second power pathway,
    wherein the controller is configured to:
       determine a state of charge (SOC) of the one or more battery cells, and
       control, based on a determination of the SOC, the first pathway/second pathway switch and the gate bypass terminal.

11. A method comprising;
    connecting, in series, a first battery pack with a second battery pack, wherein the first battery pack has a first high voltage terminal and a first low voltage terminal, wherein the second battery pack has a second high voltage terminal and a second low voltage terminal, and wherein the connecting comprises connecting the first low voltage terminal to the second high voltage terminal;
    determining a state of charge (SOC) of each of the first battery pack and the second battery pack;
    based on the SOC of the first battery pack being higher than the SOC of the second battery pack, controlling a first bypass circuit of the first battery pack to electrically connect, via the first bypass circuit, the first high voltage terminal with the first low voltage terminal;

comparing the SOC of the second battery pack to a first threshold; and based on the comparison of the SOC of the second battery pack to the first threshold, controlling the second battery pack to charge battery cells of the second battery pack at one of a first voltage level or a second voltage level, wherein the first voltage level is higher than the second voltage level.

12. The method of claim 11, wherein, based on the connection, via the first bypass circuit, between the first high voltage terminal and the first low voltage terminal, a resistance between the first high voltage terminal and the first low voltage terminal changes based on a resistance of a positive temperature control (PTC) thermistor within the first bypass circuit.

13. The method of claim 11, further comprising:

based on a determination that the SOC of the second battery pack is below the first threshold, charging the battery cells of the second battery pack at the first voltage level.

14. The method of claim 13, wherein charging the battery cells of the second battery pack at the first voltage level comprises electrically connecting one or more switches to permit voltage at the second high voltage terminal to charge the battery cells.

15. The method of claim 11, further comprising:

based on a determination that the SOC of the second battery pack is above the first threshold, charging the battery cells of the second battery pack at the second voltage level.

16. The method of claim 15, wherein charging the battery cells of the second battery pack at the second voltage level comprises electrically connecting one or more switches to permit voltage from the second high voltage terminal to be reduced, via a buck converter, to charge the battery cells at the second voltage level.

* * * * *